United States Patent
Katayama et al.

(10) Patent No.: US 6,260,051 B1
(45) Date of Patent: Jul. 10, 2001

(54) RECORDING MEDIUM AND CHARACTER STRING COLLATING APPARATUS FOR FULL-TEXT CHARACTER DATA

(75) Inventors: Osamu Katayama, Fujisawa; Takamasa Oyama, Kamakura; Chuichi Kikuchi, Ichikawa; Tomoko Fujita, Tokyo; Yasuyo Shirasaki, Iwamizawa, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/114,284

(22) Filed: Jul. 13, 1998

(30) Foreign Application Priority Data

Jul. 11, 1997 (JP) .................................................. 9-186329
Jan. 13, 1998 (JP) ................................................. 10-004535
Jan. 13, 1998 (JP) ................................................. 10-004556

(51) Int. Cl.[7] ........................... G06F 17/21; G06F 17/22; G06F 17/27

(52) U.S. Cl. ............................... 707/536; 707/531; 704/7

(58) Field of Search ................................. 707/530, 531, 707/536; 704/7

(56) References Cited

U.S. PATENT DOCUMENTS

| 5,675,818 | * | 10/1997 | Kennedy | 704/8 |
| 5,706,496 | * | 1/1998 | Noguchi et al. | 707/5 |
| 5,715,446 | * | 2/1998 | Kinoshita et al. | 707/5 |
| 5,867,812 | * | 2/1999 | Sassano | 704/10 |
| 5,870,750 | * | 2/1999 | Oyama et al. | 707/101 |
| 5,873,111 | * | 2/1999 | Edberg | 707/536 |

FOREIGN PATENT DOCUMENTS 9259140  10/1997  (JP) .

OTHER PUBLICATIONS

Kikuchi, Chuichi. "A Fast Full–Text Search Method for Japanese Text Database." . The Transactions of the Institute of Electronics, Information and Communication Engineering, vol. J75–D–I, No. 9. ©1992. pp. 836–846 (w/English translation).*

* cited by examiner

Primary Examiner—Joseph H. Feild
Assistant Examiner—Michael J. Perkins
(74) Attorney, Agent, or Firm—Lowe Hauptman Gopstein Gilman & Berner

(57) ABSTRACT

All two-character chains including two general characters and all three-character chains including one special character between two general characters are detected from a registration character string in which a large number of special characters not having any meaning are frequently arranged, or all two-character chains including two general or symbolic characters are detected from a converted registration character string produced by changing each special character of the registration character string to one type of symbolic character determined in correspondence to one general character adjacent to the special character. Also, occurrence frequencies of the general or symbolic characters of each chain are counted and stored in a recording medium with the registration character chains. When a retrieval character chain is input, occurrence frequencies of particular character chains corresponding to all retrieval character chains detected from the retrieval character string in the same manner are read out from the recording medium and are collated with each other, and a particular character string agreeing with the retrieval character chain is retrieved from the registration character string. Because an occurrence frequency of any special character is not counted or the special characters are changed to various types of symbolic characters, a recording area required for the occurrence frequencies of the registration character chains can be reduced.

112 Claims, 46 Drawing Sheets

| TWO-CHARACTER CHAINS | OCCURRENCE FREQUENCY SETS |
|---|---|
| "A B" | (1, 1), |
| "C D" | ($N_1$, $N_2$), |
| "D æ" | ($N_2$, $N_3$), |
| "æ E" | ($N_3$, $N_4$), |
| "E F" | ($N_4$, $N_5$), |
| "G H" | ($N_6$, $N_7$), |

| TWO-CHARACTER CHAINS | OCCURRENCE FREQUENCY SETS | | | |
|---|---|---|---|---|
| "A B" | (1, 1), | ----- | ----- | ----- |
| "C D" | ----- | ($N_1$, $N_2$), | ($N_a$, $N_b$), | ----- ,($N_x$, $N_y$) |
| "D æ" | ----- | ($N_2$, $N_3$), | ----- | ----- |
| "æ E" | ----- | ($N_3$, $N_4$), | ----- | ----- |
| "E F" | ----- | ($N_4$, $N_5$), | ----- | ----- |
| ⋮ | ⋮ | | | |
| "G H" | ----- | ($N_6$, $N_7$), | ----- | ----- |

| TWO-CHARACTER CHAIN TYPES | | OCCURRENCE FREQUENCY SETS |
|---|---|---|
| FORE CHARACTER | REAR CHARACTER | |
| "A B" | | (1, 1), -------------------- |
| "C D" | | ---------- ($N_1$, $N_2$), --------- |
| "E F" | | ---------- ($N_3$, $N_4$), --------- |
| ⋮ | | ⋮ |
| "G H" | | ---------- ($N_5$, $N_6$), --------- |

| THREE-CHARACTER CHAIN TYPES | | OCCURRENCE FREQUENCY SETS |
|---|---|---|
| FORE CHARACTER | REAR CHARACTER | |
| "D æ E" | | ---------- ($N_2$, $N_3$), --------- |
| ⋮ | | ⋮ |

| PARTICULAR CHAIN TYPES | PARTICULAR OCCURRENCE FREQUENCY SETS |
|---|---|
| "C D" | ($N_1$, $N_2$), |
| "D æ E" | ($N_2$, $N_3$), |
| "E F" | ($N_3$, $N_4$), |

⇩ CONVERSION

| GENERAL CHARACTER TYPES | SYMBOLIC CHARACTER TYPES |
|---|---|
| E | E^ |
| F | F^ |
| C, D | C^ |
|  |  |
| Z | Z^ |

FIG. 7C

| TWO-CHARACTER CHAIN TYPES (FORE, REAR) | OCCURRENCE FREQUENCY SETS |
|---|---|
| "A B" | (1, 1), ------ |
| "C D" | ------ ($N_1$, $N_2$), ------ |
| "D E^" | ------ ($N_2$, $N_3$), ------ |
| "E^ E" | ------ ($N_3$, $N_4$), ------ |
| "E F" | ------ ($N_4$, $N_5$), ------ |
| ⋮ | ⋮ |
| "G H" | ------------ , ($N_6$, $N_7$) |

CONVERSION

| PARTICULAR TWO-CHARACTER CHAIN TYPES (FORE, REAR) | PARTICULAR OCCURRENCE FREQUENCY SETS |
|---|---|
| "C D" | $(N_1, N_2)$, |
| "D E^" | $(N_2, N_3)$, |
| "E^ E" | $(N_3, N_4)$, |
| "E F" | $(N_4, N_5)$, |

⇩ CONVERSION

| GENERAL CHARACTER TYPES | SYMBOLIC CHARACTER TYPES |
|---|---|
| A | A^ |
| B | B^ |
| C | C^ |
| D | D^ |
| E | E^ |
| F | F^ |
| ⋮ | ⋮ |
| Z | Z^ |

| TWO-CHARACTER CHAIN TYPES (FORE, REAR) | OCCURRENCE FREQUENCY SETS |
|---|---|
| "A B" | (1, 1), ------------------------------ |
| "C D" | ---------- (N1, N2), -------------- |
| "D D^" | ---------- (N2, N3), -------------- |
| "D^ E^" | ---------- (N3, N4), -------------- |
| "E^ E" | ---------- (N4, N5), -------------- |
| "E F" | ---------- (N5, N6), -------------- |
| ⋮ | ⋮ |
| "G H" | ------------------------------ ,(N7, N8) |

FIG. 11A
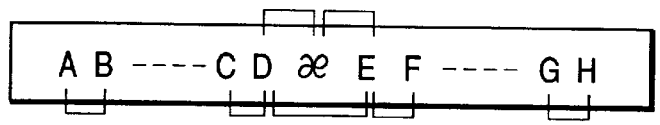
FIG. 11B
| TWO-CHARACTER CHAIN TYPES (FORE, REAR) | OCCURRENCE FREQUENCY SETS |
|---|---|
| "A B" | (1, 1), ---------------------------- |
| "C D" | ------ ($N_1$, $N_2$), ------------------ |
| "D E" | ------ ($N_2$, $N_3$), ------------------ |
| "D æ" | ------ ($N_2$, $N_c$), ------------------ |
| "æ E" | ------ ($N_c$, $N_3$), ------------------ |
| "E F" | ------ ($N_3$, $N_4$), ------------------ |
| : | : |
| "G H" | ---------------------- ($N_5$, $N_6$), |
FIG. 11C
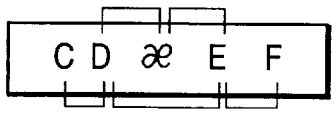
FIG. 11D
| PARTICULAR TWO-CHARACTER CHAIN TYPES (FORE, REAR) | PARTICULAR OCCURRENCE FREQUENCY SETS |
|---|---|
| "C D" | ($N_1$, $N_2$), |
| "D E" | ($N_2$, $N_3$), |
| "D æ" | ($N_2$, $N_c$), |
| "æ E" | ($N_c$, $N_3$), |
| "E F" | ($N_3$, $N_4$), |

| TWO-CHARACTER CHAIN TYPES (FORE, REAR) | OCCURRENCE FREQUENCY SETS |
|---|---|
| "A B" | (1, 1), ------------------------------ |
| "C D" | ---------- ($N_1$, $N_2$), ---------------- |
| "E F" | ---------- ($N_3$, $N_4$), ---------------- |
| ⋮ | ⋮ |
| "G H" | ------------------------------ ,($N_5$, $N_6$) |

| THREE-CHARACTER CHAIN TYPES (FORE, SPECIAL, REAR) | TWO-CHARACTER CHAIN TYPES (FORE, REAR) | OCCURRENCE FREQUENCY SETS |
|---|---|---|
| "D æ E" | "D æ" | -------- ($N_2$, 0), -------- |
|  | "æ E" | -------- (0, $N_3$), -------- |
| ⋮ | ⋮ | ⋮ |

| PARTICULAR THREE-CHARACTER CHAIN TYPES (FORE, SPECIAL, REAR) | PARTICULAR TWO-CHARACTER CHAIN TYPES (FORE, REAR) | PARTICULAR OCCURRENCE FREQUENCY SETS |
|---|---|---|
| | "C D" | ($N_1$, $N_2$) |
| "D æ E" | "D æ" | ($N_2$, 0) |
| | "æ E" | (0, $N_3$) |
| | "E F" | ($N_3$, $N_4$) |

FIG. 15A
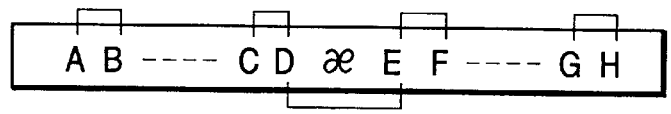
FIG. 15B
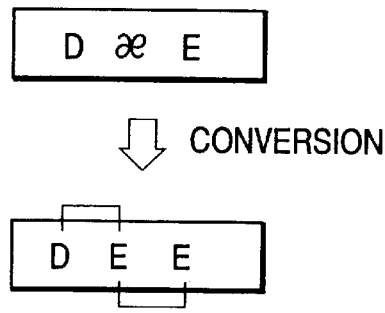
CONVERSION
FIG. 15C
| TWO-CHARACTER CHAIN TYPES (FORE, REAR) | OCCURRENCE FREQUENCY SETS |
|---|---|
| "A B" | (1, 1), -------------------- |
| "C D" | ---------- ($N_1$, $N_2$), ---------- |
| "D E" | ---------- ($N_2$, $N_3$), ---------- |
| "E E" | ---------- ($N_3$, $N_3$), ---------- |
| "E F" | ---------- ($N_3$, $N_4$), ---------- |
| ⋮ | ⋮ |
| "G H" | ---------------------- ,($N_5$, $N_6$) |

FIG. 15D
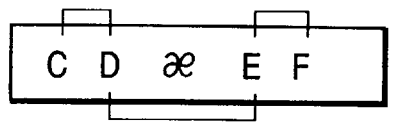
FIG. 15E
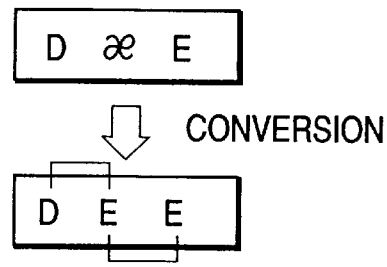
CONVERSION
FIG. 15F
| PARTICULAR TWO-CHARACTER CHAIN TYPES (FORE, REAR) | PARTICULAR OCCURRENCE FREQUENCY SETS |
|---|---|
| "C D" | $(N_1, N_2)$ |
| "D E" | $(N_2, N_3)$ |
| "E E" | $(N_3, N_3)$ |
| "E F" | $(N_3, N_4)$ |

| A B æ C D æ A B æ C E æ ----- |

| REGISTRATION TWO-CHARACTER CHAINS "FORE, REAR" | OCCURRENCE FREQUENCY SETS |
|---|---|
| "A B" | ($N_1$, $N_2$) |
| "B æ" | ($N_2$, 1) |
| "æ C" | (1, $N_3$) |
| "C D" | ($N_3$, $N_4$) |
| "D æ" | ($N_4$, 2) |
| "æ A" | (2, $N_1$+1) |
| "A B" | ($N_1$+1, $N_2$+1) |
| "B æ" | ($N_2$+1, 1) |
| "æ C" | (1, $N_3$+1) |
| "C E" | ($N_3$+1, $N_5$) |
| "E æ" | ($N_5$, 2) |
| ⋮ | ⋮ |

| "B æ" | ($N_2$, 1) |
|---|---|
| "B æ" | ($N_2$+1, 1) |
| ⋮ | ⋮ |

| "D æ" | ($N_4$, 2) |
|---|---|
| "E æ" | ($N_5$, 2) |
| ⋮ | ⋮ |

| "æ C" | (1, $N_3$) |
|---|---|
| "æ C" | (1, $N_3$+1) |
| ⋮ | ⋮ |

| "æ A" | (2, $N_1$+1) |
|---|---|
| ⋮ | ⋮ |

| DUPLICATION NUMBER FOR "B æ" | DUPLICATION NUMBER FOR "æ C" |
|---|---|
| 1 | 1 |

FIG. 19A
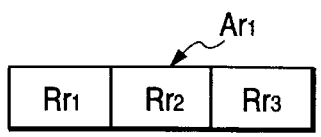
FIG. 19B
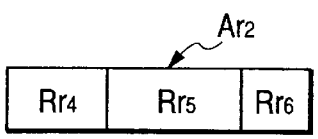
FIG. 19C
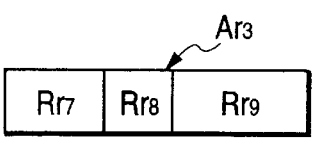
FIG. 19D
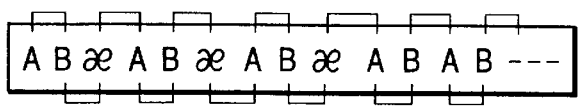
FIG. 19E
| TWO-CHARACTER CHAINS "FORE, REAR" | Nd | OCCURRENCE FREQUENCY SETS |
|---|---|---|
| "A B" | Nd0 | ($N_1$, 0) |
| "B æ" | Nd0 | (0, 1) |
| "æ A" | Nd0 | (1, 0) |
| "A B" | Nd0 | (0, 0) |
| "B æ" | Nd0 | (0, 2) |
| "æ A" | Nd0 | (2, 0) |
| "A B" | Nd0 | (0, 0) |
| "B æ" | Nd0 | (0, 3) |
| "æ A" | Nd0 | (3, 0) |
| "A B" | Nd0 | (0, $N_2$) |
| "B A" | Nd0 | ($N_2$, $N_1$+1) |
| "A B" | Nd0 | ($N_1$+1, $N_2$+1) |
| ⋮ | ⋮ | ⋮ |

FIG. 19F
CHAIN TYPE "A B"
| Nd0 | N₁ | 0 |
|---|---|---|
| Nd0 | 0 | 0 |
| Nd0 | 0 | 0 |
| Nd0 | 0 | N₂ |
| Nd0 | N₁+1 | N₂+1 |
| ⋮ | ⋮ | ⋮ |
FIG. 19G
CHAIN TYPE "B A"
| Nd0 | N₂ | N₁+1 |
|---|---|---|
| ⋮ | ⋮ | ⋮ |
FIG. 19I
CHAIN TYPE "æ A"
| Nd0 | 1 | 0 |
|---|---|---|
| Nd0 | 2 | 0 |
| Nd0 | 3 | 0 |
| ⋮ | ⋮ | ⋮ |
FIG. 19H
CHAIN TYPE "B æ"
| Nd0 | 0 | 1 |
|---|---|---|
| Nd0 | 0 | 2 |
| Nd0 | 0 | 3 |
| ⋮ | ⋮ | ⋮ |
FIG. 19J
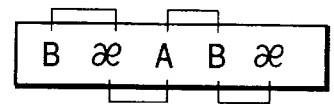
FIG. 19K
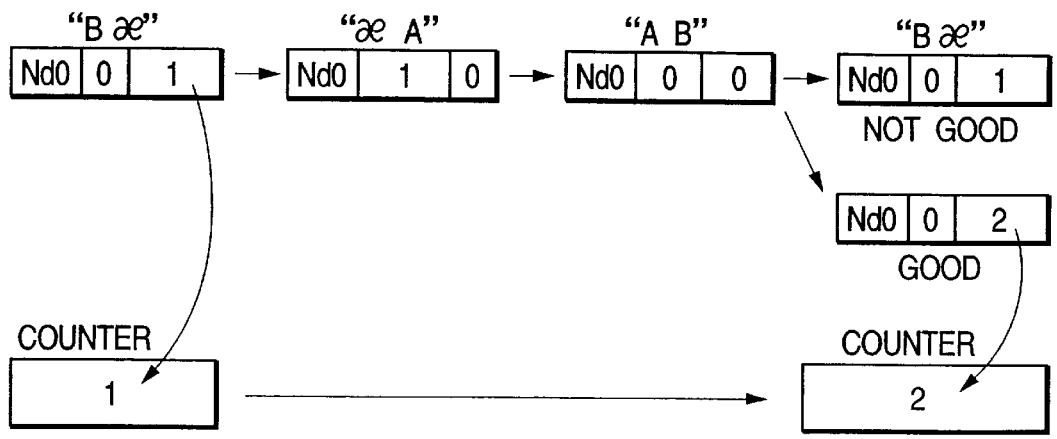

FIG. 22A
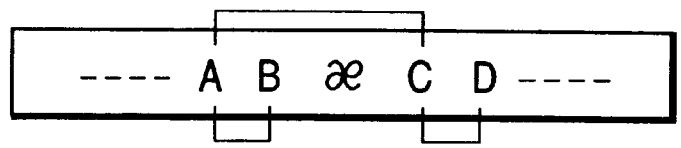
FIG. 22B
| TWO-CHARACTER CHAIN TYPES "FORE, REAR" | OCCURRENCE FREQUENCY SETS |
|---|---|
| "A B" | -------- ($N_1$, $N_2$), -------- |
| "A C" | -------- ($N_1$, $N_3$), -------- |
| "C D" | -------- ($N_3$, $N_4$), -------- |
| ⋮ | ⋮ |
FIG. 22C
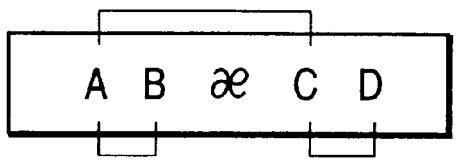

| TWO-CHARACTER CHAIN TYPES "FORE, REAR" | POSITION NUMBERS |
|---|---|
| "A B" | ---------- N, ---------- |
| "C D" | ---------- N+2, ---------- |
| ⋮ | ⋮ |

| THREE-CHARACTER CHAIN TYPES "FORE, SPECIAL, REAR" | POSITION NUMBERS |
|---|---|
| B æ C | -------- N+1, -------- |
| ⋮ | ⋮ |

| CHAIN TYPES "FORE, REAR" | DISPLACEMENT VALUES | POSITION NUMBERS |
|---|---|---|
| "A B" | 1 | --- N, --- |
| "B C" | 2 | -- N+1, -- |
| "C D" | 1 | -- N+3, -- |
| ⋮ | ⋮ | ⋮ |

FIG. 26A
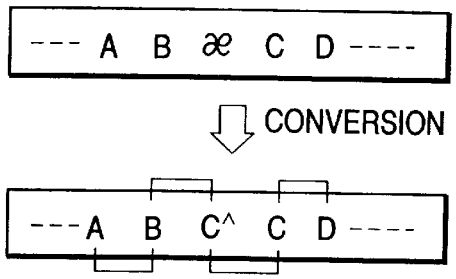
FIG. 26B
| GENERAL CHARACTER TYPES | SYMBOLIC CHARACTER TYPES |
|---|---|
| C | C^ |
| D | D^ |
| A, B | A^ |
| ⋮ | ⋮ |
FIG. 26C
| TWO-CHARACTER CHAIN TYPES "FORE, REAR" | POSITION NUMBERS |
|---|---|
| "A B" | ------ N, ----- |
| "B C^" | ----- N+1, ----- |
| "C^ C" | ----- N+2, ----- |
| "C D" | ----- N+3, ----- |
| ⋮ | ⋮ |
FIG. 26D
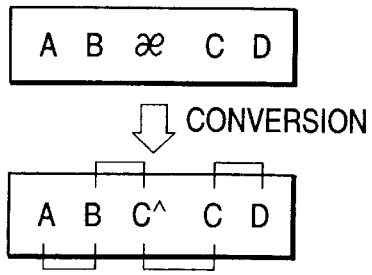
FIG. 26E
| TWO-CHARACTER CHAIN TYPES | DISPLACEMENT VALUES | POSITION NUMBERS |
|---|---|---|
| "A B" | 1 | --- N,--- |
| "B C^" | 1 | --N+1,-- |
| "C^ C" | 1 | --N+2,-- |
| "C D" | 1 | --N+3,-- |
| ⋮ | ⋮ | ⋮ |

FIG. 28A
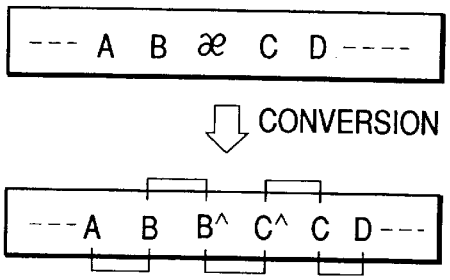
FIG. 28B
| GENERAL CHARACTER TYPES | SYMBOLIC CHARACTER TYPES |
|---|---|
| A | A^ |
| B | B^ |
| C | C^ |
| ⋮ | ⋮ |
FIG. 28C
| TWO-CHARACTER CHAIN TYPES "FORE, REAR" | POSITION NUMBERS |
|---|---|
| "A B" | ------ N, ----- |
| "B B^" | ----- N+1, ----- |
| "B^ C^" | ----- N+2, ----- |
| "C^ C" | ----- N+3, ----- |
| "C D" | ----- N+4, ----- |
| ⋮ | ⋮ |
FIG. 28D
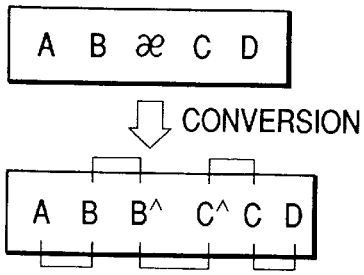
FIG. 28E
| TWO-CHARACTER CHAIN TYPES | DISPLACEMENT VALUES | POSITION NUMBERS |
|---|---|---|
| "A B" | 1 | --- N, --- |
| "B B^" | 1 | --N+1,-- |
| "B^ C^" | 1 | --N+2,-- |
| "C^ C" | 1 | --N+3,-- |
| "C D" | 1 | --N+4,-- |
| ⋮ | ⋮ | ⋮ |

FIG. 30A
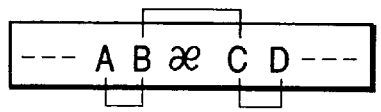
FIG. 30B
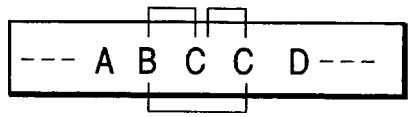
FIG. 30C
| TWO-CHARACTER CHAIN TYPES "FORE, REAR" | POSITION NUMBERS |
|---|---|
| "A B" | --- N, --- |
| "B C" | -- N+1, -- |
| "C D" | -- N+2, -- |
| ⋮ | ⋮ |
FIG. 30D
| TWO-CHARACTER CHAIN TYPES "FORE, REAR" | POSITION NUMBERS |
|---|---|
| "C C" | -- N+2, -- |
| ⋮ | ⋮ |

FIG. 30E
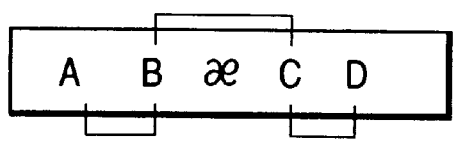
FIG. 30F
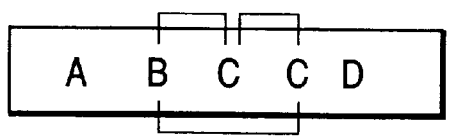
FIG. 30G
| TWO-CHARACTER CHAIN TYPES "FORE REAR" | DISPLACEMENT VALUES | POSITION NUMBERS |
|---|---|---|
| "A B" | 1 | ---N,--- |
| "B C" | 1 | ---N+1,--- |
| "C C" | 0 | ---N+2,--- |
| "C D" | 1 | ---N+2,--- |
| ⋮ | ⋮ | ⋮ |

FIG. 32A
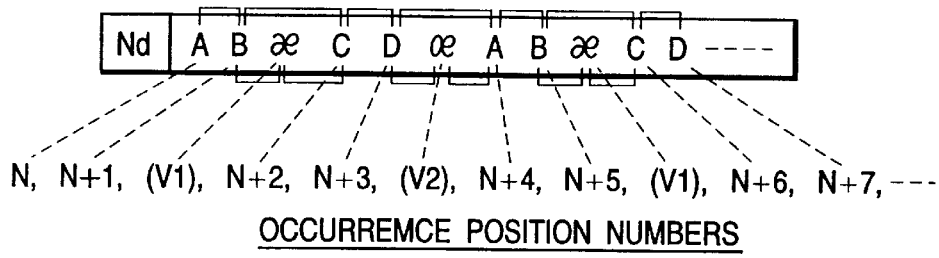
OCCURREMCE POSITION NUMBERS
FIG. 32B
| TWO-CHARACTER CHAIN TYPES "FORE, REAR" | POSITION NUMBERS | DOCUMENT NUMBERS |
|---|---|---|
| "A B" | N | Nd |
| "A B" | N+4 | Nd |
| ⋮ | ⋮ | ⋮ |
| "B C" | N+1 | Nd |
| "B æ" | V1 | Nd |
| "B C" | N+5 | Nd |
| "B æ" | V1 | Nd |
| ⋮ | ⋮ | ⋮ |
| "C D" | N+2 | Nd |
| "C D" | N+6 | Nd |
| ⋮ | ⋮ | ⋮ |
| "æ C" | N+2 | Nd |
| "æ C" | N+6 | Nd |
| ⋮ | ⋮ | ⋮ |
| "D A" | N+3 | Nd |
| "D œ" | V2 | Nd |
| ⋮ | ⋮ | ⋮ |
| "œ A" | N+4 | Nd |
| ⋮ | ⋮ | ⋮ |
FIG. 32C
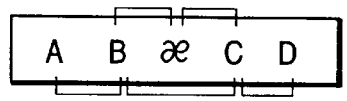
FIG. 32D
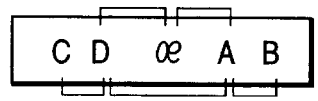

FIG. 34A

| | DOCUMENT NUMBERS | TWO-CHARACTER CHAINS | POSITION NUMBERS Tc |
|---|---|---|---|
| 1ST | M | "Cg *" | |
| 2ND | M | "Cg *" | |
| ⋮ | ⋮ | ⋮ | |
| (N+1)TH | M | "Cg^ *" | |
| (N+2)TH | M | "Cg^ *" | |
| | ⋮ | ⋮ | |

Fs

| Cg^ | N+1 |
|---|---|

FIG. 34B

| M | ---- A B æ C D C D ----- |
|---|---|

⇩ CONVERSION

| M | --- A B  C^ D C D ----- |
|---|---|

FIG. 34C

| M | --- N, N+1, N+2, N+3, N+4, N+5 --- |
|---|---|

FIG. 36A
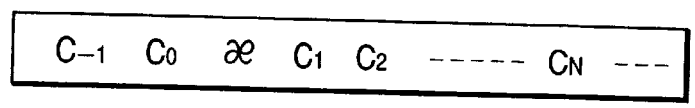
⇩ CONVERSION
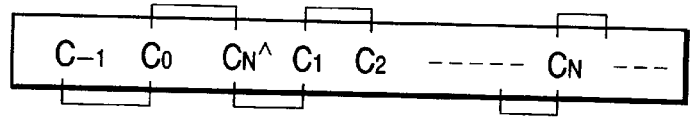
FIG. 36B
| GENERAL CHARACTER TYPES | SYMBOLIC CHARACTER TYPES |
|---|---|
| A | A^ |
| B | B^ |
| C | C^ |
| ⋮ | ⋮ |
FIG. 36C
| TWO-CHARACTER CHAIN TYPES "FORE, REAR" | OCCURRENCE FREQUENCY SETS |
|---|---|
| "$C_{-1}$ $C_0$" | --- ($N_1$, $N_2$), --- |
| "$C_0$ $C_N$^" | --- ($N_2$, $N_3$), --- |
| "$C_N$^ $C_1$" | --- ($N_3$, $N_4$), --- |
| "$C_1$ $C_2$" | --- ($N_4$, $N_5$), --- |
| ⋮ | ⋮ |
| "$C_{N-1}$ $C_N$" | --- ($N_6$, $N_7$), --- |
| ⋮ | ⋮ |
FIG. 36D
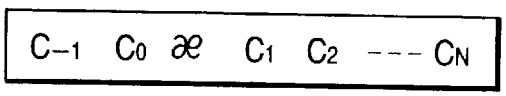
⇩ CONVERSION
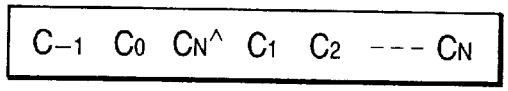

FIG. 38

| TWO-CHARACTER CHAIN TYPES "FORE, REAR" | POSITION NUMBERS |
|---|---|
| "$C_{-1}\ C_0$" | ---- N, ---- |
| "$C_0\ C_N{}^{\wedge}$" | --- N+1, ---- |
| "$C_N{}^{\wedge}\ C_1$" | --- N+2, ---- |
| "$C_1\ C_2$" | --- N+3, ---- |
| ⋮ | ⋮ |
| "$C_{N-1}\ C_N$" | ---- 2N, ---- |
| ⋮ | ⋮ |

RECORDING MEDIUM AND CHARACTER STRING COLLATING APPARATUS FOR FULL-TEXT CHARACTER DATA

BACKGROUND OF THE INVENTION

1. Field of the Invention

The present invention relates generally to a recording medium and a character string collating apparatus used for the retrieval of a character string written in a text in an information retrieval processing field, and more particularly to a recording medium, in which character data of a full text are recorded to be possible to be read out, and a character string collating apparatus in which a retrieval character string is collated with a registration character text to detect a particular character string agreeing with the retrieval character string from the registration character string by using the character data of the full text recorded in the recording medium.

2. Description of the Related Art

PREVIOUSLY PROPOSED ART

FIG. 1A shows an example of a registration character string extracted from a text, FIG. 1B shows a table of two-character chains extracted from the registration character string, FIG. 1C shows a table of two-character chain types in which at least one occurrence frequency set corresponds to each two-character chain type, and FIG. 1D shows an example of a retrieval character string input by a user to retrieve a particular character string agreeing with the retrieval character string from the registration character string of the text.

As shown in FIG. 1A, when a user intends to retrieve a particular character string agreeing with a retrieval character string from a text according to a conventional character string collating method, a registration character string "AB---CDæEF---GH" extracted from the text is decomposed into a plurality of two-character chains "AB",-------, "CD", "Dæ", "æE", "EF",-------, and "GH". Here, each two-character chain is composed of a fore character and a rear character arranged in the order of arranging the characters in the registration character string, and a letter "æ" denotes a special character inserted into a string of characters to divide the string of characters into a first divided string of characters expressing a first meaning and a second divided string of characters expressing a second meaning. The special character frequently occurs in a text. Also, the special character is not limited to a character. For example, a space frequently occurring in a text written in Hangul language can be defined as one type of special character, and a space frequently occurring in a text written in English to divide words can be also defined as one type of special character.

An occurrence frequency of each character included in the two-character chains is counted. The occurrence frequency of one character C1 placed in a prescribed position of the registration character string is defined as the number of characters of the same type as that of the character C1 existing in a character area between the starting position of the registration character string and the prescribed position of the registration character string. As shown in FIG. 1B, an occurrence frequency of the fore character "C" of the first two-character chain "CD" is indicated by N1, an occurrence frequency of the rear character "D" of the first two-character chain "CD" is indicated by N2, and the occurrence frequencies N1 and N2 for the first two-character chain are indicated by an occurrence frequency set (N1, N2). Also, occurrence frequencies of the two characters "D" and "æ" of the second two-character chain "Dæ" are indicated by N2 and N3, occurrence frequencies of the two characters "æ" and "E" of the third two-character chain "æE" are indicated by N3 and N4, and occurrence frequencies of the two characters "E" and "F" of the fourth two-character chain "EF" are indicated by N4 and N5. The occurrence frequency of the rear character of a fore two-character chain agrees with that of the fore character of a rear two-character chain following the fore two-character chain in the registration character string.

However, in practical use, because a number of two-character chains respectively having the same type of fore character and the same type of rear character exist in the registration character string, when a plurality of two-character chains respectively having the same type of fore character and the same type of rear character is called a two-character chain type, a plurality of occurrence frequency sets correspond to each two-character chain type. For example, as shown in FIG. 1C, when occurrence frequencies of the fore character "C" of the two-character chain "CD" occurring many times in the registration character string are N1, Na,--, and Nx and occurrence frequencies of the rear character "D" of the two-character chain "CD" are N2, Nb,--, and Ny, a plurality of occurrence frequency sets (N1,N2), (Na,Nb),-- and (Nx,Ny) correspond to the two-character chain type "CD" in a table of two-character chain types.

Also, when a retrieval character string "CDæEF" shown in FIG. 1D is input by a user to retrieve a particular character string agreeing with the retrieval character string from the registration character string of the text, the retrieval character string is decomposed into a plurality of retrieval two-character chains "CD", "Dæ", "æE" and "EF".

In the conventional character string collating method, a plurality of particular two-character chain types of the registration character string agreeing with the retrieval two-character chains of the retrieval character string are detected in the order of arranging the retrieval two-character chains in the retrieval character string, and each particular two-character chain type of the registration character string is searched for one occurrence frequency set of the particular two-character chain type on condition that the occurrence frequency of the fore character of the particular two-character chain type Tc1 agrees with that of the rear character of another particular two-character chain type Tc2 detected just before the particular two-character chain type Tc1. In cases where a series of occurrence frequency sets of the particular two-character chain types agreeing with a series of retrieval two-character chains of the retrieval character string is detected on condition that the occurrence frequency of the fore character of each particular two-character chain type Tc1 agrees with that of the rear character of another particular two-character chain type Tc2 detected just before the particular two-character chain type Tc1, a particular character string corresponding to the series of occurrence frequency sets of the particular two-character chain types of the registration character string is retrieved from the registration character string of the text.

For example, it is judged whether or not each occurrence frequency of the fore character "D" of the second two-character chain type "Dæ" agreeing with the second retrieval two-character chain "Dæ" agrees with the occurrence frequency N2 of the rear character "D" of the first two-character chain type "CD" agreeing with the first retrieval two-character chain "CD". When the occurrence frequency N2 of the fore character "D" of the second two-character chain type "Dæ" is detected, it is judged whether or not each occurrence frequency of the fore character "æ" of the third two-character chain type "æE" agreeing with the third retrieval two-character chain "æE" agrees with the occurrence frequency N3 of the rear character "æ" of the second two-character chain type "Dæ". When the occurrence frequency N3 of the fore character "æ" of the third two-character chain type "æE" is detected, it is judged whether or not each occurrence frequency of the fore character "E" of the fourth two-character chain type "EF" agreeing with the fourth retrieval two-character chain "EF" agrees with the occurrence frequency N4 of the rear character "E" of the third two-character chain type "æE". When the occurrence frequency N4 of the fore character "æE" of the fourth two-character chain type "EF" is detected, a particular character string "CDæEF" corresponding to the two-character chain "CD" having the occurrence frequency N2 of the rear character "D", the two-character chain "Dæ" having the occurrence frequency N2 of the fore character "D", the two-character chain "æE" having the occurrence frequency N3 of the fore character "æ" and the two-character chain "EF" having the occurrence frequency N4 of the fore character "E" is specified.

Therefore, the particular character string "CDæEF" written in the text is collated with the retrieval character string "CDæEF" and is retrieved from the text.

FIG. 2 is a block diagram of a conventional character string collating apparatus operated according to the conventional character string collating method.

As shown in FIG. 2, a conventional character string collating apparatus 10 is composed of:

an input two-character chain detecting unit 11 for receiving a registration character string of a text, producing a plurality of two-character chains from the registration character string and counting an occurrence frequency of each character included in the two-character chains to produce a plurality of occurrence frequency sets for each two-character chain type;

an input two-character chain storing unit 12 for storing a table of the two-character chain types and the occurrence frequency sets;

a retrieval two-character chain detecting unit 13 for receiving a retrieval character string input by a user and producing a plurality of retrieval two-character chains from the retrieval character string;

an occurrence frequency collating unit 14 for collating the occurrence frequency of the fore character in each occurrence frequency set of a particular two-character chain type Tc1 with that of the rear character in a particular occurrence frequency set of another particular two-character chain type Tc2; and a control unit 15 for detecting a plurality of particular two-character chain types of the registration character string agreeing with the retrieval two-character chains of the retrieval character string in the order of arranging the retrieval two-character chains in the retrieval character string, sending the particular two-character chain type Tc1 and the particular two-character chain type Tc2 detected just before the particular two-character chain type Tc1 to the occurrence frequency collating unit 14, controlling the collating operation of the occurrence frequency collating unit 14 by detecting a particular occurrence frequency set of the particular two-character chain type Tc1 in which the occurrence frequency of the fore character agrees with that of the rear character in the particular occurrence frequency set of the particular two-character chain type Tc2 and sending the particular occurrence frequency set of the particular two-character chain type Tc1 to the occurrence frequency collating unit 14 as the particular occurrence frequency set of the particular two-character chain type Tc2, and specifying a particular character string corresponding to the series of particular occurrence frequency sets of the particular two-character chain types of the registration character string.

In the above configuration, a registration character string of a text is decomposed into a plurality of two-character chain types, a plurality of occurrence frequency sets is produced for each two-character chain type, and a table of the two-character chain types is stored in the input two-character chain storing unit 12. When a retrieval character string is input by a user, the retrieval character string is decomposed into a plurality of retrieval two-character chains in the retrieval two-character chain detecting unit 13. Thereafter, a plurality of particular two-character chain types of the registration character string agreeing with the retrieval two-character chains of the retrieval character string are detected in the order of arranging the retrieval two-character chains in the retrieval character string, the occurrence frequency of the fore character in each occurrence frequency set of a particular two-character chain type Tc1 is collated with that of the rear character in a particular occurrence frequency set of another particular two-character chain type Tc2 detected just before the particular two-character chain type Tc1 under the control of the control unit 15, and a particular character string agreeing with the retrieval character string is specified and is retrieved from the text.

PROBLEMS TO BE SOLVED BY THE INVENTION

However, in cases where a special character is frequently inserted into a string of characters in the registration character string to divide the string of characters into a first divided string of characters expressing a first meaning and a second divided string of characters expressing a second meaning, an occurrence frequency of the special character is increased. For example, in cases where a special character such as a space used in Hangul language occurs in the registration character string every three characters, an occurrence frequency of the special character is enormously increased, so that there is a drawback that the input two-character chain storing unit 12 having a large memory capacity is required to store two-character chain types corresponding to the special character and occurrence frequency sets corresponding to the special character.

Also, in cases where the special character not indicating any meaning is inserted many times into the retrieval character string, the number of two-character chains of each two-character chain type corresponding to the special character is enormously increased, so that it takes a lot of time to retrieve one particular two-character chain from one two-character chain type corresponding to the special character by specifying one particular occurrence frequency set of the particular two-character chain from a large number of occurrence frequency sets of the two-character chain type.

SUMMARY OF THE INVENTION

An object of the present invention is to provide, with due consideration to the drawbacks of such a conventional recording medium and a conventional character string collating apparatus, a recording medium, in which all pieces of character data of a text are recorded to be possible to be read out, and a character string collating apparatus in which a retrieval character string is efficiently collated with a registration character string of a text while avoiding the increase of a memory capacity even though a special character expressing no meaning frequently occurs in the registration character string.

The object is achieved by the provision of a recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of a first general two-character chain placed just before a second general two-character chain agreeing with the fore general character of the second general two-character chain;

a second character chain recording region for recording all special character chains detected from the registration character string of the text, each special character chain including a fore general character, at least one special character and a rear general character arranged in that order in the registration character string, the rear general character of one special character chain placed just before one general two-character chain recorded in the first character chain recording region agreeing with the fore general character of the general two-character chain, the fore general character of one special character chain placed just after one general two-character chain recorded in the first character chain recording region agreeing with the rear general character of the general two-character chain, and the rear general character of a first special character chain placed just before a second special character chain agreeing with the fore general character of the second special character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore and rear general characters of each special character chain recorded in the second character chain recording region as a special occurrence frequency set.

In the above configuration, all general two-character chains and all special character chains existing in a registration character string of a text are recorded on condition that the rear general character of each general two-character chain or the rear general character of each special character chain agrees with the fore general character of another general two-character chain or the fore general character of another special character chain. Also, general occurrence frequency sets of the general two-character chains and special occurrence frequency sets of the special character chains are recorded.

Accordingly, because an occurrence frequency of any special character included in the registration character string is not calculated, the increase of a memory capacity for the occurrence frequency sets can be avoided even though the special character expressing no meaning frequently occurs in the registration character string.

Also, in cases where a user intends to retrieve a particular character string agreeing with a retrieval character string from the registration character string, because the connection of a first general two-character chain or a first special character chain and a second general two-character chain or a second special character chain can be ascertained when an occurrence frequency of the rear character in an occurrence frequency set of the second chain agrees with an occurrence frequency of the fore character in an occurrence frequency set of the first chain, the particular character string can be retrieved from the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special character chain from the registration character string of the text for each special character, each registration special character chain including a fore general character, one special character and a rear general character arranged in that order in the text, the rear general character of one registration general two-character chain agreeing with the fore general character of one registration special character chain placed just after the registration general two-character chain in the registration character string, and the rear general character of one registration special character chain agreeing with the fore general character of one registration general two-character chain placed just after the registration special character chain in the registration character string;

first occurrence frequency calculating means for calculating a pair of occurrence frequencies of the fore and rear general characters of each registration general two-character chain detected by the first registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a pair of occurrence frequencies of the fore and rear general characters of each registration special character chain detected by the second registration character chain detecting means as an occurrence frequency set;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special character chains existing in the retrieval character string, each retrieval special character chain including a fore general character, one special character and a rear general character arranged in that order in the retrieval character string, the rear general character of one retrieval general two-character chain agreeing with the fore general character of one retrieval special character chain placed just after the retrieval general two-character chain in the retrieval character string, and the rear general character of one retrieval special character chain agreeing with the fore general character of one retrieval general two-character chain placed just after the retrieval special character chain in the retrieval character string;

control means for specifying a plurality of particular general two-character chain type and a particular special character chain types, which are classified by the registration character chain classifying means, corresponding to the retrieval general two-character chains detected by the first retrieval character chain detecting means and the retrieval special character chains detected by the second retrieval character chain detecting means, detecting a retrieval chain order of arranging the retrieval general two-character chains and the retrieval special character chains in the retrieval character string, and determining a particular chain order corresponding to the retrieval chain order for the particular general two-character chain types and the particular special character chain types;

collating means for repeatedly receiving the occurrence frequency sets of one particular general two-character chain type or one particular special character chain type specified by the control means from the first occurrence frequency calculating means or the second occurrence frequency calculating means in the particular chain order for the particular general two-character chain types and the particular special character chain types, and performing a collating operation for the particular general two-character chain types and the particular special character chain types according to the occurrence frequencies of the particular general two-character chain types and the occurrence frequencies of the particular special character chain types, detecting a series of particular occurrence frequency sets of the particular general two-character chain types and the particular special character chain types on condition that a plurality of particular registration general two-character chains and particular registration special character chains having the particular occurrence frequency sets are connected in series in the registration character string; and character string detecting means for detecting a particular character string agreeing with the retrieval character string from the registration character string according to the particular registration general two-character chains, the particular registration special character chains, the particular occurrence frequency sets of the particular registration general two-character chains and the particular occurrence frequency sets of the particular registration special character chains detected by the collating means.

In the above configuration, all retrieval general two-character chains and all retrieval special character chains existing in a retrieval character string are detected in the order of arranging the retrieval chains in the retrieval character string on condition that the rear general character of each retrieval general two-character chain or the rear general character of each retrieval special character chain agrees with the fore general character of another retrieval general two-character chain or the fore general character of another retrieval special character chain, and a plurality of particular general two-character chains types and particular special character chain types agreeing with the retrieval general two-character chains and the retrieval special character chains are specified in the particular chain order by the control means.

Therefore, when the occurrence frequency of the fore general character in a particular occurrence frequency set of the first particular chain type agreeing with the occurrence frequency of the rear general character in a particular occurrence frequency set of a second particular chain type detected just before the detection of the first particular registration chain type is detected by the collating means, because the connection of two registration chains of the particular occurrence frequency sets is ascertained, a particular character string agreeing with the retrieval character string can be detected from the registration character string by the character string detecting means.

Accordingly, because an occurrence frequency of any special character is not calculated, the retrieval character string can be efficiently collated with the registration character string of the text while avoiding the increase of a memory capacity even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by converting each special character arranged in the registration character string into a particular type of symbolic character determined according to a type of a general character spaced at N characters (N is an integral number equal to or higher than 1) apart from the special character, each registration two-character chain including a fore general character or a fore symbolic character and a rear general character or a rear symbolic character arranged just after the fore character in the converted registration character string, the rear general character or the rear symbolic character of a first registration two-character chain agreeing with the fore general character or the fore symbolic character of a second registration two-character chain placed just before the first registration two-character chain; and an occurrence frequency recording region for recording a pair of occurrence frequencies of the fore general character or the fore symbolic character and the rear general character or the rear symbolic character of each registration two-character chain recorded in the character chain recording region as a registration occurrence frequency set, the occurrence frequency of one general character or symbolic character of a particular type placed in a particular position of the converted registration character string denoting the number of general characters or symbolic characters of the same particular type existing in an area between a starting position of the converted registration character string and the particular position of the converted registration character string.

In the above configuration, a converted registration character string is prepared by converting each special character of a registration character string into a particular type of symbolic character determined according to a type of a general character spaced at N characters apart from the special character, and all registration two-character chains existing in the converted registration character string are recorded on condition that the rear general character or the rear symbolic character of each registration two-character chain agrees with the fore general character or the fore symbolic character of another registration two-character chain. Also, occurrence frequency sets of the registration two-character chains are recorded.

Accordingly, because the special characters of the same character type in the registration character string are converted into various types of symbolic characters, when an occurrence frequency of each type of symbolic character is calculated, the occurrence frequency can be suppressed to a low value as compared with an occurrence frequency of the special character. Therefore, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each special character arranged in the registration character string into a symbolic character according to a general-symbolic character type relationship between a character type of the symbolic character and a character type of a general character spaced at N characters (N is an integral number equal to or higher than 1) apart from the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

occurrence frequency calculating means for calculating a pair of occurrence frequencies of the fore general character or the fore symbolic character and the rear general character or the rear symbolic character of each registration two-character chain detected by the registration character chain detecting means as an occurrence frequency set, the occurrence frequency of each particular general character or symbolic character of a particular type placed in a particular position of the converted registration character string denoting the number of general characters or symbolic characters of the same particular type existing in an area between a starting position of the converted registration character string and the particular position of the converted registration character string;

registration character chain classifying means for classifying each group of registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by converting each special character arranged in the retrieval character string into a symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the occurrence frequency sets of one particular two-character chain type specified by the control means from the occurrence frequency calculating means in the particular chain order for the particular two-character chain types, performing a collating operation for the particular two-character chain types according to the occurrence frequency sets of the particular two-character chain types, and detecting a series of particular occurrence frequency sets of a series of particular registration two-character chains corresponding to the particular two-character chain types arranged in the particular chain order on condition that the series of particular registration two-character chains having the particular occurrence frequency sets are connected in series in the converted registration character string; and character string detecting means for detecting a particular character string agreeing with the retrieval character string from the registration character string according to the particular registration two-character chains and the particular occurrence frequency sets of the particular registration two-character chains detected by the collating means.

In the above configuration, a converted retrieval character string is prepared by converting each special character of a retrieval character string into a particular type of symbolic character determined according to a type of a general character spaced at N characters apart from the special character, all retrieval two-character chains existing in the converted retrieval character string are detected in the order of arranging the chains in the converted retrieval character string on condition that the rear general character of each chain agrees with the fore general character of another, an occurrence frequency of each type of symbolic character is calculated, and a plurality of particular two-character chains types agreeing with the retrieval two-character chains are detected by the control means.

Therefore, when the occurrence frequency of the fore general character in a particular occurrence frequency set of the first particular two-character chains type agreeing with the occurrence frequency of the rear general character in a particular occurrence frequency set of a second particular two-character chains type arranged just before the first particular two-character chains type in the particular chain order is detected by the collating means, because the connection of two registration two-character chains of the particular occurrence frequency sets is ascertained, a particular character string agreeing with the retrieval character string can be detected from the registration character string by the character string detecting means.

Accordingly, because the special characters of the same character type in the registration character string are converted into various types of symbolic characters, when an occurrence frequency of each type of symbolic character is calculated, the occurrence frequency can be suppressed to a low value as compared with an occurrence frequency of the special character. Therefore, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by replacing each special character arranged in the registration character string with a first particular type of symbolic character determined according to a type of one general character adjacent to the special character and a second particular type of symbolic character determined according to a type of the other general character adjacent to the special character, each registration two-character chain including a fore general character or a fore symbolic character and a rear general character or a rear symbolic character arranged just after the fore character in the converted registration character string, and the rear general character or the rear symbolic character of a first registration two-character chain agreeing with the fore general character or the fore symbolic character of a second registration two-character chain placed just before the first registration two-character chain in the converted registration character string; and an occurrence frequency recording region for recording a pair of occurrence frequencies of the fore general character or the fore symbolic character and the rear general character or the rear symbolic character of each registration two-character chain recorded in the character chain recording region as a registration occurrence frequency set, the occurrence frequency of one general character or symbolic character of a particular type placed in a particular position of the converted registration character string denoting the number of general characters or symbolic characters of the same particular type existing in an area between a starting position of the converted registration character string and the particular position of the converted registration character string.

In the above configuration, a converted registration character string is prepared by replacing each special character arranged in a registration character string of the text with a first particular type of symbolic character determined according to a type of one general character adjacent to the special character and a second particular type of symbolic character determined according to a type of the other general character adjacent to the special character, and all registration two-character chains existing in the converted registration character string are recorded on condition that the rear general character or the rear symbolic character of each registration two-character chain agrees with the fore general character or the fore symbolic character of another registration two-character chain. Also, occurrence frequency sets of the registration two-character chains are recorded.

Accordingly, because each special character in the registration character string is replaced with two symbolic characters and the symbolic characters are composed of various types, when an occurrence frequency of each type of symbolic character is calculated, the occurrence frequency can be suppressed to a low value as compared with an occurrence frequency of the special character. Therefore, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by replacing each special character arranged in a registration character string of the text with a first symbolic character and a second symbolic character according to a general-symbolic character type relationship in which a character type of the first symbolic character corresponds to a character type of one general character adjacent to the special character and a character type of the second symbolic character corresponds to a character type of the other general character adjacent to the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

occurrence frequency calculating means for calculating a pair of occurrence frequencies of the fore general character or the fore symbolic character and the rear general character or the rear symbolic character of each registration two-character chain detected by the registration character chain detecting means as an occurrence frequency set, the occurrence frequency of each particular general character or symbolic character of a particular type placed in a particular position of the converted registration character string denoting the number of general characters or symbolic characters of the same particular type existing in an area between a starting position of the converted registration character string and the particular position of the converted registration character string;

registration character chain classifying means for classifying the registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string by replacing each special character in the retrieval character string with a symbolic character and another second symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain types, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the occurrence frequency sets of one particular two-character chain type specified by the control means from the occurrence frequency calculating means in the particular chain order for the particular two-character chain types, performing a collating operation for the particular two-character chain types according to the occurrence frequency sets of the particular two-character chain types, and detecting a series of particular occurrence frequency sets of a series of particular registration two-character chains corresponding to the particular two-character chain types arranged in the particular chain order on condition that the series of particular registration two-character chains having the particular occurrence frequency sets are connected in series in the converted registration character string; and character string detecting means for detecting a particular character string agreeing with the retrieval character string from the registration character string according to the particular registration two-character chains and the particular occurrence frequency sets of the particular registration two-character chains detected by the collating means.

In the above configuration, a converted retrieval character string is prepared by replacing each special character arranged in a registration character string of the text with a particular type of symbolic character determined according to a type of one general character adjacent to the special character and a particular type of symbolic character determined according to a type of the other general character adjacent to the special character, all retrieval two-character chains existing in the converted retrieval character string are detected in the order of arranging the chains in the converted retrieval character string on condition that the rear general character of each chain agrees with the fore general character of another, an occurrence frequency of each type of symbolic character is calculated, and a plurality of particular two-character chains types agreeing with the retrieval two-character chains are detected by the control means.

Therefore, when the occurrence frequency of the fore general character in a particular occurrence frequency set of the first particular two-character chains type agreeing with the occurrence frequency of the rear general character in a particular occurrence frequency set of a second particular two-character chains type detected just before the detection of the first particular two-character chains type is detected by the collating means, because the connection of two registration two-character chains of the particular occurrence frequency sets is ascertained, a particular character string agreeing with the retrieval character string can be detected from the registration character string by the character string detecting means.

Accordingly, because each special character in the registration character string are replaced with two symbolic characters and the symbolic characters are composed of various types, when an occurrence frequency of each type of symbolic character is calculated, the occurrence frequency can be suppressed to a low value as compared with an occurrence frequency of the special character. Therefore, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of each general two-character chain agreeing with the fore general character of another general two-character chain;

a second character chain recording region for recording a plurality of two-character chain sets, respectively composed of a first two-character chain including a fore general character and a rear general character in that order, a second two-character chain including the fore general character and one special character in that order and a third two-character chain including the special character and the rear general character, each two-character chain set being produced from one of all special three-character chains detected from the retrieval character string, each special three-character chain including the fore general character, the special character and the rear general character arranged in that order in the text, the rear general character of one special three-character chain placed just before one general two-character chain recorded in the first character chain recording region agreeing with the fore general character of the general two-character chain, the fore general character of one special three-character chain placed just after one general two-character chain recorded in the first character chain recording region agreeing with the rear general character of the general two-character chain, and the rear general character of a first special three-character chain placed just before a second special three-character chain agreeing with the fore general character of the second special three-character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore and rear general characters of each first two-character chain recorded in the second character chain recording region as a first special occurrence frequency set, recording a pair of occurrence frequencies of the fore general character and the special character of each second two-character chain recorded in the second character chain recording region as a second special occurrence frequency set on condition that the occurrence frequency of the special character is set to a fixed value, and recording a pair of occurrence frequencies of the special character and the rear general character of each third two-character chain recorded in the second character chain recording region as a third special occurrence frequency set on condition that the occurrence frequency of the special character is set to the fixed value.

In the above configuration, all general two-character chains and all special three-character chains existing in a registration character string of a text are detected, each special three-character chain including a fore general character, one special character and a rear general character is decomposed into a first two-character chain including the fore general character and the rear general character, a second two-character chain including the fore general character and the special character and a third two-character chain including the special character and the rear general character, and the general two-character chains, the first two-character chains, the second two-character chains and the third two-character chains are recorded. Also, an occurrence frequency of each special character is set to a fixed value, and occurrence frequency sets of the two-character chains are recorded.

Accordingly, because an occurrence frequency of each special character included in the registration character string is set to the fixed value, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, and producing a first registration two-character chain including the fore general character and the rear general character in that order, a second registration two-character chain including the fore general character and the special character in that order and a third registration two-character chain including the special character and the rear general character from each registration special three-character chain, the rear general character of one registration general two-character chain placed just before one registration special three-character chain in the registration character string agreeing with the fore general character of the first registration two-character chain produced from the registration special three-character chain, and the fore general character of one registration general two-character chain placed just after one registration special three-character chain in the registration character string agreeing with the rear general character of the third registration two-character chain produced from the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a pair of occurrence frequencies of the fore and rear general characters of each first registration two-character chain produced by the registration character chain producing means as an occurrence frequency set, determining an occurrence frequency set of each second registration two-character chain produced by the registration character chain producing means by setting an occurrence frequency of the special character of the second registration two-character chain to a fixed value and calculating an occurrence frequency of the fore general character of the second registration two-character chain, and determining an occurrence frequency set of each third registration two-character chain produced by the registration character chain producing means by setting an occurrence frequency of the special character of the third registration two-character chain to the fixed value and calculating an occurrence frequency of the rear general character of the third registration two-character chain;

registration character chain classifying means for classifying the registration general two-character chains, which respectively include the same type of fore general character and the same type of rear general character, detected by the registration character chain detecting means into one general two-character chain type, classifying the first registration two-character chain, which respectively include the same type of fore general character and the same type of rear general character, produced by the registration character chain producing means into one first two-character chain type, classifying the second registration two-character chains, which respectively include the same type of fore general character and the special character, produced by the registration character chain producing means into one second two-character chain type, and classifying the third registration two-character chain, which respectively include the special character and the same type of rear general character, produced by the registration character chain producing means into one third two-character chain types;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special three-character chains, respectively including a fore general character, one special character and a rear general character arranged in that order in the retrieval character string, from the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types, particular first two-character chain types, particular second two-character chain types and particular third two-character chain types, which are classified by the registration character chain classifying means, corresponding to the retrieval general two-character chains detected by the first retrieval character chain detecting means and the retrieval special three-character chains detected by the second retrieval character chain detecting means, detecting a retrieval chain order of arranging the retrieval general two-character chains and the retrieval special three-character chains in the retrieval character string, and determining a particular chain order corresponding to the retrieval chain order for the particular general two-character chain types, the particular first two-character chain types, the particular second two-character chain types and the particular third two-character chain types;

collating means for repeatedly receiving the occurrence frequency sets of one particular general two-character chain type, one particular first two-character chain type, one particular second two-character chain type or one particular third two-character chain type specified by the control means from the first occurrence frequency calculating means or the second occurrence frequency calculating means in the particular chain order for the particular general two-character chain types, the particular first two-character chain types, the particular second two-character chain types and the particular third two-character chain types, and performing a collating operation for the particular general two-character chain types, the particular first two-character chain types, the particular second two-character chain types and the particular third two-character chain types in which the occurrence frequencies of the occurrence frequency sets of the series of particular two-character chain types detected by the control means are collated with each other to ascertain a connection between each pair of particular general two-character chain types having particular occurrence frequency sets, a connection between each particular first two-character chain type having a particular occurrence frequency set and one particular general two-character chain type having a particular occurrence frequency set and a connection between each particular third two-character chain type having a particular occurrence frequency set and one particular general two-character chain type having a particular occurrence frequency set, and a plurality of particular occurrence frequency sets of the series of particular two-character chain types are detected on condition that a plurality of particular registration two-character chains indicated by the particular occurrence frequency sets are connected with each other in series in the retrieval character string; and character string detecting means for detecting a particular character string agreeing with the retrieval character string from the registration character string according to the series of particular registration two-character chains and the particular occurrence frequency sets of the series of particular registration two-character chains detected by the collating means.

In the above configuration, all retrieval general two-character chains and all retrieval special three-character chains existing in a retrieval character string are detected, and a series of particular two-character chain types agreeing with a series of retrieval general two-character chains and retrieval special three-character chains are specified in the particular chain order by the control means.

Therefore, when the occurrence frequencies of the occurrence frequency sets of the series of particular registration two-character chain types are collated with each other, a plurality of particular occurrence frequency sets of the series of particular registration two-character chain types can be detected on condition that a plurality of particular two-character chains indicated by the particular occurrence frequency sets are connected with each other in series in the retrieval character string, and a particular character string agreeing with the retrieval character string can be retrieved from the registration character string according to the series of particular two-character chain types and the particular occurrence frequency sets.

Accordingly, because an occurrence frequency of the special character included in each registration two-character chain is set to the fixed value, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of each general two-character chain agreeing with the fore general character of another general two-character chain;

a second character chain recording region for recording a plurality of two-character chain sets, respectively composed of a fore two-character chain including a fore general character and one special character in that order and a rear two-character chain including the special character and a rear general character, each two-character chain set being produced from one of all special three-character chains detected from the retrieval character string, each special three-character chain including the fore general character, the special character and the rear general character arranged in that order in the text, the rear general character of one special three-character chain placed just before one general two-character chain recorded in the first character chain recording region agreeing with the fore general character of the general two-character chain, the fore general character of one special three-character chain placed just after one general two-character chain recorded in the first character chain recording region agreeing with the rear general character of the general two-character chain, and the rear general character of a first special three-character chain placed just before a second special three-character chain agreeing with the fore general character of the second special three-character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore general character and the special character of each fore two-character chain recorded in the second character chain recording region as a first special occurrence frequency set on condition that the occurrence frequency of the special character is set to zero, and recording a pair of occurrence frequencies of the special character and the rear general character of each rear two-character chain recorded in the second character chain recording region as a second special occurrence frequency set on condition that the occurrence frequency of the special character is set to zero.

In the above configuration, all general two-character chains and all special three-character chains existing in a registration character string of a text are detected, each special three-character chain including a fore general character, one special character and a rear general character is decomposed into a fore two-character chain including the fore general character and the special character and a rear two-character chain including the special character and the rear general character, and the general two-character chains, the fore two-character chains and the rear two-character chains are recorded. Also, an occurrence frequency of each special character is set to zero, and occurrence frequency sets of the two-character chains are recorded.

Accordingly, because an occurrence frequency of the special character included in each two-character chain is set to zero, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, and producing a fore registration two-character chain including the fore general character and the special character in that order and a rear registration two-character chain including the special character and the rear general character in that order from each registration special three-character chain, the rear general character of one registration general two-character chain placed just before one registration special three-character chain in the registration character string agreeing with the fore general character of the fore registration two-character chain produced from the registration special three-character chain, and the fore general character of one registration general two-character chain placed just after one registration special three-character chain in the registration character string agreeing with the rear general character of the rear registration two-character chain produced from the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for determining an occurrence frequency set of each fore registration two-character chain produced by the registration character chain producing means by setting an occurrence frequency of the special character of the fore registration two-character chain to zero and calculating an occurrence frequency of the fore general character of the fore registration two-character chain, and determining an occurrence frequency set of each rear registration two-character chain produced by the registration character chain producing means by setting an occurrence frequency of the special character of the rear registration two-character chain to zero and calculating an occurrence frequency of the rear general character of the rear registration two-character chain;

registration character chain classifying means for classifying each group of registration general two-character chains, which respectively include the same type of fore general character and the same type of rear general character, detected by the registration character chain detecting means into one general two-character chain type, classifying each group of fore registration two-character chains, which respectively include the same type of fore general character and the special character, produced by the registration character chain producing means into one fore two-character chain type, and classifying each group of rear registration two-character chains, which respectively include the special character and the same type of rear general character, produced by the registration character chain producing means into one rear two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special three-character chains, respectively including a fore general character, one special character and a rear general character arranged in that order in the retrieval character string, from the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear special two-character chain types, which are classified by the registration character chain classifying means, corresponding to the retrieval general two-character chains detected by the first retrieval character chain detecting means and the retrieval special three-character chains detected by the second retrieval character chain detecting means, detecting a retrieval chain order of arranging the retrieval general two-character chains and the retrieval special three-character chains in the retrieval character string, and determining a particular chain order corresponding to the retrieval chain order for the particular general two-character chain types and the particular fore and rear special two-character chain types;

collating means for repeatedly receiving the occurrence frequency sets of one particular general two-character chain type, one particular fore special two-character chain type or one particular rear special two-character chain type specified by the control means from the first occurrence frequency calculating means or the second occurrence frequency calculating means in the particular chain order for the particular general two-character chain types and the particular fore and rear special two-character chain types, and performing a collating operation in which the occurrence frequencies of the occurrence frequency sets of the series of particular general two-character chain types and particular fore and rear special three-character chain types detected by the control means are collated with each other to ascertain a connection between each pair of particular general two-character chain types having particular occurrence frequency sets, a connection between each particular fore two-character chain type having a particular occurrence frequency set and one particular general two-character chain type having a particular occurrence frequency set and a connection between each particular rear two-character chain type having a particular occurrence frequency set and one particular general two-character chain type having a particular occurrence frequency set, and a plurality of particular occurrence frequency sets of the particular two-character chain types are detected on condition that a series of particular registration two-character chains having the particular occurrence frequency sets are connected with each other in series in the retrieval character string; and character string detecting means for detecting a particular character string agreeing with the retrieval character string from the registration character string according to the series of particular registration two-character chains and the particular occurrence frequency sets detected by the collating means.

In the above configuration, all retrieval general two-character chains and all retrieval special three-character chains existing in a retrieval character string are detected, and a series of particular two-character chain types agreeing with a series of retrieval general two-character chains and retrieval special three-character chains are detected in the particular chain order by the control means.

Therefore, when the occurrence frequencies of the occurrence frequency sets of the series of particular registration two-character chain types are collated with each other, a plurality of particular occurrence frequency sets of the series of particular two-character chain types can be detected on condition that a plurality of particular registration two-character chains indicated by the particular occurrence frequency sets are connected with each other in series in the retrieval character string, and a particular character string agreeing with the retrieval character string can be retrieved from the registration character string according to the series of particular two-character chain types and the particular occurrence frequency sets.

Accordingly, because an occurrence frequency of the special character included in each registration two-character chain is set to zero, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording region for recording all general two-character chains and all character chain sets detected from a registration character string of the text, each general two-character chain including a fore general character and a rear general character arranged just after the fore general character in the registration character string, each character chain set being composed of a fore two-character chain and a rear two-character chain, each character chain set being obtained by detecting all special three-character chains including a fore general character, one special character and a rear general character arranged in that order in the text, converting the special character of each special three-character chain into a central general character having the same character type as that of the rear general character to produce a converted three-character chain including the fore general character, the central general character and the rear general character and decomposing each converted three-character chain into one fore two-character chain including the fore general character and the central general character and one rear two-character chain including the central general character and the rear general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and an occurrence frequency recording region for recording a pair of occurrence frequencies of the fore general character and the rear general character of each general two-character chain recorded in the character chain recording region as an occurrence frequency set, recording a pair of occurrence frequencies of the fore general character and the central general character of the fore two-character chain of each character chain set recorded in the character chain recording region as an occurrence frequency set, and recording a pair of occurrence frequencies of the central general character and the rear general character of the rear two-character chain of each character chain set recorded in the character chain recording region as an occurrence frequency set by setting the occurrence frequency of the rear general character as that of the central general character, the occurrence frequency of one general character of a particular type placed in a particular position of the registration character string denoting the number of general characters of the same particular type existing in an area between a starting position of the registration character string and the particular position of the registration character string.

In the above configuration, all general two-character chains and all special three-character chains existing in a registration character string of a text are detected, each special three-character chain including a fore general character, one special character and a rear general character is converted into a converted three-character chain including the fore general character, a central general character having the same character type of that of the rear general character and the rear general character, each converted three-character chain is decomposed into a fore two-character chain including the fore general character and the central general character and a rear two-character chain including the central general character and the rear general character, and the general two-character chains, the fore two-character chains and the rear two-character chains are recorded. Also, an occurrence frequency of each central general character is set to the same value as that of the rear general character, and occurrence frequency sets of the two-character chains are recorded.

Accordingly, because each special character of a character string is converted into a central general character having the same character type of a rear general character placed just after the special character and because an occurrence frequency of the central general character is set to the same value as that of the rear general character, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, converting each registration special three-character chain into a converted registration special three-character chain including the fore general character, a central general character having the same character type as that of the rear general character and the rear general character in that order, and producing a fore registration two-character chain including the fore general character and the central general character in that order and a rear registration two-character chain including the central general character and the rear general character in that order from each converted registration special three-character chain, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a rear occurrence frequency of the rear general character of each registration special three-character chain in the registration character string, setting a central occurrence frequency of the central general character to the rear occurrence frequency of the rear general character placed just after the central general character in each converted registration special three-character chain, calculating a fore occurrence frequency of the fore general character of each registration special three-character chain in the registration character string, determining a set of the fore occurrence frequency and the central occurrence frequency as an occurrence frequency set of each fore registration two-character chain produced by the registration character chain producing means, and determining a set of the central occurrence frequency and the rear occurrence frequency as an occurrence frequency set of each rear registration two-character chain produced by the registration character chain producing means;

registration character chain classifying means for classifying each group of registration general two-character chains, which respectively include the same type of fore general character and the same type of rear general character, detected by the registration character chain detecting means into one general two-character chain type, classifying each group of fore registration two-character chains, which respectively include the same type of fore general character and the same type of central general character, produced by the registration character chain producing means into one fore two-character chain type, and classifying each group of rear registration two-character chains, which respectively include the same type of central general character and the same type of rear general character, produced by the registration character chain producing means into one rear two-character chain type;

first retrieval character chain detecting means for detecting all retrieval general two-character chain existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, converting each retrieval special three-character chain into a converted retrieval special three-character chain including the fore general character, a central general character having the same character type as that of the rear general character and the rear general character in that order to produce a converted retrieval character string from the retrieval character string, and producing a fore retrieval two-character chain including the fore general character and the central general character in that order and a rear retrieval two-character chain including the central general character and the rear general character in that order from each converted retrieval special three-character chain, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear two-character chain types, which are classified by the registration character chain classifying means, corresponding to the retrieval general two-character chains detected by the first retrieval character chain detecting means and the fore and rear retrieval two-character chains detected by the second retrieval character chain detecting means, detecting a retrieval chain order of arranging the retrieval general two-character chains and the fore and rear retrieval two-character chains in the converted retrieval character string, and determining a particular chain order corresponding to the retrieval chain order for the particular general two-character chain types and the particular fore and rear two-character chain types;

collating means for repeatedly receiving the occurrence frequency sets of one particular general two-character chain type, one particular fore two-character chain type or one particular rear two-character chain type specified by the control means from the first occurrence frequency calculating means or the second occurrence frequency calculating means in the particular chain order for the particular general two-character chain types and the particular fore and rear two-character chain types, and performing a collating operation in which the occurrence frequencies of the occurrence frequency sets of the series of particular general two-character chain types and particular fore and rear retrieval special two-character chain types detected by the control means are collated with each other to ascertain a connection between each pair of particular general two-character chain types having particular occurrence frequency sets, a connection between each particular fore two-character chain type having a particular occurrence frequency set and one particular general two-character chain type having a particular occurrence frequency set and a connection between each particular rear two-character chain type having a particular occurrence frequency set and one particular general two-character chain type having a particular occurrence frequency set, and a plurality of particular occurrence frequency sets of the particular two-character chain types are detected on condition that a plurality of particular registration two-character chains having the particular occurrence frequency sets are connected with each other in series in the converted retrieval character string; and character string detecting means for detecting a particular character string agreeing with the retrieval character string from the registration character string according to the series of particular registration two-character chains and the particular occurrence frequency sets detected by the collating means.

In the above configuration, all retrieval general two-character chains and all retrieval special three-character chains existing in a retrieval character string are detected, each retrieval special three-character chain including a fore general character, one special character and a rear general character is converted into a converted retrieval special three-character chain including the fore general character, a central general character having the same character type of that of the rear general character and the rear general character, each converted retrieval special three-character chain is decomposed into a fore retrieval two-character chain including the fore general character and the central general character and a rear retrieval two-character chain including the central general character and the rear general character, and a plurality of particular general two-character chain types and particular fore and rear special two-character chain types agreeing with the retrieval general two-character chains, the fore retrieval two-character chains and the rear retrieval two-character chains are specified in the particular chain order by the control means.

Therefore, when the occurrence frequencies of the occurrence frequency sets of the series of particular registration two-character chain types are collated with each other, a plurality of particular occurrence frequency sets of the series of particular two-character chain types can be detected on condition that a plurality of particular registration two-character chains indicated by the particular occurrence frequency sets are connected with each other in series in the converted retrieval character string, and a particular character string agreeing with the retrieval character string can be retrieved from the registration character string according to the series of particular two-character chain types and the particular occurrence frequency sets.

Accordingly, because each special character of a character string is converted into a central general character having the same character type of a rear general character placed just after the special character and because an occurrence frequency of the central general character is set to the same value as that of the rear general character, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording region for recording all general two-character chains and all special two-character chains detected from a registration character string of the text, each general two-character chain including a fore general character and a rear general character arranged just after the fore general character in the registration character string, each special two-character chain including one special character as a fore character and a rear general character or a fore general character and one special character as a rear character arranged in that order in the registration character string, the fore character of each special two-character chain placed just after one general two-character chain agreeing with the rear general character of the general two-character chain, the rear character of each special two-character chain placed just before one general two-character chain agreeing with the fore general character of the general two-character chain, the rear general character of a first general two-character chain placed just before a second general two-character chain agreeing with the fore general character of the second general two-character chain, and the rear character of a first special two-character chain placed just before a second special two-character chain agreeing with the fore character of the second special two-character chain; and an occurrence frequency recording region for recording a pair of occurrence frequencies of the fore general character and the rear general character of each general two-character chain recorded in the character chain recording region as an occurrence frequency set, recording an occurrence frequency of the fore or rear general character and a limited occurrence frequency of the rear or fore special character of each special two-character chain recorded in the character chain recording region as an occurrence frequency set, the occurrence frequency of each character of a particular type placed in a particular position of the registration character string denoting the number of characters of the same particular type existing in an area between a starting position of the registration character string and the particular position of the registration character string, and the limited occurrence frequency of each special character being obtained by setting a plurality of N limited values (N is an integer higher than 1) different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string.

In the above configuration, all general two-character chains and all special two-character chains existing in a registration character string of a text are recorded. Each general two-character chain includes a fore general character and a rear general character, and each special two-character chain includes one special character as a fore character and a rear general character or a fore general character and one special character as a rear character. Also, an occurrence frequency of each general character in the two-character chains is counted, a limited occurrence frequency of each special character in the special two-character chains is counted, and occurrence frequency sets of the two-character chains are recorded. Here, the limited occurrence frequency of each special character is obtained by setting a plurality of N limited values different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string.

Accordingly, in cases where a duplication number for a particular limited occurrence frequency of a particular special two-character chain indicates the number of special two-character chains having the same limited occurrence frequency in an area between a starting position of the registration character string and a particular position of the particular special two-character chain in the registration character string, because a serial connection between two special two-character chains can be ascertained according to the occurrence frequency sets of the chains and the duplication numbers of the chains, the increase of a memory capacity for the occurrence frequency sets can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration general character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration special character chain detecting means for detecting all registration special two-character chains, respectively including one special character as a fore character and a rear general character or a fore general character and one special character as a rear character arranged in that order in the registration character string, the fore character of each registration special two-character chain placed just after one registration general two-character chain agreeing with the rear general character of the registration general two-character chain, the rear character of each registration special two-character chain placed just before one registration general two-character chain agreeing with the fore general character of the registration general two-character chain, and the rear character of a first registration special two-character chain placed just before a second registration special two-character chain agreeing with the fore character of the second registration special two-character chain;

first occurrence frequency calculating means for calculating a pair of occurrence frequencies of the fore and rear general characters of each registration general two-character chain detected by the registration general character chain detecting means as an occurrence frequency set, the occurrence frequency of each character of a particular type placed in a particular position of the registration character string denoting the number of characters of the same particular type existing in an area between a starting position of the registration character string and the particular position of the registration character string;

second occurrence frequency calculating means for calculating an occurrence frequency of the fore or rear general character and a limited occurrence frequency of the rear or fore special character of each registration special two-character chain detected by the registration special character chain detecting means as an occurrence frequency set, the limited occurrence frequency of each special character being obtained by setting a plurality of N limited values (N is an integer higher than 1) different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string;

registration character chain classifying means for classifying each group of registration general two-character chains, which respectively include the same type of fore general character and the same type of rear general character, detected by the registration general character chain detecting means into one general two-character chain type, classifying each group of registration special two-character chains, which respectively include one special character of the same limited occurrence frequency as one fore character, detected by the registration special character chain detecting means into one first special two-character chain type, and classifying each group of registration special two-character chains, which respectively include one special character of the same limited occurrence frequency as one rear character, detected by the registration special character chain detecting means into one second special two-character chain type;

registration special two-character chain table producing means for producing a first special two-character chain table in which a plurality of registration special two-character chains respectively including one special character of the same limited occurrence frequency as one fore character and the occurrence frequency sets of the registration special two-character chains are arranged in the order of arranging the registration special two-character chains in the retrieval character string, and producing a second special two-character chain table in which a plurality of registration special two-character chains respectively including one special character of the same limited occurrence frequency as one rear character and the occurrence frequency sets of the registration special two-character chains are arranged in the order of arranging the registration special two-character chains in the retrieval character string;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special two-character chains, respectively including one special character as a fore character and a rear general character or a fore general character and one special character as a rear character arranged in that order in the retrieval character string, the fore character of each retrieval special two-character chain placed just after one retrieval general two-character chain agreeing with the rear general character of the retrieval general two-character chain, the rear character of each retrieval special two-character chain placed just before one retrieval general two-character chain agreeing with the fore general character of the retrieval general two-character chain, and the rear character of a first retrieval special two-character chain placed just before a second retrieval special two-character chain agreeing with the fore character of the second retrieval special two-character chain;

control means for specifying a plurality of particular general two-character chain types and particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, and determining a particular chain order corresponding to the retrieval chain order for the particular general two-character chain types and the particular special two-character chain types;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation in which a first serial connection between two particular registration general two-character chains corresponding to two particular general two-character chain types adjacent to each other is ascertained according to the occurrence frequency sets of the particular registration general two-character chains, a second serial connection between a particular registration general two-character chain and a particular registration special two-character chain corresponding to one particular general two-character chain type and one particular special two-character chain type adjacent to each other is ascertained according to the occurrence frequency set of the particular registration general two-character chain and the occurrence frequency set of the particular registration special two-character chain, a third serial connection between two particular registration special two-character chains corresponding to one pair of particular special two-character chain types adjacent to each other is ascertained according to the occurrence frequency sets of the particular registration special two-character chains on condition that two limited occurrence frequencies of two special characters of the two registration special two-character chains are equal to each other and duplication numbers for the limited occurrence frequencies are equal to each other, and particular occurrence frequency sets of the series of particular registration two-character chains serially connected with each other are determined, the duplication number for one limited occurrence frequency of a particular registration special two-character chain corresponding to one special two-character chain table produced by the registration special two-character chain table indicating the number of limited occurrence frequencies arranged in an area between a starting position of the special two-character chain table and a particular position of the particular registration special two-character chain; and character string detecting means for detecting a particular character string agreeing with the retrieval character string from the registration character string according to the series of particular registration two-character chains and the particular occurrence frequency sets determined by the collating means.

In the above configuration, the occurrence frequency set of each special two-character chain is composed of an occurrence frequency of one general character and a limited occurrence frequency of one special character. The limited occurrence frequency of each special character is obtained by setting a plurality of N limited values different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string.

Therefore, in cases where two registration special two-character chains are collated with each other in the collating means according to the occurrence frequency sets of the registration special two-character chains to check a serial connection between the registration special two-character chains, because it is required to ascertain that one special character of one registration special two-character chain agrees with that of the other registration special two-character chain, not only the coincidence of the limited occurrence frequencies of the chains but also the coincidence of duplication numbers for the limited occurrence frequencies are checked. The duplication number for a particular limited occurrence frequency of one special character included in a particular registration special two-character chain as a fore (or rear) character indicates the number of special two-character chains having special characters as fore (or rear) characters, of which limited occurrence frequencies are the same as the particular limited occurrence frequency, arranged in an area between a starting position of the registration character string and a particular position of the particular registration special two-character chain in the registration character string.

Accordingly, because the occurrence frequency set of each special two-character chain is composed of an occurrence frequency of one general character and a limited occurrence frequency of one special character and because not only the coincidence of limited occurrence frequencies of a pair of special two-character chains but also the coincidence of duplication numbers for the limited occurrence frequencies are checked, the retrieval character string can be efficiently collated with the registration character string of the text while avoiding the increase of a memory capacity for the occurrence frequencies even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording area for recording all general two-character chains and all special two-character chains detected from a registration character string of the text, each general two-character chain including a fore general character and a rear general character arranged just after the fore general character in the registration character string, each special two-character chain including a fore special character and a rear general character or a fore general character and a rear special character arranged in that order in the registration character string, the fore character of each special two-character chain placed just after one general two-character chain agreeing with the rear general character of the general two-character chain, the rear character of each special two-character chain placed just before one general two-character chain agreeing with the fore general character of the general two-character chain, the rear general character of a first general two-character chain placed just before a second general two-character chain agreeing with the fore general character of the second general two-character chain, and the rear character of a first special two-character chain placed just before a second special two-character chain agreeing with the fore character of the second special two-character chain; and an occurrence frequency recording area for recording a pair of occurrence frequencies of the fore general character and the rear general character of each general two-character chain recorded in the character chain recording area as an occurrence frequency set and recording a pair of occurrence frequencies of the fore character and the rear character of each special two-character chain recorded in the character chain recording area as an occurrence frequency set, the occurrence frequency of each particular special character placed in a particular position of the registration character string denoting the number of special characters existing in an area between a starting position of the registration character string and the particular position of the registration character string, the occurrence frequency of each particular general character of a particular type placed in a particular position of the registration character string denoting the number of general characters of the same particular type existing in an area between a starting position of the registration character string and the particular position of the registration character string in cases where each of the general characters including the particular general character is not adjacent to any special character, and the occurrence frequency of each particular general character being set to the same prescribed value in cases where each of the general characters including the particular general character is adjacent to one special character.

In the above configuration, all general two-character chains and all special two-character chains detected from a registration character string of the text are recorded. Also, an occurrence frequency of each general character not adjacent to any special character in the registration character string is calculated, an occurrence frequency of each general character adjacent to one special character is set to the same prescribed value, an occurrence frequency of each special character is calculated, and the occurrence frequencies of fore and rear characters of each two-character chain are recorded as an occurrence frequency set.

Accordingly, even though an occurrence frequency of each special character is recorded, because an occurrence frequency of each general character adjacent to one special character is set to the same prescribed value such as 0, the increase of a memory capacity for the occurrence frequency sets can be avoided.

Also, because the number of general characters adjacent to one special character is increased as the number of special characters is increased, even though the special character expressing no meaning frequently occurs in the registration character string, the increase of a memory capacity for the occurrence frequency sets can be avoided.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration general character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration special character chain detecting means for detecting all registration special two-character chains, respectively including one special character as a fore character and a rear general character or a fore general character and one special character as a rear character arranged in that order in the registration character string, the fore character of each registration special two-character chain placed just after one registration general two-character chain agreeing with the rear general character of the registration general two-character chain, the rear character of each registration special two-character chain placed just before one registration general two-character chain agreeing with the fore general character of the registration general two-character chain, and the rear character of a first registration special two-character chain placed just before a second registration special two-character chain agreeing with the fore character of the second registration special two-character chain;

first occurrence frequency calculating means for calculating an occurrence frequency of each general character not adjacent to any special character in the registration character string, setting an occurrence frequency of each general character adjacent to one special character to the same prescribed value, and setting the pair of occurrence frequencies of the fore and rear general characters of each registration general two-character chain detected by the registration general character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating an occurrence frequency of each special character, setting the pair of occurrence frequencies of one general character and one special character in each registration special two-character chain detected by the registration special character chain detecting means as an occurrence frequency set according to the occurrence frequencies of the general characters obtained by the first occurrence frequency calculating means, the occurrence frequency of each particular special character placed in a particular position of the registration character string denoting the number of special characters existing in an area between a starting position of the registration character string and the particular position of the registration character string;

registration character chain classifying means for classifying each group of registration general two-character chains, which respectively include the same type of fore general character and the same type of rear general character, detected by the registration general character chain detecting means into one general two-character chain type, and classifying each group of registration special two-character chains, which respectively include one special character as one fore character and the same type of rear general character or the same type of fore general character and one special character as one rear character, detected by the registration special character chain detecting means into one special two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special two-character chains, respectively including one special character as a fore character and a rear general character or a fore general character and one special character as a rear character arranged in that order in the retrieval character string, the fore character of each retrieval special two-character chain placed just after one retrieval general two-character chain agreeing with the rear general character of the retrieval general two-character chain, the rear character of each retrieval special two-character chain placed just before one retrieval general two-character chain agreeing with the fore general character of the retrieval general two-character chain, and the rear character of a first retrieval special two-character chain placed just before a second retrieval special two-character chain agreeing with the fore character of the second retrieval special two-character chain;

control means for specifying a plurality of particular general two-character chain types and particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, determining a particular chain order corresponding to the retrieval chain order for the particular general two-character chain types and the particular special two-character chain types, and controlling the first occurrence frequency calculating means and the second occurrence frequency calculating means to output the occurrence frequency sets of the particular general two-character chain types and the particular special two-character chain types arranged in the particular chain order;

special character occurrence counting means for setting a special character occurrence number to a particular occurrence frequency of one special character in a particular occurrence frequency set of one particular special two-character chain type first positioned among the particular special two-character chain types arranged in the particular chain order, and incrementing the special character occurrence number each time the occurrence frequency sets of one particular special two-character chain type corresponding to a particular special character are output from the second occurrence frequency calculating means under the control of the control means after the output of the occurrence frequency sets of another particular special two-character chain type corresponding to one special character different from the particular special character;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation in which a first serial connection between two particular registration general two-character chains corresponding to two particular general two-character chain types adjacent to each other is ascertained according to the occurrence frequency sets of the two registration general two-character chains, a second serial connection between a particular registration general two-character chain and a particular registration special two-character chain corresponding to one particular general two-character chain type and one particular special two-character chain type adjacent to each other is ascertained according to the occurrence frequency set of the particular registration general two-character chain and the occurrence frequency set of the particular registration special two-character chain on condition that the occurrence frequency of one special character of the particular registration special two-character chain agrees with the special character occurrence number set by the special character occurrence counting means, a third serial connection between two particular registration special two-character chains corresponding to two particular special two-character chain types adjacent to each other is ascertained according to the occurrence frequency sets of the particular registration special two-character chains according to the occurrence frequency set of the particular registration special two-character chains on condition that the occurrence frequency of one special character of one particular registration special two-character chain corresponding to one particular special two-character chain type arranged after the other particular special two-character chain type in the particular chain order agrees with the special character occurrence number set by the special character occurrence counting means, and particular occurrence frequency sets of the series of particular registration two-character chains serially connected with each other are determined; and character string detecting means for detecting a particular character string agreeing with the retrieval character string from the registration character string according to the series of particular registration two-character chains and the particular occurrence frequency sets determined by the collating means.

In the above configuration, a special character occurrence number is set to a particular occurrence frequency of one special character in a particular occurrence frequency set of one particular special two-character chain type first positioned among the particular special two-character chain types arranged in the particular chain order by the special character occurrence counting means, and the special character occurrence number is incremented each time the occurrence frequency sets of one particular special two-character chain type corresponding to a particular special character are output from the second occurrence frequency calculating means to the collating means under the control of the control means after the output of the occurrence frequency sets of another particular special two-character chain type corresponding to one special character different from the particular special character.

Therefore, in cases where a serial connection between a special two-character chain (C1,æ) corresponding to one particular special two-character chain type is collated with a general two-character chain (*,C1) corresponding to one particular general two-character chain type arranged before the particular special two-character chain type in the collating means to check a serial connection between the chains, because it is checked whether or not an occurrence frequency of the special character "æ" of the special two-character chain (C1,æ) agrees with the special character occurrence number, even though the occurrence frequency of the general character C1 is set to the prescribed value such as 0, the serial connection can be checked. Also, in cases where a serial connection between a first special two-character chain (C1,æ) corresponding to a first particular special two-character chain type is collated with a second special two-character chain (æ,C1) corresponding to a second particular general two-character chain type arranged before the first particular special two-character chain type in the collating means to check a serial connection between the chains, because it is checked whether or not an occurrence frequency of the special character "æ" of the first special two-character chain (C1,æ) agrees with the special character occurrence number, even though the occurrence frequency of the general character C1 is set to the prescribed value such as 0, the serial connection can be checked.

Accordingly, even though an occurrence frequency of each special character is calculated and recorded, because an occurrence frequency of each general character adjacent to one special character is set to the same prescribed value such as 0, the increase of a memory capacity for the occurrence frequency sets can be avoided.

Also, because the number of general characters adjacent to one special character is increased as the number of special characters is increased, even though the special character expressing no meaning frequently occurs in the registration character string, the increase of a memory capacity for the occurrence frequency sets can be avoided.

The object is also achieved by the provision of a recording medium for recording information of a text in which each of a plurality of special characters of the same character type is intermittently arranged in a plurality of general characters classified into a plurality of character types and at least two general characters exist between each pair of special characters, comprising:

a character chain recording area for recording all general two-character chains detected from a registration character string of the text and recording a special two-character chain detected from the registration character string for each special character, each general two-character chain including a fore general character and a rear general character arranged just after the fore general character in the registration character string, each special two-character chain including a fore general character placed two characters before one special character and a rear general character placed just after the special character in the registration character string, the fore character of a first general two-character chain placed just after a second general two-character chain agreeing with the rear general character of the second general two-character chain; and an occurrence frequency recording area for recording a pair of occurrence frequencies of the fore general character and the rear general character of each general two-character chain recorded in the character chain recording area as an occurrence frequency set and recording a pair of occurrence frequencies of the fore general character and the rear general character of each special two-character chain recorded in the character chain recording area as an occurrence frequency set, the occurrence frequency of each particular general character of a particular type placed in a particular position of the registration character string denoting the number of general characters of the same particular type existing in an area between a starting position of the registration character string and the particular position of the registration character string.

In the above configuration, all general two-character chains and all special two-character chains are detected from a registration character string of the text. Each general two-character chain includes a fore general character and a rear general character arranged just after the fore general character in the registration character string, and each special two-character chain includes a fore general character placed two characters before one special character and a rear general character placed just after the special character in the registration character string. Therefore, though an occurrence frequency of any special character is not recorded, a serial connection of four characters "**æ*" including the three general characters "*" and one special character "æ" can be checked.

Accordingly, because an occurrence frequency of any special character is not recorded, the increase of a memory capacity for the occurrence frequency sets can be avoided.

The object is also achieved by the provision of a character string collating apparatus for collating a retrieval character string with a registration character string of a text, in which each of a plurality of special characters of the same character type is intermittently arranged in a plurality of general characters classified into a plurality of character types and at least two general characters exist between each pair of special characters, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the fore character of a first registration general two-character chain placed just after a second registration general two-character chain agreeing with the rear general character of the second registration general two-character chain;

second registration character chain detecting means for detecting a registration special two-character chain from the registration character string of the text for each special character, each registration special two-character chain including a fore general character placed two characters before one special character and a rear general character placed just after the special character in the registration character string;

occurrence frequency calculating means for calculating a pair of occurrence frequencies of the fore and rear general characters of each registration general two-character chain detected by the first registration character chain detecting means as an occurrence frequency set, and calculating a pair of occurrence frequencies of the fore and rear general characters of each registration special two-character chain detected by the second registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the fore character of a first retrieval general two-character chain placed just after a second retrieval general two-character chain agreeing with the rear general character of the second retrieval general two-character chain;

second retrieval character chain detecting means for detecting a retrieval special two-character chain from the retrieval character string for each special character, each retrieval special two-character chain including a fore general character placed two characters before one special character and a rear general character placed just after the special character in the retrieval character string;

control means for specifying a plurality of particular general two-character chain type and a particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, and determining a particular chain order corresponding to the retrieval chain order for the particular general two-character chain types and the particular special two-character chain types;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation for the particular general two-character chain types and the particular special two-character chain types according to the occurrence frequencies of the particular general two-character chain types and the occurrence frequencies of the particular special two-character chain types, detecting a series of particular occurrence frequency sets of the particular general two-character chain types and the particular special two-character chain types on condition that a plurality of particular registration general two-character chains and particular registration special two-character chains having the particular occurrence frequency sets are connected in series in the registration character string; and character string detecting means for detecting a particular character string agreeing with the retrieval character string from the registration character string according to the particular registration general two-character chains, the particular registration special two-character chains, the particular occurrence frequency sets of the particular registration general two-character chains and the particular occurrence frequency sets of the particular registration special two-character chains detected by the collating means.

In the above configuration, when a retrieval character string "C1C2æC3C4" is detected in the first retrieval character chain detecting means and the second retrieval character chain detecting means, a retrieval general two-character chain "C1,C2", a retrieval special two-character chain "C1,C3" and a retrieval general two-character chain "C3,C4" arranged in a particular chain order are detected in the control means. Therefore, when a serial connection between a registration general two-character chain "C1,C2" corresponding to the general two-character chain type "C1, C2" and a registration special two-character chain "C1,C3" corresponding to the special two-character chain type "C1, C3" is checked according to the occurrence frequency of the general character "C1" of the chains and a serial connection between the registration special two-character chain "C1, C3" corresponding to the special two-character chain type "C1,C3"and the registration general two-character chain "C3,C4" corresponding to the general two-character chain type "C3,C4" is checked according to the occurrence frequency of the general character "C3" of the chains, a particular character string agreeing with the retrieval character string can be retrieved from the registration character string without counting an occurrence frequency of any special character "æ".

Accordingly, because an occurrence frequency of any special character is not recorded, the increase of a memory capacity for the occurrence frequency sets can be avoided.

The object is also achieved by the provision of a recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of one general two-character chain agreeing with the fore general character of another general two-character chain for each general two-character chain;

a second character chain recording region for recording all special character chains detected from the registration character string of the text, each special character chain including a fore general character, one special character and a rear general character arranged in that order in the registration character string, the rear general character of one special character chain placed just before one general two-character chain recorded in the first character chain recording region agreeing with the fore general character of the general two-character chain, the fore general character of one special character chain placed just after one general two-character chain recorded in the first character chain recording region agreeing with the rear general character of the general two-character chain, and the rear general character of a first special character chain placed just before a second special character chain agreeing with the fore general character of the second special character chain; and a position number recording region for recording a position number of each general two-character chain recorded in the first character chain recording region and recording a position number of each special character chain recorded in the second character chain recording region, the position number of each character chain representing the general two-character chains and the special character chains being indicated by an occurrence position number of the fore or rear general character of the character chain, and the occurrence position number of each general character being obtained by numbering all general characters of the retrieval character string in the order of arranging the general characters in the retrieval character string.

In the above configuration, all general two-character chains and all special character chains are detected from a registration character string and are recorded. Also, all general characters of the retrieval character string are numbered in the order arranging the general characters in the retrieval character string to allocate an occurrence position number to each general character, a position number of each general two-character chain is set to an occurrence position number of the fore general character (or the rear general character) of the general two-character chain, a position number of each special character chain is set to an occurrence position number of the fore general character (or the rear general character) of the special character chain, and the position numbers of the character chains are recorded.

Because a difference between two position numbers of two character chains adjacent to each other is one, when the difference is checked, a serial connection of each pair of character chains can be ascertained.

Accordingly, because any position number of each special character is not recorded, the increase of a memory capacity for the position numbers can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special character chain from the registration character string for each special character, each registration special character chain including a fore general character, one special character and a rear general character arranged in that order in the registration character string, the rear general character of one registration general two-character chain agreeing with the fore general character of one registration special character chain placed just after the registration general two-character chain in the registration character string, and the rear general character of one registration special character chain agreeing with the fore general character of one registration general two-character chain placed just after the registration special character chain in the registration character string;

position number setting means for numbering all general characters of the retrieval character string in the order of arranging the general characters in the retrieval character string to allocate an occurrence position number to each general character, and setting a position number of each character chain representing the general two-character chains and the special character chains detected by the first registration character chain detecting means and the second registration character chain detecting means to the occurrence position number of the fore or rear general character of the character chain;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special character chain from the retrieval character string for each special character, each retrieval special character chain including a fore general character, one special character and a rear general character arranged in that order in the retrieval character string, the rear general character of one retrieval general two-character chain agreeing with the fore general character of one retrieval special character chain placed just after the retrieval general two-character chain in the retrieval character string, and the rear general character of one retrieval special character chain agreeing with the fore general character of one retrieval general two-character chain placed just after the retrieval special character chain in the retrieval character string;

control means for specifying a plurality of particular general two-character chain type and a particular special character chain types, which are classified by the registration character chain classifying means, corresponding to the retrieval general two-character chains detected by the first retrieval character chain detecting means and the retrieval special character chains detected by the second retrieval character chain detecting means, detecting a retrieval chain order of arranging the retrieval general two-character chains and the retrieval special character chains in the retrieval character string, and determining a particular chain order corresponding to the retrieval chain order for the particular general two-character chain types and the particular special character chain types;

collating means for repeatedly receiving the position numbers of one particular general two-character chain type or one particular special character chain type specified by the control means from the position number setting means in the particular chain order for the particular general two-character chain types and the particular special character chain types, and performing a collating operation for the particular general two-character chain types and the particular special character chain types according to the position numbers of the particular general two-character chain types and the position numbers of the particular special character chain types, detecting a series of particular position numbers of the particular general two-character chain types and the particular special character chain types on condition that a plurality of particular registration general two-character chains and particular registration special character chains having the particular position numbers are connected in series in the registration character string; and character string detecting means for detecting a particular character string agreeing with the retrieval character string from the registration character string according to the particular registration general two-character chains, the particular registration special character chains, the particular position numbers of the particular registration general two-character chains and the particular position numbers of the particular registration special character chains detected by the collating means.

In the above configuration, the particular general two-character chain types and the particular special character chain types corresponding to retrieval character chains detected from a retrieval character string are transmitted to the collating means in the particular chain order under the control of the control means, and a position number of a first registration character chain corresponding to a first particular general two-character chain type or a first particular special character chain type is collated with that of a second registration character chain corresponding to a second particular general two-character chain type or a second particular special character chain type placed just before the first particular general two-character chain type or the first particular special character chain type. In cases where a position number of the first registration character chain is higher than that of the second registration character chain by one, a serial connection between the first registration character chain and the second registration character chain is ascertained.

Accordingly, because any position number of each special character is not counted, the increase of a memory capacity for the position numbers can be avoided even though the special character expressing no meaning frequently occurs in the registration character string.

The object is also achieved by the provision of a recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by converting each special character arranged in the registration character string into a particular type of symbolic character determined according to a type of a general character spaced at N characters (N is an integral number equal to or higher than 1) apart from the special character, each registration two-character chain including a fore general character or a fore symbolic character and a rear general character or a rear symbolic character arranged just after the fore character in the converted registration character string, the rear general character or the rear symbolic character of a first registration two-character chain agreeing with the fore general character or the fore symbolic character of a second registration two-character chain placed just before the first registration two-character chain; and a position number recording region for recording a position number of each registration two-character chain recorded in the character chain recording region, the position number of each registration two-character chain being indicated by an occurrence position number of the fore or rear character of the registration two-character chain, and the occurrence position number of each character being obtained by numbering all general characters and symbolic characters of the converted retrieval character string in the order of arranging the general characters and symbolic characters in the converted retrieval character string.

In the above configuration, a converted registration character string is prepared by converting each special character of a registration character string into a particular type of symbolic character corresponding to a character type of general character spaced at N characters apart from the special character, and all registration two-character chains existing in the converted registration character string are recorded. Also, position numbers of the registration two-character chains are recorded.

Accordingly, because one position number is only recorded for each registration two-character chain, the increase of a memory capacity for the position numbers can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each special character arranged in the registration character string into a symbolic character according to a general-symbolic character type relationship between a character type of the symbolic character and a character type of a general character spaced at N characters (N is an integral number equal to or higher than 1) apart from the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

position number setting means for numbering all general characters and all symbolic characters of the converted retrieval character string in the order of arranging the general characters and the symbolic characters in the converted retrieval character string to allocate an occurrence position number to each general character or symbolic character, and setting a position number of each registration two-character chain detected by the registration character chain detecting means to the occurrence position number of the fore character or the rear character of the registration two-character chain;

registration character chain classifying means for classifying each group of registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by converting each special character arranged in the retrieval character string into a symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the position numbers of one particular two-character chain type specified by the control means from the position number setting means in the particular chain order for the particular two-character chain types, performing a collating operation for the particular two-character chain types according to the position numbers of the particular two-character chain types, and detecting a series of particular position numbers of a series of particular registration two-character chains corresponding to the particular two-character chain types arranged in the particular chain order on condition that the series of particular registration two-character chains having the particular position numbers are connected in series in the converted registration character string; and character string detecting means for detecting a particular character string agreeing with the retrieval character string from the registration character string according to the particular registration two-character chains and the particular position numbers of the particular registration two-character chains detected by the collating means.

In the above configuration, each special character arranged in the retrieval character string is converted into a type of symbolic character according to the general-symbolic character type relationship in the same manner as the conversion of the special characters arranged in the registration character string. Thereafter, position numbers of the particular two-character chain types corresponding to the retrieval two-character chains are transmitted to the collating means in the particular chain order under the control of the control means, and a series of particular registration two-character chains of the series of particular two-character chain types arranged in the particular chain order is determined by collating a plurality of particular position numbers of the particular registration two-character chains with each other.

Accordingly, because the special characters of the same character type in the registration character string are converted into various types of symbolic characters, the number of registration two-character chains of each two-character chain type relating to one type of symbolic character is reduced, so that a particular position number of each two-character chain type relating to one type of symbolic character can be rapidly determined.

The object is also achieved by the provision of a recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by replacing each special character arranged in the registration character string with a first particular type of symbolic character determined according to a type of one general character adjacent to the special character and a second particular type of symbolic character determined according to a type of the other general character adjacent to the special character, each registration two-character chain including a fore general character or a fore symbolic character and a rear general character or a rear symbolic character arranged just after the fore character in the converted registration character string, and the rear general character or the rear symbolic character of a first registration two-character chain agreeing with the fore general character or the fore symbolic character of a second registration two-character chain placed just before the first registration two-character chain in the converted registration character string; and a position number recording region for recording a position number of each registration two-character chain recorded in the character chain recording region, the position number of each registration two-character chain being indicated by an occurrence position number of the fore or rear character of the registration two-character chain, and the occurrence position number of each character being obtained by numbering all general characters and symbolic characters of the converted retrieval character string in the order of arranging the general characters and symbolic characters in the converted retrieval character string.

In the above configuration, a converted registration character string is prepared by converting each special character of a registration character string into a first particular type of symbolic character determined according to a type of one general character adjacent to the special character and a second particular type of symbolic character determined according to a type of the other general character adjacent to the special character, and all registration two-character chains existing in the converted registration character string are recorded. Also, position numbers of the registration two-character chains are recorded.

Accordingly, because one position number is only recorded for each registration two-character chain, the increase of a memory capacity for the position numbers can be avoided even though the special character expressing no meaning frequently occurs in the registration character string.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by replacing each special character arranged in a registration character string of the text with a first symbolic character and a second symbolic character according to a general-symbolic character type relationship in which a character type of the first symbolic character corresponds to a character type of one general character adjacent to the special character and a character type of the second symbolic character corresponds to a character type of the other general character adjacent to the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

position number setting means for numbering all general characters and all symbolic characters of the converted retrieval character string in the order of arranging the general characters and the symbolic characters in the converted retrieval character string to allocate an occurrence position number to each general character or symbolic character, and setting a position number of each registration two-character chain detected by the registration character chain detecting means to the occurrence position number of the fore character or the rear character of the registration two-character chain;

registration character chain classifying means for classifying the registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by replacing each special character arranged in the retrieval character string with a symbolic character and another symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the position numbers of one particular two-character chain type specified by the control means from the position number setting means in the particular chain order for the particular two-character chain types, performing a collating operation for the particular two-character chain types according to the position numbers of the particular two-character chain types, and detecting a series of particular position numbers of a series of particular registration two-character chains corresponding to the particular two-character chain types arranged in the particular chain order on condition that the series of particular registration two-character chains having the particular position numbers are connected in series in the converted registration character string; and character string detecting means for detecting a particular character string agreeing with the retrieval character string from the registration character string according to the particular registration two-character chains and the particular position numbers of the particular registration two-character chains detected by the collating means.

In the above configuration, each special character arranged in the retrieval character string is converted into two symbolic characters according to the general-symbolic character type relationship in the same manner as the conversion of each special character arranged in the registration character string. Thereafter, position numbers of the particular two-character chain types corresponding to the retrieval two-character chains are transmitted to the collating means in the particular chain order under the control of the control means, and a series of particular registration two-character chains of the series of particular two-character chain types arranged in the particular chain order is determined by collating a plurality of particular position numbers of the particular registration two-character chains with each other.

Accordingly, because the special characters of the same character type in the registration character string are converted into various types of symbolic characters, the number of registration two-character chains of each two-character chain type relating to one type of symbolic character is reduced, so that a particular position number of each two-character chain type relating to one type of symbolic character can be rapidly determined.

The object is also achieved by the provision of a recording medium for recording information of a text in which each of a plurality of special characters of the same character type is intermittently arranged in a plurality of general characters classified into a plurality of character types, comprising:

a character chain recording region for recording all general two-character chains and all character chain sets detected from a registration character string of the text, each general two-character chain including a fore general character and a rear general character arranged just after the fore general character in the registration character string, each character chain set being composed of a fore two-character chain and a rear two-character chain obtained by detecting all special three-character chains, respectively including a fore general character, one special character and a rear general character arranged in that order in the registration character string, converting the special character of each special three-character chain into a central general character having the same character type as that of the rear general character to produce a converted special three-character chain including the fore general character, the central general character and the rear general character and decomposing each converted special three-character chain into one fore two-character chain including the fore general character and the central general character as a rear general character and one rear two-character chain including the central general character as a fore general character and the rear general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and a position number recording region for recording a position number of each general two-character chain recorded in the character chain recording region, recording a position number of the fore two-character chain of each character chain set recorded in the character chain recording region, and recording a position number of the rear two-character chain of each character chain set recorded in the character chain recording region, the position number of each two-character chain being indicated by an occurrence position number of the fore or rear general character of the two-character chain, the occurrence position number of each general character being obtained by numbering all general characters of the retrieval character string in the order of arranging the general characters in the retrieval character string, and the occurrence position number of the fore general character of each rear two-character chain being set to that of the rear general character of the rear two-character chain.

In the above configuration, a special character of each special three-character chain is converted into a central general character agreeing with a rear general character of the chain, and each converted special three-character chain is decomposed into a fore two-character chain having the central general character as a rear general character and a rear two-character chain having the central general character as a fore general character. In the character chain recording region, all general two-character chains and all character chain sets respectively composed of the fore and rear two-character chains are recorded.

Also, all general characters of the retrieval character string are numbered to allocate an occurrence position number to each general character, an occurrence position number of the fore general character of each rear two-character chain is set to that of the rear general character of the rear two-character chain, a position number of each registration two-character chain is set to the occurrence position number of the fore general character or the rear general character of the registration two-character chain, and position numbers of the general two-character chains and position numbers of the fore and rear two-character chains are recorded in the position number recording region.

Accordingly, because a position number of any special character is not recorded and a position number of a converted general character converted from each special character is set to that of a general character placed just after the special character, even though the special character expressing no meaning frequently occurs in the registration character string, the increase of the position number can be avoided, so that the increase of a memory capacity for the position numbers can be avoided.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special three-character chain, including a fore general character, one special character and a rear general character arranged in that order in the registration character string, from the registration character string for each special character, converting each registration special three-character chain into a converted registration special three-character chain including the fore general character, a central general character having the same character type as that of the rear general character and the rear general character in that order, and decomposing each converted registration special three-character chain into a fore registration two-character chain including the fore general character and the central general character as a rear general character and a rear registration two-character chain including the central general character as a fore general character and the rear general character, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

position number setting means for numbering all general characters of the retrieval character string in the order of arranging the general characters in the retrieval character string to allocate an occurrence position number to each general character, setting an occurrence position number of the fore general character of each rear two-character chain detected by the second registration character chain detecting means to that of the rear general character of the rear two-character chain, and setting a position number of each registration two-character chain detected by the first registration character chain detecting means and the second registration character chain detecting means to the occurrence position number of the fore general character or the rear general character of the registration two-character chain;

registration character chain classifying means for classifying each group of registration general two-character chains, which respectively include the same type of fore general character and the same type of rear general character, detected by the first registration character chain detecting means into one general two-character chain type, classifying each group of fore registration two-character chains, which respectively include the same type of fore general character and the same type of central general character, detected by the second registration character chain detecting means into one fore two-character chain type, and classifying each group of rear registration two-character chains, which respectively include the same type of central general character and the same type of rear general character, detected by the second registration character chain detecting means into one rear two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, converting each retrieval special three-character chain into a converted retrieval special three-character chain including the fore general character to produce a converted retrieval character string from the retrieval character string, a central general character having the same character type as that of the rear general character and the rear general character, and decomposing each converted retrieval special three-character chain into a fore retrieval two-character chain including the fore general character and the central general character as a rear character and a rear retrieval two-character chain including the central general character as a fore character and the rear general character, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear two-character chain types, which are classified by the registration character chain classifying means, corresponding to the retrieval general two-character chains detected by the first retrieval character chain detecting means and the fore and rear retrieval two-character chains detected by the second retrieval character chain detecting means, detecting a retrieval chain order of arranging the retrieval general two-character chains and the fore and rear retrieval two-character chains in the converted retrieval character string, and determining a particular chain order corresponding to the retrieval chain order for the particular general two-character chain types and the particular fore and rear two-character chain types;

collating means for repeatedly receiving the position numbers of one particular general two-character chain type, one particular fore two-character chain type or one particular rear two-character chain type specified by the control means from the position number setting means in the particular chain order for the particular general two-character chain types and the particular fore and rear two-character chain types, and performing a collating operation in which the position numbers of the series of particular general two-character chain types and particular fore and rear retrieval special two-character chain types detected by the control means are collated with each other to ascertain a connection between each pair of particular two-character chain types having particular position numbers, and a plurality of particular position numbers of the particular two-character chain types are detected on condition that a plurality of particular registration two-character chains having the particular position numbers are connected with each other in series in the converted retrieval character string; and character string detecting means for detecting a particular character string agreeing with the retrieval character string from the registration character string according to the series of particular registration two-character chains and the particular position numbers detected by the collating means.

In the above configuration, the position numbers of the particular general two-character chain types and the particular fore and rear two-character chain types corresponding to the retrieval general two-character chains and the fore and rear retrieval two-character chains are transmitted to the collating means in the particular chain order under the control of the control means. Thereafter, a serial connection of a plurality of registration two-character chains corresponding to the particular general two-character chain types and the particular fore and rear two-character chain types is checked according to the position numbers of the registration two-character chains, and a series of particular registration two-character chains of the series of particular general two-character chain types and particular fore and rear two-character chain types arranged in the particular chain order is determined.

Accordingly, because a position number of any special character is not counted and a position number of a converted general character converted from each special character is set to that of a general character placed just after the special character, even though the special character expressing no meaning frequently occurs in the registration character string, the increase of the position number can be avoided, so that a particular character string agreeing with the retrieval character string can be efficiently retrieved from the registration character string while avoiding the increase of a memory capacity for the position numbers.

The object is also achieved by the provision of a recording medium for recording information of a text in which each of a plurality of special characters of the same character type is intermittently arranged in a plurality of general characters classified into a plurality of character types, comprising:

a general character chain recording region for recording all general two-character chains and all character chain sets detected from a registration character string of the text, each general two-character chain including a fore general character and a rear general character arranged just after the fore general character in the registration character string, each character chain set being composed of a first two-character chain, a second two-character chain arranged just after the first two-character chain in the registration character string and a third two-character chain arranged just after the second two-character chain in the registration character string, the first, second and the third two-character chains of each character chain set being obtained by detecting all special three-character chains, respectively including a fore general character, one special character and a rear general character arranged in that order in the registration character string and decomposing each special three-character chain into one first two-character chain including the fore general character and the rear general character, one second two-character chain including the fore general character and the special character as a rear character and one third two-character chain including the special character as a fore character and the rear general character, the first two-character chains and the second two-character chains being arranged in the order of arranging the first and second two-character chains in the registration character string for each type of fore general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and a position number recording region for recording a position number of each general two-character chain recorded in the character chain recording region, recording a position number of each first two-character chain recorded in the character chain recording region, recording a position number of each second two-character chain recorded in the character chain recording region, and recording a position number of each third two-character chain recorded in the character chain recording region, the position number of each general two-character chain being indicated by an occurrence position number of the fore general character of the general two-character chain, the position number of each first two-character chain being indicated by an occurrence position number of the fore general character of the first two-character chain, the position number of each second two-character chain being indicated by an occurrence position number of the rear general character of the second two-character chain, the occurrence position number of each general character being obtained by numbering all general characters of the retrieval character string in the order of arranging the general characters in the retrieval character string, the position number of each third two-character chain being set to a fixed value, and the position numbers of the first and second two-character chains being arranged according to the arranging order of the first and second two-character chains.

In the above configuration, all general two-character chains, all first two-character chains "C1,C2" respectively detected from a special three-character chain "C1,æ, C2", all second two-character chains "C1,æ" respectively detected from the special three-character chain "C1,æ,C2" and all third two-character chains "æ,C2" respectively detected from the special three-character chain "C1,æ,C2" are recorded in the general character chain recording region. In this case, the first and second two-character chains having the same type of fore general character are arranged in the order of arranging the first and second two-character chains in the registration character string for each type of fore general character.

Also, the position numbers of the two-character chains are recorded in the position number recording region. In this case, the position numbers of the first and second two-character chains are arranged according to the arranging order of the first and second two-character chains for each type of fore general character of the chains.

Accordingly, because a position number of any special character is not recorded, even though the special character expressing no meaning frequently occurs in the registration character string, the increase of the position number can be avoided, so that the increase of a memory capacity for the position numbers can be avoided.

Also, because the second two-character chain "C1,æ" is arranged just after the first two-character chain "C1,C2", when the first two-character chain "C1,C2" is specified, the position number of the second two-character chain "C1,æ" can be automatically specified without performing a collation between the position numbers of the first and second two-character chains.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special three-character chain, including a fore general character, one special character and a rear general character arranged in that order in the registration character string, from the registration character string for each special character, and decomposing each registration special three-character chain into a first registration two-character chain including the fore general character and the rear general character, a second registration two-character chain including the fore general character and the special character as a rear character and a third registration two-character chain including the special character as a fore character and the rear general character, the first registration two-character chain, the second registration two-character chain and the third registration two-character chain in each registration special three-character chain being arranged in that order in the registration character string, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

position number setting means for numbering all general characters of the retrieval character string in the order of arranging the general characters in the retrieval character string to allocate an occurrence position number to each general character, setting a position number of each registration general two-character chain detected by the first registration character chain detecting means to the occurrence position number of the fore general character of the registration general two-character chain, setting a position number of each first registration two-character chain detected by the second registration character chain detecting means to the occurrence position number of the fore general character of the first registration two-character chain, setting a position number of each second registration two-character chain detected by the second registration character chain detecting means to a fixed value, setting a position number of each third registration two-character chain detected by the second registration character chain detecting means to the occurrence position number of the rear general character of the third registration two-character chain;

registration character chain classifying means for classifying each group of registration general two-character chains, which respectively include the same type of fore general character and the same type of rear general character, detected by the first registration character chain detecting means into one general two-character chain type, classifying each group of first registration two-character chains, which respectively include the same type of fore general character and the same type of rear general character, detected by the second registration character chain detecting means into one first two-character chain type, classifying each group of second registration two-character chains, which respectively include the same type of fore general character, detected by the second registration character chain detecting means into one second two-character chain type, and classifying each group of third registration two-character chains, which respectively include the same type of rear general character, detected by the second registration character chain detecting means into one third two-character chain type;

registration two-character chain arrangement setting means for classifying the first registration two-character chains and the second registration two-character chains detected by the second registration character chain detecting means into a plurality of groups of first and second registration two-character chains respectively having the same type of fore character, and arranging the first and second registration two-character chains of each group in the order of arranging the first and second registration two-character chains in the registration character string;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, and decomposing each retrieval special three-character chain into a first retrieval two-character chain including the fore general character and the rear general character, a second retrieval two-character chain including the fore general character and the special character as a rear character and a third retrieval two-character chain including the special character as a fore character and the rear general character, the first retrieval two-character chain, the second retrieval two-character chain and the third retrieval two-character chain in each retrieval special three-character chain being arranged in that order in the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular first, second and third two-character chain types, which are classified by the retrieval character chain classifying means, corresponding to the retrieval general two-character chains detected by the first retrieval character chain detecting means and the first, second and third retrieval two-character chains detected by the second retrieval character chain detecting means, detecting a retrieval chain order of arranging the retrieval general two-character chains and the first, second and third retrieval two-character chains in the retrieval character string, and determining a particular chain order corresponding to the retrieval chain order for the particular general two-character chain types and the particular first, second and third two-character chain types;

collating means for repeatedly receiving the position numbers of one particular general two-character chain type, or one group of particular first, second and third two-character chain types specified by the control means from the position number setting means in the particular chain order for the particular general two-character chain types and the particular first, second and third two-character chain types, and performing a collating operation in which the position numbers of the series of particular general two-character chain types and particular first, second and third retrieval special two-character chain types detected by the control means are collated with each other to ascertain a connection between each pair of particular two-character chain types having particular position numbers, and a plurality of particular position numbers of the particular two-character chain types are detected on condition that a plurality of particular retrieval two-character chains having the particular position numbers are connected with each other in series in the retrieval character string; and character string detecting means for detecting a particular character string agreeing with the retrieval character string from the registration character string according to the series of particular registration two-character chains and the particular position numbers detected by the collating means.

In the above configuration, the position numbers of the particular general two-character chain types and the particular first, second and third two-character chain types corresponding to the retrieval general two-character chains and the first, second and third retrieval two-character chains are transmitted to the collating means in the particular chain order under the control of the control means. Thereafter, a serial connection of a plurality of registration two-character chains corresponding to the particular general two-character chain types and the particular first, second and third two-character chain types is checked according to the position numbers of the registration two-character chains, and a series of particular registration two-character chains corresponding to the particular general two-character chain types and the particular first, second and third two-character chain types is determined. In this case, because the first and second two-character chains having the same type of fore general character are arranged in the order of arranging the first and second two-character chains in the registration character string for each type of fore general character, when a particular first two-character chain is determined, a particular second two-character chain arranged just after the particular first two-character chain is automatically determined though a position number of each second two-character chain is not counted but set to a fixed value.

Accordingly, because a position number of any special character is not counted, even though the special character expressing no meaning frequently occurs in the registration character string, the increase of the position number can be avoided, so that a particular character string agreeing with the retrieval character string can be efficiently retrieved from the registration character string while avoiding the increase of a memory capacity for the position numbers.

The object is also achieved by the provision of a recording medium for recording information of a text in which each of a plurality of special characters of the same character type is intermittently arranged in a plurality of general characters classified into a plurality of character types, comprising:

a character chain recording region for recording all first two-character chains detected from a converted registration character string, which is obtained from the registration character string by converting each pair of one special character and a general character placed just after the special character in the registration character string into a symbolic character determined in correspondence to a character type of the general character, to include a fore general character and a rear general character or a rear symbolic character arranged just after the fore general character in each first two-character chain, recording all second two-character chains, respectively including a fore general character placed two characters before one symbolic character and the symbolic character as a rear character, detected from the converted registration character string, and recording all special two-character chains, respectively including a fore symbolic character and a rear general character arranged in that order in the converted registration character string, detected from the converted registration character string, each group of first and second two-character chains respectively including the same type of fore general character and one group of special two-character chains respectively including one type of symbolic character determined in correspondence to the type of fore general character being arranged in one two-character chain table to produce the two-character chain table for each type of fore general character; and a position number recording region for recording a position number of each first two-character chain recorded in the character chain recording region, recording a position number of each second two-character chain recorded in the character chain recording region, and recording a position number of each special two-character chain recorded in the character chain recording region, the position number of each two-character chain being indicated by an occurrence position number of the fore character of the two-character chain, and the occurrence position numbers of the general and symbolic characters being obtained by numbering all general and symbolic characters of the converted retrieval character string in the order of arranging the general and symbolic characters in the converted retrieval character string.

In the above configuration, a registration character string "C1C2æC3C4,--" is converted into a converted registration character string "C1C2C3^C4--" including a symbolic character "C3^", and all first two-character chains "C1,C2", "C2,C3^",--, all second two-character chains "C1,C3^",--, and all third two-character chains "C3^,C4",-- detected from the converted registration character string are recorded in the general character chain recording region. In this case, each group of first and second two-character chains respectively including the same type of fore general character and one group of special two-character chains respectively including one type of symbolic character determined in correspondence to the type of fore general character are arranged in one two-character chain table. Also, the position numbers of the two-character chains are recorded in the position number recording region.

Therefore, when a serial connection among characters "C1", "C2" and "æ" in a character string "C1C2æC3" is checked, position numbers of first and second two-character chains "C1,C2" and "C1,C3^" arranged in the same two-character chain table are collated with each other.

Accordingly, because a position number of any special character is not recorded, even though the special character expressing no meaning frequently occurs in the registration character string, the increase of the position number can be avoided, so that the increase of a memory capacity for the position numbers can be avoided.

Also, because the first and second two-character chains "C1,C2" and "C1,C3^" are arranged in the same two-character chain table, the position numbers of the first and second two-character chains "C1,C2" and "C1,C3^" can be rapidly read out from the general character chain recording region.

The object is also achieved by the provision of a character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each pair of one special character and a general character placed just after the special character into a type of symbolic character determined in correspondence to a type of the general character;

first registration character chain detecting means for detecting all registration first two-character chains, respectively including a fore general character and a rear general character or a rear symbolic character arranged just after the fore general character, from the converted registration character string, and detecting a registration second two-character chain, including a fore general character placed two characters before one symbolic character and the symbolic character as a rear character, from the converted registration character string for each symbolic character;

second registration character chain detecting means for detecting a registration special two-character chain, including a fore symbolic character and a rear general character arranged in that order, from the converted registration character string for each symbolic character;

position number setting means for numbering all general characters and symbolic characters of the converted retrieval character string produced by the registration character string converting means in the order of arranging the general characters and symbolic characters in the converted retrieval character string to allocate an occurrence position number to each general character and symbolic character, setting a position number of each registration two-character chain detected by the first registration character chain detecting means to the occurrence position number of the fore general character of the registration two-character chain, and setting a position number of each registration special two-character chain detected by the second registration character chain detecting means to the occurrence position number of the fore symbolic character of the registration special two-character chain;

two-character chain table producing means for arranging each group of first and second two-character chains respectively including the same type of fore general character and one group of special two-character chains respectively including one type of symbolic character determined in correspondence to the type of fore general character in one two-character chain table to produce the two-character chain table for each type of fore general character;

retrieval character string converting means for producing a converted retrieval character string from the retrieval character string by converting each pair of one special character and a general character placed just after the special character into a type of symbolic character determined in correspondence to a type of the general character in the same manner as the conversion performed by the registration character string converting means;

first retrieval character chain detecting means for detecting all retrieval first two-character chains, respectively including a fore general character and a rear general character or a rear symbolic character arranged just after the fore general character, from the converted retrieval character string produced by the retrieval character string converting means, and detecting a retrieval second two-character chain, including a fore general character placed two characters before one symbolic character and the symbolic character as a rear character, from the converted retrieval character string for each symbolic character;

second retrieval character chain detecting means for detecting a retrieval special two-character chain, including a fore symbolic character and a rear general character arranged in that order, from the converted retrieval character string produced by the retrieval character string converting means for each symbolic character;

control means for specifying a particular group of registration two-character chains respectively agreeing with one retrieval two-character chain detected by the first retrieval character chain detecting means or the second retrieval character chain detecting means for each retrieval two-character chain, detecting a retrieval chain order of arranging the retrieval first and second two-character chains and the retrieval special two-character chains in the retrieval character string, and determining a particular chain order corresponding to the retrieval chain order for the particular groups of registration two-character chains;

collating means for repeatedly receiving position numbers of the particular group of registration two-character chains specified by the control means from the position number setting means, and performing a collating operation in which each of the position numbers of one particular group of registration two-character chains Tc1 is collated with a particular position number of a particular registration two-character chain Tc2 received just before the particular group of registration two-character chains Tc1 in the particular chain order to detect a particular registration two-character chain Tc1 having a particular position number on condition that the particular registration two-character chain Tc1 is connected with the particular registration two-character chain Tc2 in the converted registration character string; and character string detecting means for detecting a particular character string agreeing with the retrieval character string from the registration character string according to the series of particular registration two-character chains Tc1 and the particular position numbers detected by the collating means in the particular chain order.

In the above configuration, the position numbers of the particular groups of registration two-character chains are transmitted to the collating means in the particular chain order under the control of the control means. Thereafter, a serial connection between each registration two-character chain in one particular group and one registration two-character chain in another particular group is checked according to the position numbers of the registration two-character chains for each particular group, and a series of particular registration two-character chains arranged in the particular chain order is determined.

Accordingly, because a position number of any special character is not counted, even though the special character expressing no meaning frequently occurs in the registration character string, the increase of the position number can be avoided, so that a particular character string agreeing with the retrieval character string can be efficiently retrieved from the registration character string while avoiding the increase of a memory capacity for the position numbers.

Also, because the first and second two-character chains having the same fore general character are arranged in the same two-character chain table, when the first and second two-character chains are collated with each other, the position numbers of the first and second two-character chains can be efficiently specified, so that the collation of the first and second two-character chains can be rapidly performed.

BRIEF DESCRIPTION OF THE DRAWINGS

The objects, features and advantages of the present invention will be apparent from the following description taken in conjunction with the accompanying drawings, in which:

FIG. 7A shows the conversion of a registration character string extracted from a text according to the second embodiment;

FIG. 7B shows a general-symbolic character type relationship between a character type of symbolic character and a character type of general character placed just after one special character;

FIG. 7C shows a two-character chain table composed of two-character chain types and occurrence frequency sets;

FIG. 9A shows the conversion of a registration character string extracted from a text according to the third embodiment;

FIG. 9B shows a general-symbolic character type relationship in which a character type of first symbolic character corresponds to a character type of one general character placed just before one special character and a character type of second symbolic character corresponds to a character type of one general character placed just after the special character;

FIG. 11A shows a plurality of registration two-character chains detected from a registration character string according to the fourth embodiment;

FIG. 11B shows a two-character chain table composed of a plurality of two-character chain types and occurrence frequency sets of the chain types;

FIG. 11C shows a plurality of retrieval two-character chains detected from a retrieval character string according to the fourth embodiment;

FIG. 11D shows a particular occurrence frequency set determined for each of a plurality of particular two-character chains in the collation according to the fourth embodiment;

FIG. 15A shows a plurality of registration two-character chains detected from a registration character string according to the sixth embodiment;

FIG. 15B shows the conversion of a registration three-character chain detected from the registration character string and a pair of registration two-character chains produced from the converted registration three-character chain according to the sixth embodiment;

FIG. 15C shows a two-character chain table composed of a plurality of two-character chain types and occurrence frequency sets of the chain types;

FIG. 15D shows a plurality of retrieval two-character chains detected from a retrieval character string according to the sixth embodiment;

FIG. 15E shows the conversion of a retrieval three-character chain detected from the retrieval character string and a pair of retrieval two-character chains produced from the converted retrieval three-character chain according to the sixth embodiment;

FIG. 15F shows a particular occurrence frequency set determined for each of a plurality of particular two-character chains in the collation according to the sixth embodiment;

FIG. 19A shows a recording area for one general two-character chain;

FIG. 19B shows a recording area for one special two-character chain having a fore special character;

FIG. 19C shows a recording area for one special two-character chain having a rear special character;

FIG. 19D shows a plurality of registration two-character chains detected from a registration character string according to the eighth embodiment;

FIG. 19E shows a table of registration two-character chains, a document number and occurrence frequency sets;

FIGS. 19F and 19G respectively show a general two-character chain table of one registration general two-character chain type and occurrence frequency sets of the chain type;

FIGS. 19H and 19I respectively show a special two-character chain table of one registration special two-character chain type and occurrence frequency sets of the chain type;

FIG. 19J shows a plurality of retrieval two-character chains detected from a retrieval character string according to the eighth embodiment;

FIG. 19K shows the collation of one character chain with another character chain;

FIG. 22A shows a plurality of registration two-character chains detected from a registration character string according to the ninth embodiment;

FIG. 22B shows a table of registration two-character chains and occurrence frequency sets of the chains;

FIG. 22C shows a plurality of retrieval two-character chains detected from a retrieval character string according to the ninth embodiment;

FIG. 24D shows a plurality of retrieval two-character chains and a retrieval three-character chain detected from a retrieval character string according to the tenth embodiment;

FIG. 26A shows the conversion of a registration character string and a plurality of registration two-character chains detected from the converted registration character string according to the eleventh embodiment;

FIG. 26B shows the relationship between a character placed just after one special character and a symbolic character with which the special character is replaced;

FIG. 26C shows a registration two-character chain table;

FIG. 26D shows the conversion of a retrieval character string and a plurality of retrieval two-character chains detected from the converted retrieval character string according to the eleventh embodiment;

FIG. 26E shows a registration two-character chain table obtained according to a modification of the eleventh embodiment;

FIG. 28A shows the conversion of a registration character string and a plurality of registration two-character chains detected from the converted registration character string according to the twelfth embodiment;

FIG. 28B shows the relationship between a character placed just after one special character and a symbolic character with which the special character is replaced;

FIG. 28C shows a registration two-character chain table;

FIG. 28D shows the conversion of a retrieval character string and a plurality of retrieval two-character chains detected from the converted retrieval character string according to the twelfth embodiment;

FIG. 28E shows a registration two-character chain table obtained according to a modification of the twelfth embodiment;

FIG. 30A shows a plurality of registration two-character chains detected from a registration character string according to the thirteenth embodiment;

FIG. 30B shows fore and rear registration two-character chains obtained from each registration three-character chain detected from a converted registration character string according to the thirteenth embodiment;

FIG. 30C shows a registration general two-character chain table;

FIG. 30D shows a registration special two-character chain table;

FIG. 30E shows a plurality of retrieval two-character chains detected from a retrieval character string according to the thirteenth embodiment;

FIG. 30F shows fore and rear retrieval two-character chains obtained from each retrieval three-character chain detected from a converted retrieval character string according to the thirteenth embodiment;

FIG. 30G shows a retrieval two-character chain table obtained according to a modification of the thirteenth embodiment;

FIG. 32A shows a plurality of registration two-character chains detected from a registration character string and occurrence position numbers of characters of the registration character string according to the fourteenth embodiment;

FIG. 32B shows a plurality of two-character chain tables;

FIG. 32C shows a plurality of retrieval two-character chains detected from a retrieval character string according to the fourteenth embodiment;

FIG. 32D shows a plurality of retrieval two-character chains detected from another retrieval character string according to the fourteenth embodiment;

FIG. 34A generally shows a two-character chain table;

FIG. 34B shows the conversion of a registration character string and a plurality of registration two-character chains detected from the converted registration character string according to the fifteenth embodiment;

FIG. 34C shows occurrence position numbers of characters of the converted registration character string;

FIG. 36A shows the conversion of a registration character string extracted from a text according to the sixteenth embodiment;

FIG. 36B shows a general-symbolic character type relationship between a character type of symbolic character and a character type of general character placed N characters after one special character;

FIG. 36C shows a two-character chain table composed of two-character chain types and occurrence frequency sets;

FIG. 36D shows the conversion of a retrieval character string input by a user according to the sixteenth embodiment;

FIG. 38 shows a two-character chain table composed of two-character chain types and occurrence frequency sets.

DETAILED DESCRIPTION OF THE EMBODIMENTS

Preferred embodiments of a recording medium and a character string collating apparatus according to the present invention are described with reference to the drawings.

Figures 1A, 1B, 1C:
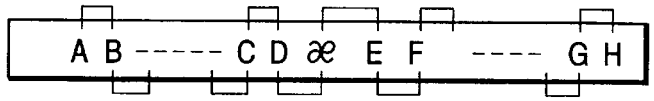
FIG. 1A shows an example of a registration character string extracted from a text.
FIG. 1B shows a table of two-character chains extracted from the registration character string.
FIG. 1C shows a table of two-character chain types in which at least one occurrence frequency set corresponds to each two-character chain type.
Figure 1D:
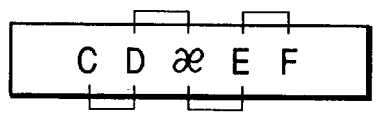
FIG. 1D shows an example of a retrieval character string input by a user to retrieve a particular character string agreeing with the retrieval character string from the registration character string of the text.
Figure 2:
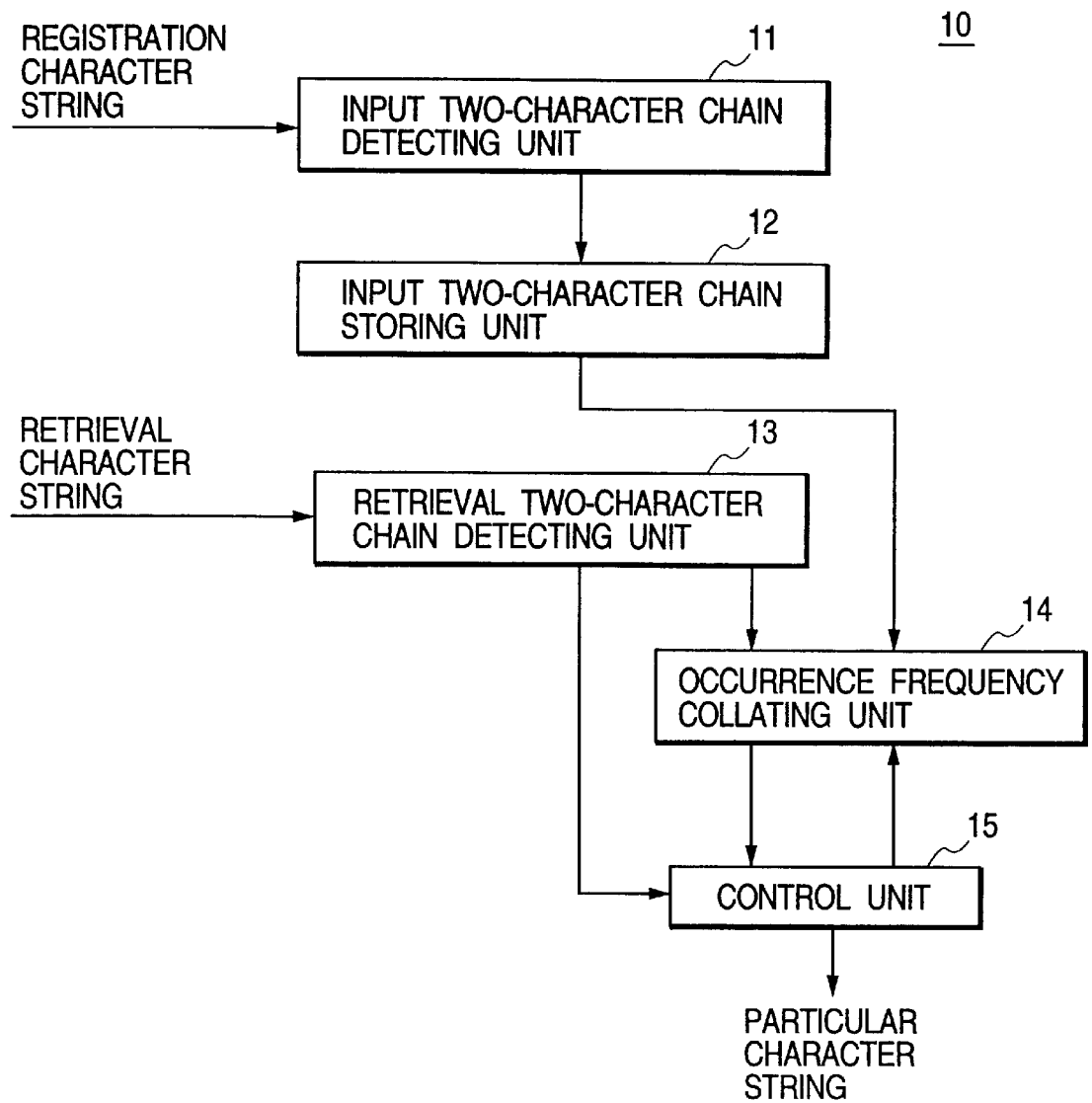
FIG. 2 is a block diagram of a conventional character string collating apparatus.
Figure 3:
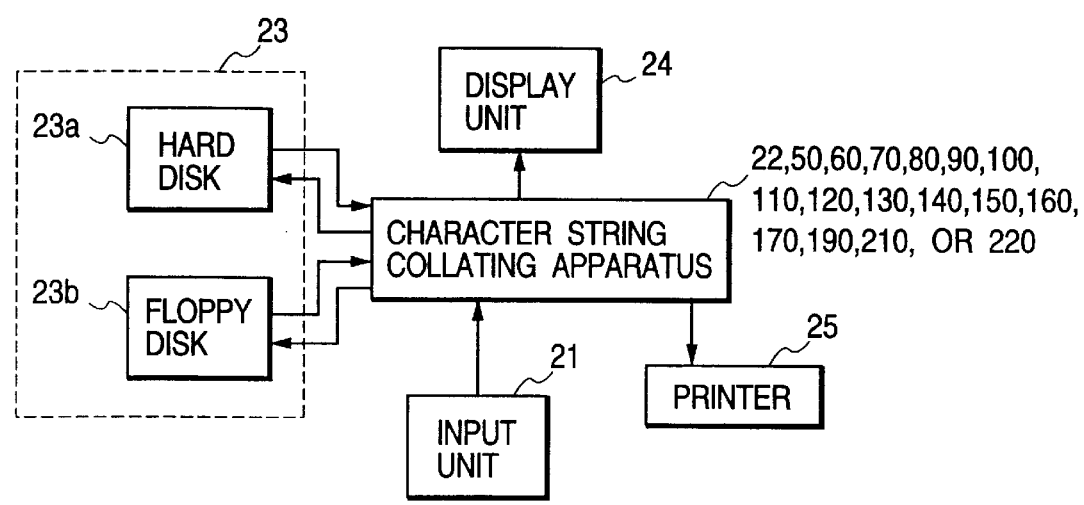
FIG. 3 is a block diagram of a hardware system used to operate a character string collating apparatus according to the present invention.

FIG. 3 is a block diagram of a hardware system used to operate a character string collating apparatus according to the present invention.

As shown in FIG. 3, a hardware system 20 comprises an input unit 21 such as a keyboard or a mouse for inputting a retrieval character string in which the special character is included;

a text recording medium 23 such as a hard disk 23a or a floppy disk 23b for recording a registration character string of a full text in which a special character such as a space in Hangul language is frequently used;

a character string collating apparatus 22, 50, 60, 70, 80, 90, 100, 110, 120, 130, 140, 150, 160, 170, 190, 210 or 220 for detecting all registration character chains (two-character chains and three-character chains) from the registration character string recorded in the text recording medium 23, calculating an occurrence frequency set (or a position number) of each registration character chain, collating the retrieval character string input by the inputting means 21 with the registration character string by using the registration character chains and the occurrence frequency sets (or the position numbers) of the registration character chains, and detecting a particular character string agreeing with the retrieval character string from the registration character string;

a character chain recording medium 26 for recording the registration character chains and the occurrence frequency sets of the registration character chains obtained in the character string collating apparatus;

a display unit 24 for displaying the particular character string written in the retrieval character string and indicating a position of the particular character string in the text; and a printer 25 for printing out a position of the particular character string placed in the retrieval character string.
(First Embodiment)

Figure 4:
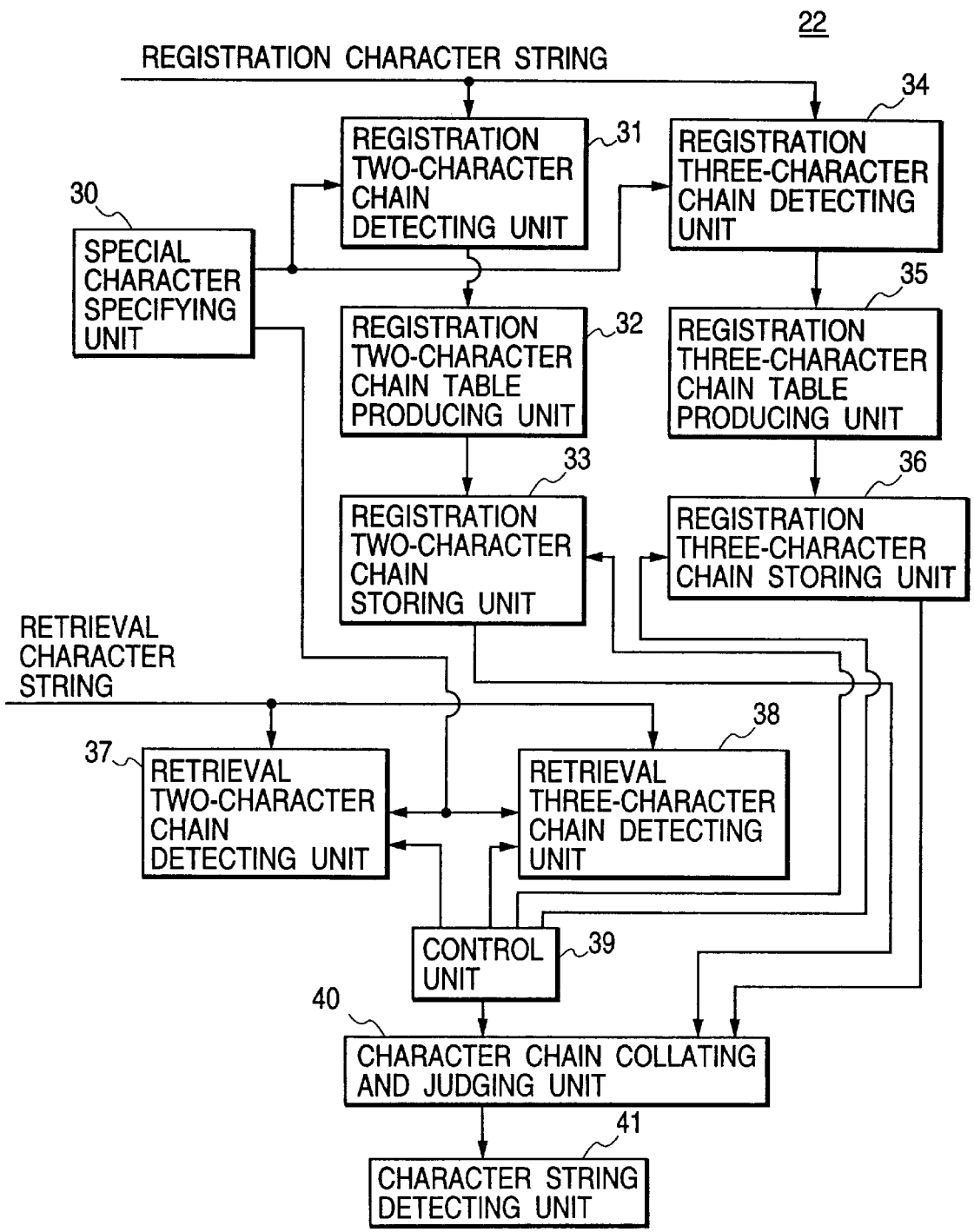
FIG. 4 is a block diagram of a character string collating apparatus according to a first embodiment of the present invention.

FIG. 4 is a block diagram of the character string collating apparatus 22 according to a first embodiment.

As shown in FIG. 4, the character string collating apparatus 22 comprises:

a special character specifying unit 30 for specifying a type of character "æ", frequently occurring in a registration character string, as a special character, the character "æ" being input by the user through the input unit 21;

a registration two-character chain detecting unit 31 for detecting all registration two-character chains, which respectively include a fore general character and a rear general character arranged in series in that order in the registration character string and do not include any special character specified by the special character specifying unit 30, from the registration character string and counting a pair of occurrence frequencies of the fore and rear general characters of each registration two-character chain in the registration character string to produce an occurrence frequency set for each registration two-character chain;

a registration two-character chain table producing unit 32 for classifying each group of registration two-character chains, respectively having the same type of fore general character and the same type of rear general character, into one registration two-character chain type to produce a two-character chain table in which one registration two-character chain type and occurrence frequency sets of registration two-character chains corresponding to the chain type are listed for each chain type;

a registration two-character chain storing unit 33 for storing the two-character chain table produced by the table producing unit 32;

a registration three-character chain detecting unit 34 for detecting a plurality of registration three-character chains, respectively including a fore general character, one special character specified by the special character specifying unit 30 and a rear general character arranged in series in that order in the registration character string, from the registration character string and counting a pair of occurrence frequencies of the fore and rear general characters of each registration three-character chain in the registration character string to produce an occurrence frequency set for each registration three-character chain;

a registration three-character chain table producing unit 35 for classifying each group of registration three-character chains, respectively having the same type of fore general character and the same type of rear general character, into one registration three-character chain type to produce a three-character chain table in which one registration three-character chain type and occurrence frequency sets of registration three-character chains corresponding to the chain type are listed for each chain type;

a registration three-character chain storing unit 36 for storing the three-character chain table produced by the table producing unit 35;

a retrieval two-character chain detecting unit 37 for detecting all retrieval two-character chains, which respectively include a fore general character and a rear general character arranged in that order in the retrieval character string and do not include any special character specified by the special character specifying unit 30, from the retrieval character string in the order of arranging the retrieval two-character chains in the retrieval character string;

a retrieval three-character chain detecting unit 38 for detecting all retrieval three-character chains, respectively including a fore general character, one special character specified by the special character specifying unit 30 and a rear general character arranged in that order in the retrieval character string, from the retrieval character string in the order of arranging the retrieval three-character chains in the retrieval character string;

a control unit 39 for detecting one retrieval two-character chain or one retrieval three-character chain detected by the detecting unit 37 or 38 each time the retrieval two-character chain or the retrieval three-character chain is detected by the detecting unit 37 or 38 in the order of arranging the chains in the retrieval character string and controlling the storing units 33 and 36 to output a particular two-character chain type or a particular three-character chain type agreeing with the retrieval two-character chain or the retrieval three-character chain and occurrence frequency sets of the particular two-character chain type or occurrence frequency sets of the particular three-character chain type for each detection of the retrieval chain;

a character chain collating and judging unit 40 for receiving the occurrence frequency sets of one particular two-character chain type Tc1 or the occurrence frequency sets of one particular three-character chain type Tc1 from the storing unit 33 or 36 just after the reception of the occurrence frequency sets of another particular two-character chain type Tc2 or the occurrence frequency sets of another particular three-character chain type Tc2 under the control of the control unit 39 each time the retrieval two-character chain or the retrieval three-character chain is detected in the detecting unit 37 or 38, collating one occurrence frequency of the fore general character in each occurrence frequency set of the particular chain type Tc1 with that of the rear character in a particular occurrence frequency set of the particular two-character chain type Tc2 or the particular three-character chain type Tc2, judging whether or not the occurrence frequency in the particular chain type Tc1 agrees with that in the particular chain type Tc2, and detecting an occurrence frequency of the fore general character in a particular occurrence frequency set of the particular chain type Tc1 agreeing with that of the rear character in the particular occurrence frequency set of the particular chain type Tc2; and a character string detecting unit 41 for detecting a particular character string agreeing with the retrieval character string from the registration character string according to the particular chain types detected by the control unit 39 and specifying a position of the particular character string in the text according to the particular occurrence frequency sets of the particular chain types detected by the character chain collating and judging unit 40.

In the above configuration, an operation of the character string collating apparatus 22 is described with reference to FIGS. 5A to 5E.

Figure 5A:
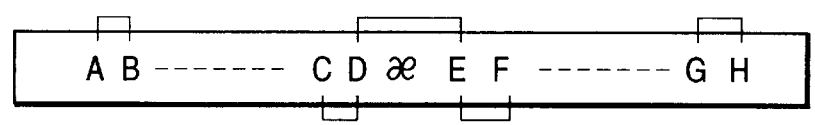
FIG. 5A shows an example of a registration character string extracted from a text according to the first embodiment.

As shown in FIG. 5A, when a type of special character is specified by a user by inputting a special character to the specifying unit 30, a registration two-character chain "AB",--, a registration two-character chain "CD", a registration two-character chain "EF",--, and a registration two-character chain "GH" are detected from a registration character string "AB--CDæEF---GH" of a full text recorded in the recording medium 23 in the detecting unit 31, and an occurrence frequency of each general character included in the registration two-character chains is counted. Also, a registration three-character chain "DæE" is detected from the registration character string in the detecting unit 34, and an occurrence frequency of each general character included in the registration three-character chain is counted.

A letter "æ" included in the registration three-character chain "DæE" denotes a special character inserted into a string of characters to divide the string of characters into a first divided string of characters expressing a first meaning and a second divided string of characters expressing a second meaning. Also, any special character is not included in the registration two-character chains, but the special character is placed between a fore general character "D" and a rear general character "E" in the registration three-character chain "DæE". The general character denotes a character other than the special character, and a series of general characters written in a text expresses a certain meaning.

Figures 5B, 5C, 5D, 5E:
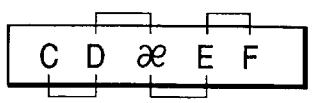
FIG. 5B shows a two-character chain table composed of two-character chain types produced from the registration character string and occurrence frequency sets.
FIG. 5C shows a three-character chain table composed of three-character chains and occurrence frequency sets.
FIG. 5D shows an example of a retrieval character string input by a user according to the first embodiment.
FIG. 5E shows a table of particular chain types and particular occurrence frequency sets selected from the chain tables shown in FIGS. 5B and 5C.

Thereafter, a two-character chain table shown in FIG. 5B and a three-character chain table shown in FIG. 5C are produced in the table producing units 32 and 35. In the three-character chain table, an occurrence frequency set of the registration three-character chain "DæE" is composed of an occurrence frequency N2 of a fore general character "D" and an occurrence frequency N3 of a rear general character "E", and an occurrence frequency of the special character "æ" is not counted. The chain tables are stored in the storing units 33 and 36.

When a user inputs a retrieval character string "CDæEF" shown in FIG. 5D from the input unit 21 to retrieve a particular character string "CDæEF" agreeing with the retrieval character string from the registration character string, a plurality of retrieval two-character chains "CD" and "EF" are detected from the retrieval character string "CDæEF" in the retrieval two-character chain detecting unit 37, and a retrieval three-character chain "DæE" is detected from the retrieval character string "CDæEF" in the retrieval three-character chain detecting unit 38.

The detection of the retrieval two-character chain "CD", the detection of the retrieval three-character chain "DæE" and the detection of the retrieval two-character chain "EF" in the detecting units 37 and 38 is detected by the control unit 39 in that order, and a particular two-character chain type agreeing with one retrieval two-character chain or one retrieval three-character chain and the occurrence frequency sets of the particular chain type are read out from the storing unit 33 or 36 to the collating and judging unit 40 under the control of the control unit 39 each time the retrieval chain is detected by the control unit 39.

In the collating and judging unit 40, when the three-character chain type "DæE" is received as a particular three-character chain type Tc1 with the occurrence frequency sets of the chain type "DæE" after the reception of the particular two-character chain type "CD" and the occurrence frequency sets of the chain type "CD", the particular two-character chain type "CD" is set as a particular two-character chain type Tc2, the occurrence frequency of the fore general character "D" in each occurrence frequency set of the particular three-character chain type "DæE" is collated with an occurrence frequency of the rear character "D" in one occurrence frequency set of the particular two-character chain type "CD" for each particular occurrence frequency set of the particular two-character chain type "CD". Because the occurrence frequency N2 of the fore general character "D" in an occurrence frequency set (N2, N3) of the particular three-character chain type "DæE" agrees with the occurrence frequency N2 of the rear character "D" in the occurrence frequency set (N1, N2) of the particular two-character chain type "CD", the occurrence frequency set (N1, N2) of the particular two-character chain type "CD" is selected as a particular occurrence frequency set, and the occurrence frequency set (N2, N3) of the particular three-character chain type "DæE" is selected as a particular occurrence frequency set. Thereafter, the three-character chain type "DæE" is set as a particular three-character chain type Tc2, the two-character chain type "EF" is received as a particular two-character chain type Tc1, the occurrence frequency of the fore general character "E" in each occurrence frequency set of the particular two-character chain type "EF" is collated with the occurrence frequency N3 of the rear character "E" in the particular occurrence frequency set (N2, N3) of the particular three-character chain type "DæE". Because the occurrence frequency N3 of the fore general character "E" in a particular occurrence frequency set (N3, N4) of the particular two-character chain type "EF" agrees with the occurrence frequency N3 of the rear character "E" in the particular occurrence frequency set (N2, N3) of the particular three-character chain type "DæE", the particular occurrence frequency set (N3, N4) of the particular two-character chain type "EF" is selected as a particular occurrence frequency set. Because the particular occurrence frequency sets of the particular chain types "CD", "DæE" and "EF" corresponding to the retrieval chains "CD", "DæE" and "EF" are determined, it is judged by the control unit 39 that the collation of the retrieval character string "CDæEF" with the registration character string "AB--CDæEF--GH" of the text is successfully completed.

Thereafter, as shown in FIG. 5E, a table of the particular chain types "CD", "DæE" and "EF" and the particular occurrence frequency sets is sent to the character string detecting unit 41, and a position of a particular character string "CDæEF" written in the text is specified according to the particular occurrence frequency sets of the particular chain types. The position of the particular character string "CDæEF" is displayed on the display unit 24 or is printed out by the printer 25.

Accordingly, because each special character occurring in the text is extracted as one three-character chain and any occurrence frequency of the special character is not counted, the increase of the occurrence frequency of the special character can be avoided. Therefore, even though the special character expressing no meaning frequently occurs in the registration character string of the text, the retrieval character string can be efficiently collated with the registration character string while avoiding the increase of a memory capacity.

In this embodiment, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDæEF".

Also, the registration two-character chain storing unit 33 and the registration three-character chain storing unit 36 are required to separately store a group of two-character chains and a group of three-character chains. However, it is applicable that the group of two-character chains and the group of three-character chains be stored in the same memory. In this case, an identifier is attached to each of the two-character chains or each of the three-character chains to distinguish the group of two-character chains from the group of three-character chains.

Also, a plurality of retrieval two-character chains and a plurality of retrieval three-character chains are sent from the detecting units 37 and 38 to the collating and judging unit 40 one after another in the order of arranging the retrieval chains in the retrieval character string. However, it is applicable that the retrieval two-character chains and the retrieval three-character chains be simultaneously sent to the collating and judging unit 40 under the control of the control unit 39.

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Second Embodiment)

In this embodiment, a character string is converted into a converted character string by converting each special character "æ" into a symbolic character determined according to a general character placed just after the special character, and the collation of a retrieval character string with a registration character string is performed after a plurality of two-character chains are extracted from the converted registration character string. Here, the symbolic character is expressed by a symbol or code, the general character denotes a character other than the special character and the symbolic character, and a series of general characters written in a text expresses a certain meaning.

Figure 6:
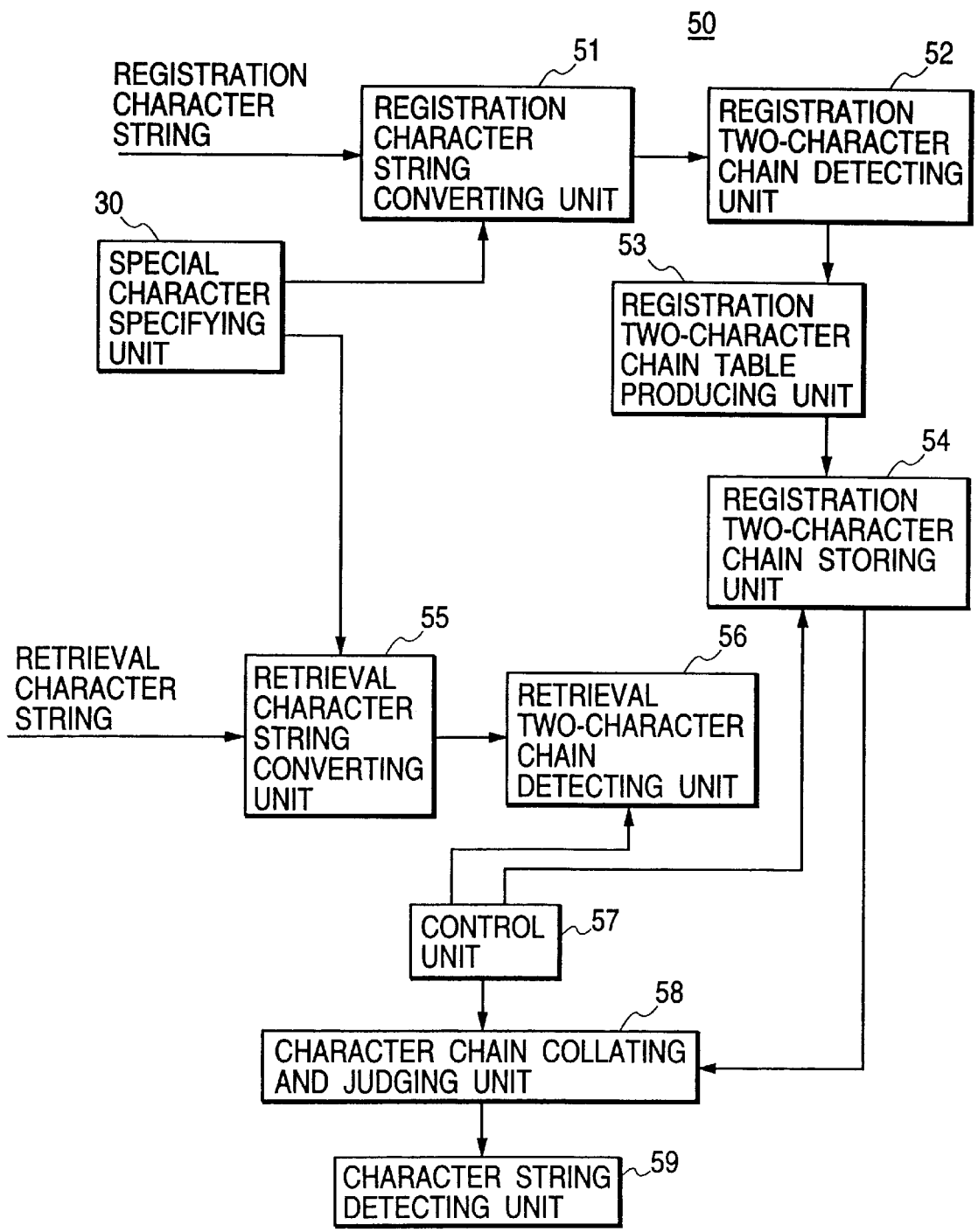
FIG. 6 is a block diagram of a character string collating apparatus according to a second embodiment.

FIG. 6 is a block diagram of a character string collating apparatus according to a second embodiment.

As shown in FIG. 6, a character string collating apparatus 50 comprises: the special character specifying unit 30;

a registration character string converting unit 51 for detecting all special characters specified by the special character specifying unit 30 from the registration character string, converting each detected special character into a symbolic character according to a general-symbolic character type relationship between a character type of the symbolic character and a character type of a general character placed just after the special character to produce a converted registration character string from the registration character string;

a registration two-character chain detecting unit 52 for detecting all registration two-character chains, respectively having a fore general character or a fore symbolic character and a rear general character or a rear symbolic character, from the converted registration character string and counting an occurrence frequency of each character or symbolic character of the registration two-character chains in the converted registration character string to produce an occurrence frequency set for each registration two-character chain;

a registration two-character chain table producing unit 53 for classifying each group of registration two-character chains, respectively having the same type of fore general character or the same type of fore symbolic character and the same type of rear general character or the same type of rear symbolic character, into one registration two-character chain type to produce a two-character chain table in which one registration two-character chain type and occurrence frequency sets of registration two-character chains corresponding to the chain type are listed for each chain type;

a registration two-character chain storing unit 54 for storing the two-character chain table produced by the table producing unit 53;

a retrieval character string converting unit 55 for detecting all special characters specified by the special character specifying unit 30 from the retrieval character string, converting each detected special character into a symbolic character according to the same general-symbolic character type relationship to produce a converted retrieval character string;

a retrieval two-character chain detecting unit 56 for detecting all retrieval two-character chains, which respectively include a fore general character or a fore symbolic character and a rear general character or a rear symbolic character arranged in that order in the converted retrieval character string, from the converted retrieval character string in the order of arranging the chains in the converted retrieval converted character string;

a control unit 57 for detecting one retrieval two-character chain detected by the detecting unit 56 each time the retrieval two-character chain is detected in the detecting unit 56 and controlling the storing unit 54 to output occurrence frequency sets of a particular two-character chain type agreeing with the retrieval two-character chain for each detection of the retrieval two-character chain;

a character chain collating and judging unit 58 for receiving the occurrence frequency sets of one particular two character chain type Tc1 from the storing unit 54 just after the reception of the occurrence frequency sets of another particular two-character chain type Tc2 under the control of the control unit 57 each time the retrieval two-character chain is detected in the detecting unit 56, collating one occurrence frequency of the fore general character (or the fore symbolic character) in each occurrence frequency set of the particular two-character chain type Tc1 with that of the rear general character (or the rear symbolic character) in a particular occurrence frequency set of the particular two-character chain type Tc2 to judge whether or not the occurrence frequency in the particular two-character chain type Tc1 agrees with that in the particular two-character chain type Tc2, and detecting an occurrence frequency of the fore general character in a particular occurrence frequency set of the particular two-character chain type Tc1 agreeing with that of the rear character in the particular occurrence frequency set of the particular two-character chain type Tc2; and a character string detecting unit 59 for detecting a particular character string agreeing with the retrieval character string from the registration character string according to the particular two-character chain types detected by the control unit 57 and specifying a position of the particular character string in the text according to the particular occurrence frequency sets of the particular two-character chain types detected by the character chain collating and judging unit 58.

In the above configuration, an operation of the character string collating apparatus 50 is described with reference to FIGS. 7A to 7E.

As shown in FIG. 7A, a registration character string "AB--CDæEF--GH" of a full text recorded in the recording medium 23 is converted into a converted registration character string "AB--CDE^EF--GH" in the converting unit 51. Here, the symbolic character "E^" replaced with the special character "æ" is determined according to a character type of the general character "E" placed just after the special character. FIG. 7B shows a general-symbolic character type relationship. For example, the special character is replaced with a symbolic character "F^" in cases where a general character "F" is placed just after the special character in the registration character string, and the special character is replaced with a symbolic character "C^" in cases where a general character "C" or a general character "D" is placed just after the special character in the registration character string.

Thereafter, a registration two-character chain "AB",--, a registration two-character chain "CD", a registration two-character chain "DE^", a registration two-character chain "E^E", a registration two-character chain "EF",--, and a registration two-character chain "GH" are detected from the converted registration character string in the detecting unit 52, and an occurrence frequency of each character or symbolic character included in the registration two-character chains is counted. For example, the occurrence frequency of the symbolic character E^ is N3.

Thereafter, a two-character chain table shown in FIG. 7C is produced in the table producing unit 53, and the table is stored in the storing unit 54. For example, an occurrence frequency set of the two-character chain type "DE^" corresponding to the N3-th symbolic character "E^" occurring in the converted registration character string is expressed by (N2, N3), and an occurrence frequency set of the two-character chain type "E^E" corresponding to the N3-th symbolic character "E^" is expressed by (N3, N4).

Figures 7D, 7E:
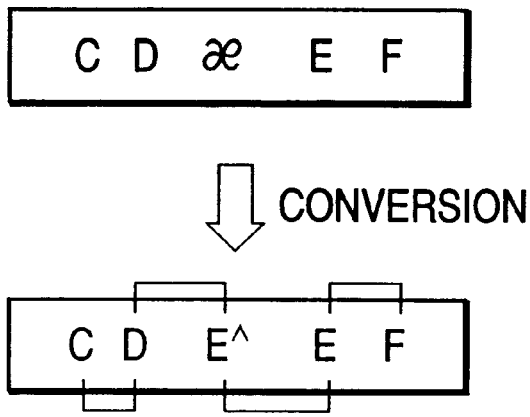
FIG. 7D shows the conversion of a retrieval character string input by a user according to the second embodiment.
FIG. 7E shows a table of particular two-character chain types and particular occurrence frequency sets selected from the two-character chain table shown in FIG. 7C.

As shown in FIG. 7D, when a user inputs a retrieval character string "CDæEF" from the input unit 21 to retrieve a particular character string "CDæEF" agreeing with the retrieval character string from the registration character string, the retrieval character string is converted into a converted retrieval character string "CDE^EF" in the converting unit 55 in the same manner as the conversion of the registration character string, and a plurality of retrieval two-character chains "CD", "DE^", "E^E" and "EF" are detected from the converted retrieval character string in the detecting unit 56.

The detection of the retrieval two-character chains "CD", "DE^", "E^E" and "EF" in the detecting unit 56 is detected by the control unit 57, and a particular two-character chain type Tc1 agreeing with one retrieval two-character chain and the occurrence frequency sets of the particular two-character chain type are read out from the storing unit 54 to the collating and judging unit 58 under the control of the control unit 57 each time the retrieval two-character chain is detected by the control unit 57.

In the collating and judging unit 58, when the particular two-character chain type "DE^" is received from the storing unit 54 as a particular two-character chain type Tc1 with the occurrence frequency sets of the chain type "DE^" after the reception of the particular two-character chain type "CD" and the occurrence frequency sets of the chain type "CD", the particular two-character chain type "CD" is set as a particular two-character chain type Tc2, the occurrence frequency of the fore general character "D" in each occurrence frequency set of the particular two-character chain type "DE^" is collated with the occurrence frequency N2 of the rear character "D" in a particular occurrence frequency set (N1, N2) of the particular two-character chain type "CD" detected by the control unit 57 just before the detection of the particular two-character chain type "DE^". Because the occurrence frequency N2 of the fore general character "D" in the particular occurrence frequency set (N2, N3) of the particular two-character chain type "DE^" agrees with the occurrence frequency N2 of the rear character "D" in the particular occurrence frequency set (N1, N2) of the particular two-character chain type "CD", the particular occurrence frequency set (N2, N3) of the particular two-character chain type "DE^" is set as a particular occurrence frequency set. Thereafter, when the particular two-character chain type "E^E" is received from the storing unit 54, the occurrence frequency of the fore symbolic character "E^" in each occurrence frequency set of the particular two-character chain type "E^E" is collated with the occurrence frequency N3 of the rear symbolic character "E^" in the particular occurrence frequency set (N2, N3) of the particular two-character chain type "DE^". Because the occurrence frequency N3 of the fore symbolic character "E^" in the occurrence frequency set (N3, N4) of the particular two-character chain type "E^E" agrees with the occurrence frequency N3 of the rear symbolic character "E^" in the particular occurrence frequency set (N2, N3) of another particular two-character chain type "DE^", the occurrence frequency set (N3, N4) of the particular two-character chain type "E^E" is set as a particular occurrence frequency set. Thereafter, when the particular two-character chain type "EF" is received from the storing unit 54, the occurrence frequency of the fore general character "E" in each occurrence frequency set of the particular two-character chain type "EF" is collated with the occurrence frequency N4 of the rear general character "E" in the particular occurrence frequency set (N3, N4) of the particular two-character chain type "E^E". Because the occurrence frequency N4 of the fore general character "E" in the occurrence frequency set (N4, N5) of the particular two-character chain type "EF" agrees with the occurrence frequency N4 of the rear general character "E" in the particular occurrence frequency set (N3, N4) of the particular two-character chain type "E^E", the occurrence frequency set (N4, N5) of the particular two-character chain type "EF" is set as a particular occurrence frequency set.

Because the particular occurrence frequency sets of the particular two-character chain types "CD", "DE^", "E^E" and "EF" corresponding to the retrieval two-character chains "CD", "DE^", "E^E" and "EF" are determined, it is judged by the control unit 57 that the collation of the retrieval character string "CDæEF" with the registration character string "AB--CDæEF--GH" of the text is successfully completed.

Thereafter, as shown in FIG. 7E, a table of the particular two-character chain types "CD", "DE^", "E^E" and "EF" and the particular occurrence frequency sets are sent to the character string detecting unit 59, and a position of a particular character string "CDæEF" written in the text is specified according to the particular occurrence frequency sets of the particular two-character chain types. The position of the particular character string "CDæEF" is displayed on the display unit 24 or is printed out by the printer 25.

Accordingly, because each special character occurring in the text is replaced with a symbolic character determined according to a general character placed just after the special character, even though the special character expressing no meaning occurs in the text at a high occurrence frequency, the increase of the occurrence frequency of the two-character chain type corresponding to each symbolic character can be avoided. Therefore, the retrieval character string can be efficiently collated with the registration character string while avoiding the increase of a memory capacity.

Also, because each special character in the registration character string is replaced with one of a plurality of symbolic characters, the number of two-character chains of each two-character chain type relating to one symbolic character is reduced, so that a particular occurrence frequency set of each two-character chain type relating to one symbolic character can be rapidly determined.

Also, because any three-character chain used in the first embodiment is not extracted in this embodiment, the collation of the retrieval character string with the registration character string of the text can be simplified, and a processing time required to perform the collation can be shortened as compared with that in the first embodiment.

In this embodiment, each special character occurring in the text is replaced with a symbolic character determined according to a general character placed just after the special character. However, it is applicable that each special character occurring in the text be replaced with a symbolic character determined according to a general character placed just before the special character.

Also, in cases where a series of special characters "ææ--æ" occurs in the registration character string or the retrieval character string, the series of special characters is replaced with a single special character, and the single special character is replaced with a symbolic character determined according to a general character placed just after the special character. Therefore, a character string "CDæææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Third Embodiment)

In this embodiment, a character string is converted into a converted character string by converting each special character "æ" between a fore general character and a rear general character in the character string into both a first symbolic character (or code) determined according to the front character placed just before the special character and a second symbolic character (or code), which is placed just after the first symbolic character, determined according to the rear general character placed just after the special character, and the collation of a retrieval character string with a registration character string is performed after a plurality of two-character chains are extracted from the converted registration character string.

Figure 8:
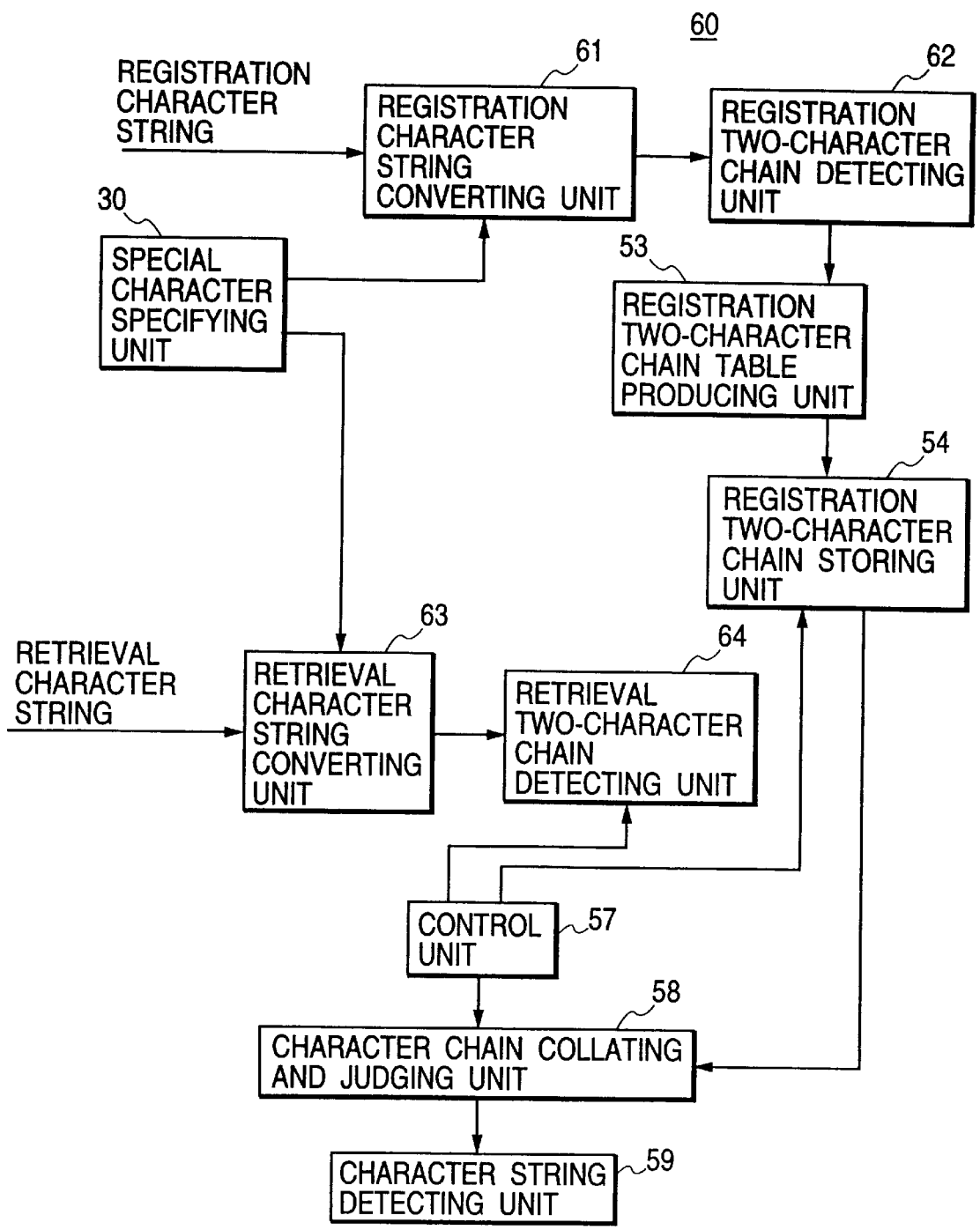
FIG. 8 is a block diagram of a character string collating apparatus according to a third embodiment.

FIG. 8 is a block diagram of a character string collating apparatus according to a third embodiment.

As shown in FIG. 8, a character string collating apparatus 60 comprises: the special character specifying unit 30;

a registration character string converting unit 61 for detecting all special characters frequently specified by the special character specifying unit 30 from the registration character string, converting each detected special character into both a first symbolic character and a second symbolic character according to a general-symbolic character type relationship in which a character type of the first symbolic character corresponds to a character type of one general character placed just before the special character and a character type of the second symbolic character corresponds to a character type of the other general character placed just after the special character, and producing a converted registration character string;

a registration two-character chain detecting unit 62 for detecting all registration two-character chains, respectively having a general character, one first symbolic character or one second symbolic character as a fore character and a general character, one first symbolic character or one second symbolic character as a rear character arranged in that order in the converted registration character string, from the converted registration character string and counting an occurrence frequency of each character of the registration two-character chains in the converted registration character string to produce an occurrence frequency set for each registration two-character chain; the registration two-character chain table producing unit 53; the registration two-character chain storing unit 54;

a retrieval character string converting unit 63 for detecting all special characters specified by the special character specifying unit 30 from the retrieval character string, converting each detected special character into a third symbolic character determined according to the same general-symbolic character type relationship to produce a converted retrieval character string;

a retrieval two-character chain detecting unit 64 for detecting all retrieval two-character chains, which respectively include a fore general character, a fore third symbolic character or a fore fourth symbolic character and a rear general character, a rear third symbolic character or a rear fourth symbolic character arranged in that order in the converted retrieval character string, from the converted retrieval character string in the order of arranging the chains in the converted retrieval converted character string, the control unit 57, the character chain collating and judging unit 58; and the character string detecting unit 59.

In the above configuration, an operation of the character string collating apparatus 60 is described with reference to FIGS. 9A to 9D.

As shown in FIG. 9A, in the converting unit 61, each special character "æ" is converted into both a first symbolic character "D^" determined according to a general character "D" placed just before the special character and a second symbolic character "E^" determined according to a general character "E" placed just after the special character to convert a registration character string "AB--CDæEF--GH" of a full text recorded in the recording medium 23 into a converted registration character string "AB--CDD^E^EF--GH". FIG. 9B shows a general-symbolic character type relationship. For example, in cases where one special character "æ" is placed between a general character "A" and an arbitrary general character "Cg" to form a character chain "AæCg" or "CgæA", the character chain is converted into "AA^Cg^Cg" or "CgCg^A^A". The symbolic character "A^" is determined according to the character "A", and the symbol "Cg^" indicates a symbolic character determined according to the arbitrary general character "Cg" such as "A", "B",-- or "Z". Also, in cases where one special character "æ" is placed between a general character "B" and an arbitrary general character "Cg" to form a character chain "BæCg" or "CgæB", the character chain is converted into "BB^Cg^Cg" or "CgCg^B^B" by using the symbolic character "B^" determined according to the character "B".

Figures 9C, 9D:
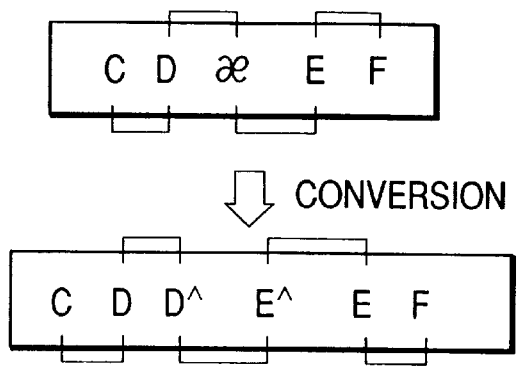
FIG. 9C shows a two-character chain table composed of two-character chain types and occurrence frequency sets.
FIG. 9D shows the conversion of a retrieval character string input by a user according to the third embodiment.

Thereafter, in the detecting unit 62, a plurality of registration two-character chains are detected from the converted registration character string, and an occurrence frequency of each general character and an occurrence frequency of each symbolic character included in the registration two-character chains are counted to produce an occurrence frequency set for each registration two-character chain. For example, as shown in FIG. 9C, three registration two-character chains "DD^", "D^E^" and "E^E" are obtained from a partial character string "DæE" of the registration character string, an occurrence frequency set (N2, N3) of the two-character chains "DD^", an occurrence frequency set (N3, N4) of the two-character chains "D^E^" and an occurrence frequency set (N4, N5) of the two-character chains "E^E" are obtained. Thereafter, a two-character chain table is produced in the producing unit 53 and is stored in the storing unit 54.

As shown in FIG. 9D, when a user inputs a retrieval character string "CDæEF" from the input unit 21 to retrieve a particular character string "CDæEF" agreeing with the retrieval character string from the registration character string, the retrieval character string is converted into a converted retrieval character string "CDD^E^EF" in the converting unit 63 in the same manner as the conversion of the registration character string, and a plurality of retrieval two-character chains "CD", "DD^", "D^E^", "E^E" and "EF" are detected from the converted retrieval character string in the detecting unit 64.

Thereafter, a particular character string "CDæEF" agreeing with the retrieval character string is retrieved from the text in the units 57, 58 and 59 in the same manner as in the second embodiment.

Accordingly, because each special character is converted into two symbolic characters determined according to two general characters adjacent to the special character, even though the special character expressing no meaning occurs in the text at a high occurrence frequency, the increase of the occurrence frequency of the two-character chain type corresponding to each symbolic character can be avoided. Therefore, the retrieval character string can be efficiently collated with the registration character string while avoiding the increase of a memory capacity.

Also, because any three-character chain used in the first embodiment is not extracted in this embodiment, the collation of the retrieval character string with the registration character string of the text can be simplified, and a processing time required to perform the collation can be shortened as compared with that in the first embodiment.

In this embodiment, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Fourth Embodiment)

In this embodiment, an occurrence frequency of each special character occurring in a character string is fixed to a constant value, a two-character chain corresponding to two general characters adjacent to each special character is detected to indicate the serial connection of the general characters through the special character in addition to a plurality of two-character chains detected from the character string in the order of arranging the chains in the character string, and the collation of a retrieval character string with a registration character string is performed.

Figure 10:
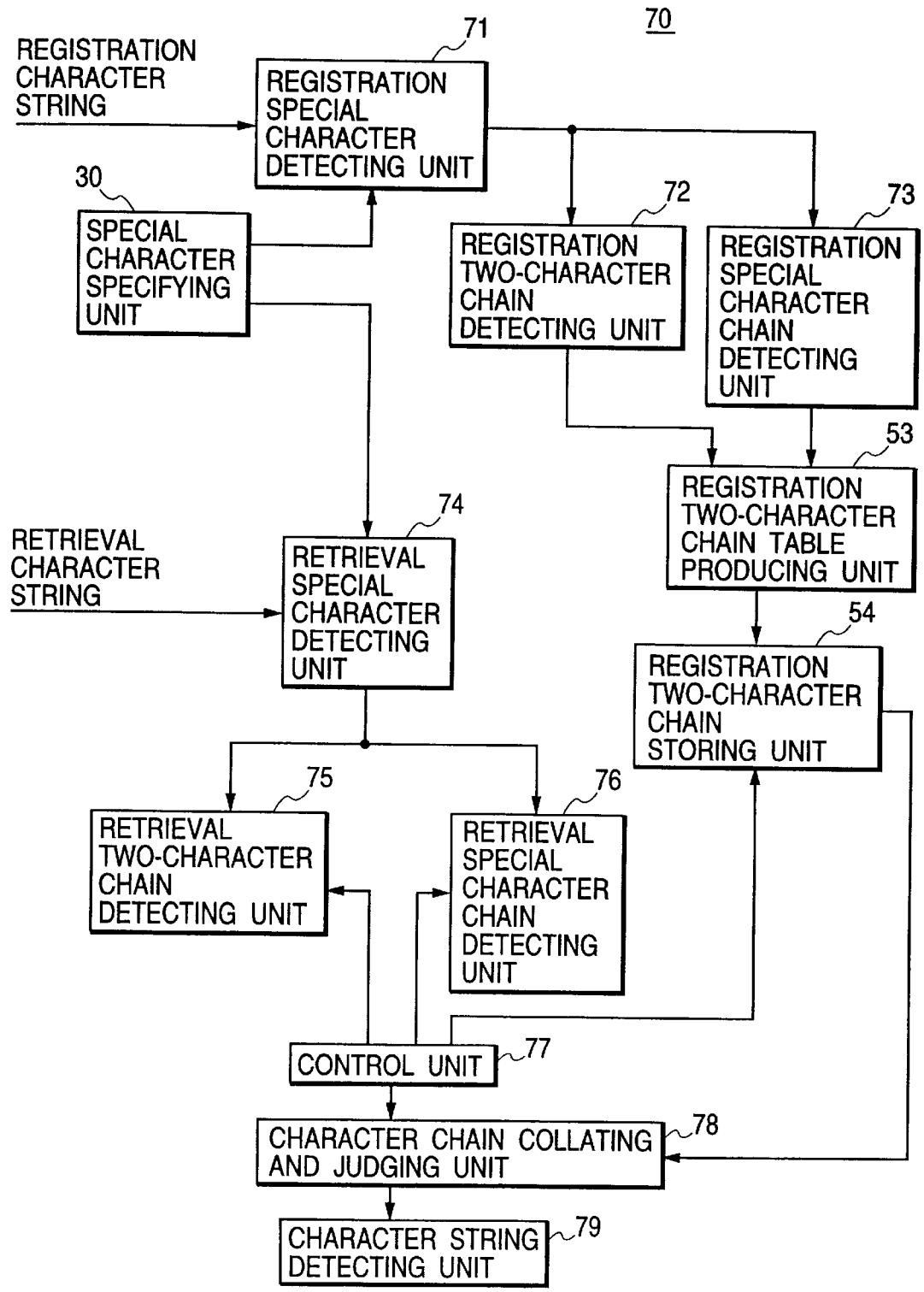
FIG. 10 is a block diagram of a character string collating apparatus according to a fourth embodiment.

FIG. 10 is a block diagram of a character string collating apparatus according to a fourth embodiment.

As shown in FIG. 10, a character string collating apparatus 70 comprises: the special character specifying unit 30;

a registration special character detecting unit 71 for detecting all special characters specified by the special character specifying unit 30 from the registration character string;

a registration two-character chain detecting unit 72 for detecting all registration general two-character chains, which respectively include a fore general character and a rear general character arranged in series in that order in the registration character string and do not include any special character detected by the registration special character detecting unit 71, from the registration character string and counting a pair of occurrence frequencies of the fore and rear general characters of each registration general two-character chain in the registration character string to produce an occurrence frequency set for each registration general two-character chain;

a registration special character chain detecting unit 73 for detecting all registration three-character chains, respectively including a fore general character, one special character detected by the registration special character detecting unit 71 and a rear general character arranged in that order in the registration character string, from the registration character string, producing a first registration two-character chain including the fore general character and the rear general character in that order, a second registration two-character chain including the fore general character and the special character in that order and a third registration two-character chain including the special character and the rear general character in that order from each registration three-character chain, counting an occurrence frequency of each general character of the general two-character chains in the registration character string, and setting an occurrence frequency of each special character included in the two-character chains to a constant value; the registration two-character chain table producing unit 53; the registration two-character chain storing unit 54;

a retrieval special character detecting unit 74 for detecting all special characters occurring in a retrieval character string;

a retrieval two-character chain detecting unit 75 for detecting all retrieval general two-character chains, which respectively include a fore general character and a rear general character arranged in that order in the retrieval character string and do not include any special character detected by the retrieval character detecting unit 74, from the retrieval character string in the order of arranging the chains in the retrieval character string;

a retrieval special character chain detecting unit 76 for detecting all retrieval three-character chains, respectively including a fore general character, one special character detected by the retrieval character detecting unit 74 and a rear general character arranged in that order in the retrieval character string, from the retrieval character string in the order of arranging the chains in the retrieval character string, and producing a first retrieval two-character chain including the fore general character and the rear general character in that order, a second retrieval two-character chain including the fore general character and the special character in that order and a third retrieval two-character chain including the special character and the rear general character in that order from each retrieval three-character chain in the order of the first, second and third retrieval two-character chains;

a control unit 77 for detecting one retrieval general two-character chain detected by the detecting unit 75 or each of three retrieval two-character chains produced by the detecting unit 76 each time the retrieval general two-character chain or the retrieval three-character chain is detected by the detecting unit 75 or 76 in the order of arranging the chains in the retrieval character string and controlling the storing unit 54 to output occurrence frequency sets of a particular two-character chain type agreeing with the detected retrieval two-character chain for each detection of the retrieval two-character chain;

a character chain collating and judging unit 78 for receiving the occurrence frequency sets of one particular two-character chain type Tc1 from the storing unit 54 just after the reception of the occurrence frequency sets of another particular two-character chain type Tc2 under the control of the control unit 77 each time the retrieval two-character chain is detected or produced in the detecting unit 75 or 76, collating one occurrence frequency of the fore general character in each occurrence frequency set of the particular two-character chain type Tc1 with that of the rear character in a particular occurrence frequency set of the particular two-character chain type Tc2 in cases where the control unit 77 detects that the retrieval two-character chains corresponding to the chain types Tc1 and Tc2 are detected together by the detecting unit 75 (first collation case), collating one occurrence frequency of the fore general character in each occurrence frequency set of the particular two-character chain type Tc1 with that of the rear character in a particular occurrence frequency set of the particular two-character chain type Tc2 in cases where the control unit 77 detects that the retrieval two-character chain corresponding to the chain type Tc1 (or Tc2) is produced by the detecting unit 76 and the retrieval two-character chain corresponding to the chain type Tc2 (or Tc1) is detected by the detecting unit 75 (second collation case), collating one occurrence frequency of the fore general character in each occurrence frequency set of the particular two-character chain type Tc1 with that of the fore character in a particular occurrence frequency set of the particular two-character chain type Tc2 in cases where the control unit 77 detects that the retrieval two-character chain corresponding to the chain type Tc1 is the second retrieval two-character chain produced by the detecting unit 76 and the retrieval two-character chain corresponding to the chain type Tc2 is the first retrieval two-character chain produced by the detecting unit 76 (third collation case), collating one occurrence frequency of the rear general character in each occurrence frequency set of the particular two-character chain type Tc1 with that of the rear character in a particular occurrence frequency set of another particular two-character chain type Tc3 detected by the control unit 39 just before the detection of the particular two-character chain type Tc2 in cases where the control unit 77 detects that the retrieval two-character chain corresponding to the chain type Tc1 is the third retrieval two-character chain produced by the detecting unit 76 and the retrieval two-character chain corresponding to the chain type Tc2 is the second retrieval two-character chain produced by the detecting unit 76 (fourth collation case), judging whether or not the occurrence frequency in the particular two-character chain type Tc1 agrees with that in the particular two-character chain type Tc2 (or Tc3), and detecting an occurrence frequency in a particular occurrence frequency set of the particular two-character chain type Tc1 agreeing with that in the particular two-character chain type Tc2 (or Tc3); and a character string detecting unit 79 for detecting a particular character string agreeing with the retrieval character string from the registration character string according to the particular two-character chain types detected by the control unit 77 and specifying a position of the particular character string in the text according to the particular occurrence frequency sets of the particular two-character chain types detected by the character chain collating and judging unit 78.

In the above configuration, an operation of the character string collating apparatus 70 is described with reference to FIGS. 11A to 11D.

As shown in FIG. 11A, a plurality of special characters frequently occurring in a registration character string "AB--CDæEF---GH" of a full text are detected in the detecting unit 71. Thereafter, a plurality of registration general two-character chain "AB",--, a registration general two-character chain "CD", a registration general two-character chain "EF",--, and a registration general two-character chain "GH", in which any special character is not included, are detected from the registration character string in the detecting unit 72.

Also, in the detecting unit 73, a registration three-character chain "DæE" including a fore general character "D", one special character "æ" and a rear general character "E" in that order is detected from the registration character string, and a first registration two-character chain "DE" including the fore general character and the rear general character in that order, a second registration two-character chain "Dæ" including the fore general character and the special character in that order and a third registration two-character chain "æE" including the special character "æ" and the rear general character "E" in that order are produced from the registration three-character chain "DæE". Thereafter, an occurrence frequency of each general character included in the two-character chains is counted, and an occurrence frequency of each special character included in the two-character chains is set to a constant value Nc.

Thereafter, in the table producing unit 53, a two-character chain table shown in FIG. 11B is produced from the registration two-character chains obtained in the detecting units 72 and 73. In the three-character chain table, an occurrence frequency set of the general two-character chain "CD" is (N1, N2), an occurrence frequency set of the first two-character chain "DE" is (N2, N3), an occurrence frequency set of the second two-character chain "Dæ" is (N2, Nc), an occurrence frequency set of the third two-character chain "æE" is (Nc, N3), and an occurrence frequency set of the general two-character chain "EF" is (N3, N4). The chain table is stored in the storing unit 54.

When a user inputs a retrieval character string "CDæEF" shown in FIG. 11c from the input unit 21 to retrieve a particular character string "CDæEF" agreeing with the retrieval character string from the registration character string, the special character "æ" of the retrieval character string is detected in the detecting unit 74, a plurality of retrieval general two-character chains "CD" and "EF" are detected from the retrieval character string "CDæEF" in the detecting unit 75. Also, in the detecting unit 76, a retrieval three-character chain "DæE" including a fore general character "D", one special character "æ" and a rear general character "E" in that order is detected from the retrieval character string "CDæEF", and a first retrieval general two-character chain "DE" including the fore general character "D" and the rear general character "E" in that order, a second retrieval two-character chain "Dæ" including the fore general character "D" and the special character "æ" in that order and a third retrieval two-character chain "æE" including the special character "æ" and the rear general character "E" in that order are produced from the retrieval three-character chain "DæE" in the order of the first, second and third retrieval two-character chains.

The detection of the retrieval general two-character chain "CD", the production of the first retrieval general two-character chain "DE", the production of the second retrieval two-character chain "Dæ", the production of the third retrieval two-character chain "æE" and the detection of the retrieval general two-character chain "EF" are detected by the control unit 77. Thereafter, a plurality of occurrence frequency sets of the particular general two-character chain type "CD" corresponding to the retrieval general two-character chain "CD", a plurality of occurrence frequency sets of the particular general two-character chain type "DE" corresponding to the retrieval general two-character chain "DE", a plurality of occurrence frequency sets of the particular two-character chain type "Dæ" corresponding to the retrieval two-character chain "Dæ", a plurality of occurrence frequency sets of the particular two-character chain type "æE" corresponding to the retrieval two-character chain "æE" and a plurality of occurrence frequency sets of the particular general two-character chain type "EF" corresponding to the retrieval general two-character chain "EF" are output from the storing unit 54 to the collating and judging unit 78 in that order under the control of the control unit 77.

In the collating and judging unit 78, when the particular general two-character chain type "DE" is received from the storing unit 54 as a particular two-character chain type Tc1 after the reception of the particular two-character chain type "CD", the particular two-character chain type "CD" is set as a particular two-character chain type Tc2, the occurrence frequency of the fore general character "D" in each occurrence frequency set of the particular two-character chain type "DE" is collated with the occurrence frequency N2 of the rear character "D" in a particular occurrence frequency set (N1, N2) of the particular two-character chain type "CD" (the first collation case). Because the occurrence frequency N2 of the fore general character "D" in the occurrence frequency set (N2,N3) of the particular two-character chain type "DE" agrees with that of the rear character "D" in the particular two-character chain type "CD", the occurrence frequency set (N2, N3) of the particular two-character chain type "DE" is set as a particular occurrence frequency set. Thereafter, when the occurrence frequency sets of the particular two-character chain type "Dæ" are received from the storing unit 54, the occurrence frequency of the fore general character "D" in each occurrence frequency set of the particular two-character chain type "Dæ" is collated with the occurrence frequency N2 of the fore character "D" in the particular occurrence frequency set (N2, N3) of the particular two-character chain type "DE" (the third collation case). Because the occurrence frequency N2 of the fore general character "D" in the occurrence frequency set (N2,Nc) of the particular two-character chain type "Dæ" agrees with that of the fore character "D" in the particular two-character chain type "DE", the occurrence frequency set (N2, Nc) of the particular two-character chain type "Dæ" is set as a particular occurrence frequency set. Thereafter, when the occurrence frequency sets of the particular two-character chain type "æE"are received from the storing unit 54, the occurrence frequency of the rear general character "E" in each occurrence frequency set of the particular two-character chain type "æE" is collated with the occurrence frequency N3 of the rear character "E" in the particular occurrence frequency set (N2, N3) of the particular two-character chain type "DE" (the fourth collation case). Because the occurrence frequency N3 of the rear general character "E" in the occurrence frequency set (Nc,N3) of the particular two-character chain type "æE" agrees with that of the rear character "E" in the particular two-character chain type "DE", the occurrence frequency set (Nc, N3) of the particular two-character chain type "æE" is set as a particular occurrence frequency set. Thereafter, when the occurrence frequency sets of the particular two-character chain type "EF" are received from the storing unit 54, the occurrence frequency of the fore general character "E" in each occurrence frequency set of the particular two-character chain type "EF" is collated with the occurrence frequency N3 of the rear character "E" in the particular occurrence frequency set (Nc, N3) of the particular two-character chain type "æE" (the first collation case). Because the occurrence frequency N3 of the fore general character "E" in the occurrence frequency set (N3,N4) of the particular two-character chain type "EF" agrees with that of the rear character "E" in the particular two-character chain type "æE", the occurrence frequency set (N3, N4) of the particular two-character chain type "EF" is set as a particular occurrence frequency set.

Because the particular occurrence frequency sets of the particular two-character chain types "CD", "DE", "Dæ", "æE" and "EF" corresponding to the retrieval two-character chains "CD", "DE", "Dæ", "æE" and "EF" are determined, it is judged by the control unit 77 that the collation of the retrieval character string "CDæEF" with the registration character string "AB--CDæEF--GH" of the text is successfully completed.

Thereafter, as shown in FIG. 11D, a table of the particular two-character chain types "CD", "DE", "Dæ", "æE" and "EF" and the particular occurrence frequency sets are sent to the character string detecting unit 79, and a position of a particular character string "CDæEF" written in the text is specified according to the particular occurrence frequency sets of the particular two-character chain types. The position of the particular character string "CDæEF" is displayed on the display unit 24 or is printed out by the printer 25.

Accordingly, because an occurrence frequency of each special character occurring in the text is fixed to a constant value, even though the special character expressing no meaning occurs in the text at a high occurrence frequency, the increase of the occurrence frequency of the special character can be avoided. Therefore, the retrieval character string can be efficiently collated with the registration character string while avoiding the increase of a memory capacity.

Also, even though an occurrence frequency of one special character occurring in the text is fixed to a constant value, because the serial connection among a fore general character, the special character and a rear general character arranged in that order in a three-character chain is ascertained by checking both the serial connection between a first two-character chain including the fore general character and the rear general character and a second two-character chain including the fore general character and the special character and the serial connection between the first two-character chain and a third two-character chain including the special character and the rear general character, the collation of the retrieval character string with the registration character string can be correctly performed.

In this embodiment, each special character written in the text is separately used, and any series of special characters does not occur in the text. However, in cases where a series of special characters "æœ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Fifth Embodiment)

In this embodiment, a three-character chain including a fore general character, one special character and a rear general character arranged in that order is detected for each special character of a character string, a fore two-character chain including the fore general character and the special character and a rear two-character chain including the special character and the rear general character are produced from the three-character chain in a pair, an occurrence frequency of the special character is set to zero, the fore two-character chain and the rear two-character chain are linked to each other, and the collation of a retrieval character string with a registration character string is performed.

Figure 12:
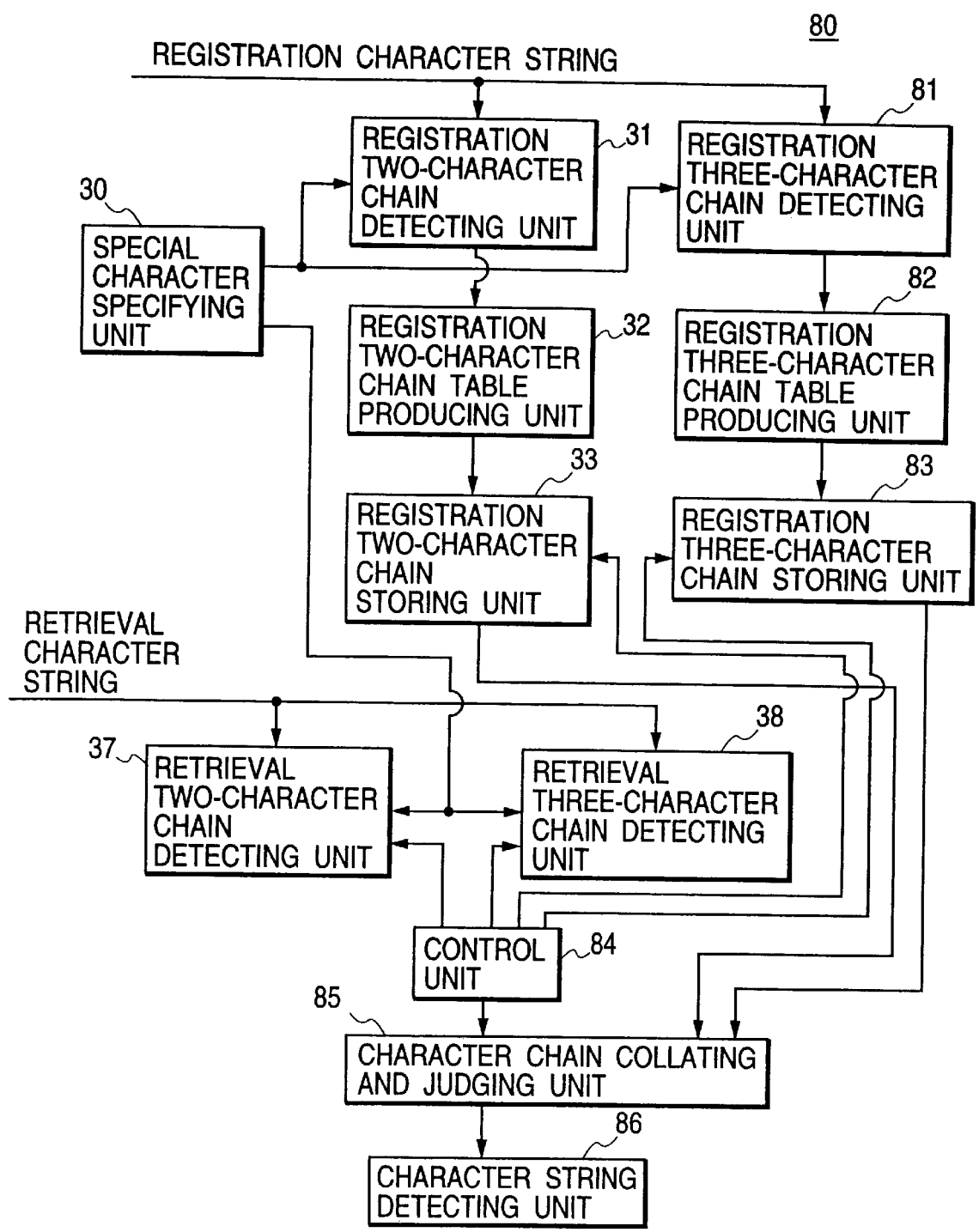
FIG. 12 is a block diagram of a character string collating apparatus according to a fifth embodiment.

FIG. 12 is a block diagram of a character string collating apparatus according to a fifth embodiment.

As shown in FIG. 12, a character string collating apparatus 80 comprises: the special character specifying unit 30; the registration two-character chain detecting unit 31; the registration two-character chain table producing unit 32; the registration two-character chain storing unit 33;

a registration three-character chain detecting unit 81 for detecting all registration three-character chains, respectively including a fore general character, one special character specified by the special character specifying unit 30 and a rear general character arranged in that order in the registration character string, from the registration character string, producing a fore registration two-character chain including the fore general character and the special character and a rear registration two-character chain including the special character and the rear general character from each registration three-character chain, counting occurrence frequencies of the fore and rear general characters included in each registration two-character chain, and setting an occurrence frequency of the special character included in each registration two-character chain to zero to produce an occurrence frequency set for each registration two-character chain;

registration three-character chain table producing unit 82 for classifying each group of registration three-character chains, respectively having the same type of fore general character and the same type of rear general character, into one registration three-character chain type, decomposing each registration three-character chain type into a fore registration two-character chain type and a rear registration two-character chain type linked to each other and producing a three-character chain table in which the fore registration two-character chain type, a plurality of occurrence frequency sets of the chain type, the rear registration two-character chain type and a plurality of occurrence frequency sets of the chain type are listed for each registration three-character chain type;

a registration three-character chain storing unit 83 for storing the three-character chain table produced by the table producing unit 82; the retrieval two-character chain detecting unit 37; the retrieval three-character chain detecting unit 38;

a control unit 84 for detecting one retrieval two-character chain or one retrieval three-character chain detected by the detecting unit 37 or 38 each time the retrieval two-character chain or the retrieval three-character chain is detected by the detecting unit 37 or 38 in the order of arranging the chains in the retrieval character string and controlling the storing units 33 and 83 to output occurrence frequency sets of a particular two-character chain type or occurrence frequency sets of a particular three-character chain type agreeing with the retrieval two-character chain or the retrieval three-character chain for each detection of the retrieval chain;

a character chain collating and judging unit 85 for receiving the occurrence frequency sets of one particular two-character chain type Tc1 or the occurrence frequency sets of one particular three-character chain type Tc1 from the storing unit 33 or 83 just after the reception of the occurrence frequency sets of another particular two-character chain type Tc2 or the occurrence frequency sets of another particular three-character chain type Tc2 under the control of the control unit 84 each time the retrieval two-character chain or the retrieval three-character chain is detected in the detecting unit 37 or 38, collating one occurrence frequency of the fore general character in each occurrence frequency set of the particular two-character chain type Tc1 with that of the rear character in a particular occurrence frequency set of the particular two-character chain type Tc2 in cases where the control unit 77 detects that the retrieval two-character chains corresponding to the chain types Tc1 and Tc2 are detected together by the detecting unit 37 (first collation case), collating one occurrence frequency of the fore general character in each occurrence frequency set of the fore two-character chain of the particular three-character chain type Tc1 with that of the rear character in a particular occurrence frequency set of the particular two-character chain type Tc2 in cases where the control unit 77 detects that the retrieval three-character chain corresponding to the particular three-character chain type Tc1 is detected by the detecting unit 38 and the retrieval two-character chain corresponding to the particular two-character chain type Tc2 is detected by the detecting unit 37 (second collation case), collating one occurrence frequency of the fore general character in each occurrence frequency set of the particular two-character chain type Tc1 with that of the rear character in a particular occurrence frequency set of the rear two-character chain type of the particular three-character chain type Tc2 in cases where the control unit 77 detects that the retrieval two-character chain corresponding to the particular two-character chain type Tc1 is detected by the detecting unit 37 and the retrieval three-character chain corresponding to the particular three-character chain type Tc2 is detected by the detecting unit 38 (third collation case), judging whether or not the occurrence frequency in the particular chain type Tc1 agrees with that in the particular chain type Tc2, and detecting an occurrence frequency of a particular occurrence frequency set of the particular chain type Tc1 agreeing with that in the particular chain type Tc2; and a character string detecting unit 86 for detecting a particular character string agreeing with the retrieval character string from the registration character string according to the particular chain types detected by the control unit 84 and specifying a position of the particular character string in the text according to the particular occurrence frequency sets of the particular chain types detected by the character chain collating and judging unit 85.

In the above configuration, an operation of the character string collating apparatus 80 is described with reference to FIGS. 13A to 13E.

Figures 13A, 13B, 13C:
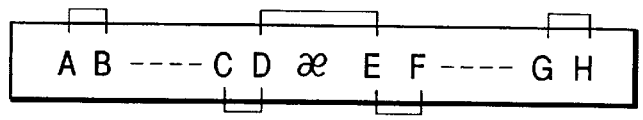
FIG. 13A shows a plurality of registration two-character chains and registration three-character chains detected from a registration character string according to the fifth embodiment.
FIG. 13B shows a two-character chain table composed of a plurality of two-character chain types and occurrence frequency sets of the chain types.
FIG. 13C shows a three-character chain table composed of a plurality of three-character chain types and occurrence frequency sets of the chain types.

As shown in FIG. 13A, when a type of special character is specified by a user by inputting a special character to the specifying unit 30, a registration general two-character chain "AB",--, a registration general two-character chain "CD", a registration general two-character chain "EF",--, and a registration general two-character chain "GH" are detected from a registration character string "AB--CDæEF---GH" of a full text recorded in the recording medium 23 in the detecting unit 31, and an occurrence frequency of each general character included in the registration general two-character chains is counted.

Also, in the detecting unit 81, a registration three-character chain "DæE" is detected from the registration character string, a fore two-character chain "Dæ" and a rear two-character chain "æE" are produced from the registration three-character chain, an occurrence frequency of each general character included in the fore and rear two-character chains is counted and an occurrence frequency of the special character "æ" is set to zero.

Thereafter, a two-character chain table shown in FIG. 13B is produced in the table producing unit 32, and a three-character chain table shown in FIG. 13C is produced in the table producing unit 82. In the three-character chain table, a three-character chain type "DæE" is divided into a fore two-character chain type "Dæ" and a rear two-character chain type "æE", an occurrence frequency set (N2, 0) of the fore two-character chain type "Dæ" and an occurrence frequency set (0, N3) of the rear two-character chain type "æE" are linked to each other. The chain tables are stored in the storing units 33 and 83.

Figures 13D, 13E:
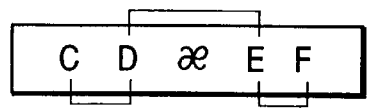
FIG. 13D shows a plurality of retrieval two-character chains and registration three-character chains detected from a retrieval character string according to the fifth embodiment.
FIG. 13E shows a particular occurrence frequency set determined for each of a plurality of particular two-character chains in the collation according to the fifth embodiment.

When a user inputs a retrieval character string "CDæEF" shown in FIG. 13D from the input unit 21 to retrieve a particular character string "CDæEF" agreeing with the retrieval character string from the registration character string, a plurality of retrieval general two-character chains "CD" and "EF" are detected from the retrieval character string "CDæEF" in the retrieval two-character chain detecting unit 37, and a retrieval three-character chain "DæE" is detected from the retrieval character string "CDæEF" in the retrieval three-character chain detecting unit 38.

The detection of the retrieval general two-character chain "CD", the detection of the retrieval three-character chain "DæE" and the detection of the retrieval general two-character chain "EF" in the detecting units 37 and 38 are detected by the control unit 84 in that order, and a particular two-character chain type agreeing with one retrieval two-character chain or one retrieval three-character chain and the occurrence frequency sets of the particular chain type are read out from the storing unit 33 or 83 to the collating and judging unit 85 under the control of the control unit 84 each time the retrieval chain is detected by the control unit 84.

In the collating and judging unit 85, when the three-character chain type "DEE" is received as a particular three-character chain type Tc1 after the reception of the two-character chain type "CD", the two-character chain type "CD" is set as a particular two-character chain type Tc2, the occurrence frequency of the fore general character "D" in each occurrence frequency set of the fore two-character chain type "Dæ" of the particular three-character chain type "DæE" is collated with an occurrence frequency of the rear character "D" in one particular occurrence frequency set of the particular two-character chain type "CD" for each particular occurrence frequency set of the particular two-character chain type "CD" (the second collation case). Because the occurrence frequency N2 of the fore general character "D" in an occurrence frequency set (N2, 0) of the fore two-character chain type "Dæ" of the particular three-character chain type "DæE" agrees with the occurrence frequency N2 of the rear character "D" in the particular occurrence frequency set (N1, N2) of the particular two-character chain type "CD", the occurrence frequency set (N1, N2) of the particular two-character chain type "CD" is selected as a particular occurrence frequency set, and the occurrence frequency set (N2, 0) of the fore two-character chain type "Dæ" of the particular three-character chain type "DæE" is selected as a particular occurrence frequency set.

Thereafter, when the two-character chain type "EF" is received as a particular two-character chain type Tc1, the particular three-character chain type "DæE" is set as a particular three-character chain type Tc2, a particular occurrence frequency set (0, N3) of the rear two-character chain "æE" linked with the particular occurrence frequency set (N2, 0) of the fore two-character chain type "Dæ" is selected, the occurrence frequency of the fore general character "E" in each occurrence frequency set of the particular two-character chain type "EF" is collated with a particular occurrence frequency N3 of the rear character "E" in the particular occurrence frequency set (0, N3) of the rear two-character chain "SE" (the third collation case). Because the occurrence frequency N3 of the fore general character "E" in an occurrence frequency set (N3, N4) of the particular two-character chain type "EF" agrees with the particular occurrence frequency N3 of the rear character "E" in the particular occurrence frequency set (0, N3) of the rear two-character chain "æE", the occurrence frequency set (N3, N4) of the particular two-character chain type "EF" is set as a particular occurrence frequency set. Because the particular occurrence frequency sets of the particular chain types "CD", "Dæ", "æE" and "EF" corresponding to the retrieval chains "CD", "DæE" and "EF" are determined, it is judged by the control unit 84 that the collation of the retrieval character string "CDæEF" with the registration character string "AB--CDæEF--GH" of the text is successfully completed.

Thereafter, as shown in FIG. 13E, a table of the particular two-character chain types "CD" and "EF" and the particular two-character chain type "DæE" and the particular occurrence frequency sets of the chain types are sent to the character string detecting unit 86, and a position of a particular character string "CDæEF" written in the text is specified according to the particular occurrence frequency sets of the particular chain types. The position of the particular character string "CDæEF" is displayed on the display unit 24 or is printed out by the printer 25.

Accordingly, because an occurrence frequency of each special character occurring in the text is fixed to zero, even though the special character expressing no meaning occurs in the text at a high occurrence frequency, the increase of the occurrence frequency of the special character can be avoided. Therefore, the retrieval character string can be efficiently collated with the registration character string while avoiding the increase of a memory capacity.

Also, even though an occurrence frequency of one special character occurring in the text is fixed to zero, because the serial connection among a fore general character, the special character and a rear general character arranged in that order in a three-character chain is ascertained by linking a fore two-character chain including the fore general character and the special character and a rear two-character chain including the special character and the rear general character, the collation of the retrieval character string with the registration character string can be correctly performed.

In this embodiment, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the registration two-character chain storing unit 33 and the registration three-character chain storing unit 83 are required to separately store a two-character chain table and a three-character chain table. However, it is applicable that the two-character chain table and the three-character chain table be stored in the same memory. In this case, an identifier is attached to each of the two-character chain types of the two-character chain table or each of the three-character chain types of the three-character chain table to distinguish the group of two-character chain types from the group of three-character chain types.

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Sixth Embodiment)

In this embodiment, a three-character chain including a fore general character, one special character and a rear general character arranged in that order is detected for each special character of a character string, an occurrence frequency of the rear general character in the character string is counted, a converted three-character chain including the fore general character and the two rear general characters arranged in that order is produced from the three-character chain, a two-character chain including the fore general character and the rear general character and a two-character chain including the two rear general characters are produced from the converted three-character chain, occurrence frequencies of the rear general characters included in the two-character chains are set to the same counted occurrence frequency, and the collation of a retrieval character string with a registration character string is performed.

Figure 14:
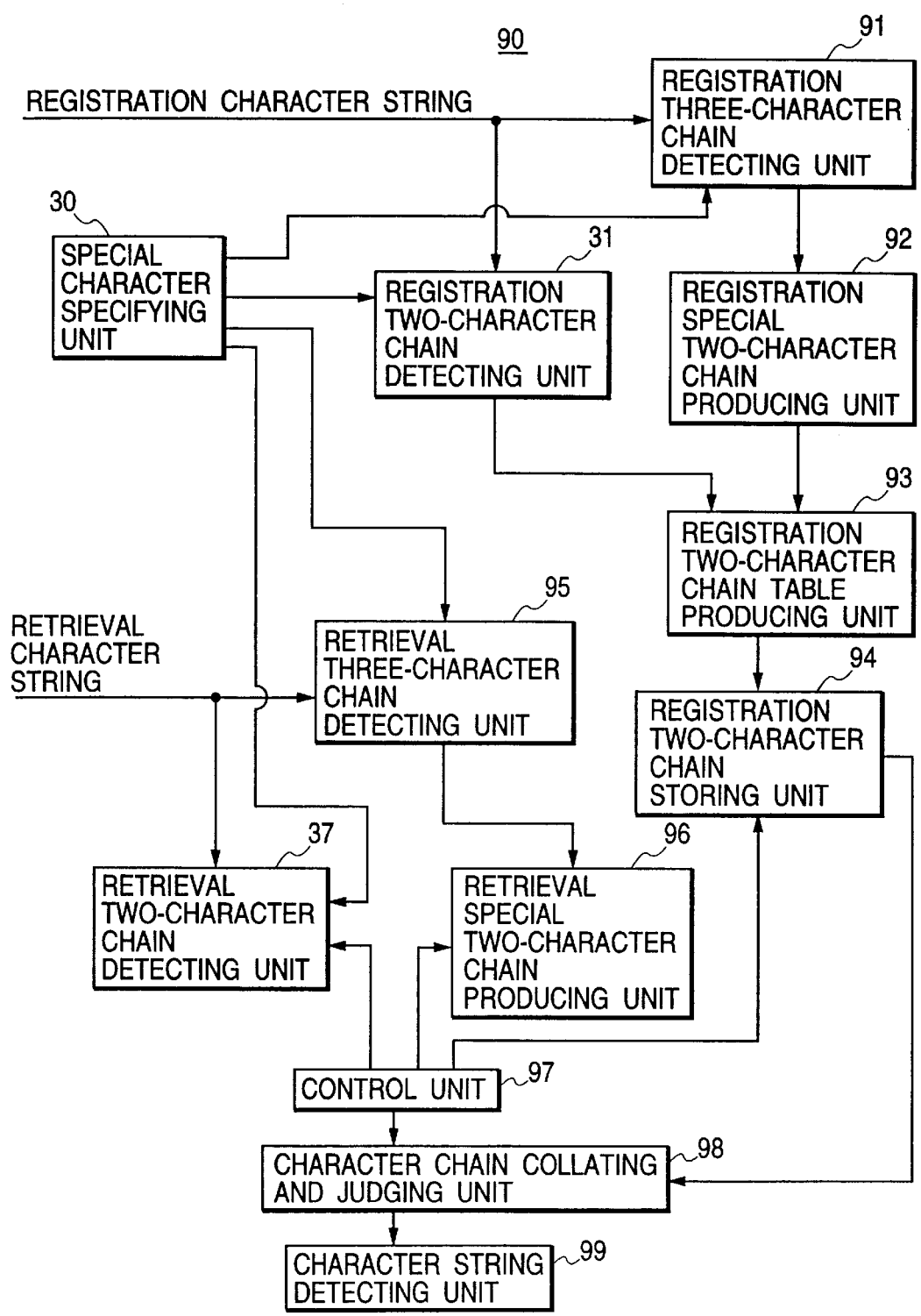
FIG. 14 is a block diagram of a character string collating apparatus according to a sixth embodiment.

FIG. 14 is a block diagram of a character string collating apparatus according to a sixth embodiment.

As shown in FIG. 14, a character string collating apparatus 90 comprises:

the special character specifying unit 30; the registration two-character chain detecting unit 31;

a registration three-character chain detecting unit 91 for detecting all registration three-character chains, respectively including a fore general character, one special character specified by the special character specifying unit 30 and a rear general character arranged in that order in the registration character string, from the registration character string;

a registration special two-character chain producing unit 92 for counting an occurrence frequency Nr of the rear general character included in each registration three-character chain detected by the detecting unit 91, converting each registration three-character chain into a converted three-character chain including the fore general character, a central general character having the same character type as that of the rear general character and the rear general character in that order, producing a fore registration two-character chain including the fore general character and the central general character and a rear registration two-character chain including the central general character and the rear general character from the converted three-character chain, counting an occurrence frequency of the fore general character included in the fore registration two-character chain, and setting occurrence frequencies of the central general character and the rear general character included in each registration two-character chain to the same occurrence frequency Nr to produce an occurrence frequency set for each registration two-character chain;

a registration two-character chain table producing unit 93 for classifying each group of registration general two-character chains detected by the detecting unit 31, respectively having the same type of fore general character and the same type of rear general character, into one registration general two-character chain type, classifying each group of fore registration two-character chains produced by the producing unit 92, respectively having the same type of fore general character and the same type of central general character, into one fore registration two-character chain type, classifying each group of rear registration two-character chains produced by the producing unit 92, respectively having the same type of central general character and the same type of rear general character, into one rear registration two-character chain type, producing a registration general two-character chain table in which one registration general two-character chain type and a plurality of occurrence frequency sets of the chain type are listed for each registration general two-character chain type, producing a fore registration two-character chain table in which one fore registration two-character chain type and a plurality of occurrence frequency sets of the chain type are listed for each fore registration two-character chain type, and producing a rear registration two-character chain table in which one rear registration two-character chain type and a plurality of occurrence frequency sets of the chain type are listed for each rear registration two-character chain type;

a registration two-character chain storing unit 94 for storing the registration general two-character chain table, the fore registration two-character chain table and the rear registration two-character chain table produced by the table producing unit 93; the retrieval two-character chain detecting unit 37;

a retrieval three-character chain detecting unit 95 for detecting all special characters occurring in the retrieval character string, detecting all retrieval three-character chains, respectively including a fore general character, one special character and a rear general character arranged in the retrieval character string in that order, from the retrieval character string in the order of arranging the retrieval three-character chains in the retrieval character string;

a retrieval special two-character chain producing unit 96 for converting each retrieval three-character chain detected by the detecting unit 95 into a converted retrieval three-character chain including the fore general character, a central general character having the same character type as that of the rear general character and the rear general character in that order, producing a fore retrieval two-character chain including the fore general character and the central general character and a rear retrieval two-character chain including the central general character and the rear general character from the converted retrieval three-character chain;

a control unit 97 for detecting one retrieval two-character chain detected by the detecting unit 37 or one pair of fore and rear retrieval two-character chains produced by the producing unit 96 each time the retrieval two-character chain or the retrieval three-character chain is detected by the detecting unit 37 or 96 in the order of arranging the chains in the retrieval character string and controlling the storing unit 94 to output occurrence frequency sets of a particular two-character chain type agreeing with the retrieval general two-character chain or occurrence frequency sets of a pair of particular fore and rear two-character chain types agreeing with the pair of fore and rear retrieval two-character chains for each detection of the retrieval chain in the detecting unit 37 or 95;

a character chain collating and judging unit 98 for receiving the occurrence frequency sets of one particular two-character chain type Tc1 or the occurrence frequency sets of one pair of particular fore and rear two-character chain types Tc1 from the storing unit 94 just after the reception of the occurrence frequency sets of another particular two-character chain type Tc2 or the occurrence frequency sets of another pair of particular fore and rear two-character chain types Tc2 under the control of the control unit 97 each time the retrieval two-character chain or the retrieval three-character chain is detected in the detecting unit 37 or 95, collating one occurrence frequency of the fore general character in each occurrence frequency set of the particular two-character chain type Tc1 with that of the rear general character in a particular occurrence frequency set of the particular two-character chain type Tc2 in cases where the particular two-character chain type Tc1 and the particular two-character chain type Tc2 are received (first collation case), collating one occurrence frequency of the fore general character in each occurrence frequency set of the particular fore two-character chain type Tc1 with that of the rear general character in a particular occurrence frequency set of the particular two-character chain type Tc2 in cases where the particular fore two-character chain type Tc1 and the particular two-character chain type Tc2 are received (second collation case), collating one occurrence frequency of the central general character in each occurrence frequency set of the particular rear two-character chain type Tc1 with that of the central general character in a particular occurrence frequency set of the particular fore two-character chain type Tc2 in cases where the particular rear two-character chain type Tc1 and the particular fore two-character chain type Tc2 are received (third collation case), collating one occurrence frequency of the fore general character in each occurrence frequency set of the particular two-character chain type Tc1 with that of the rear general character in a particular occurrence frequency set of the rear two-character chain type Tc2 in cases where the particular two-character chain type Tc1 and the particular rear two-character chain type Tc2 are received (fourth collation case), judging whether or not the occurrence frequency in the particular chain type Tc1 agrees with that in the particular chain type Tc2, and detecting an occurrence frequency of a particular occurrence frequency set of the particular chain type Tc1 agreeing with that in the particular chain type Tc2; and a character string detecting unit 99 for detecting a particular character string agreeing with the retrieval character string from the registration character string according to the particular chain types detected by the control unit 97 and specifying a position of the particular character string in the text according to the particular occurrence frequency sets of the particular chain types detected by the character chain collating and judging unit 98.

In the above configuration, an operation of the character string collating apparatus 90 is described with reference to FIGS. 15A to 15E.

As shown in FIG. 15A, a registration general two-character chain "AB",--, a registration general two-character chain "CD", a registration general two-character chain "EF",--, and a registration general two-character chain "GH" not including any special character are detected from a registration character string "AB--CDæEF---GH" of a full text recorded in the recording medium 23 in the detecting unit 31, and an occurrence frequency of each general character included in the registration general two-character chains is counted.

Also, as shown in FIG. 15B, in the detecting unit 91, a registration three-character chain "DæE" including one special character between a fore general character and a rear general character is detected from the registration character string. Thereafter, in the producing unit 92, an occurrence frequency N3 of the rear general character "E" is counted, the registration three-character chain "DæE" is converted into a registration three-character chain "DEE" including the fore general character "D", a central general character "E" having the same character type as that of the rear general character and the rear general character "E" by replacing the special character with the central general character, a fore registration two-character chain "DE" and a rear registration two-character chain "EE" are produced from the registration three-character chain "DEE", and an occurrence frequency of the fore general character included in the fore registration two-character chain is counted. The occurrence frequencies of the central and rear general characters included in the fore and rear registration two-character chains are set to the counted occurrence frequency N3.

Thereafter, in the producing unit 93, a registration general two-character chain table shown in FIG. 15C is produced from the registration two-character chains detected by the detecting unit 31 and occurrence frequency sets of the chains, and a fore registration two-character chain table and a rear registration two-character chain table shown in FIG. 15C are produced from the fore and rear registration two-character chains produced by the producing unit 92 and occurrence frequency sets of the chains. The registration two-character chain tables are stored in the storing unit 94.

When a user inputs a retrieval character string "CDæEF" shown in FIG. 15D from the input unit 21 to retrieve a particular character string "CDæEF" agreeing with the retrieval character string from the registration character string, a plurality of retrieval general two-character chains "CD" and "EF" not including any special character are detected in that order from the retrieval character string "CDæEF" in the retrieval two-character chain detecting unit 37, and a retrieval three-character chain "DæE" including one special character between a fore general character and a rear general character is detected from the retrieval character string "CDæEF" in the retrieval three-character chain detecting unit 95. Thereafter, as shown in FIG. 15E, in the producing unit 96, the retrieval three-character chain "DæE" is converted into a retrieval three-character chain "DEE" by replacing the special character with a central general character having the same character type as that of the rear general character, and a fore retrieval two-character chain "DE" and a rear retrieval two-character chain "EE" are produced in that order from the retrieval three-character chain "DEE". Because the chain "EE" is the rear retrieval two-character chain, the chain "EE" is distinguished from a retrieval two-character chain "EE" even though the retrieval two-character chain "EE" exists in the retrieval character string.

The retrieval general two-character chain "CD", the fore retrieval two-character chain "DE", the rear retrieval two-character chain "EE" and the retrieval general two-character chain "EF" are detected by the control unit 97 in that order, and a particular two-character chain type agreeing with one retrieval two-character chain and the occurrence frequency sets of the particular two-character chain type are read out from the storing unit 94 to the collating and judging unit 98 under the control of the control unit 97 each time the retrieval two-character chain is detected by the control unit 97.

In the collating and judging unit 98, when the fore two-character chain type "DE" and the rear two-character chain type "EE" is received as a pair of particular two-character chain types Tc1 after the reception of the two-character chain type "CD", the two-character chain type "CD" is set as a particular two-character chain type Tc2, the occurrence frequency of the fore general character "D" in each occurrence frequency set of the particular fore two-character chain type "DE" is collated with an occurrence frequency of the rear character "D" in one occurrence frequency set of the particular two-character chain type "CD" for each occurrence frequency set of the particular two-character chain type "CD" (the second collation case). Because the occurrence frequency N2 of the fore general character "d" in an occurrence frequency set (N2, N3) of the particular fore two-character chain type "DE" agrees with the occurrence frequency N2 of the rear character "D" in the particular occurrence frequency set (N1, N2) of the particular two-character chain type "CD", the occurrence frequency set (N1, N2) of the particular two-character chain type "CD" is selected as a particular occurrence frequency set, and the occurrence frequency set (N2, N3) of the particular fore two-character chain type "DE" is selected as a particular occurrence frequency set.

Thereafter, the particular rear two-character chain type "EE" distinguished from a retrieval two-character chain type "EE" is specified by the control means 97, one occurrence frequency of the fore general character "E" in each occurrence frequency set of the particular rear two-character chain type "EE" is collated with the occurrence frequency N3 of the rear character "E" in the particular occurrence frequency set (N2, N3) of the particular two-character chain type "DE" (the third collation case). Because the occurrence frequency N3 of the fore general character "E" in the occurrence frequency set (N3, N3) of the particular rear two-character chain type "EE" agrees with the occurrence frequency N3 of the rear character "E" in the particular occurrence frequency set (N2, N3) of the particular two-character chain type "DE", the occurrence frequency set (N3, N3) of the particular rear two-character chain type "EE" is set as a particular occurrence frequency set.

Thereafter, when the two-character chain type "EF" is received as a particular two-character chain type Tc1, the particular rear two-character chain type "EE" is set as a particular two-character chain type Tc2, and one occurrence frequency of the fore general character "E" in each occurrence frequency set of the particular two-character chain type "EF" is collated with the occurrence frequency N3 of the rear character "E" in the particular occurrence frequency set (N3, N3) of the particular two-character chain type "EE"

(the fourth collation case). Because the occurrence frequency N3 of the fore general character "E" in the occurrence frequency set (N3, N4) of the particular two-character chain type "EF" agrees with the occurrence frequency N3 of the rear character "E" in the particular occurrence frequency set (N3, N3) of the particular two-character chain type "EE", the occurrence frequency set (N3, N4) of the particular two-character chain type "EF" is set as a particular occurrence frequency set.

Because the particular occurrence frequency sets of the particular two-character chain types "CD", "DE", "EE" and "EF" corresponding to the retrieval two-character chains "CD", "DE", "EE" and "EF" are determined, it is judged by the control unit 84 that the collation of the retrieval character string "CDæEF" with the registration character string "AB--CDæEF--GH" of the text is successfully completed.

Thereafter, as shown in FIG. 15F, a table of the particular two-character chain types "CD", "DE", "EE" and "EF" and the particular occurrence frequency sets of the chain types are sent to the character string detecting unit 99, and a position of a particular character string "CDæEF" written in the text is specified according to the particular occurrence frequency sets of the particular chain types. The position of the particular character string "CDæEF" is displayed on the display unit 24 or is printed out by the printer 25.

Accordingly, because each special character is replaced with a central general character having the same character type as that of a rear general character placed just after the special character, even though the special character expressing no meaning occurs in the text at a high occurrence frequency, the increase of the occurrence frequency of the special character can be avoided. Therefore, the retrieval character string can be efficiently collated with the registration character string while avoiding the increase of a memory capacity.

Also, even though a three-character chain including one special character is converted by replacing the special character with a general character, because the serial connection between the three-character chain and a two-character chain placed just before the three-character chain and the serial connection between the three-character chain and a two character chain placed just after the three-character chain are ascertained, the collation of the retrieval character string with the registration character string can be correctly performed.

In this embodiment, each special character written in the text is separately used, and any series of special characters does not occur in the text. However, in cases where a series of special characters "æ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Seventh Embodiment)

In this embodiment, a maximum value Vm is set for an occurrence frequency of each special character of a registration character string, and a value of the occurrence frequency of the special character cyclically changes like 1,2,--,Vm,1,2,--Vm,1,2--. Also, a duplication number indicating the number of repeating times of one occurrence frequency having a fixed value is defined for each occurrence frequency of the special characters, and a particular special character arranged in the registration character string is specified according to a particular occurrence frequency and a particular duplication number counted for the particular special character.

Figure 16:
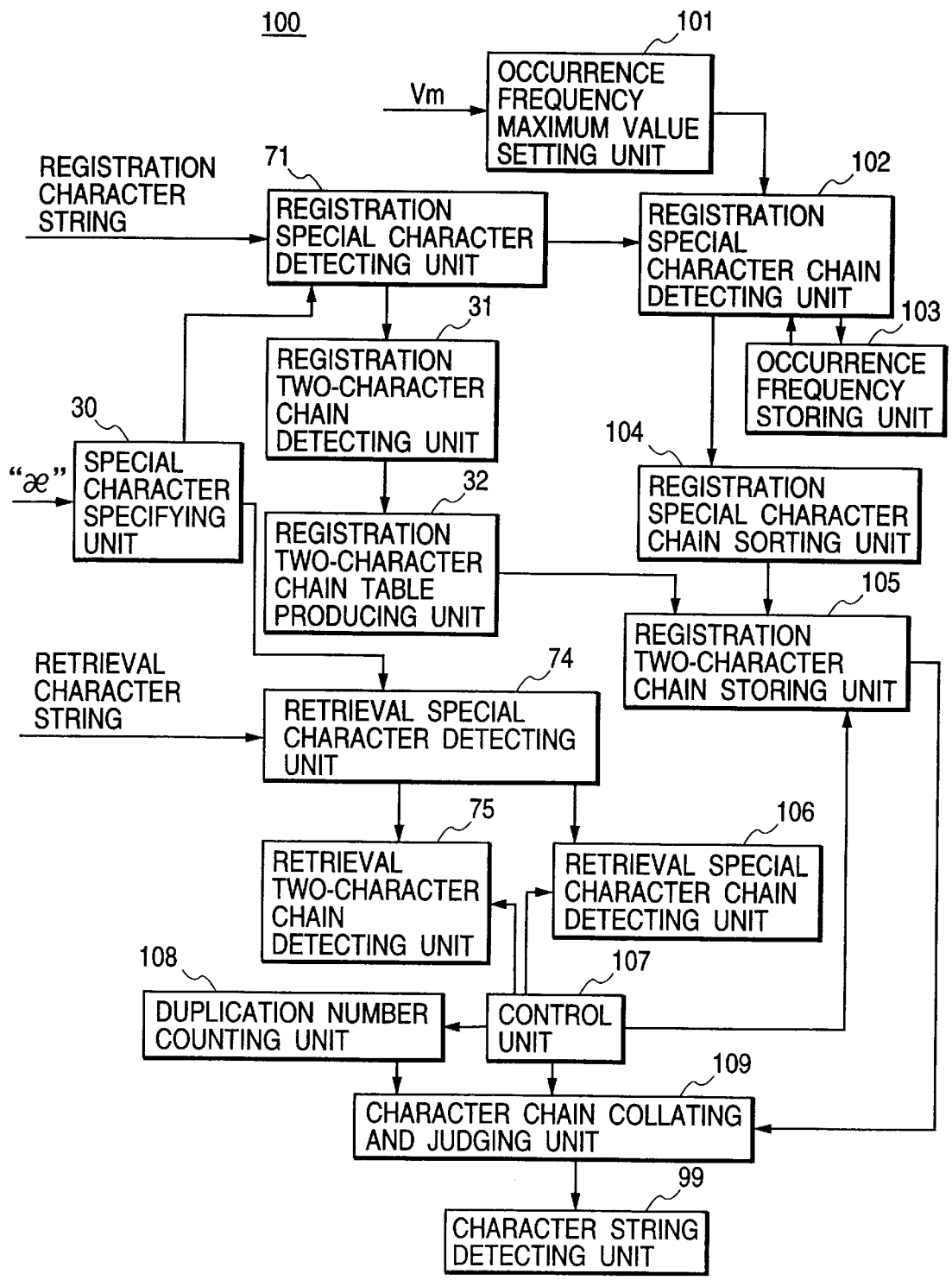
FIG. 16 is a block diagram of a character string collating apparatus according to a seventh embodiment.

FIG. 16 is a block diagram of a character string collating apparatus according to a seventh embodiment.

As shown in FIG. 16, a character string collating apparatus 100 comprises:

the special character specifying unit 30; the registration special character detecting unit 71; the registration two-character chain detecting unit 31; the registration two-character chain table producing unit 32;

an occurrence frequency maximum value setting unit 101 for receiving a specific number input by the user and setting the specific number as a maximum value vm allowed for a limited occurrence frequency of each special character arranged in the registration character string;

a registration special character chain detecting unit 102 for detecting all registration special two-character chains, respectively including one special character detected by the registration special character detecting unit 71 as a fore character (or a rear character) and a rear general character (or a fore general character) arranged in the registration character string in that order, from the registration character string, counting an occurrence frequency of each general character of the fore and rear registration two-character chains in the registration character string, counting an occurrence frequency of one special character included in the fore and rear registration two-character chains for each special character of the registration character string, dividing the occurrence frequency of the special character by the maximum value Vm to obtain a remainder such as 1,2,--, Vm−1 or 0 for each special character of the registration character string, and setting the remainder as a limited occurrence frequency of the special character while the remainder equal to zero is reset to the maximum value Vm set in the setting unit 101 for each special character of the registration character string;

an occurrence frequency storing unit 103 for temporarily storing one occurrence frequency of a first special character currently counted in the detecting unit 102, the stored occurrence frequency being transmitted to the detecting unit 102 to inform the detecting unit 102 of the occurrence frequency of the first special character detected just before a second special character when the second special character is detected in the detecting unit 102 after the detection of the first special character;

a registration special character chain sorting unit 104 for classifying each group of registration special two-character chains detected by the detecting unit 102, respectively having the same type of rear general character (or the same type of fore general character), into one registration special two-character chain type, sorting the registration special two-character chain types according to the occurring order of the registration special two-character chains in the registration character string for each value of the limited occurrence frequencies of the special characters, and producing a special character chain table in which the registration special two-character chain types and occurrence frequency sets of each chain type are listed;

a registration two-character chain storing unit 105 for storing the general two-character chain table produced in the table producing unit 32 and the special character chain table produced in the sorting unit 104; the retrieval special character detecting unit 74; the retrieval two-character chain detecting unit 75;

a retrieval special character chain detecting unit 106 for detecting all retrieval special two-character chains, respectively including one special character as a fore character (or a rear character) and a rear general character (or a fore general character) arranged in the retrieval character string in that order, from the retrieval character string;

a control unit 107 for detecting one retrieval general two-character chain detected by the detecting unit 75 or one retrieval special two-character chain detected by the detecting unit 106 each time the retrieval two-character chain is detected by the detecting unit 75 or 106 in the order of arranging the retrieval two-character chains in the retrieval character string and controlling the storing unit 105 to output occurrence frequency sets of a particular general two-character chain type agreeing with the retrieval general two-character chain or occurrence frequency sets of a particular special two-character chain type agreeing with the retrieval special two-character chain for each detection of the retrieval two-character chain in the detecting unit 75 or 106;

a duplication number counting unit 108 for initially setting a duplication number corresponding to one special two-character chain type to zero for each special two-character chain type stored in the storing unit 105, and incrementing the duplication number corresponding to the particular special two-character chain type each time one limited occurrence frequency having a particular value such as "1" is detected when the control unit 107 searches the special character chain table of the storing unit 105 for the limited occurrence frequency of the particular value;

a character chain collating and judging unit 109 for receiving the occurrence frequency sets of one particular two-character chain type Tc1 from the storing unit 105 just after the reception of another particular two-character chain type Tc2 from the storing unit 105 under the control of the control unit 107 each time the retrieval general two-character chain or the retrieval special two-character chain is detected in the detecting unit 75 or 106, collating one occurrence frequency of the fore general character in each occurrence frequency set of the particular general two-character chain type Tc1 with that of the rear general character in a particular occurrence frequency set of the particular general two-character chain type Tc2 in cases where the particular general two-character chain types Tc1 and Tc2 are received (first collation case), collating one occurrence frequency of the fore general character in each occurrence frequency set of the particular special two-character chain type Tc1 with that of the rear general character in a particular occurrence frequency set of the particular general two-character chain type Tc2 in cases where the particular special two-character chain type Tc1 and the particular general two-character chain type Tc2 are received (second collation case), collating a limited occurrence frequency of the fore special character in each occurrence frequency set of the particular special two-character chain type Tc1 with that of the rear special character in a particular occurrence frequency set of the particular special two-character chain type Tc2 on condition that a duplication number counted by the counting unit 108 for the chain type Tc1 agrees with that for the chain type Tc2 in cases where the particular special two-character chain type Tc1 having the fore special character and the particular special two-character chain type Tc2 having the rear special character are received (third collation case), collating a limited occurrence frequency of the fore general character in each occurrence frequency set of the particular special two-character chain type Tc1 with that of the rear general character in a particular occurrence frequency set of the particular special two-character chain type Tc2 in cases where the particular special two-character chain type Tc1 having the rear special character and the particular special two-character chain type Tc2 having the fore special character are received (fourth collation case), collating one occurrence frequency of the fore general character in each occurrence frequency set of the particular general two-character chain type Tc1 with that of the rear general character in a particular occurrence frequency set of the special two-character chain type Tc2 in cases where the particular general two-character chain type Tc1 and the particular special two-character chain type Tc2 are received (fifth collation case), judging whether or not the occurrence frequency in the particular two-character chain type Tc1 agrees with that in the particular two-character chain type Tc2, and detecting an occurrence frequency of a particular occurrence frequency set of the particular two-character chain type Tc1 agreeing with that in the particular two-character chain type Tc2; and the character string detecting unit 99.

Because there are five cases (*, æ, *æ*, æ*æ, æ) in the arrangement of three characters relating to two-character chains, five collation cases are performed in the collating and judging unit 109**. Here, the symbol "*" denotes one type of general character.

In the above configuration, an operation of the character string collating apparatus 100 is described with reference to FIGS. 17A to 17E.

Figures 17A, 17B, 17C, 17D, 17E:
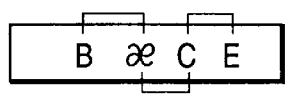
FIG. 17A shows a plurality of registration two-character chains detected from a registration character string according to the seventh embodiment.
FIG. 17B shows a table of the registration two-character chains and occurrence frequency sets of the chains.
FIG. 17C shows a special character chain table.
FIG. 17D shows a plurality of retrieval two-character chains detected from a retrieval character string according to the seventh embodiment.
FIG. 17E shows a duplication number for each particular special two-character chain.

As shown in FIG. 17A, a registration general two-character chain "AB", a registration special two-character chain "Bæ", a registration special two-character chain "æC",-- are detected from a registration character string "ABæCDæABæCEæ---" of a full text recorded in the recording medium 23 in the detecting units 31 and 102, and an occurrence frequency of each general character included in the registration two-character chains is counted in the detecting units 31 and 102.

Also, a limited occurrence frequency of each special character included in the registration special two-character chains is counted in the detecting unit 102. That is, a remainder such as 1,2,--, Vm−1 obtained by dividing an occurrence frequency of each special character by a maximum value Vm set in the setting unit 101 is set as one limited occurrence frequency, and a limited occurrence frequency of one special character relating to a remainder of 0 is set to Vm. For example, in cases where a maximum value vm allowed for a limited occurrence frequency of each special character is set to 2 in the setting unit 101, the limited occurrence frequency of each special character is expressed by "1" or "2". Therefore, as shown in FIG. 17B, a table of the registration two-character chains and the occurrence frequency sets of the chains is obtained.

Thereafter, in the sorting unit 104, the registration special two-character chains detected by the detecting unit 102 are classified into a plurality of registration special two-character chain types, the registration special two-character chain types are sorted according to values of the limited occurrence frequencies of the special characters, and the registration special two-character chain types relating to the limited occurrence frequencies having the same values are sorted according to the occurring order of the registration special two-character chains in the registration character string, for each value. Therefore, a special character chain table shown in FIG. 17C is obtained.

The special character chain table is stored in the storing unit 105 with a general two-character chain table produced in the table producing unit 32.

When a user inputs a retrieval character string "BæCE" from the input unit 21 to retrieve a particular character string "Bæce" agreeing with the retrieval character string from the registration character string, as shown in FIG. 17D, a retrieval two-character chain "CE" is detected from the retrieval character string "BæCE" in the detecting unit 75, and a plurality of retrieval special two-character chains "Bæ" and "æC" are detected in the detecting unit 106.

Thereafter, the collation of one character chain with another character chain is performed to check a serial connection between the character chains in the collating and judging unit 109. In detail, a duplication number of a counter corresponding to the particular special two-character chain type "Bæ" is initially set to 0 in the duplication number counting unit 108, and the control unit 107 searches the special character chain table stored in the storing unit 105 for a particular special two-character chain type "Bæ" agreeing with the retrieval special two-character chain "Bæ". In this case, the duplication number is incremented each time the control unit 107 checks one special two-character chain "*æ" relating to the limited occurrence frequency "1" from the top line of the special character chain table to a lower line. Here a symbol "*" denotes a general character. Because the particular special two-character chain type "Bæ" of an occurrence frequency set (N2,1) is listed on the top line, as shown in FIG. 17E, the duplication number for the particular special two-character chain "Bæ" is set to "1". Thereafter, a duplication number of a counter corresponding to the particular special two-character chain type "æC" is initially set to 0 in the duplication number counting unit 108, and the control unit 107 searches the special character chain table for a particular special two-character chain type "æC" agreeing with the retrieval special two-character chain "æC". In this case, the duplication number is incremented each time the control unit 107 checks one special two-character chain "æ*" relating to the same limited occurrence frequency "1" from the top line of the special character chain table to a lower line. Because the particular special two-character chain type "æC" of an occurrence frequency set (1,N3) is listed on the top line, as shown in FIG. 17E, the duplication number for the particular special two-character chain "Bæ" is set to "1". Because the limited occurrence frequencies of the particular special two-character chain types "Bæ" and "æC" agrees with each other and because the duplication numbers of the particular special two-character chain types "Bæ" and "æC" agrees with each other, it is judged that the particular special two-character chain type "Bæ" of a particular occurrence frequency set (N2,1) is serially connected with the particular special two-character chain type "æC" of a particular occurrence frequency set (1,N3). Thereafter, a serial connection between the particular special two-character chain type "æC" and the particular general two-character chain type "CE" is checked. Because an occurrence frequency N3 of the rear general character in the particular occurrence frequency set of the particular special two-character chain type "æC" does not agree with any occurrence frequency of the fore general character in the particular general two-character chain type "CE". Therefore, another pair of particular occurrence frequency sets of the particular special two-character chain types "Bæ" and "æC" serially connected with each other are again checked in the same manner. Because a duplication number for the particular special two-character chain type "Bæ" of an occurrence frequency set (N2+1,1) and a duplication number for the particular special two-character chain type "æC" of an occurrence frequency set (1,N3+1) are set to "2" together, it is judged that the particular special two-character chain type "Bæ" of a particular occurrence frequency set (N2+1,1) is serially connected with the particular special two-character chain type "æC" of a particular occurrence frequency set (1,N3+1). Thereafter, it is judged that the particular special two-character chain type "æC" of the particular occurrence frequency set (1,N3+1) is serially connected with the particular general two-character chain type "CE" of a particular occurrence frequency set (N3+1,N5). Therefore, the particular occurrence frequency sets (N2+1,1), (1,N3+1) and (N3+1,N5) of the particular special two-character chain types "Bæ", "æC" and "CE" are detected in the collating and judging unit 109.

Thereafter, a position of a particular character string "BæcE" written in the text is specified according to the particular occurrence frequency sets of the particular chain types. The position of the particular character string "BæCE" is displayed on the display unit 24 or is printed out by the printer 25.

Accordingly, because an occurrence frequency of each special character is indicated by a limited occurrence frequency, even though the special character expressing no meaning occurs in the text at a high occurrence frequency, the increase of the occurrence frequency of the special character can be avoided. Therefore, the retrieval character string can be efficiently collated with the registration character string while avoiding the increase of a memory capacity.

In this embodiment, the limited occurrence frequency of each special character is indicated by a remainder obtained by dividing the occurrence frequency of each special character by a maximum value Vm, and the limited occurrence frequency relating to a remainder of 0 is set to Vm. However, any set of numbers, which do not duplicate with each other and does not exceed a maximum value, can be used for expressing the limited occurrence frequencies of the special characters. For example, a set of values, obtained by subtracting each of the remainders from the maximum value, such as 5,4,3,2,1,5,4,--, a set of even increasing numbers such as 2,4,8,10,2,4,--, a set of odd increasing numbers such as 1,3,5,7,9,1,3,--, a set of even decreasing numbers such as 10,8,6,4,2,10,8,--, a set of odd decreasing numbers such as 9,7,5,3,1,9,7,--, or a set of numbers 3,5,7, 8,6,4,2,3,5,-- can be used as a set of limited occurrence frequencies.

Also, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Eighth Embodiment)

In this embodiment, though an occurrence frequency of each special character arranged in a retrieval character string is counted, a pair of occurrence frequencies of general characters adjacent to each special character are set to a specific value such as 0. Though a serial connection between a first two-character chain including a first general character, of which an occurrence frequency is set to the specific value, and a second two-character chain including the first general character cannot be checked by referring the occurrence frequency of the first general character, the serial connection is checked by referring an occurrence frequency of a special character adjacent to the first general character.

Figure 18:
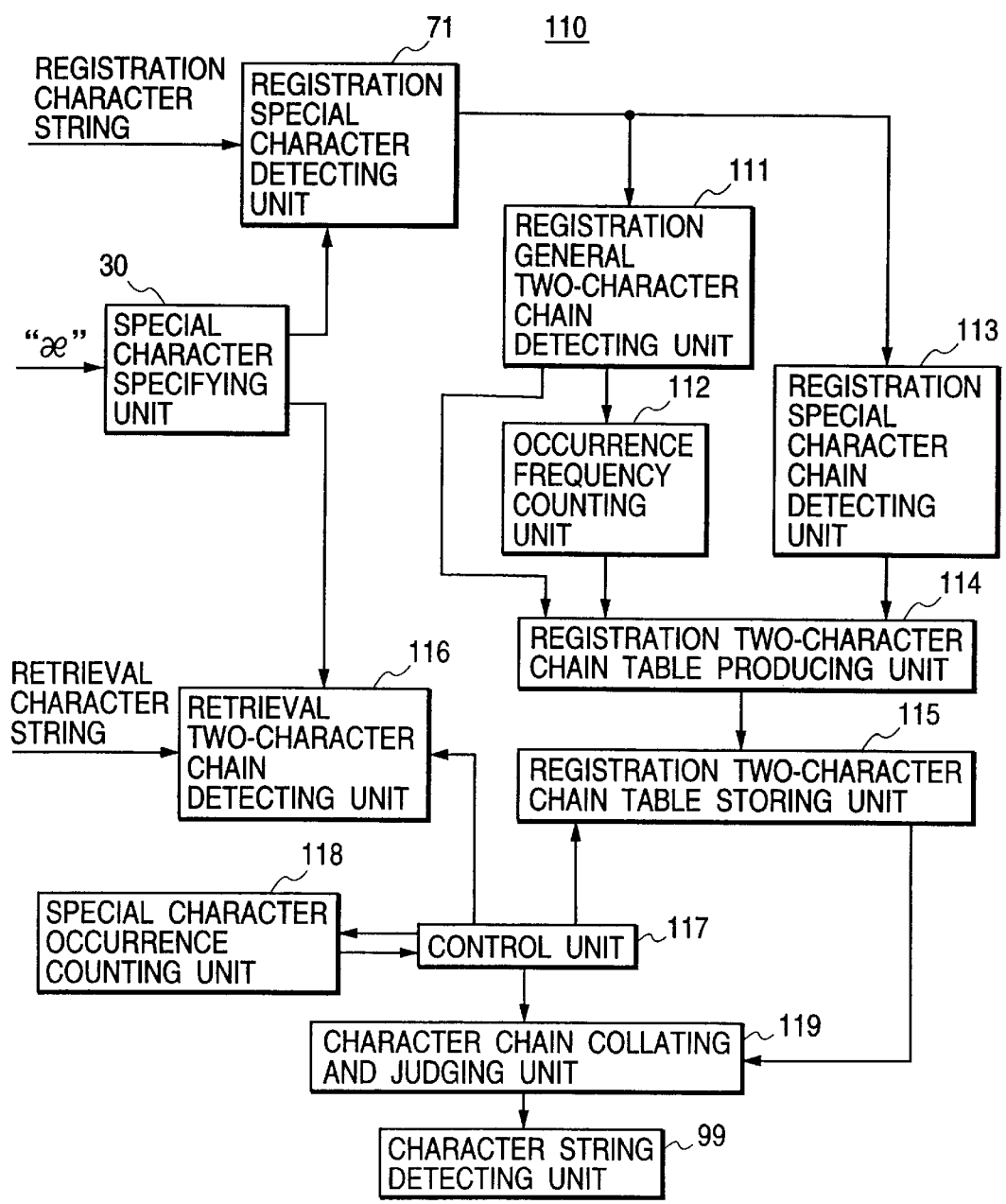
FIG. 18 is a block diagram of a character string collating apparatus according to an eighth embodiment.

FIG. 18 is a block diagram of a character string collating apparatus according to an eighth embodiment.

As shown in FIG. 18, a character string collating apparatus 110 comprises: the special character specifying unit 30; the registration special character detecting unit 71; a registration general two-character chain detecting unit 111 for detecting all registration general two-character chains, which respectively include a fore general character and a rear general character arranged in series in that order in the registration character string and do not include any special character detected by the registration special character detecting unit 71, from the registration character string;

an occurrence frequency counting unit 112 for judging whether or not each general character included in the registration general two-character chains detected by the detecting unit 111 is adjacent to one special character detected by the detecting unit 71, setting an occurrence frequency of each general character of each registration general two-character chain to a specific value in cases where the general character is adjacent to one special character, and counting an occurrence frequency of each general character of each registration general two-character chain in cases where the general character is not adjacent to any special character;

a registration special character chain detecting unit 113 for detecting all registration special two-character chains, respectively including one special character detected by the detecting unit 71 as a fore character (or a rear character) and a rear general character (or a fore general character) arranged in the registration character string in that order, from the registration character string, counting an occurrence frequency of each special character included in the registration special two-character chains and setting an occurrence frequency of each general character included in the registration special two-character chains to the specific value;

a registration two-character chain table producing unit 114 for classifying each group of registration general two-character chains, respectively having the same type of fore general character and the same type of rear general character, into one registration general two-character chain type to produce a general two-character chain table in which one registration general two-character chain type and occurrence frequency sets of registration general two-character chains corresponding to the chain type are listed for each registration general two-character chain type, and classifying each group of registration special two-character chains, respectively having the same type of fore general character (or the special character) and the special character (or the same type of rear general character), into one registration special two-character chain type to produce a special two-character chain table in which one registration special two-character chain type and occurrence frequency sets of registration special two-character chains corresponding to the chain type are listed for each registration special two-character chain type;

a registration two-character chain table storing unit 115 for storing the general two-character chain tables and the special two-character chain tables produced by the registration two-character chain table producing unit 114, a plurality of occurrence frequency sets of two-character chains being arranged in the order of arranging the two-character chains in the registration character string for each two-character chain table;

a retrieval two-character chain detecting unit 116 for detecting all retrieval general two-character chains, respectively including a fore general character and a rear general character arranged in series in that order in a retrieval character string, and all retrieval special two-character chains, respectively including one special character as a fore character (or a rear character) and a rear general character (or a fore general character) arranged in the retrieval character string in that order, from the retrieval character string in the order arranging the chains in the retrieval character string;

a control unit 117 for detecting one retrieval general two-character chain or one retrieval special two-character chain detected by the detecting unit 116 each time the retrieval two-character chain is detected by the detecting unit 116 in the order of arranging the retrieval two-character chains in the retrieval character string and controlling the storing unit 115 to output occurrence frequency sets of a particular general two-character chain type agreeing with the retrieval general two-character chain or occurrence frequency sets of a particular special two-character chain type agreeing with the retrieval special two-character chain for each detection of the retrieval two-character chain in the detecting unit 116;

a special character occurrence counting unit 118 for setting a special character occurrence number of a counter to a particular occurrence frequency of one special character in a particular occurrence frequency set of one particular special two-character chain type first output from the storing unit 115 under the control of the control unit 117 and incrementing the special character occurrence number each time a particular special two-character chain type corresponding to a new special character C1 is output from the storing unit 115 under the control of the control unit 117 after the output of another particular special two-character chain type corresponding to another special character C2;

a character chain collating and judging unit 119 for receiving the occurrence frequency sets of one particular two-character chain type Tc1 from the storing unit 115 just after the reception of another particular two-character chain type Tc2 from the storing unit 115 under the control of the control unit 117 each time the retrieval general two-character chain or the retrieval special two-character chain is detected in the detecting unit 116, collating one occurrence frequency of the fore general character in each occurrence frequency set of the particular general two-character chain type Tc1 with that of the rear general character in a particular occurrence frequency set of the particular general two-character chain type Tc2 in cases where the particular general two-character chain types Tc1 and Tc2 are received (first collation case), collating one occurrence frequency of the fore general character in each occurrence frequency set of the particular special two-character chain type Tc1 with that of the rear general character in a particular occurrence frequency set of the particular general two-character chain type Tc2 on condition that the occurrence frequency of the rear special character of the particular special two-character chain type Tc1 is equal to the special character occurrence number counted by the counting unit 118 in cases where the particular special two-character chain type Tc1 and the particular general two-character chain type Tc2 are received (second collation case), collating one occurrence frequency of the fore special character in each occurrence frequency set of the particular special two-character chain type Tc1 with that of the rear special character in a particular occurrence frequency set of the particular special two-character chain type Tc2 in cases where the particular special two-character chain type Tc1 having the fore special character and the particular special two-character chain type Tc2 having the rear special character are received (third collation case), collating one occurrence frequency of the fore general character in each occurrence frequency set of the particular special two-character chain type Tc1 with that of the rear general character in a particular occurrence frequency set of the particular special two-character chain type Tc2 on condition that the occurrence frequency of the rear special character of the particular special two-character chain type Tc1 is equal to the special character occurrence number counted by the counting unit 118 in cases where the particular special two-character chain type Tc1 having the rear special character and the particular special two-character chain type Tc2 having the fore special character are received (fourth collation case), collating one occurrence frequency of the fore general character in each occurrence frequency set of the particular general two-character chain type Tc1 with that of the rear general character in a particular occurrence frequency set of the special two-character chain type Tc2 in cases where the particular general two-character chain type Tc1 and the particular special two-character chain type Tc2 are received (fifth collation case), judging whether or not the occurrence frequency in the particular two-character chain type Tc1 agrees with that in the particular two-character chain type Tc2, and detecting an occurrence frequency of a particular occurrence frequency set of the particular two-character chain type Tc1 agreeing with that in the particular two-character chain type Tc2; and the character string detecting unit 99.

In the above configuration, an operation of the character string collating apparatus 110 is described with reference to FIGS. 19A to 19K.

As shown in FIG. 19A, a recording area Ar1 is arranged in the storing unit 115 for each general two-character chain, and each recording area Ar1 is composed of a first recording region Rr1 for recording a document number of one chain, a second recording region Rr2 for recording an occurrence frequency of a fore general character of the chain and a third recording region Rr3 for recording an occurrence frequency of a rear general character of the chain. A size of the second recording region is the same as that of the third recording region. As shown in FIG. 19B, a recording area Ar2 is arranged in the storing unit 115 for each special two-character chain having a fore special character, and each recording area Ar2 is composed of a first recording region Rr4 for recording a document number of one chain, a second recording region Rr5 for recording an occurrence frequency of the fore special character of the chain and a third recording region Rr6 for recording an occurrence frequency of a rear general character of the chain. A size of the second recording region is larger than that of the third recording region. As shown in FIG. 19C, a recording area Ar3 is arranged in the storing unit 115 for each special two-character chain having a rear special character, and each recording area Ar3 is composed of a first recording region Rr7 for recording a document number of one chain, a second recording region Rr8 for recording an occurrence frequency of a fore general character of the chain, and a third recording region Rr9 for recording an occurrence frequency of the rear special general character of the chain. A size of the third recording region is larger than that of the second recording region.

Figure 20:
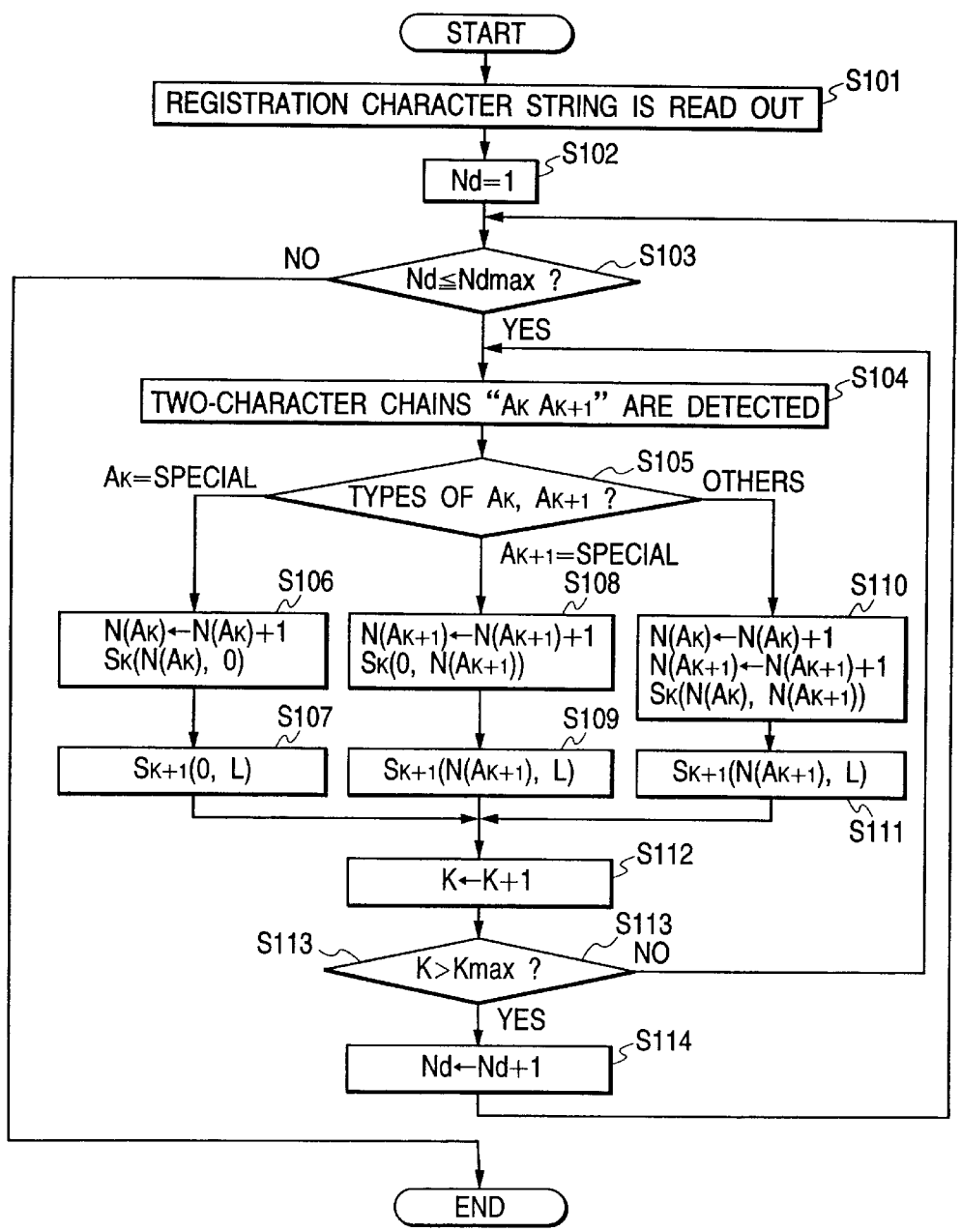
FIG. 20 is a flow chart showing the production of a two-character chain table shown in FIG. 19E.

The production of a two-character chain table is described with reference to FIG. 20.

When a registration character string "ABæABæABæABAB---" of a full text recorded in the recording medium 23 is read out (step S101), a document number Nd is initially set to 1 (step S102), and it is checked that the document number Nd is not exceed a maximum document number Ndmax (step S103). Thereafter, as shown in FIG. 19D, a plurality of registration general two-character chains and a plurality of registration special two-character chains "AB", "Bæ", "æA", "AB", "Bæ", "æA","AB", "Bæ", "æA", "AB", "BA" and "AB",-- are detected from the registration character string "ABæABæABæABAB---" in the detecting units 111 and 113 (step S104). Thereafter, character types of a fore character $A_k$ and a rear character $A_{k+1}$ of each two-character chain are checked (step S105). In cases where the fore character $A_k$ is one special character, an occurrence frequency $N(A_k)$ for the special character is incremented, the incremented occurrence frequency is set for the special character (step S106), an occurrence frequency set $S_k(N(A_k), 0)$ of the two-character chain is produced (step S106), and an occurrence frequency set $S_{k+1}(0, L)$ of a next two-character chain is prepared (step S107). Here the symbol "L" denotes that an occurrence frequency is not determined. In cases where the rear character $A_{k+1}$ is one special character, an occurrence frequency $N(A_{k+1})$ for the special character is incremented, the incremented occurrence frequency is set for the special character (step S108), an occurrence frequency set $S_k(0,N(A_{k+1}))$ of the two-character chain is produced (step S108 and an occurrence frequency set $S_{k+1}(N(A_{k+1}), L)$ of a next two-character chain is prepared (step S109). In cases where the fore character $A_k$ and the rear character $A_{k+1}$ are general characters, an occurrence frequency $N(A_k)$ for the special character is incremented, the incremented occurrence frequency is set for the special character, an occurrence frequency $N(A_{k+1})$ for the special character is incremented, the incremented occurrence frequency is set for the special character (step S110), an occurrence frequency set $S_k(N(A_k),N(A_{k+1}))$ of the two-character chain is produced (step S111), and an occurrence frequency set $S_{k+1}(N(A_{k+1}), L)$ of a next two-character chain is prepared (step S111). Thereafter, a chain number K is incremented (step S112), it is checked that the chain number K does not exceed a maximum two-character chain number Kmax (step S113), and the steps S104 to S113 are repeated. When the chain number exceeds the maximum two-character chain number (step S113), the document number Nd is incremented (step S114), and he steps S103 to S114 are repeated.

As a result, an occurrence frequency of each general character of each registration general two-character chain is set to a specific value "0" in cases where the general character is adjacent to one special character, an occurrence frequency of each general character of each registration general two-character chain is counted in cases where the general character is not adjacent to any special character, an occurrence frequency of each special character included in the registration special two-character chains is counted, and an occurrence frequency of each general character included in the registration special two-character chains is set to the specific value. Therefore, as shown in FIG. 19E, a table of the registration two-character chains, the document number Nd and the occurrence frequency sets is obtained.

Thereafter, in the table producing unit 114, as shown in FIGS. 19F and 19G, the occurrence frequency sets of one registration general two-character chain type are stored in one recording area Ar1 of the storing unit 115 as a general two-character chain table for each registration general two-character chain type. Also, as shown in FIGS. 19H and 19I, the occurrence frequency sets of one registration special two-character chain type are stored in one recording area Ar2 of the storing unit 115 as one special two-character chain table for each registration special two-character chain type.

When a user inputs a retrieval character string "BæABæ" from the input unit 21 to retrieve a particular character string "BæABæ" agreeing with the retrieval character string from the registration character string, as shown in FIG. 19J, a retrieval special two-character chain "Bæ", a retrieval special two-character chain "æA", a retrieval general two-character chain "AB" and a retrieval special two-character chain "Bæ" are detected from the retrieval character string "BæABæ" in the detecting unit 116 in that order.

Thereafter, as shown in FIG. 19K, the collation of one character chain with another character chain is performed to check a serial connection between the character chains in the collating and judging unit 119. In detail, one occurrence frequency "1" of the fore special character in a particular occurrence frequency set (1,0) of the particular special two-character chain type "æA" is collated with one occurrence frequency "1" of the rear special character in a particular occurrence frequency set (0,1) of the particular special two-character chain type "Bæ" (the third collation case). Because the occurrence frequency "1" in the particular special two-character character chain type "æA" agrees with the occurrence frequency "1" in the particular special two-character chain type "Bæ", the particular occurrence frequency set (1,0) of the particular special two-character chain type "æA" and the particular occurrence frequency set (0,1) of the particular special two-character chain type "Bæ" are temporarily selected. The special character occurrence number is set to 1 by the counting unit 118 because of the detection of the particular special two-character chain type "Bæ". Thereafter, one occurrence frequency "0" of the fore general character in a particular occurrence frequency set (0,0) of the particular general two-character chain type "AB" is collated with one occurrence frequency "0" of the rear general character in the particular occurrence frequency set (1,0) of the particular special two-character chain type "æA" (the fifth collation case). Because the occurrence frequency "0" in the particular general two-character chain type "AB" agrees with the occurrence frequency "0" in the particular special two-character chain type "æA", the particular occurrence frequency set (0,0) of the particular general two-character chain type "AB" is temporarily selected. Thereafter, one occurrence frequency "0" of the fore general character in a particular occurrence frequency set (0,1) of the particular special two-character chain type "Bæ" is collated with one occurrence frequency "0" of the rear general character in the particular occurrence frequency set (0,0) of the particular general two-character chain type "AB" (the second collation case). The special character occurrence number is set to 2 by the counting unit 118 because of the detection of the particular special two-character chain type "Bæ". Because the occurrence frequency "1" of the rear special character of the particular special two-character chain type "Bæ" differs from the special character occurrence number "2" counted by the counting unit 118, the particular occurrence frequency set (0,1) of the particular special two-character chain type "Bæ" is not adequate. Therefore, a particular occurrence frequency set (0,2) of the particular special two-character chain type "Bæ" is retrieved. Because one occurrence frequency "0" of the fore general character in a particular occurrence frequency set (0,2) of the particular special two-character chain type "Bæ" agrees with one occurrence frequency "0" of the rear general character in the particular occurrence frequency set (0,0) of the particular general two-character chain type "AB", and because the occurrence frequency "2" of the rear special character in the particular occurrence frequency set of the particular special two-character chain type "Bæ" is equal to the special character occurrence number "2" counted by the counting unit 118, the particular occurrence frequency set (0,2) of the particular special two-character chain type "Bæ" is temporarily selected.

Because the particular occurrence frequency sets of the particular two-character chain types corresponding to all retrieval two-character chains are obtained, the particular occurrence frequency sets of the particular two-character chain types are transmitted to the character string detecting unit 99, and a position of a particular character string "BæABæ" written in the text is specified according to the particular occurrence frequency sets of the particular chain types. The position of the particular character string "BæABæ" is displayed on the display unit 24 or is printed out by the printer 25.

Accordingly, because an occurrence frequency of each general character adjacent to one special character is set to a fixed value, a memory capacity required for each general character adjacent to one special character can be reduced, so that the retrieval character string can be efficiently collated with the registration character string while avoiding the increase of a memory capacity.

Also, because the number of general characters, of which the occurrence frequencies are set to the fixed value, is increased as the number of special characters in the registration character string is increased, the memory capacity for the occurrence frequencies is not increased even though the special character is frequency used in the registration character string.

In this embodiment, a first character of the retrieval character string is a general character. However, in cases where a first character of a retrieval character string "æAB--" is one special character, it is not required to refer a retrieval two-character chain "æA", but it is checked whether or not an occurrence frequency of a fore general character in a general two-character chain "AB" is 0. In this case, a collation processing can be shortened.

Also, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Ninth Embodiment)

In this embodiment, a character string "ABæCD" is decomposed into a general two-character chain "AB" and a special two-character chain "AC", an occurrence frequency of a fore general character in the general two-character chain "AB" is collated with an occurrence frequency of a fore general character in the special two-character chain "AC" to check a serial connection of the character string "ABæCD". In the character string, at least two general characters are arranged on each side of one special character.

Figure 21:
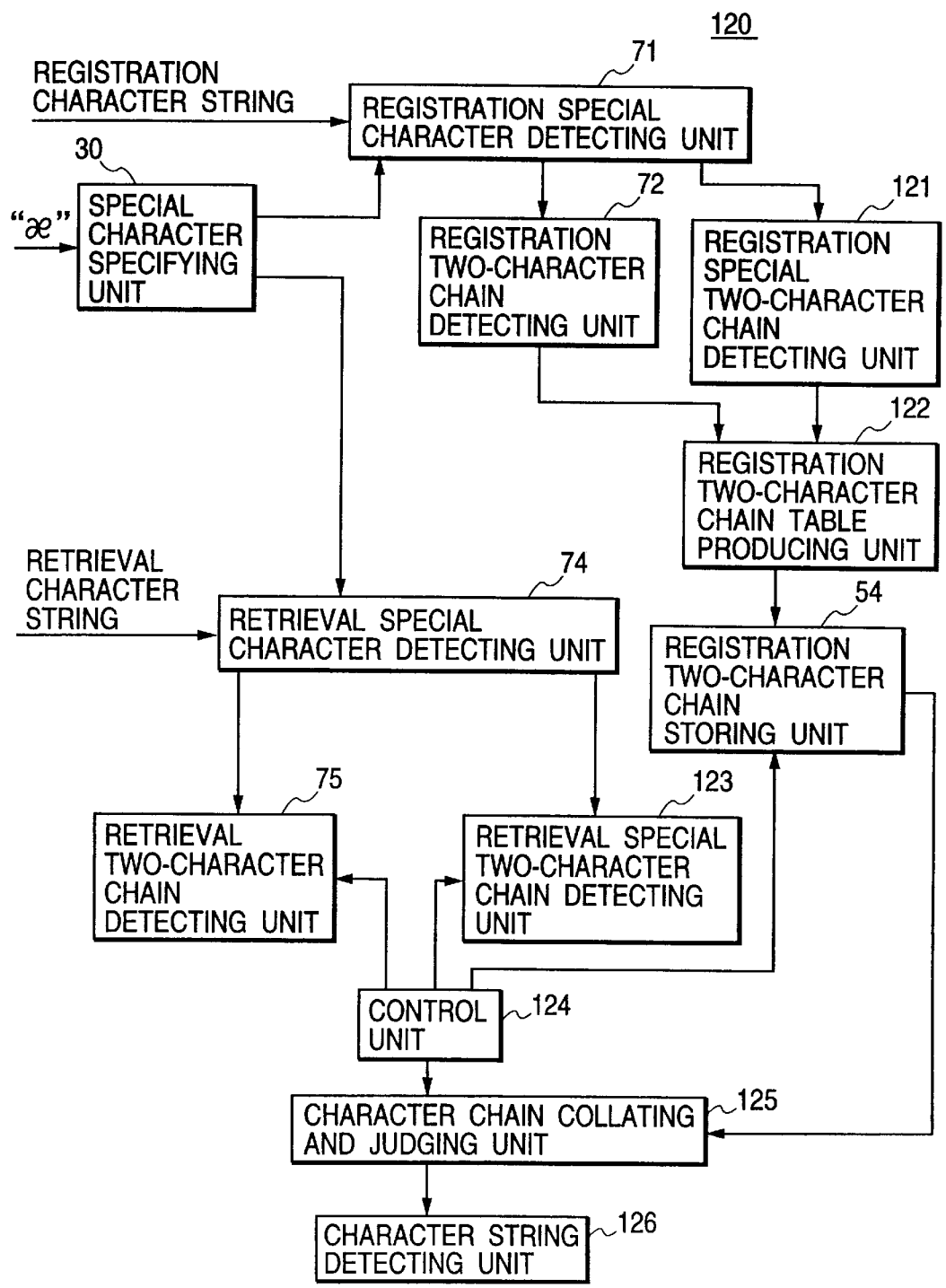
FIG. 21 is a block diagram of a character string collating apparatus according to a ninth embodiment.

FIG. 21 is a block diagram of a character string collating apparatus according to a ninth embodiment.

As shown in FIG. 21, a character string collating apparatus 120 comprises:

the special character specifying unit 30; the registration special character detecting unit 71; the registration two-character chain detecting unit 72;

a registration special two-character chain detecting unit 121 for detecting all registration special two-character chains, respectively including a fore general character agreeing with one fore general character of one registration general two-character placed just before one special character and a rear general character arranged just after the special character, from the registration character string in the order of arranging the chains in the registration character string, and counting an occurrence frequency of each general character of the special two-character chains in the registration character string;

a registration two-character chain table producing unit 122 for classifying each group of registration general two-character chains detected by the detecting unit 72, respectively having the same type of fore general character and the same type of rear general character, into one registration general two-character chain type, classifying each group of registration special two-character chains detected by the detecting unit 121, respectively having the same type of fore general character and the same type of rear general character, into one registration special two-character chain type and producing a registration two-character chain table in which the registration two-character chain types and a plurality of occurrence frequency sets of each chain type are listed, the registration two-character chain storing unit 54; the retrieval special character detecting unit 74; the retrieval two-character chain detecting unit 75;

a retrieval special two-character chain detecting unit 123 for detecting all retrieval special two-character chains, respectively including a fore general character agreeing with one fore general character of one retrieval general two-character placed just before one special character and a rear general character arranged just after the special character, from the retrieval character string in the order of arranging the chains in the retrieval character string;

a control unit 124 for detecting the retrieval general two-character chains detected by the detecting unit 75 and the retrieval special two-character chains detected by the detecting unit 123 in the order of arranging the chains in the retrieval character string and controlling the storing unit 54 to output occurrence frequency sets of a particular two-character chain type agreeing with the detected retrieval two-character chain for each detection of the retrieval two-character chain, one retrieval special two-character chain of which the fore general character agrees with the fore general character of one retrieval general two-character chain being arranged just after the retrieval general two-character chain in the retrieval character string;

character chain collating and judging unit 125 for receiving the occurrence frequency sets of a particular two-character chain type Tc1 from the storing unit 54 just after the reception of the occurrence frequency sets of another particular two-character chain type Tc2 under the control of the control unit 124 each time one retrieval two-character chain is detected in the detecting unit 75 or 123, collating one occurrence frequency of the fore general character in each occurrence frequency set of the particular two-character chain type Tc1 with that of the rear character in a particular occurrence frequency set of the particular two-character chain type Tc2 in cases where the particular two-character chain types Tc1 and Tc2 agree with two retrieval general two-character chains detected by the detecting unit 75 (first collation case), collating one occurrence frequency of the fore general character in each occurrence frequency set of the particular two-character chain type Tc1 with that of the fore general character in a particular occurrence frequency set of the particular two-character chain type Tc2 in cases where the particular two-character chain type Tc1 agrees with one retrieval special two-character chain detected by the detecting unit 123 and the particular two-character chain type Tc2 agrees with one retrieval general two-character chain detected by the detecting unit 75 (second collation case), collating one occurrence frequency of the fore general character in each occurrence frequency set of the particular two-character chain type Tc1 with that of the rear general character in a particular occurrence frequency set of the particular two-character chain type Tc2 in cases where the particular two-character chain type Tc1 agrees with one retrieval general two-character chain detected by the detecting unit 75 and the particular two-character chain type Tc2 agrees with one retrieval special two-character chain detected by the detecting unit 123 (third collation case), judging whether or not the occurrence frequency in the particular two-character chain type Tc1 agrees with that in the particular two-character chain type Tc2, and detecting an occurrence frequency in a particular occurrence frequency set of the particular two-character chain type Tc1 agreeing with that in the particular two-character chain type Tc2; and a character string detecting unit 126 for detecting a particular character string agreeing with the retrieval character string from the registration character string according to the particular two-character chain types detected by the control unit 124 and specifying a position of the particular character string in the text according to the particular occurrence frequency sets of the particular two-character chain types detected by the character chain collating and judging unit 125.

In the above configuration, an operation of the character string collating apparatus 120 is described with reference to FIGS. 22A to 22C.

A plurality of special characters frequently occurring in a registration character string "--ABæCD--" of a full text are detected in the detecting unit 71. Thereafter, as shown in FIG. 22A, a plurality of registration general two-character chains "AB","CD",-- are detected from the registration character string in the detecting unit 72, and a plurality of registration special two-character chains "AC",-- are detected in the detecting unit 121. Each registration special two-character chain includes a fore general character agreeing with one fore general character of one registration general two-character chain C1 placed just before one special character and a rear general character arranged just after the special character. The rear general character of the registration special two-character chain agrees with a fore general character of another registration general two-character chain C2 following the registration general two-character chain C1.

Thereafter, an occurrence frequency of each general character included in the two-character chains is counted in the detecting units 72 and 121. Thereafter, a registration two-character chain table shown in FIG. 22B is produced in the producing unit 122 and is stored in the storing unit 54.

When a user inputs a retrieval character string "ABæCD" shown in FIG. 22C from the input unit 21 to retrieve a particular character string "ABæCD" agreeing with the retrieval character string from the registration character string, the specific character "æ" of the retrieval character string is detected in the detecting unit 74, a plurality of retrieval general two-character chains "AB" and "CD" are detected from the retrieval character string in the detecting unit 75, and a retrieval special two-character chain "AC" is detected from the retrieval character string in the detecting unit 123.

Thereafter, a particular general two-character chain type "AB", a particular special two-character chain type "AC" and a particular general two-character chain type "CD" agreeing with the retrieval two-character chains "AB", "AC" and "CD" are specified by the control unit 124 in that order, and occurrence frequency sets of the particular general two-character chain type "AB", occurrence frequency sets of the particular special two-character chain type "AC" and occurrence frequency sets of the particular general two-character chain type "CD" are read out from the storing unit 54 to the collating and judging unit 125 in that order under the control of the control unit 124.

In the collating and judging unit 125, one occurrence frequency of the fore general character "A" in each occurrence frequency set of the particular two-character chain type "AC" is collated with the occurrence frequency N1 of the fore general character "A" in a particular occurrence frequency set (N1, N2) of the particular two-character chain type "AB" (the second collation case). Because the occurrence frequency N1 of the fore general character "A" in a particular occurrence frequency set (N1, N3) of the particular two-character chain type "AC" agrees with that of the fore general character "A" in the particular occurrence frequency set (N1, N2) of the particular two-character chain type "AB", the particular occurrence frequency set (N1, N3) of the particular two-character chain type "AC" is temporarily selected. Thereafter, one occurrence frequency of the fore general character "C" in each occurrence frequency set of the particular two-character chain type "CD" is collated with the occurrence frequency N3 of the rear general character "C" in the particular occurrence frequency set (N1, N3) of the particular two-character chain type "AC" (the third collation case). Because the occurrence frequency N3 of the fore general character "C" in a particular occurrence frequency set (N3, N4) of the particular two-character chain type "CD" agrees with that of the rear general character "C" in the particular occurrence frequency set (N1, N3) of the particular two-character chain type "AC", the particular occurrence frequency set (N3, N4) of the particular two-character chain type "CD" is temporarily selected.

Thereafter, because the particular occurrence frequency sets of the particular two-character chain types corresponding to all retrieval two-character chains are obtained, the particular occurrence frequency sets of the particular two-character chain types are transmitted to the character string detecting unit 99, and a position of a particular character string "ABæCD" written in the text is specified according to the particular occurrence frequency sets of the particular chain types. The position of the particular character string "ABæCD" is displayed on the display unit 24 or is printed out by the printer 25.

Accordingly, because one special two-character chain straddling one special character is detected for each special character and any occurrence frequency of each special character is not counted, even though the special character expressing no meaning occurs in the text at a high occurrence frequency, the retrieval character string can be efficiently collated with the registration character string while avoiding the increase of a memory capacity.

In this embodiment, occurrence frequency sets of one special two-character chain type, of which one fore general character agrees with one fore general character of one general two-character chain type, are transmitted to the collating unit 125 after occurrence frequency sets of the general two-character chain type. However, in cases where the number of general two-character chains of the general two-character chain type is lower than that of special two-character chains of the special two-character chain type, it is preferred that the occurrence frequency sets of one special two-character chain type be transmitted to the collating unit 125 before the occurrence frequency sets of the general two-character chain type.

Also, each special character written in the text is separately used, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Tenth Embodiment)

In this embodiment, all general characters arranged in a retrieval character string are numbered to attach an occurrence position number to each general character, all registration two-character chains and all registration three-character chains are detected from the retrieval character string in the same manner as in the first embodiment, a position number of each character chain is represented by the occurrence position number of the fore general character of the character chain, and a serial connection between each two character chains adjacent to each other is judged by checking the difference between the position numbers of the two character chains.

Figure 23:
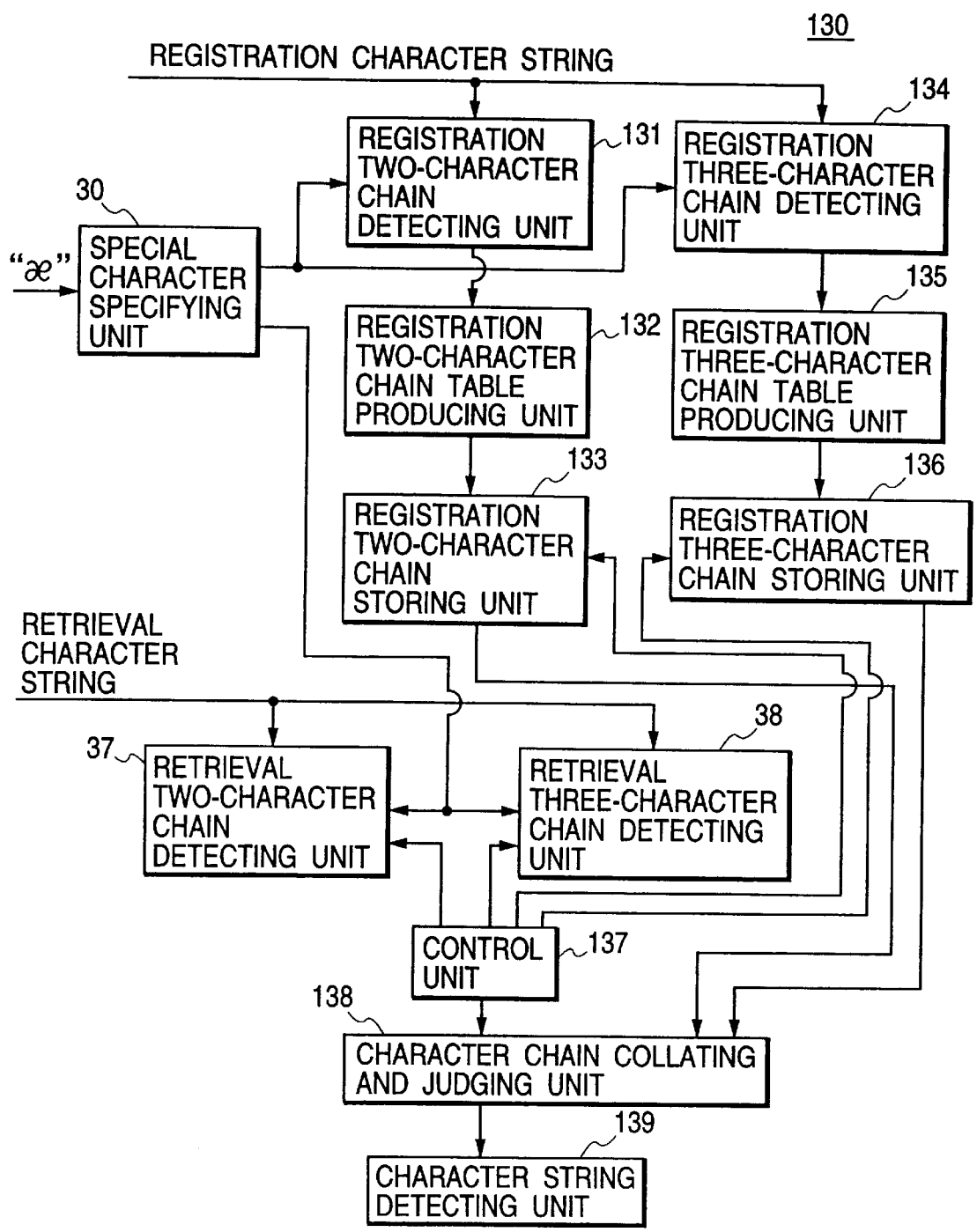
FIG. 23 is a block diagram of a character string collating apparatus according to a tenth embodiment.

FIG. 23 is a block diagram of a character string collating apparatus according to a tenth embodiment.

As shown in FIG. 23, a character string collating apparatus 130 comprises:

the special character specifying unit 30;

a registration two-character chain detecting unit 131 for detecting all registration two-character chains, which respectively include a fore general character and a rear general character arranged in series in that order in the registration character string and do not include any special character specified by the special character specifying unit 30, from the registration character string and counting a position number of each registration two-character chain represented by an occurrence position number of the fore general character of the chain in the registration character string, the occurrence position numbers of general characters being obtained by numbering each of the general characters occurring in the registration character string in the order of increasing the occurrence position numbers;

a registration two-character chain table producing unit 132 for classifying each group of registration two-character chains, respectively having the same type of fore general character and the same type of rear general character, into one registration two-character chain type to produce a two-character chain table in which one registration two-character chain type and the position numbers of registration two-character chains corresponding to the chain type are listed for each chain type;

a registration two-character chain storing unit 133 for storing the two-character chain table produced by the table producing unit 132;

a registration three-character chain detecting unit 134 for detecting a plurality of registration three-character chains, respectively including a fore general character, one special character specified by the special character specifying unit 30 and a rear general character arranged in series in that order in the registration character string, from the registration character string and counting a position number of each registration three-character chain represented by an occurrence position number of the fore general character of the chain in the registration character string;

a registration three-character chain table producing unit 135 for classifying each group of registration three-character chains, respectively having the same type of fore general character and the same type of rear general character, into one registration three-character chain type to produce a three-character chain table in which one registration three-character chain type and the position numbers of registration three-character chains corresponding to the chain type are listed for each chain type;

a registration three-character chain storing unit 136 for storing the three-character chain table produced by the table producing unit 135;

the retrieval two-character chain detecting unit 37; the retrieval three-character chain detecting unit 38;

a control unit 137 for detecting one retrieval two-character chain or one retrieval three-character chain detected by the detecting unit 37 or 38 each time the retrieval two-character chain or the retrieval three-character chain is detected by the detecting unit 37 or 38 in the order of arranging the chains in the retrieval character string and controlling the storing units 133 and 136 to output a particular two-character chain type or a particular three-character chain type agreeing with the retrieval two-character chain or the retrieval three-character chain and position numbers of the particular two-character chain type or position numbers of the particular three-character chain type for each detection of the retrieval chain;

a character chain collating and judging unit 138 for receiving the position numbers of one particular two-character chain type Tc1 or the position numbers of one particular three-character chain type Tc1 from the storing unit 133 or 136 just after the reception of the position numbers of another particular two-character chain type Tc2 or the position numbers of another particular three-character chain type Tc2 under the control of the control unit 137 each time the retrieval two-character chain or the retrieval three-character chain is detected in the detecting unit 37 or 38, collating each position number of the particular chain type Tc1 with a particular position number of the particular two-character chain type Tc2 or the particular three-character chain type Tc2 to judge whether or not each position number of the particular chain type Tc1 is higher than the particular position number of the particular chain type Tc2 by one, and detecting a particular position number of the particular chain type Tc1 higher than the particular position number of the particular chain type Tc2 by one, and a character string detecting unit 139 for detecting a particular character string agreeing with the retrieval character string from the registration character string according to the particular chain types detected by the control unit 137 and specifying a position of the particular character string in the text according to the particular position numbers of the particular chain types detected by the character chain collating and judging unit 138.

Figure 24A:
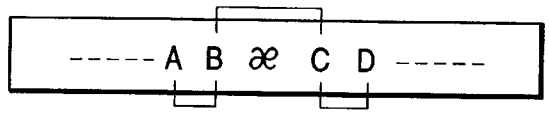
FIG. 24A shows a plurality of registration two-character chains and registration three-character chains detected from a registration character string according to the tenth embodiment.
Figures 22D, 24B, 24C, 24E:
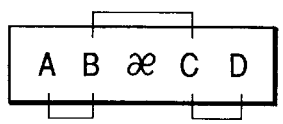
FIG. 24B shows a registration two-character chain table.
FIG. 24C shows a registration three-character chain table.
FIG. 24E shows a registration two-character chain table obtained according to a modification of the tenth embodiment.

In the above configuration, an operation of the character string collating apparatus 130 is described with reference to FIGS. 24A to 24C.

A plurality of special characters frequently occurring in a registration character string "--ABæCD--" of a full text are detected in the detecting unit 71. Thereafter, as shown in FIG. 24A, a plurality of registration two-character chains "AB", "CD",-- are detected from the registration character string in the detecting unit 131, and a plurality of registration three-character chains "BæC",-- are detected in the detecting unit 134. Each registration three-character chain includes a fore general character, one special character and a rear general character arranged in that order in the registration character string.

Thereafter, a position number of each two-character chain is counted in the detecting unit 131, and a position number of each three-character chain is counted in the detecting unit 134. The position number of each chain is represented by an occurrence position number of the fore general character of the chain in the registration character string, and the occurrence position number is incremented each time one general character occurs in the registration character string. Thereafter, a registration two-character chain table shown in FIG. 24B is produced in the producing unit 132 and is stored in the storing unit 133. Also, a registration three-character chain table shown in FIG. 24C is produced in the producing unit 135 and is stored in the storing unit 136.

When a user inputs a retrieval character string "ABæCD" shown in FIG. 24D from the input unit 21 to retrieve a particular character string "ABæCD" agreeing with the retrieval character string from the registration character string, a plurality of retrieval two-character chains "AB" and "CD" are detected from the retrieval character string in the detecting unit 37, and a retrieval three-character chain "BæC" is detected from the retrieval character string in the detecting unit 38.

Thereafter, a particular two-character chain "AB", a particular three-character chain "BæC" and a particular two-character chain "CD" agreeing with the retrieval two-character chains "AB", "BæC" and "CD" are specified by the control unit 138 in that order, and position numbers of the particular two-character chain type "AB", position numbers of the particular three-character chain type "BæC" and position numbers of the particular two-character chain type "CD" are read out from the storing units 133 and 136 to the collating and judging unit 138 in that order under the control of the control unit 137.

In the collating and judging unit 138, each position number of the particular three-character chain type "BæC" is collated with a particular position number N of the particular two-character chain type "AB". Because a particular position number N+1 of the particular three-character chain type "BæC" is higher than the particular position number N of the particular two-character chain type "AB" by one, the particular position number N of the particular two-character chain type "AB" and the particular position number N+1 of the particular three-character chain type "BæC" are temporarily selected. Thereafter, each position number of the particular two-character chain type "CD" is collated with the particular position number N+1 of the particular three-character chain type "BæC". Because a particular position number N+2 of the particular two-character chain type "CD" is higher than the particular position number N+1 of the particular three-character chain type "BæC" by one, the particular position number N+2 of the particular two-character chain type "CD" is temporarily selected.

Thereafter, because the particular position numbers of all particular two-character chain types and particular three-character chain type are obtained, the particular position numbers of the particular two-character chain types are transmitted to the character string detecting unit 139, and a position of a particular character string "ABæCD" written in the text is specified according to the particular position numbers of the particular chain types. The position of the particular character string "ABæCD" is displayed on the display unit 24 or is printed out by the printer 25.

Accordingly, because a serial connection of each pair of character chains is checked according to position numbers of the character chains without counting any occurrence frequency of each special character, even though the special character expressing no meaning occurs in the text at a high occurrence frequency, the retrieval character string can be efficiently collated with the registration character string while avoiding the increase of a memory capacity.

In this embodiment, a large number of special characters written in the text are separately arranged, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the registration two-character chain storing unit 133 and the registration three-character chain storing unit 136 are required to separately store a group of two-character chains and a group of three-character chains. However, it is applicable that the group of two-character chains and the group of three-character chains be stored in the same memory. In this case, a first displacement value is attached to each of the two-character chain types, a second displacement value is attached to each of the three-character chain types, and the group of two-character chain types is distinguished from the group of three-character chain types. For example, as shown in FIG. 24E, the occurrence position number is incremented each time one general character or one special character occurs in the registration character string, each displacement value of one character chain type C1 indicates a difference in position number between the character chain type C1 and another character chain type C2 following the character chain type C1, a displacement value of "1" is attached to each two-character chain type, a displacement value of "2" is attached to each three-character chain type, and it is judged in the collating unit 138 whether or not each position number of the particular two-character chain type Tc1 is equal to a sum of the particular position number of the particular two-character chain type Tc2 and the displacement value.

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, a position number of each character chain is represented by the occurrence position number of the fore general character of the character chain. However, it is applicable that a position number of each character chain be represented by the occurrence position number of the rear general character of the character chain.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Eleventh Embodiment)

In this embodiment, a character string is converted in the same manner as in the second embodiment, all general characters and symbolic characters arranged in the converted character string are numbered to attach an occurrence position number to each character, a position number of each character chain is represented by the occurrence position number of the fore character of the character chain, and a serial connection between each two character chains adjacent to each other is judged by checking the difference between the position numbers of the two character chains.

Figure 25:
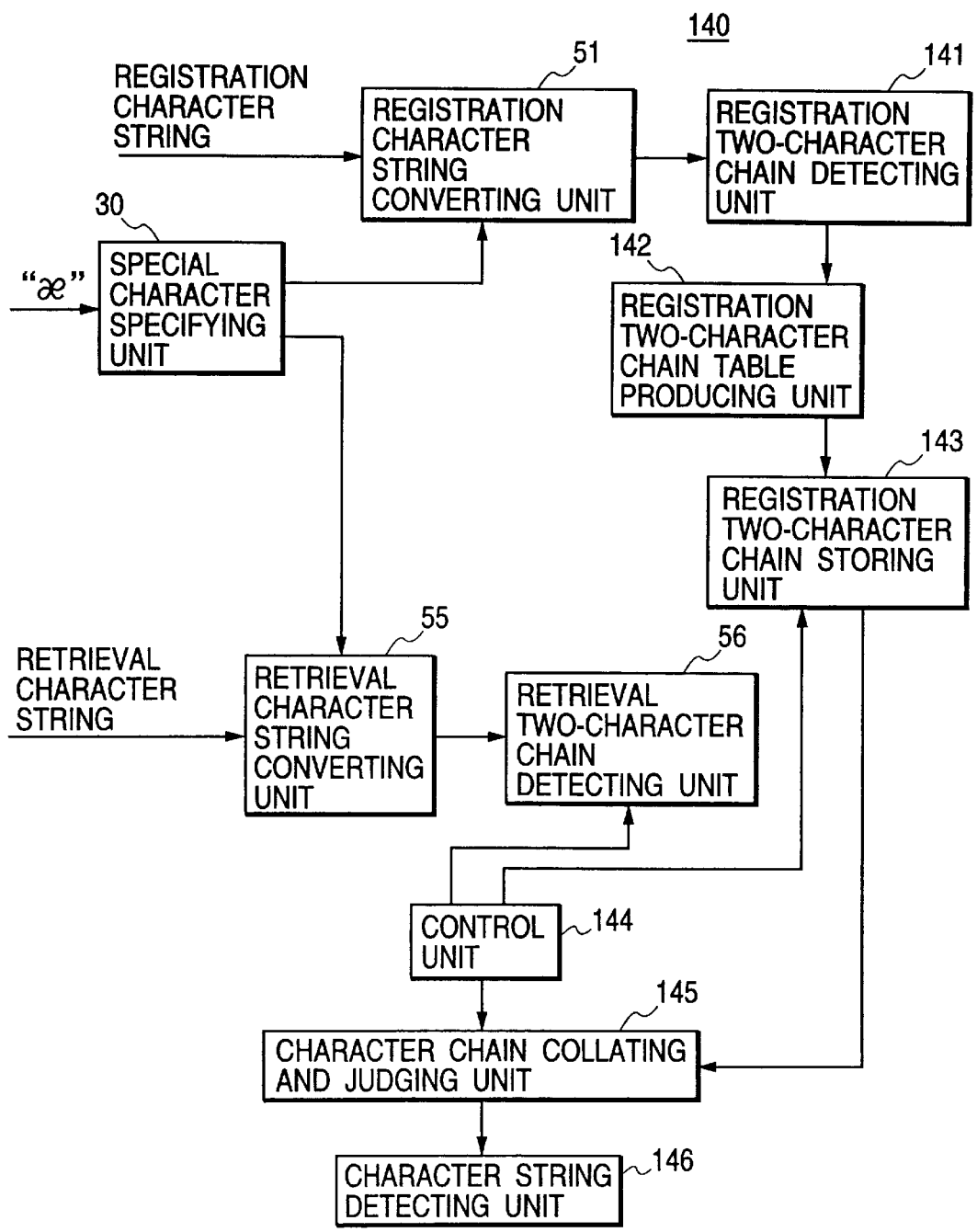
FIG. 25 is a block diagram of a character string collating apparatus according to an eleventh embodiment.

FIG. 25 is a block diagram of a character string collating apparatus according to an eleventh embodiment.

As shown in FIG. 25, a character string collating apparatus 140 comprises:

the special character specifying unit 30; the registration character string converting unit 51;

a registration two-character chain detecting unit 141 for detecting all registration two-character chains, respectively having a fore general character or a fore symbolic character and a rear general character or a rear symbolic character, from the converted registration character string and counting a position number of each registration two-character chain represented by an occurrence position number of the fore character of the chain in the converted registration character string, the occurrence position numbers of characters composed of the general characters and the symbolic characters being obtained by numbering each of the general characters and symbolic characters occurring in the converted registration character string in the order of increasing the occurrence position numbers;

a registration two-character chain table producing unit 142 for classifying each group of registration two-character chains, respectively having the same type of fore general character or the same type of fore symbolic character and the same type of rear general character or the same type of rear symbolic character, into one registration two-character chain type to produce a two-character chain table in which one registration two-character chain type and position numbers of registration two-character chains corresponding to the chain type are listed for each chain type;

a registration two-character chain storing unit 143 for storing the two-character chain table produced by the table producing unit 142;

the retrieval character string converting unit 55; the retrieval two-character chain detecting unit 56;

a control unit 144 for detecting one retrieval two-character chain detected by the detecting unit 56 each time the retrieval two-character chain is detected in the detecting unit 56 and controlling the storing unit 143 to output position numbers of a particular two-character chain type agreeing with the retrieval two-character chain for each detection of the retrieval two-character chain;

a character chain collating and judging unit 145 for receiving the position numbers of one particular two-character chain type Tc1 from the storing unit 143 just after the reception of the position numbers of another particular two-character chain type Tc2 under the control of the control unit 144 each time the retrieval two-character chain is detected in the detecting unit 56, collating each position number of the particular two-character chain type Tc1 with a particular position number of the particular two-character chain type Tc2 to judge whether or not each position number of the particular two-character chain type Tc1 is higher than a particular position number of the particular two-character chain type Tc2 by one, and detecting a particular position number of the particular two-character chain type Tc1 higher than the particular position number of the particular two-character chain type Tc2 by one; and a character string detecting unit 146 for detecting a particular character string agreeing with the retrieval character string from the registration character string according to the particular two-character chain types detected by the control unit 144 and specifying a position of the particular character string in the text according to the particular position numbers of the particular two-character chain types detected by the character chain collating and judging unit 145.

In the above configuration, an operation of the character string collating apparatus 140 is described with reference to FIGS. 26A to 26D.

As shown in FIG. 26A, a registration character string "--ABæCD--" of a full text recorded in the recording medium 23 is converted into a converted registration character string "--ABC^CD--" in the converting unit 51. Here, the symbolic character C^ replaced with the special character "æ" is determined according to the general character "C" placed just after the special character. For example, as shown in FIG. 26B, the special character is replaced with a symbolic character D^ in cases where a general character "D" is placed just after the special character in the registration character string, and the special character is replaced with a symbolic character A^ in cases where a general character "A" or a general character "B" is placed just after the special character in the registration character string.

Thereafter, as shown in FIG. 26A, a registration two-character chain "AB", a registration two-character chain "BC^", a registration two-character chain "C^C" and a registration two-character chain "CD",-- are detected from the converted registration character string in the detecting unit 141, and a position number of each registration two-character chain is counted. The position number of each registration two-character chain is represented by an occurrence position number of the fore character of the chain in the converted registration character string, and the occurrence position number is incremented each time one character occurs in the converted registration character string.

Thereafter, a registration two-character chain table shown in FIG. 26C is produced in the producing unit 142 and is stored in the storing unit 143.

When a user inputs a retrieval character string "ABæCD" from the input unit 21, as shown in FIG. 26D, the retrieval character string is converted into "ABC^CD" in the converting unit 55 in the same manner as in the second embodiment, and a plurality of retrieval two-character chains "AB", "BC^", "C^C " and "CD" are detected from the converted retrieval character string in the detecting unit 56.

Thereafter, a plurality of particular two-character chains "AB", "BC^", "C^C" and "CD" are specified by the control unit 144 in that order, and position numbers of the particular two-character chain type "AB", position numbers of the particular three-character chain type "BC^", position numbers of the particular three-character chain type "C^C" and position numbers of the particular two-character chain type "CD" are read out from the storing unit 143 to the collating and judging unit 145 in that order under the control of the control unit 144.

In the collating and judging unit 145, each position number of the particular two-character chain type "BC^" is collated with the position number N of the particular two-character chain type "AB" to judge whether or not each position number of the particular two-character chain type "BC^" is higher than the particular position number N of the particular two-character chain type "AB" by one. Because a particular position number N+1 of the particular two-character chain type "BC^" is higher than the position number N of the particular two-character chain type "AB" by one, the particular position number N of the particular two-character chain type "AB" and the particular position number N+1 of the particular two-character chain type "BC^" is temporarily selected. Thereafter, each position number of the particular two-character chain type "C^C" is collated with the position number N+1 of the particular two-character chain type "BC^", to judge whether or not each position number of the particular two-character chain type "C^C" is higher than the particular position number N+1 of the particular two-character chain type "BC^" by one. Because a particular position number N+2 of the particular two-character chain type "C^C" is higher than the particular position number N+1 of the particular two-character chain type "BC^" by one, the particular position number N+2 of the particular two-character chain type "C^C" is temporarily selected. Thereafter, each position number of the particular two-character chain type "CD" is collated with the position number N+2 of the particular two-character chain type "C^C" to judge whether or not each position number of the particular two-character chain type "CD" is higher than the particular position number N+2 of the particular two-character chain type "C^C" by one. Because a particular position number N+3 of the particular two-character chain type "CD" is higher than the particular position number N+2 of the particular two-character chain type "C^C" by one, the particular position number N+3 of the particular two-character chain type "CD" is temporarily selected.

Because the particular position numbers of all particular two-character chain types are determined, the particular position numbers of the particular two-character chain types are transmitted to the character string detecting unit 146, and a position of a particular character string "ABæCD" written in the text is specified according to the particular position numbers of the particular chain types. The position of the particular character string "ABæCD" is displayed on the display unit 24 or is printed out by the printer 25.

Accordingly, because each special character occurring in the text is replaced with a symbolic character determined according to a general character placed just after the special character, even though the special character expressing no meaning occurs in the text at a high occurrence frequency, the increase of the position number of each registration two-character chain corresponding to one symbolic character can be avoided. Therefore, the retrieval character string can be efficiently collated with the registration character string while avoiding the increase of a memory capacity.

Also, because each special character in the registration character string is replaced with one of a plurality of symbolic characters, the number of two-character chains of each two-character chain type relating to one symbolic character is reduced, so that a particular position number of each two-character chain type relating to one symbolic character can be rapidly determined.

Also, because any three-character chain used in the tenth embodiment is not extracted in this embodiment, the collation of the retrieval character string with the registration character string of the text can be simplified, and a processing time required to perform the collation can be shortened as compared with that in the tenth embodiment.

In this embodiment, each special character occurring in the text is replaced with a symbolic character determined according to a general character placed just after the special character. However, it is applicable that each special character occurring in the text be replaced with a symbolic character determined according to a general character placed just before the special character.

Also, as shown in FIG. 26E, it is applicable that a displacement value "1" be attached to each of the two-character chain types to judge whether or not each position number of the particular two-character chain type Tc1 is equal to a sum of the particular position number of the particular two-character chain type Tc2 and the displacement value.

Also, a large number of special characters written in the text are separately arranged, and any series of special characters does not occur in the text. However, in cases where a series of special characters "æœ--æ" occurs in the registration character string or the retrieval character string, the series of special characters is replaced with a single special character, and the collation of the retrieval character string with the registration character string is performed. Therefore, a character string "CDæœ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, a position number of each two-character chain is represented by the occurrence position number of the fore character of the two-character chain. However, it is applicable that a position number of each two-character chain be represented by the occurrence position number of the rear character of the two-character chain.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Twelfth Embodiment)

In this embodiment, a character string is converted in the same manner as in the third embodiment, all general characters and symbolic characters arranged in the converted character string are numbered to attach an occurrence position number to each character, a position number of each character chain is represented by the occurrence position number of the fore character of the character chain, and a serial connection between each two character chains adjacent to each other is judged by checking the difference between the position numbers of the two character chains.

Figure 27:
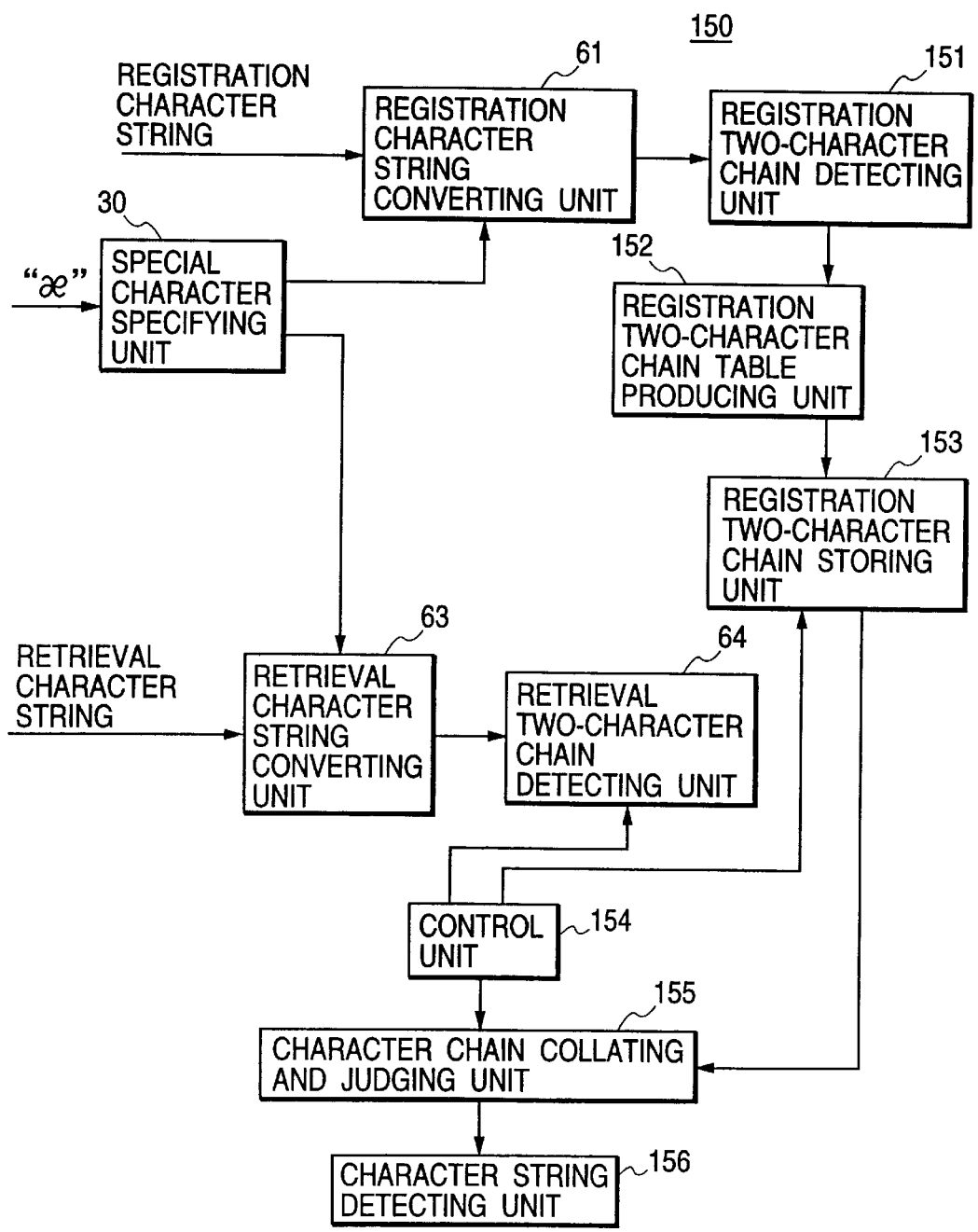
FIG. 27 is a block diagram of a character string collating apparatus according to a twelfth embodiment.

FIG. 27 is a block diagram of a character string collating apparatus according to a twelfth embodiment.

As shown in FIG. 27, a character string collating apparatus 150 comprises:

the special character specifying unit 30; the registration character string converting unit 61;

a registration two-character chain detecting unit 151 for detecting all registration two-character chains, respectively having a general character, one first symbolic character or one second symbolic character as a fore character and a general character, one first symbolic character or one second symbolic character as a rear character arranged in that order in the converted registration character string, from the converted registration character string and counting a position number of each registration two-character chain represented by an occurrence position number of the fore character of the chain in the converted registration character string, the occurrence position numbers of characters composed of the general characters and the symbolic characters being obtained by numbering each of the general characters and symbolic characters occurring in the converted registration character string in the order of increasing the occurrence position numbers;

a registration two-character chain table producing unit 152 for classifying each group of registration two-character chains, respectively having the same type of fore general character or the same type of fore symbolic character and the same type of rear general character or the same type of rear symbolic character, into one registration two-character chain type to produce a two-character chain table in which one registration two-character chain type and position numbers of registration two-character chains corresponding to the chain type are listed for each chain type;

a registration two-character chain storing unit 153 for storing the two-character chain table produced by the table producing unit 152;

the retrieval character string converting unit 63; the retrieval two-character chain detecting unit 64;

a control unit 154 for detecting one retrieval two-character chain detected by the detecting unit 56 each time the retrieval two-character chain is detected in the detecting unit 56 and controlling the storing unit 153 to output position numbers of a particular two-character chain type agreeing with the retrieval two-character chain for each detection of the retrieval two-character chain;

a character chain collating and judging unit 155 for receiving one particular two-character chain type Tc1 from the storing unit 153 just after the reception of the position numbers of another particular two-character chain type Tc2 under the control of the control unit 154 each time the retrieval two-character chain is detected in the detecting unit 64, collating each position number of the particular two-character chain type Tc1 with a particular position number of the particular two-character chain type Tc2 to judge whether or not each position number of the particular two-character chain type Tc1 is higher than a particular position number of the particular two-character chain type Tc2 by one, and detecting a particular position number of the particular two-character chain type Tc1 higher than the particular position number of the particular two-character chain type Tc2 by one; and a character string detecting unit 156 for detecting a particular character string agreeing with the retrieval character string from the registration character string according to the particular two-character chain types detected by the control unit 154 and specifying a position of the particular character string in the text according to the particular position numbers of the particular two-character chain types detected by the character chain collating and judging unit 155.

In the above configuration, an operation of the character string collating apparatus 150 is described with reference to FIGS. 28A to 28D.

As shown in FIG. 28A, a registration character string "--ABæCD--" of a full text recorded in the recording medium 23 is converted into a converted registration character string "--ABB^C^CD--" in the converting unit 61 in the same manner as in the third embodiment. An example of a special character conversion is shown in FIG. 28B.

Thereafter, as shown in FIG. 28A, a registration two-character chain "AB", a registration two-character chain "BB^", a registration two-character chain "B^C^", a registration two-character chain "C^C" and a registration two-character chain "CD",-- are detected from the converted registration character string in the detecting unit 151, and a position number of each registration two-character chain is counted. Thereafter, a registration two-character chain table shown in FIG. 28C is produced in the producing unit 152 and is stored in the storing unit 153.

When a user inputs a retrieval character string "ABæCD" from the input unit 21, as shown in FIG. 28D, the retrieval character string is converted into "ABB^C^CD" in the converting unit 63 in the same manner as in the third embodiment, and a plurality of retrieval two-character chains "AB", "BB^", "B^C^", "C^C" and "CD" are detected from the converted retrieval character string in the detecting unit 64.

Thereafter, a plurality of particular two-character chains "AB", "BB^", "B^C", "C^C" and "CD" are specified by the control unit 154 in that order, and position numbers of the particular two-character chain type "AB", position numbers of the particular three-character chain type "BB^", position numbers of the particular three-character chain type "B^C^", position numbers of the particular three-character chain type "C^C" and position numbers of the particular two-character chain type "CD" are read out from the storing unit 153 to the collating and judging unit 155 in that order under the control of the control unit 154.

In the collating and judging unit 155, each position number of the particular two-character chain type "BB^" is collated with the position number N of the particular two-character chain type "AB" to judge whether or not each position number of the particular two-character chain type "BB^" is higher than the particular position number N of the particular two-character chain type "AB" by one. Because a particular position number N+1 of the particular two-character chain type "BB^" is higher than the position number N of the particular two-character chain type "AB" by one, the particular position number N of the particular two-character chain type "AB" and the particular position number N+1 of the particular two-character chain type "BB^" is temporarily selected. Thereafter, each position number of the particular two-character chain type "B^C^" is collated with the position number N+1 of the particular two-character chain type "BB^" to judge whether or not each position number of the particular two-character chain type "B^C^", is higher than the particular position number N+1 of the particular two-character chain type "BB^" by one. Because a particular position number N+2 of the particular two-character chain type "B^C^" is higher than the particular position number N+1 of the particular two-character chain type "BB^" by one, the particular position number N+2 of the particular two-character chain type "B^C^" is temporarily selected. Thereafter, each position number of the particular two-character chain type "C^C" is collated with the position number N+2 of the particular two-character chain type "B^C^" to judge whether or not each position number of the particular two-character chain type "C^C" is higher than the particular position number N+2 of the particular two-character chain type "B^C^" by one. Because a particular position number N+3 of the particular two-character chain type "C^C" is higher than the particular position number N+2 of the particular two-character chain type "B^C^" by one, the particular position number N+3 of the particular two-character chain type "C^C" is temporarily selected. Thereafter, each position number of the particular two-character chain type "CD" is collated with the position number N+3 of the particular two-character chain type "C^C" to judge whether or not each position number of the particular two-character chain type "CD" is higher than the particular position number N+3 of the particular two-character chain type "C^C" by one. Because a particular position number N+4 of the particular two-character chain type "CD" is higher than the particular position number N+3 of the particular two-character chain type "C^C" by one, the particular position number N+4 of the particular two-character chain type "CD" is temporarily selected.

Because the particular position numbers of all particular two-character chain types are determined, the particular position numbers of the particular two-character chain types are transmitted to the character string detecting unit 156, and a position of a particular character string "ABæCD" written in the text is specified according to the particular position numbers of the particular chain types. The position of the particular character string "ABæCD" is displayed on the display unit 24 or is printed out by the printer 25.

Accordingly, because each special character is converted into two symbolic characters determined according to two general characters adjacent to the special character, even though the special character expressing no meaning occurs in the text at a high occurrence frequency, the increase of the position number of the two-character chain type corresponding to each symbolic character can be avoided. Therefore, the retrieval character string can be efficiently collated with the registration character string while avoiding the increase of a memory capacity.

Also, because any three-character chain used in the tenth embodiment is not extracted in this embodiment, the collation of the retrieval character string with the registration character string of the text can be simplified, and a processing time required to perform the collation can be shortened as compared with that in the tenth embodiment.

In this embodiment, as shown in FIG. 28E, it is applicable that a displacement value "1" be attached to each of the two-character chain types to judge whether or not each position number of the particular two-character chain type Tc1 is equal to a sum of the particular position number of the particular two-character chain type Tc2 and the displacement value.

Also, a large number of special characters written in the text are separately arranged, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, a position number of each two-character chain is represented by the occurrence position number of the fore character of the two-character chain. However, it is applicable that a position number of each two-character chain be represented by the occurrence position number of the rear character of the two-character chain.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Thirteenth Embodiment)

In this embodiment, general two-character chains are extracted from a retrieval character chain, fore and rear two-character chains are produced from a converted three-character chain in the same manner as in the sixth embodiment, a position number of each chain is counted, and a serial connection between each two character chains adjacent to each other is judged by checking the difference between the position numbers of the two character chains.

Figure 29:
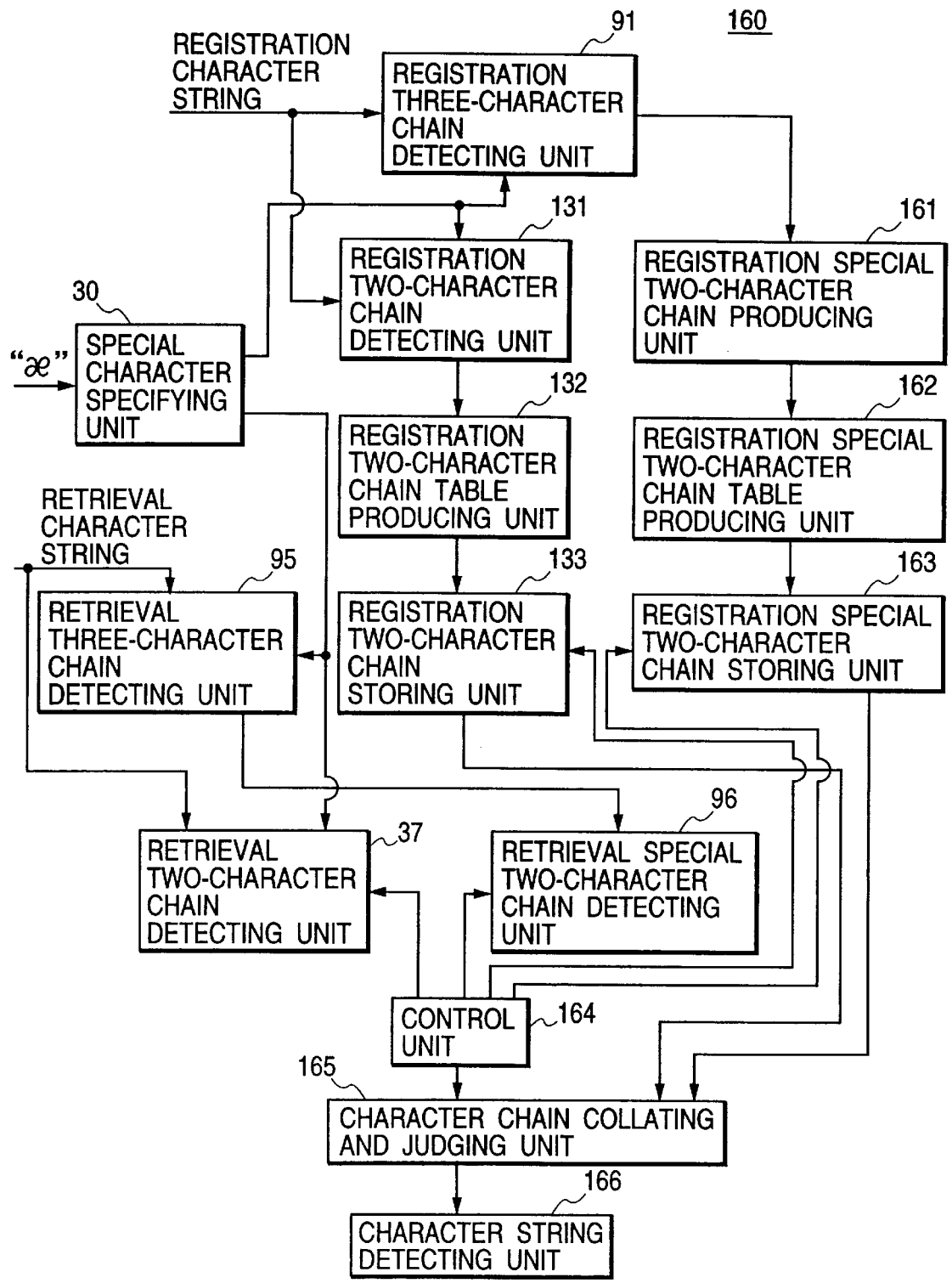
FIG. 29 is a block diagram of a character string collating apparatus according to a thirteenth embodiment.

FIG. 29 is a block diagram of a character string collating apparatus according to a thirteenth embodiment.

As shown in FIG. 29, a character string collating apparatus 160 comprises:

the special character specifying unit 30; the registration two-character chain detecting unit 131; the two-character chain table producing unit 132; the registration two-character chain storing unit 133; the registration three-character chain detecting unit 91;

a registration special two-character chain producing unit 161 for counting occurrence position numbers of the fore and rear general characters included in each registration three-character chain detected by the detecting unit 91, converting each registration three-character chain into a converted three-character chain including the fore general character, a central general character having the same character type as that of the rear general character and the rear general character in that order, producing a fore registration two-character chain including the fore general character and the central general character and a rear registration two-character chain including the central general character and the rear general character from the converted three-character chain, setting a position number of the fore registration two-character chain produced from each converted three-character chain to the occurrence position number of the fore general character of the converted three-character chain, and setting a position number of the rear registration two-character chain produced from each converted three-character chain to the occurrence position number of the rear general character of the converted three-character chain;

a registration special two-character chain table producing unit 162 for classifying each group of fore registration two-character chains, respectively having the same type of fore general character and the same type of central general character, into one fore registration two-character chain type to produce a fore two-character chain table in which one fore registration two-character chain type and the position numbers of fore registration two-character chains corresponding to the chain type are listed for each chain type, and classifying each group of rear registration two-character chains, respectively having the same type of central general character and the same type of rear general character, into one rear registration two-character chain type to produce a rear two-character chain table in which one registration rear two-character chain type and the position numbers of rear registration two-character chains corresponding to the chain type are listed for each chain type;

a registration special two-character chain storing unit 163 for storing the fore two-character chain table and the rear two-character chain table produced by the table producing unit 162;

the retrieval two-character chain detecting unit 37, the retrieval three-character chain detecting unit 95; the retrieval special two-character chain producing unit 96;

a control unit 164 for detecting one retrieval two-character chain detected by the detecting unit 37 or one pair of fore and rear retrieval two-character chains produced by the producing unit 96 each time the retrieval two-character chain or the retrieval three-character chain is detected by the detecting unit 37 or 96 in the order of arranging the chains in the retrieval character string and controlling the storing units 133 and 163 to output position numbers of a particular general two-character chain type agreeing with the retrieval general two-character chain or position numbers of a pair of particular fore and rear two-character chain types agreeing with the pair of fore and rear retrieval two-character chains for each detection of the retrieval chain in the detecting unit 37 or 95;

a character chain collating and judging unit 165 for receiving the position numbers of one particular two-character chain type Tc1 or the position numbers of one pair of particular fore and rear two-character chain types Tc1 from the storing unit 133 or 163 just after the reception of the position numbers of another particular two-character chain type Tc2 or the position numbers of another pair of particular fore and rear two-character chain types Tc2 under the control of the control unit 164 each time the retrieval two-character chain or the retrieval three-character chain is detected in the detecting unit 37 or 95, collating each position number of the particular general two-character chain type Tc1 with a particular position number of the particular general two-character chain type Tc2 to judge whether or not each position number of the particular general two-character chain type Tc1 is higher than the particular position number of another particular general two-character chain type Tc2 by one (first collation case), collating each position number of the particular fore two-character chain type Tc1 with a particular position number of the particular general two-character chain type Tc2 to judge whether or not each position number of the particular fore two-character chain type Tc1 is higher than the particular position number of the particular general two-character chain type Tc2 by one (second collation case), collating each position number of the particular rear two-character chain type Tc1 with a particular position number of the particular fore two-character chain type Tc2 to judge whether or not each position number of the particular rear two-character chain type Tc1 is higher than the particular position number of the particular fore two-character chain type Tc2 (third collation case), collating each position number of the particular general two-character chain type Tc1 with a particular position number of the particular rear two-character chain type Tc2 to judge whether or not each position number of the particular general two-character chain type Tc1 is equal to the particular position number of the particular rear two-character chain type Tc2 (fourth collation case), and detecting a particular position number of the particular chain type Tc1 higher than the particular position number of the particular two-character chain type Tc2 by one or a particular position number of the particular chain type Tc1 equal to the particular position number of the particular two-character chain type Tc2, and a character string detecting unit 166 for detecting a particular character string agreeing with the retrieval character string from the registration character string according to the particular chain types detected by the control unit 164 and specifying a position of the particular character string in the text according to the particular position numbers of the particular chain types detected by the character chain collating and judging unit 165.

In the above configuration, an operation of the character string collating apparatus 160 is described with reference to FIGS. 30A to 30F.

As shown in FIG. 30A, a registration general two-character chain "AB", a registration general two-character chain "CD",-- are detected from a registration character string "--ABæCD--" of a full text recorded in the recording medium 23 in the detecting unit 131, a position number of each general two-character chains is calculated, and a registration general two-character chain table shown in FIG. 30C is produced in the producing unit 132 and is stored in the storing unit 133.

Also, a registration three-character chain "BæC" is detected from the registration character string in the detecting unit 91, and an occurrence position number of a fore general character "B" and an occurrence position number of a rear general character "C" are counted. Thereafter, in the same manner as in the sixth embodiment, as shown in FIG. 30B, the registration three-character chain "BæC" is converted into a registration three-character chain "BCC", a fore registration two-character chain "BC" and a rear registration two-character chain "CC" are produced from the registration three-character chain "BCC", the occurrence position number of the fore general character "B" is set to a position number of the fore registration two-character chain "BC", and the occurrence position number of the rear general character "C" is set to a position number of the rear registration two-character chain "CC".

Thereafter, in the producing unit 132, a registration general two-character chain table shown in FIG. 30C is produced from the registration two-character chains detected by the detecting unit 131 and the position numbers of the chains, and the registration general two-character chain table is stored in the storing unit 133. Also, a fore registration two-character chain table and a rear registration two-character chain table shown in FIG. 30D are produced from the fore and rear registration two-character chains produced by the producing unit 161 and the position numbers of the chains. The fore and rear registration two-character chain tables are stored in the storing unit 163.

When a user inputs a retrieval character string "ABæCD" from the input unit 21, as shown in FIG. 30E, a plurality of retrieval general two-character chains "AB" and "CD" not including any special character are detected in that order from the retrieval character string "ABæCD" in the retrieval two-character chain detecting unit 37, and a retrieval three-character chain "BæC" including one special character between a fore general character and a rear general character is detected from the retrieval character string "ABæCD" in the retrieval three-character chain detecting unit 95. Thereafter, as shown in FIG. 30F, in the producing unit 96, the retrieval three-character chain "BæC" is converted into a retrieval three-character chain "BCC" in the same manner as in the sixth embodiment, and a fore retrieval two-character chain "BC" and a rear retrieval two-character chain "CC" are produced in that order from the retrieval three-character chain "BCC". Because the chain "CC" is the rear retrieval two-character chain, the chain "CC" is distinguished from a retrieval general two-character chain "CC" even though the retrieval general two-character chain "CC" exists in the retrieval character string.

The retrieval general two-character chain "AB", the fore retrieval two-character chain "BC", the rear retrieval two-character chain "CC" and the retrieval general two-character chain "CD" are detected by the control unit 164 in that order, and a particular two-character chain type agreeing with one retrieval two-character chain and the position numbers of the particular two-character chain type are read out from the storing unit 94 to the collating and judging unit 165 under the control of the control unit 164 each time the retrieval two-character chain is detected by the control unit 164.

In the collating and judging unit 165, each position number of the particular fore two-character chain type "BC" is collated with a particular position number N of the particular general two-character chain type "AB" to judge whether or not each position number of the particular fore two-character chain type "BC" is higher than the particular position number N of the particular general two-character chain type "AB" by one (the second collation case). Because a particular position number N+1 of the particular fore two-character chain type "BC" is higher than the particular position number N of the particular general two-character chain type "AB" by one, the particular position number N+1 of the particular fore two-character chain type "BC" is temporarily selected. Thereafter, each position number of the particular rear two-character chain type "CC" is collated with the particular position number N+1 of the particular fore two-character chain type "BC" to judge whether or not each position number of the particular rear two-character chain type "CC" is higher than the particular position number N+1 of the particular fore two-character chain type "BC" (the third collation case). Because a particular position number N+2 of the particular rear two-character chain type "CC" is higher than the particular position number N+1 of the particular fore two-character chain type "BC", the particular position number N+2 of the particular rear two-character chain type "CC" is temporarily selected. Thereafter, each position number of the particular general two-character chain type "CD" is collated with the particular position number N+2 of the rear two-character chain type "CC" to judge whether or not each position number of the particular general two-character chain type "CD" is equal to the particular position number N+2 of the rear two-character chain type "CC" (the fourth collation case). Because a particular position number N+2 of the particular general two-character chain type "CD" is equal to the particular position number N+2 of the rear two-character chain type "CC", the particular position number N+2 of the particular general two-character chain type "CD" is temporarily selected.

Thereafter, because the particular position numbers of all particular two-character chain types are determined, the particular position numbers of the particular two-character chain types are transmitted to the character string detecting unit 166, and a position of a particular character string "ABæCD" written in the text is specified according to the particular position numbers of the particular chain types. The position of the particular character string "ABæCD" is displayed on the display unit 24 or is printed out by the printer 25.

Accordingly, because each special character is replaced with a central general character having the same character type as that of a rear general character placed just after the special character, even though the special character expressing no meaning occurs in the text at a high occurrence frequency, the increase of the occurrence position number of the special character set as the position number of the two-character chain type can be avoided. Therefore, the retrieval character string can be efficiently collated with the registration character string while avoiding the increase of a memory capacity.

In this embodiment, the registration two-character chain storing unit 133 and the registration three-character chain storing unit 163 are required to separately store the registration general two-character chain table and the fore and rear registration two-character chain tables. However, it is applicable that the registration general two-character chain table and the fore and rear registration two-character chain tables be stored in the same memory. In this case, as shown in FIG. 30F, a displacement having a value "1" is attached to each of the general two-character chain types and fore two-character chain types, a displacement having a value "0" is attached to each of the rear two-character chain types, and it is judged in the collating unit 165 whether or not each position number of the particular two-character chain type Tc1 is equal to a sum of the particular position number of the particular two-character chain type Tc2 and the displacement value.

Also, a large number of special characters written in the text are separately arranged, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, a position number of each general two-character chain and a position number of each fore two-character chain are respectively represented by the occurrence position number of the fore character of the two-character chain. However, it is applicable that a position number of each general two-character chain and a position number of each fore two-character chain be respectively represented by the occurrence position number of the rear character of the two-character chain.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Fourteenth Embodiment)

In this embodiment, a plurality of types of special characters "æ" and "œ" are used, all two-character chains "AB", "BC", "Bæ", "æC",-- are detected from a character string "ABæC--", a position number of each of the chain "AB" and "BC" is set to an occurrence position number of its fore general character, a position number of the chain "Bæ" is set to a fixed value corresponding to a type of the special character, a position number of the chain "æC" is set to an occurrence position number of its rear general character, and a serial connection between each pair of two-character chains is checked according to position numbers of the two-character chains.

Figure 31:
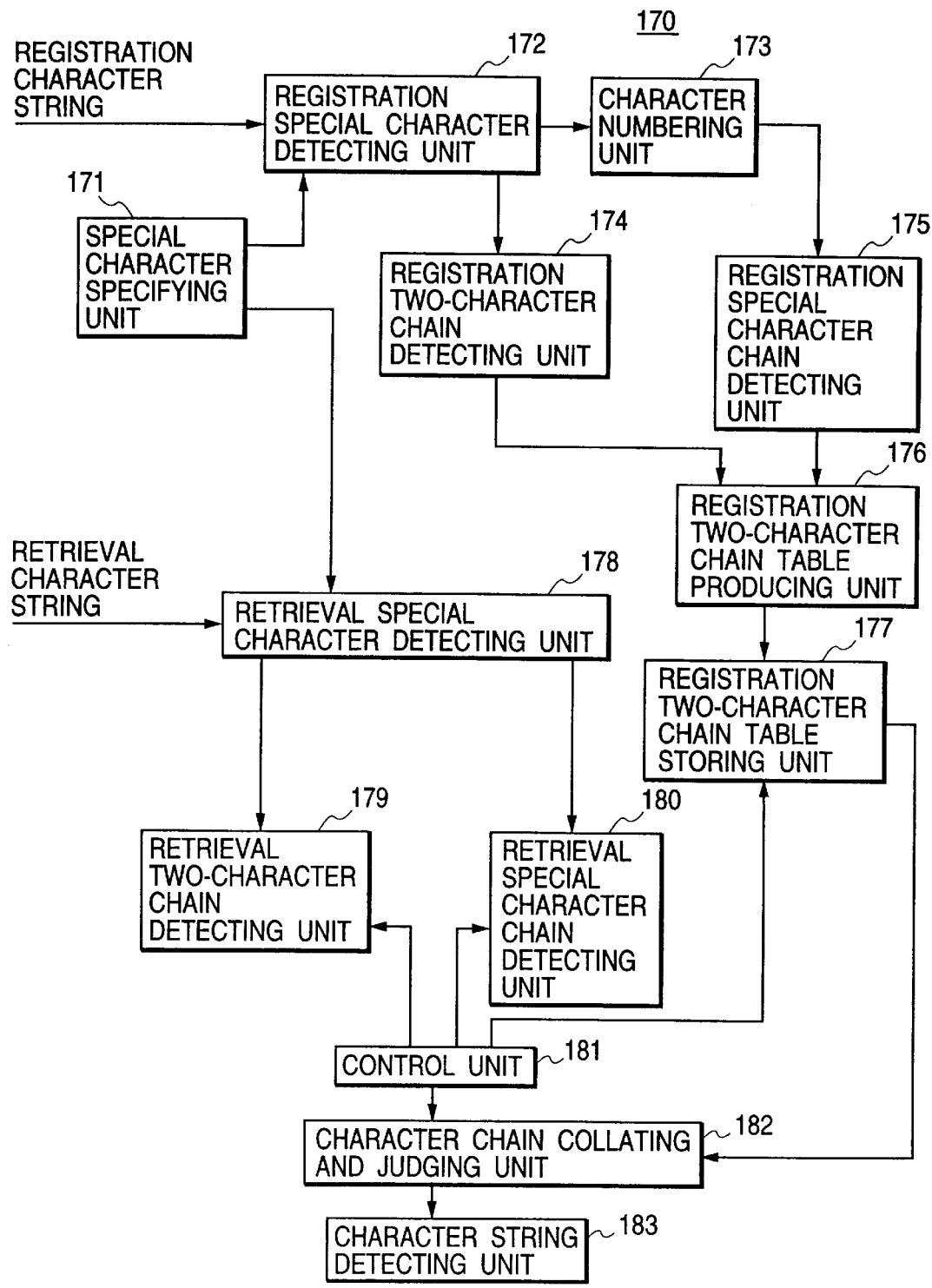
FIG. 31 is a block diagram of a character string collating apparatus according to a fourteenth embodiment.

FIG. 31 is a block diagram of a character string collating apparatus according to a fourteenth embodiment.

As shown in FIG. 31, a character string collating apparatus 170 comprises:

a special character specifying unit 171 for specifying a first type of character "æ", frequently occurring in a registration character string, as a first special character and a second type of character "œ", frequently occurring in the registration character string, as a second special character, the characters "æ" and "œ" being input by the user through the input unit 21;

a registration special character detecting unit 172 for detecting all special characters specified by the special character specifying unit 171 from the registration character string, a character numbering unit 173 for numbering each of general characters occurring in the registration character string in the increasing order to assign an occurrence position number to each general character;

a registration two-character chain detecting unit 174 for detecting all registration general two-character chains, which respectively include a fore general character and a rear general character arranged in series in that order in the registration character string and do not include any special character detected by the registration special character detecting unit 172, from the registration character string and setting a position number of each registration two-character chain to the occurrence position number assigned to the fore general character of the chain;

a registration special character chain detecting unit 175 for detecting all first registration three-character chains, respectively including a fore general character, one first special character detected by the registration special character detecting unit 172 and a rear general character arranged in that order in the registration character string, from the registration character string, producing a first registration two-character chain including the fore general character and the rear general character in that order, a second registration two-character chain including the fore general character and the first special character in that order and a third registration two-character chain including the first special character and the rear general character in that order from each first registration three-character chain, detecting all second registration three-character chains, respectively including a fore general character, one second special character detected by the registration special character detecting unit 172 and a rear general character arranged in that order in the registration character string, from the registration character string, producing a fourth registration two-character chain including the fore general character and the rear general character in that order, a fifth registration two-character chain including the fore general character and the second special character in that order and a sixth registration two-character chain including the second special character and the rear general character in that order from each second registration three-character chain, setting a position number of each registration first two-character chain to the occurrence position number assigned to the fore general character of the chain, setting a position number of each registration second two-character chain to a first fixed value "V1", setting a position number of each registration third two-character chain to the occurrence position number assigned to the rear general character of the chain, setting a position number of each registration fourth two-character chain to the occurrence position number assigned to the fore general character of the chain, setting a position number of each registration fifth two-character chain to a second fixed value "V2", and setting a position number of each registration sixth two-character chain to the occurrence position number assigned to the rear general character of the chain;

a registration two-character chain table producing unit 176 for classifying each group of registration general two-character chains, respectively having the same type of fore general character and the same type of rear general character, into one general two-character chain type to produce a general two-character chain table in which the registration general two-character chains of the general two-character chain type and the position numbers of the registration general two-character chains are listed in the order of arranging the chains in the registration character string, for each group, classifying each group of first registration two-character chains, respectively having the same type of fore general character and the same type of rear general character, into one first two-character chain type, classifying each group of second registration two-character chains, respectively having the same type of fore general character, into one second two-character chain type, producing a first-second two-character chain table, in which first and second registration two-character chains of first and second two-character chain types having the same type of fore general character and the position numbers of the first and second registration two-character chains are listed in the order of arranging the chains in the registration character string, for each fore general character type, classifying each group of third registration two-character chains, respectively having the same type of rear general character, into one third two-character chain type to produce a third two-character chain table, in which the third registration two-character chains of the third two-character chain type and the position numbers of the third registration two-character chains are listed in the order of arranging the chains in the registration character string, for each rear general character type, classifying each group of fourth registration two-character chains, respectively having the same type of fore general character and the same type of rear general character, into one fourth two-character chain type, classifying each group of fifth registration two-character chains, respectively having the same type of fore general character, into one fifth two-character chain type, producing a fourth-fifth two-character chain table, in which fourth and fifth registration two-character chains of fourth and fifth two-character chain types having the same type of fore general character and the position numbers of the fourth and fifth registration two-character chains are listed in the order of arranging the chains in the registration character string, for each fore general character type, and classifying each group of sixth registration two-character chains, respectively having the same type of rear general character, into one sixth two-character chain type to produce a sixth two-character chain table, in which the sixth registration two-character chains of the sixth two-character chain type and the position numbers of the sixth registration two-character chains are listed in the order of arranging the chains in the registration character string, for each rear general character type;

a two-character chain table storing unit 177 for storing the two-character chain table produced in the producing unit 176;

a retrieval special character detecting unit 178 for detecting all special characters specified by the special character specifying unit 171 from a retrieval character string input by the user;

a retrieval two-character chain detecting unit 179 for detecting all retrieval general two-character chains, which respectively include a fore general character and a rear general character arranged in series in that order in the retrieval character string and do not include any special character detected by the retrieval special character detecting unit 172, from the retrieval character string in the order arranging the chains in the retrieval character string;

a retrieval special character chain detecting unit 180 for detecting all first retrieval three-character chains, respectively including a fore general character, one first special character detected by the retrieval special character detecting unit 178 and a rear general character arranged in that order in the retrieval character string, from the retrieval character string in the order arranging the chains in the retrieval character string, producing a first retrieval two-character chain including the fore general character and the rear general character in that order, a second retrieval two-character chain including the fore general character and the first special character in that order and a third retrieval two-character chain including the first special character and the rear general character in that order from each first retrieval three-character chain, detecting all second retrieval three-character chains, respectively including a fore general character, one second special character detected by the retrieval special character detecting unit 178 and a rear general character arranged in that order in the retrieval character string, from the retrieval character string in the order arranging the chains in the retrieval character string, and producing a fourth retrieval two-character chain including the fore general character and the rear general character in that order, a fifth retrieval two-character chain including the fore general character and the second special character in that order and a sixth retrieval two-character chain including the second special character and the rear general character in that order from each second retrieval three-character chain;

a control unit 181 for detecting the retrieval two-character chains detected by the detecting units 179 and 180 in the order of arranging the chains in the retrieval character string and controlling the storing unit 177 to output position numbers of a particular general two-character chain type agreeing with the retrieval general two-character chain, position numbers of a particular first two-character chain type agreeing with the first retrieval two-character chain, position numbers of a particular second two-character chain type agreeing with the second retrieval two-character chain, position numbers of a particular third two-character chain type agreeing with the third retrieval two-character chain, position numbers of a particular fourth two-character chain type agreeing with the fourth retrieval two-character chain, position numbers of a particular fifth two-character chain type agreeing with the fifth retrieval two-character chain or position numbers of a particular sixth two-character chain type agreeing with the sixth retrieval two-character chain for each detection of the retrieval two-character chain in the detecting unit 179 or 180;

a character chain collating and judging unit 182 for receiving the position numbers of one particular two-character chain type Tc1 from the storing unit 177 just after the reception of the position numbers of another particular two-character chain type Tc2 under the control of the control unit 181 each time the retrieval two-character chain is detected in the detecting unit 179 or 180, collating each position number of the particular general two-character chain type Tc1 with a particular position number of the particular general two-character chain type Tc2 to judge whether or not each position number of the particular general two-character chain type Tc1 is higher than the particular position number of another particular general two-character chain type Tc2 by one (first collation case), collating each position number of the particular first two-character chain type Tc1 with a particular position number of the particular general two-character chain type Tc2 to judge whether or not each position number of the particular fore two-character chain type Tc1 is higher than the particular position number of the particular general two-character chain type Tc2 by one (second collation case), collating each second two-character chain of the particular second two-character chain type Tc1 with a particular first two-character chain of the particular first two-character chain type Tc2 having a particular position number to select a particular second two-character chain placed just after the particular first two-character chain in the first-second two-character chain table (third collation case), collating each position number of the particular third two-character chain type Tc1 with a particular position number of the particular first two-character chain type Tc2 to judge whether or not each position number of the particular third two-character chain type Tc1 is higher than the particular position number of the particular first two-character chain type Tc2 by one (fourth collation case), collating each position number of the particular general two-character chain type Tc1 with a particular position number of the particular first two-character chain type Tc2 to judge whether or not each position number of the particular general two-character chain type Tc1 is higher than the particular position number of the particular first two-character chain type Tc2 by one (fifth collation case), and detecting a particular position number of the particular chain type Tc1 higher than the particular position number of the particular two-character chain type Tc2 by one, and a character string detecting unit 183 for detecting a particular character string agreeing with the retrieval character string from the registration character string according to the particular chain types detected by the control unit 181 and specifying a position of the particular character string in the text according to the particular position numbers of the particular chain types and the particular second two-character chain detected by the character chain collating and judging unit 182.

In the above configuration, an operation of the character string collating apparatus 170 is described with reference to FIGS. 32A to 32E.

As shown in FIG. 32A, when a registration character string "--ABæCDœABæCD--" of a document number Nd recorded in the recording medium 23 is received, an occurrence position number of each general character arranged in the registration character string is counted in the numbering unit 173, a plurality of registration general two-character chain "AB", "CD", "AB", "CD",-- are detected from the registration character string in the detecting unit 174, and a position number of each general two-character chain is set to an occurrence position number of the fore general character of the chain. Also, in the detecting unit 175, a plurality of first registration three-character chains "BæC", "BæC",-- are detected from the registration character string, a plurality of second registration three-character chains "DœA",-- are detected from the registration character string, a plurality of first registration two-character chains "BC",-- are produced from the first registration three-character chains, a plurality of second registration two-character chains "Bæ",-- are produced from the first registration three-character chains, a plurality of third registration two-character chains "æC",-- are produced from the first registration three-character chains, a plurality of fourth registration two-character chains "DA",-- are produced from the second registration three-character chains, a plurality of fifth registration two-character chains "œ",-- are produced from the second registration three-character chains, a plurality of sixth registration two-character chains "œA",-- are produced from the second registration three-character chains, and a position number of each two-character chain is set. In this case, a position number of each of the first and fourth registration two-character chains is set to an occurrence position number of the fore general character of the chain, a position number of each second registration two-character chain is set to a first fixed value "V1", a position number of each of the third and sixth registration two-character chains is set to an occurrence position number of the rear general character of the chain, and a position number of each fifth registration two-character chain is set to a second fixed value "V2".

Thereafter, in the producing unit 176, the registration two-character chains are classified into general two-character chain types, first two-character chain types, second two-character chain types, third two-character chain types, fourth two-character chain types, fifth two-character chain types and sixth two-character chain types, and general two-character chain tables, first-second two-character chain tables, third two-character chain tables, fourth-fifth two-character chain tables and sixth two-character chain tables shown in FIG. 32B are produced. The tables are stored in the storing unit 177.

When a user inputs a retrieval character string "ABæCD" shown in FIG. 32C from the input unit 21, a plurality of retrieval general two-character chains "AB" and "CD" are detected in that order from the retrieval character string in the retrieval two-character chain detecting unit 179. Also, in the retrieval three-character chain detecting unit 180, a first retrieval three-character chain "BæC" is detected from the retrieval character string, a first retrieval two-character chain "BC", a second retrieval two-character chain "Bæ" and a third retrieval two-character chain "æC" are produced from the chain "BæC".

In the control unit 181, the retrieval two-character chains detected or produced in the detecting units 179 and 180 are detected in the order of arranging the chains in the retrieval character string, and position numbers of a particular two-character chain type agreeing with the retrieval two-character chain are output from the storing unit 177 to the collating and judging unit 182 under the control of the control unit 181.

In the collating and judging unit 182, each position number of the particular first two-character chain type "BC" of the document number Nd is collated with a particular position number Nd of the particular general two-character chain type "AB" of the document number Nd (the second collation case). Because a particular position number N+1 of the particular fore two-character chain type "BC" is higher than the particular position number N of the particular general two-character chain type "AB" by one, the particular position number N+1 of the particular fore two-character chain type "BC" is temporarily selected. Thereafter, each second two-character chain of the particular second two-character chain type "Bæ" is collated with the particular first two-character chain type "BC" of the particular first two-character chain type "BC" having the particular position number N+1 (the third collation case). Because a particular second two-character chain "Bæ" of the document number Nd is placed just after the particular first two-character chain "BC" of the document number Nd in the first-second two-character chain table, the particular second two-character chain "Bæ" is temporarily selected. Thereafter, each position number of the particular third two-character chain type "æC" of the document number Nd is collated with the particular position number N+1 of the particular first two-character chain type "BC" of the document number Nd (the fourth collation case). Because a particular position number N+2 of the particular third two-character chain type "æC" is higher than the particular position number N+1 of the particular first two-character chain type "BC" by one, the particular position number N+2 of the particular third two-character chain type "æC" is temporarily selected. Thereafter, each position number of the particular general two-character chain type "CD" of the document number Nd is collated with the particular position number N+1 of the particular first two-character chain type "BC" of the document number Nd (the fifth collation case). Because a particular position number N+2 of the particular general two-character chain type "CD" is higher than the particular position number N+1 of the particular first two-character chain type "BC" by one, the particular position number N+2 of the particular general two-character chain type "CD" is temporarily selected.

Thereafter, because the particular position numbers of the particular two-character chain types "AB", "BC", "æC" and "CD" are determined and the particular second two-character chain "Bæ" is determined, the particular position numbers of the particular two-character chain types and the particular second two-character chain "Bæ" are transmitted to the character string detecting unit 183, and a position of a particular character string "ABæCD" written in the text is specified according to the particular position numbers of the particular chain types and the particular second two-character chain "Bæ". The position of the particular character string "ABæCD" is displayed on the display unit 24 or is printed out by the printer 25.

Also, a particular position number N+4 of the particular two-character chain type "AB", a particular position number N+5 of the particular two-character chain type "BC", a particular position number N+6 of the particular two-character chain type "æC", a particular position number N+6 of the particular two-character chain type "CD" and a particular second two-character chain "Bæ" placed just after the particular two-character chain type "BC" having the particular position number N+5 are selected, and a position of another particular character string "ABæCD" written in the text is specified according to the particular position numbers of the particular chain types and the particular second two-character chain "Bæ".

Also, when a user inputs a retrieval character string "CDœAB" shown in FIG. 32D from the input unit 21, a retrieval general two-character chain "CD", a fourth retrieval two-character chain "DA", a fifth retrieval two-character chain "Dœ", a sixth retrieval two-character chain "œA" and a retrieval general two-character chain "AB" are detected by the control unit 181, a particular position number N+2 of the particular two-character chain type "CD", a particular position number N+3 of the particular two-character chain type "DA", a particular position number N+4 of the particular two-character chain type "œA", a particular position number N+4 of the particular two-character chain type "AB" and a particular second two-character chain "Dœ" placed just after the particular two-character chain type "DA" having the particular position number N+3 are selected in the collating and judging unit 182, and a position of a particular character string "CDœAB" written in the text is specified according to the particular position numbers of the particular chain types and the particular second two-character chain "Dœ".

Accordingly, because a position number of each special character is not counted, even though the special character expressing no meaning occurs in the text at a high occurrence frequency, the increase of the position number of the special character can be avoided. Therefore, the retrieval character string can be efficiently collated with the registration character string while avoiding the increase of a memory capacity.

In this embodiment, a first character of the retrieval character string is a general character. However, in cases where a first character of a retrieval character string "æA--" is one special character, it is not required to refer a retrieval two-character chain "æA", but a position number of a two-character chain having a fore general character "A" is collated with another one. In this case, a collation processing can be shortened.

Also, a large number of special characters written in the text are separately arranged, and any series of special characters does not occur in the text. However, in cases where a series of special characters "æaæ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Fifteenth Embodiment)

In this embodiment, a pair of one special character "æ" and a general character "C" placed just after the special character in a character string "ABæCD--" is converted into a symbolic character "C^" determined in correspondence to a character type of the general character "C" to produce a converted registration character string "AB C^D--", all general two-character chains "AB", "AC^", "BC^",-- and all specific two-character chains "C^D",-- are detected from the converted registration character string, and a serial connection between each pair of two-character chains is checked according to position numbers of the two-character chains.

Each type of general character "C" and one type of symbolic character "C^" determined in correspondence to the type of general character are called one character group in this embodiment.

Figure 33:
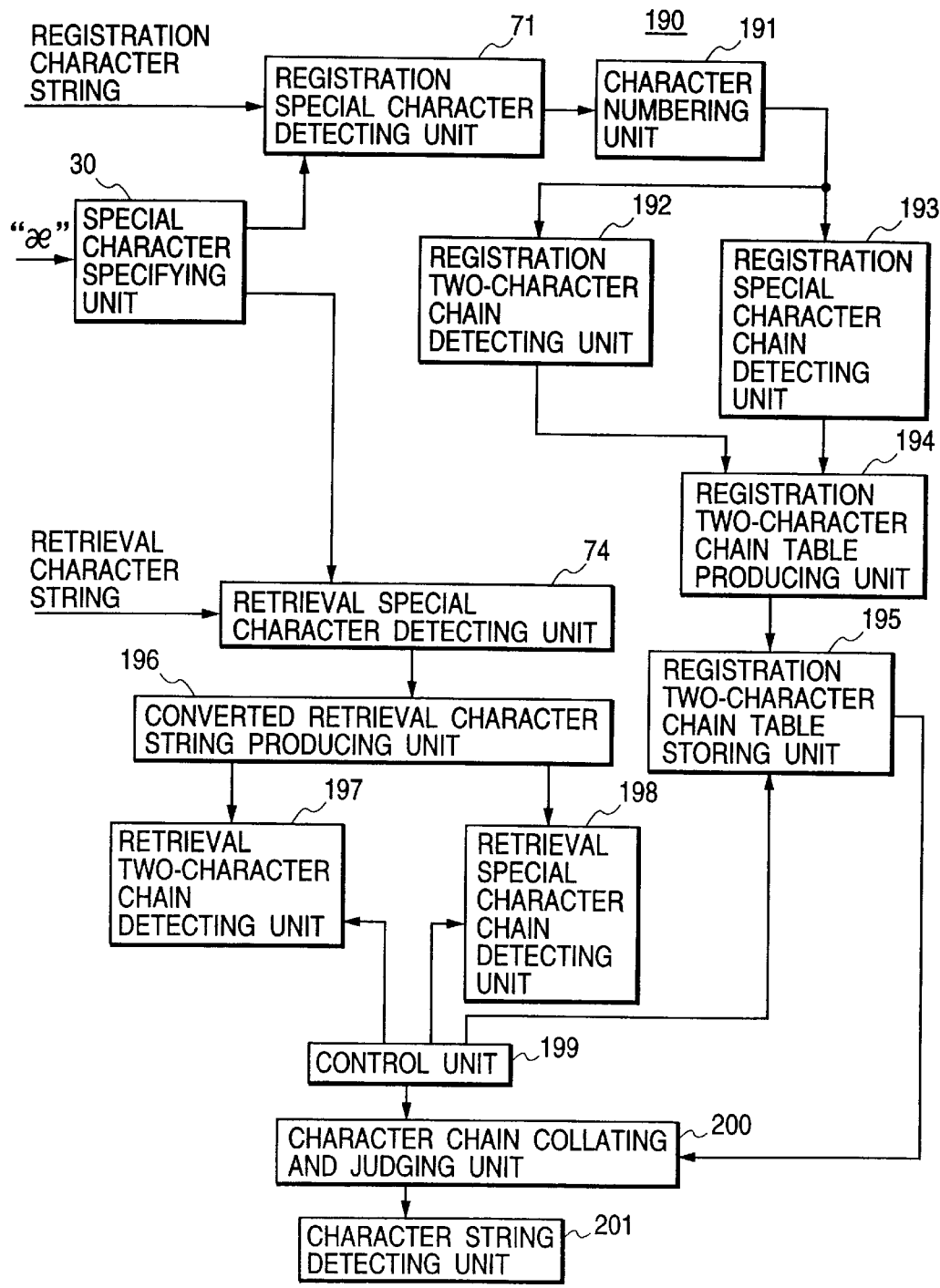
FIG. 33 is a block diagram of a character string collating apparatus according to a fifteenth embodiment.

FIG. 33 is a block diagram of a character string collating apparatus according to a fifteenth embodiment.

As shown in FIG. 33, a character string collating apparatus 190 comprises:

the special character specifying unit 30; the registration special character detecting unit 71;

a character numbering unit 191 for converting each pair of one special character and a general character placed just after the special character in the registration character string into a symbolic character determined in correspondence to a character type of the general character to produce a converted registration character string, and numbering each of general characters and symbolic characters occurring in the converted registration character string in the increasing order to assign an occurrence position number to each general or symbolic character;

a registration two-character chain detecting unit 192 for detecting all registration first two-character chains, which respectively include a fore general character and a rear general character or a rear symbolic character arranged in series in that order in the converted registration character string, from the converted registration character string, detecting all registration second two-character chains, which respectively include a fore general character placed two characters before one symbolic character and the symbolic character as a rear character, from the converted registration character string and setting a position number of each of the registration first two-character chains and registration second two-character chains to the occurrence position number assigned to the fore general character of the chain;

a registration special character chain detecting unit 193 for detecting all registration special two-character chains, respectively including a fore symbolic character and a rear general character arranged in that order in the converted registration character string, from the converted registration character string and setting a position number of each registration special two-character chain to the occurrence position number assigned to the fore symbolic character of the chain;

a registration two-character chain table producing unit 194 for producing a first table block, in which a plurality of registration first and second two-character chains respectively including the same type of fore general character and the position numbers of the registration first and second two-character chains are listed in the order of arranging the chains in the converted registration character string, for each fore general character type, producing a second table block, in which a plurality of registration special two-character chains respectively including the same type of fore symbolic character and the position numbers of the registration special two-character chains are listed in the order of arranging the chains in the converted registration character string, for each fore symbolic character type, and combining each first table block corresponding to one type of fore general character and one second table block corresponding to one type of fore symbolic character determined in correspondence to the type of the fore general character to form a two-character chain table for each character group, the fore characters of the chains in each two-character chain table belonging to the same character group;

a registration two-character chain table storing unit 195 for storing the two-character chain table produced in the producing unit 194;

the retrieval special character detecting unit 74;

a converted retrieval character string producing unit 196 for producing a converted retrieval character string from the retrieval character string by converting each pair of one special character and a general character placed just after the special character in the retrieval character string into a symbolic character determined in correspondence to a character type of the general character in the same manner as the conversion performed by the character numbering unit 191;

a retrieval two-character chain detecting unit 197 for detecting all retrieval first two-character chains, which respectively include a fore general character and a rear general character or a rear symbolic character arranged in series in that order in the converted retrieval character string, from the converted retrieval character string, detecting all retrieval second two-character chains, which respectively include a fore general character placed two characters before one symbolic character and the symbolic character as a rear character, from the converted retrieval character string;

a retrieval special character chain detecting unit 198 for detecting all retrieval special two-character chains, respectively including a fore symbolic character and a rear general character arranged in that order in the converted retrieval character string, from the converted retrieval character string;

a control unit 199 for detecting the retrieval two-character chains detected by the detecting units 197 and 198 in the order of arranging the chains in the retrieval character string, detecting a particular two-character chain agreeing with one retrieval two-character chain from a particular two-character chain table, in which the fore characters of the two-character chains belong to the same character group as that of the fore character of the retrieval two-character chain, for each retrieval two-character chain, and controlling the storing unit 195 to output position numbers of the particular two-character chain each time the retrieval two-character chain is detected;

a character chain collating and judging unit 200 for receiving the position numbers of one particular two-character chain Tc1 from the storing unit 195 just after the reception of the position numbers of another particular two-character chain Tc2 under the control of the control unit 199 each time the retrieval two-character chain is detected in the detecting unit 197 or 198, collating each position number of a particular first two-character chain Tc1 with a particular position number of a particular first two-character chain Tc2 to judge whether or not each position number of the particular first two-character chain Tc1 is higher than the particular position number of the particular two-character chain Tc2 by one (first collation case), collating each position number of a particular second two-character chain Tc1 with a particular position number of a particular first two-character chain Tc2 to judge whether or not each position number of the particular second two-character chain Tc1 agrees with the particular position number of the particular first two-character chain Tc2 (second collation case), collating each position number of a particular special two-character chain Tc1 with a particular position number of a particular first two-character chain Tc2 to judge whether or not each position number of the particular special two-character chain Tc1 is higher than the particular position number of the particular first two-character chain Tc2 by one (third collation case), collating each position number of a particular special two-character chain Tc1 with a particular position number of a particular second two-character chain Tc2 to judge whether or not each position number of the particular special two-character chain Tc1 is higher than the particular position number of the particular second two-character chain Tc2 by two (fourth collation case), collating each position number of a particular first two-character chain Tc1 with a particular position number of a particular special two-character chain Tc2 to judge whether or not each position number of the particular first two-character chain Tc1 is higher than the particular position number of the particular special two-character chain Tc2 by one (fifth collation case), and detecting a particular position number of a particular two-character chain of the particular two-character chain table Tc1 for each collation case; and a character string detecting unit 183 for detecting a particular character string agreeing with the retrieval character string from the registration character string according to the particular two-character chains detected by the character chain collating and judging unit 200 and specifying a position of the particular character string in the text according to the particular position numbers of the particular two-character chains detected by the character chain collating and judging unit 200.

In the above configuration, an operation of the character string collating apparatus 190 is described with reference to FIGS. 34A to 34H.

As shown in FIG. 34A, a document number, a two-character chain and a position number of the chain are listed in a chain region for each chain in each two-character chain table Tc produced in the two-character chain table producing unit 194. Also, a special two-character chain flag Fs, indicating a starting position of a particular chain region from which one or more special two-character chains are listed, is attached to each two-character chain table Tc. For example, in cases where one special two-character chain flag Fs is attached to one two-character chain table Tc in which the fore characters of the chains are the same type of general character "C" or the same type of symbolic character "C^" corresponding to the general character "C" and one or more special two-characters having the symbolic characters "C^" as fore characters are listed from the (N+1)-th chain region, the symbolic character "C^" and a starting position "N+1" are written in the special two-character chain flag Fs.

As shown in FIG. 34B, when a registration character string "--ABæCDCD--" of a document number M recorded in the recording medium 23 is received, each pair of one special character "æ" and a general character "C" placed just after the special character in the registration character string is converted into a symbolic character "C^" determined in correspondence to a character type of the general character "C" to produce a converted registration character string "--AB C^DCD--". Thereafter, as shown in FIG. 34C, each of general characters and symbolic characters occurring in the converted registration character string is numbered in the character numbering unit 191 in the increasing order to assign an occurrence position number to each general or symbolic character.

Thereafter, in the detecting unit 192, all registration first two-character chains "AB", "BC^", "DC", "CD",-- are detected from the converted registration character string, and all registration second two-character chains "AC^",-- are detected from the converted registration character string. Also, all registration special two-character chains "C^D",-- are detected from the converted registration character string in the detecting unit 193.

Figure 34D:
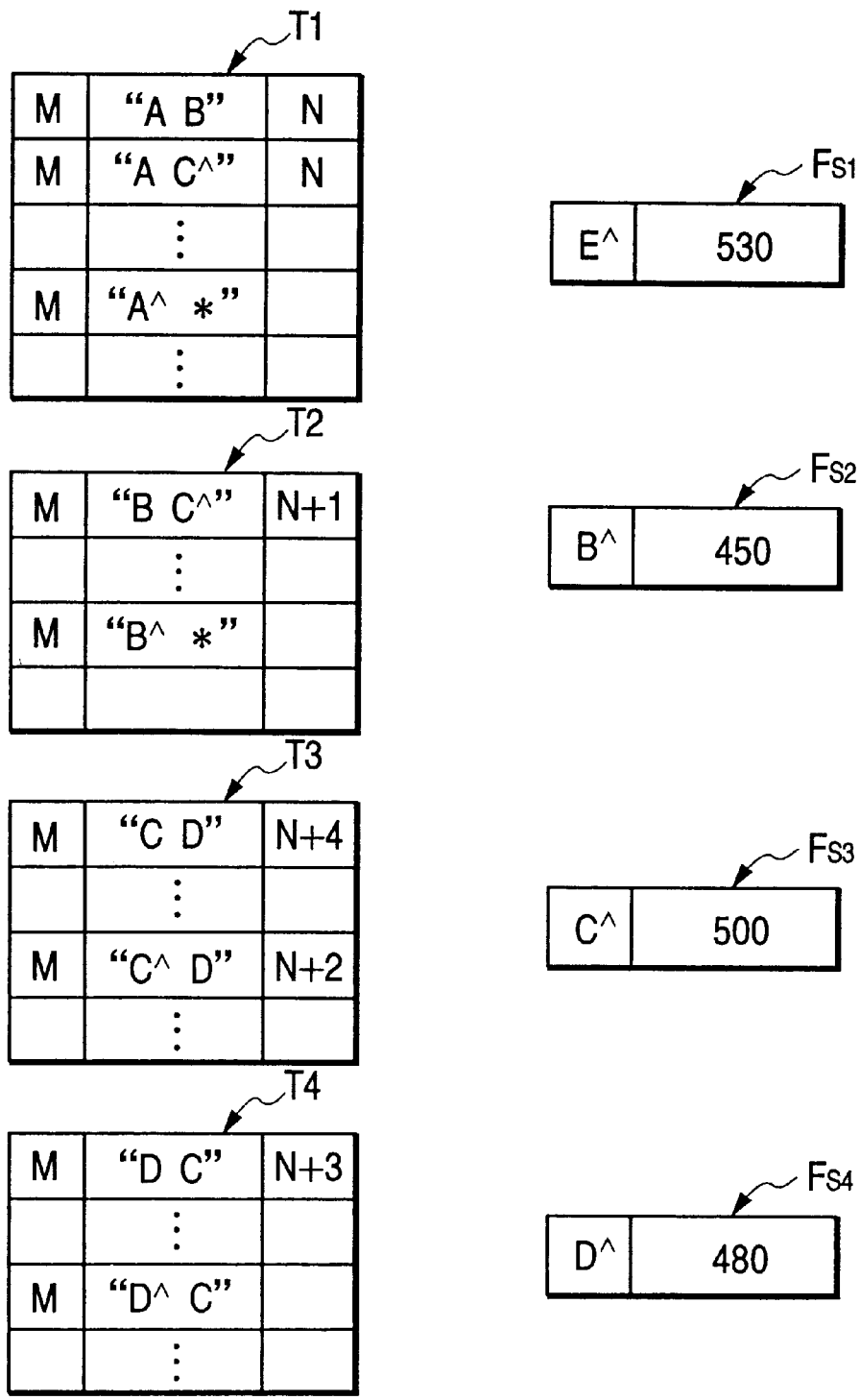
FIG. 34D shows a plurality of two-character chain tables produced from the registration two-character chains and those position numbers.

Thereafter, a plurality of two-character chain tables are produced for each fore general character type in the producing unit 194. For example, as shown in FIG. 34D, a plurality of registration first and second two-character chains "AB", "AC^",-- and the position numbers of the registration first and second two-character chains are listed in the order of arranging the chains in the converted registration character string in a first table block of a two-character chain table T1, a plurality of registration special two-character chains "A^*",-- and the position numbers of the registration special two-character chains are listed in the order of arranging the chains in the converted registration character string in a second table block of the two-character chain table T1, and the symbolic character "A^" and a value "53" of a starting position are written in a special two-character chain flag Fs1. Here, a symbol "*" denotes a general character.

Also, a plurality of registration first and second two-character chains "BC^",-- and the position numbers of the registration first and second two-character chains are listed in a first table block of a two-character chain table T2, a plurality of registration special two-character chains "B^*",-- and the position numbers of the registration special two-character chains are listed in a second table block of the two-character chain table T2, and the symbolic character "B^" and a value "45", of a starting position are written in a special two-character chain flag Fs2. Also, a plurality of registration first and second two-character chains "CD",-- and the position numbers of the registration first and second two-character chains are listed in a first table block of a two-character chain table T3, a plurality of registration special two-character chains "C^D",-- and the position numbers of the registration special two-character chains are listed in a second table block of the two-character chain table T3, and the symbolic character "C^" and a value "50" of a starting position are written in a special two-character chain flag Fs3. Also, a plurality of registration first and second two-character chains "DC", . . . and the position numbers of the registration first and second two-character chains are listed in a first table block of a two-character chain table T4, a plurality of registration special two-character chains "D^*",-- and the position numbers of the registration special two-character chains are listed in a second table block of the two-character chain table T4, and the symbolic character "D^" and a value "48" of a starting position are written in a special two-character chain flag Fs4. The tables are stored in the storing unit 195.

Figure 34E:
FIG. 34E shows a first retrieval character string and a plurality of retrieval two-character chains detected from a first converted retrieval character string according to the fifteenth embodiment.

When a user inputs a retrieval character string "BæCD" shown in FIG. 34E from the input unit 21, a converted retrieval character string "B C^D" is produced from the retrieval character string in the producing unit 196, a retrieval first two-character chain "BC^" and a retrieval special two-character chain "C^D" are detected in that order from the converted retrieval character string in the detecting units 197 and 198. Thereafter, in the control unit 199, because a fore character of the retrieval first two-character chain "BC^" is a general character "B", the two-character chain table T2 corresponding to the general character "B" is selected, a particular first two-character chain "BC^" agreeing with the retrieval first two-character chain "BC^" is detected, and the position numbers of the particular first two-character chain "BC^" are retrieved from the two-character chain table T2 and are output to the collating and judging unit 200 under the control of the control unit 199. Also, a particular special two-character chain "C^D" agreeing with the retrieval special two-character chain "C^D" is detected in the control unit 199, and the position numbers of the particular special two-character chain "C^D" are retrieved from the two-character chain table T3 corresponding to the retrieval special two-character chain "C^D" and are output to the collating and judging unit 200 under the control of the control unit 199.

In the collating and judging unit 200, a particular position number N+1 of the particular first two-character chain "BC^" and a particular document number M of the particular first two-character chain "BC^" are initially ascertained. Thereafter, each position number of the particular special two-character chain "C^D" is collated with the particular position number N+1 of the particular first two-character chain "BC^" to judge whether or not each position number of the particular special two-character chain "C^D" is higher than the particular position number N+1 of the particular first two-character chain "BC^" by one (the third collation case). Because a particular position number N+2 of the particular special two-character chain "C^D" is higher than the particular position number N+1 of the particular first two-character chain "BC^" by one and the document number of the particular special two-character chain "C^" having the particular position number N+2 is M, the particular position number N+1 of the particular first two-character chain "BC^" and the particular position number N+2 of the particular special two-character chain "C^D" are selected and are transmitted to the character string detecting unit 201.

In the detecting unit 201, a position of a particular character string "BæCD" written in the text is specified according to the particular position numbers of the particular two-character chains. The position of the particular character string "BæCD" is displayed on the display unit 24 or is printed out by the printer 25.

Figure 34F:
FIG. 34F shows a second retrieval character string and a plurality of retrieval two-character chains detected from a second converted retrieval character string according to the fifteenth embodiment.

Also, when a user inputs a retrieval character string "æCD" from the input unit 21, as shown in FIG. 34F, a converted retrieval character string "C^D" is produced, a retrieval special two-character chain "C^D" is detected in the detecting unit 198, the two-character chain table T3 corresponding to the fore character "C^" of the retrieval special two-character chain "C^D" is selected, a particular special two-character chain "C^D" agreeing with the retrieval special two-character chain "C^D" is detected, a starting position of the special two-character chains "C^*" listed in the two-character chain table T3 is detected from the special two-character chain flag Fs3 attached to the two-character chain table T3, and the position numbers of the particular special two-character chain "C^D" are detected from the two-character chain table T3 and are output to the collating and judging unit 200 under the control of the control unit 199. In the collating and judging unit 200, because the particular special two-character chain "C^D" having a particular position number N+2 exists, the particular position number N+2 of the particular special two-character chain "C^D" is transmitted to the character string detecting unit 201, and a position of a particular character string "æCD" written in the text is specified according to the particular position number N+2 of the particular special two-character chain "C^D".

Figure 34G:
FIG. 34G shows a third retrieval character string and a plurality of retrieval two-character chains detected from a third converted retrieval character string according to the fifteenth embodiment.

Also, when a user inputs a retrieval character string "æC" from the input unit 21, as shown in FIG. 34G, a converted retrieval character string "C^" is produced, and a retrieval special two-character chain "C^*" is detected in the detecting unit 198. Here, the symbol "*" denotes an arbitrary general character. Thereafter, in the control unit 199, the two-character chain table T3 corresponding to the fore character "C^" of the retrieval special two-character chain "C^*" is selected, particular special two-character chains "C^*" agreeing with the retrieval special two-character chain "C^*" are detected, a starting position of the special two-character chains "C^*" listed in the two-character chain table T3 is detected from the special two-character chain flag Fs3 attached to the two-character chain table T3, and the position numbers of the particular special two-character chains "C^*" are detected from the two-character chain table T3 and are output to the collating and judging unit 200 under the control of the control unit 199. In the collating and judging unit 200, because the particular special two-character chain "C^D" having a particular position number N+2 exists, the particular position number N+2 of the particular special two-character chain "C^D" is transmitted to the character string detecting unit 201, and a position of a particular character string "æCD" written in the text is specified according to the particular position number N+2 of the particular special two-character chain "C^D".

Figure 34H:
FIG. 34H shows a fourth retrieval character string and a plurality of retrieval two-character chains detected from a fourth converted retrieval character string according to the fifteenth embodiment.

Also, when a user inputs a retrieval character string "ABæCD" from the input unit 21, as shown in FIG. 34H, a converted retrieval character string "AB C^D" is produced, a retrieval first two-character chain "AB", a retrieval second two-character chain "AC^" and a retrieval special two-character chain "C^D" are detected in that order from the converted retrieval character string in the detecting units 197 and 198. Thereafter, in the control unit 199, the two-character chain table T1 corresponding to the fore character "AB" of the retrieval first two-character chain "AB" is selected, a particular first two-character chain "ab" agreeing with the retrieval first two-character chain "AB" is detected, and the position numbers of the particular first two-character chain "AB" are detected from the two-character chain table T1 and are output to the collating and judging unit 200 under the control of the control unit 199. Also, the two-character chain table T1 corresponding to the fore character "A" of the retrieval second two-character chain "AC^" is selected, a particular second two-character chain "AC^" agreeing with the retrieval second two-character chain "AC^" is detected, and the position numbers of the particular second two-character chain "AC^" are detected from the two-character chain table T1 and are output to the collating and judging unit 200 under the control of the control unit 199.

In the collating and judging unit 200, each position number of the particular second two-character chain "AC^" is collated with a particular position number N of the particular first two-character chain "AB" to judge whether or not each position number of the particular second two-character chain "AC^" agrees with the particular position number N of the particular first two-character chain "AB" (the second collation case). Because a particular position number N of the particular second two-character chain "AC^" agrees with the particular position number N of the particular first two-character chain "AB" and the document number M of the particular second two-character chain "AC^" having the particular position number N is the same as that of the particular first two-character chain "AB" having the particular position number N, the particular position number N of the particular first two-character chain "AB" and the particular position number N of the particular second two-character chain "AC^" are temporarily selected. Thereafter, each position number of the particular special two-character chain "C^D" is collated with the particular position number N of the particular second two-character chain "AC^" to judge whether or not each position number of the particular special two-character chain "C^D" is higher than the particular position number N of the particular second two-character chain "AC^" by two (the fourth collation case). Because a particular position number N+2 of the particular special two-character chain "C^D" is higher than the particular position number N of the particular second two-character chain "AC^" by two, the particular position number N+2 of the particular special two-character chain "C^D" is temporarily selected. Thereafter, the particular position number N of the particular first two-character chain "AB", the particular position number N of the particular second two-character chain "AC^" and the particular position number N+2 of the particular special two-character chain "C^D" are transmitted to the character string detecting unit 201, and a position of a particular character string "ABæCD" written in the text is specified.

Accordingly, because each pair of one special character and a general character placed just after the special character is converted into a symbolic character determined in correspondence to a character type of the general character and a position number of each special two-character chain including the symbolic character and a rear general character is counted, a position number of each special character is not counted. Therefore, even though the special character expressing no meaning occurs in the text at a high occurrence frequency, the increase of the position number of the special character can be avoided, and the retrieval character string can be efficiently collated with the registration character string while avoiding the increase of a memory capacity.

In this embodiment, a first character of the retrieval character string is a general character. However, in cases where a first character of a retrieval character string "æA--" is one special character, it is not required to refer a retrieval two-character chain "æA", but a position number of a two-character chain having a fore general character "A" is collated with another one. In this case, a collation processing can be shortened.

Also, a large number of special characters written in the text are separately arranged, and any series of special characters does not occur in the text. However, in cases where a series of special characters "ææ--æ" occurs in the registration character string or the retrieval character string, the series of special characters is replaced with a single special character, and the collation of the retrieval character string with the registration character string is performed. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Sixteenth Embodiment)

In this embodiment, a character string "$C_0$æ$C_1C_2$--$C_N$--" is converted into a converted character string "$C_0C_N{}^{\wedge}C_1C_2$--$C_N$--" by converting each special character "æ" into a symbolic character "$C_N{}^{\wedge}$" determined according to a type of a general character "$C_N$" placed N characters (the symbol N is an integral number higher than 1) after the special character "æ", a plurality of two-character chains are extracted from the converted character string, an occurrence frequency set of each two-character chain is calculated, and the collation of a retrieval character string with a registration character string is performed. Here, the concept of the sixteenth embodiment agrees with that of the second embodiment in case of the integral number N=1.

Figure 35:
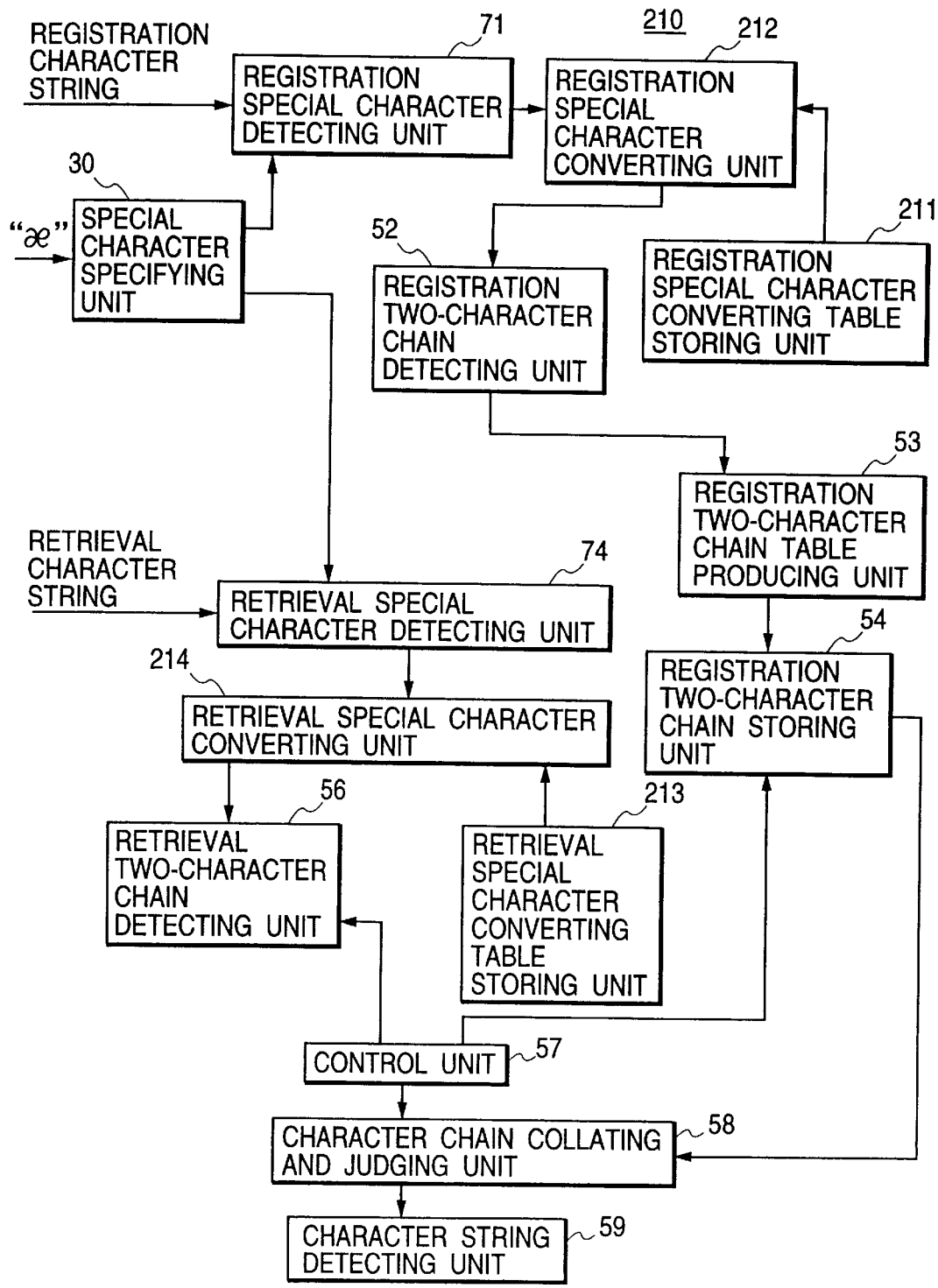
FIG. 35 is a block diagram of a character string collating apparatus according to a sixteenth embodiment.

FIG. 35 is a block diagram of a character string collating apparatus according to a sixteenth embodiment.

As shown in FIG. 35, a character string collating apparatus 210 comprises:

the special character specifying unit 30; the registration special character detecting unit 71;

a registration special character converting table storing unit 211 for storing a registration special character converting table in which a type of symbolic character corresponding to one type of general character according to a general-symbolic character type relationship is listed for each type of general character;

a registration special character converting unit 212 for converting each special character detected by the detecting unit 71 into a type of symbolic character which corresponds to a general character placed N characters after the special character according to the general-symbolic character type relationship and is read out from the registration special character converting table stored in the storing unit 211, a converted registration character string being produced from the registration character string; the registration two-character chain detecting unit 52; the registration two-character chain table producing unit 53; the registration two-character chain storing unit 54; the retrieval special character detecting unit 74;

a retrieval special character converting table storing unit 213 for storing a retrieval special character converting table in which a type of symbolic character corresponding to one type of general character according to the general-symbolic character type relationship is listed for each type of general character;

a retrieval special character converting unit 214 for converting each special character detected from the retrieval character string by the detecting unit 74 into a symbolic character which corresponds to a general character placed N characters after the special character according to the general-symbolic character type relationship and is read out from the retrieval special character converting table stored in the storing unit 213, a converted retrieval character string being produced from the retrieval character string; the retrieval two-character chain detecting unit 56; the control unit 57; the character chain collating and judging unit 58; and the character string detecting unit 59.

In the above configuration, an operation of the character string collating apparatus 210 is described with reference to FIGS. 36A to 36D.

As shown in FIG. 36A, when a registration character string "$C_{-1}C_0 æ C_1 C_2$--$C_N$--" of a full text recorded in the recording medium 23 is received in the apparatus 210, all special characters "æ" are detected by the detecting unit 71, and each special character is converted into a type of symbolic character "$C_N^\wedge$" in correspondence to a general character "$C_N$" placed N characters after the special character in the converting unit 212 to produce a converted registration character string "$C_{-1}C_0 C_N^\wedge C_1 C_2$--$C_N$--". Here, as shown in FIG. 36B, a general-symbolic character type relationship indicating the relationship between the general character "$C_N$" and the symbolic character "$C_N^\wedge$" is stored in the table storing unit 211, and the general-symbolic character type relationship is referred by the converting unit 212. Thereafter, a plurality of retrieval two-character chains "$C_{-1}C_0$", "$C_0 C_N^\wedge$", "$C_N^\wedge C_1$", "$C_1 C_2$",--, "$C_{N-1} C_N$",-- and occurrence frequency sets of the chains shown in FIG. 36C are detected from the converted registration character string and are stored in the storing unit 54 in the same manner as in the second embodiment.

As shown in FIG. 36D, when a user inputs a retrieval character string "$C_{-1}C_0 æ C_1 C_2$--$C_N$" the from input unit 21 to retrieve a particular character string "$C_{-1}C_0 æ C_1 C_2$--$C_N$" agreeing with the retrieval character string from the registration character string, the retrieval character string is converted into a converted retrieval character string "$C_{-1}C_0 C_N^\wedge C_1 C_2$--$C_N$" in the converting unit 214 in the same manner as the conversion of the registration character string, and a plurality of retrieval two-character chains "$C_{-1}C_0$", "$C_0 C_N^\wedge$", "$C_N^\wedge C_1$", "$C_1 C_2$",--, and "$C_{N-1} C_N$" and are detected from the converted retrieval character string in the detecting unit 56.

Thereafter, a series of particular registration two-character chains and particular occurrence frequency sets of the particular registration two-character chains are determined in the collating unit 58 in the same manner as in the second embodiment, and a position of a particular character string "$C_{-1}C_0 æ C_1 C_2$--$C_N$" written in the text is specified according to the particular occurrence frequency sets of the particular registration two-character chains. The position of the particular character string "$C_{-1}C_0 æ C_1 C_2$--$C_N$" is displayed on the display unit 24 or is printed out by the printer 25.

Accordingly, because each special character occurring in the text is replaced with a symbolic character determined in correspondence to a general character placed N characters after the special character, even though the special character expressing no meaning occurs in the text at a high occurrence frequency, the increase of the occurrence frequency of the two-character chain type corresponding to each symbolic character can be avoided. Therefore, the retrieval character string can be efficiently collated with the registration character string while avoiding the increase of a memory capacity.

Also, because each special character in the registration character string is replaced with one of a plurality of symbolic characters, the number of two-character chains of each two-character chain type relating to one symbolic character is reduced, so that a particular occurrence frequency set of each two-character chain type relating to one symbolic character can be rapidly determined.

In this embodiment, each special character occurring in the text is replaced with a symbolic character determined in correspondence to a general character placed N characters after the special character. However, it is applicable that each special character occurring in the text be replaced with a symbolic character determined in correspondence to a general character placed N characters before the special character. In other words, it is applicable that each special character occurring in the text be replaced with a symbolic character determined in correspondence to a general character spaced at N characters apart from the special character.

Also, in cases where a series of special characters "ææ--æ" occurs in the registration character string or the retrieval character string, the series of special characters is replaced with a single special character, and the single special character is replaced with a symbolic character determined according to a general character placed just after the special character. Therefore, a character string "CDææ--æEF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

(Seventeenth Embodiment)

In this embodiment, a character string "$C_0 æ C_1 C_2 -- C_N$" is converted into a converted character string "$C_0 C_N \hat{\ } C_1 C_2 -- C_N --$" in the same manner as in the sixteenth embodiment, a plurality of two-character chains are extracted from the converted character string, a position number of each two-character chain is set, and the collation of a retrieval character string with a registration character string is performed. Here, the concept of the seventeenth embodiment agrees with that of the eleventh embodiment in case of the integral number N=1.

Figure 37:
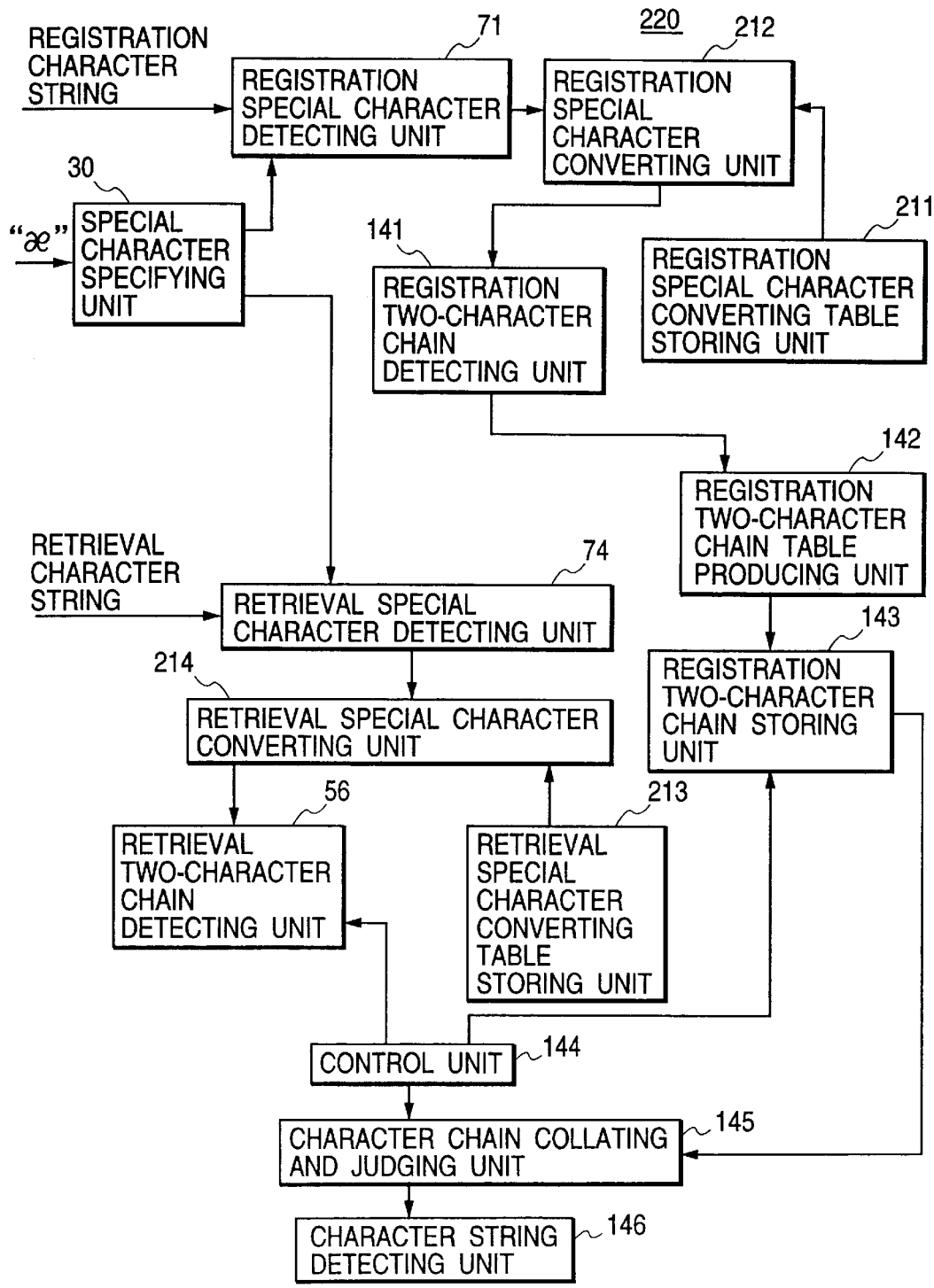
FIG. 37 is a block diagram of a character string collating apparatus according to a seventeenth embodiment.

FIG. 37 is a block diagram of a character string collating apparatus according to a seventeenth embodiment.

As shown in FIG. 37, a character string collating apparatus 220 comprises:

the special character specifying unit 30; the registration special character detecting unit 71; the registration special character converting table storing unit 211; the registration special character converting unit 212; the registration two-character chain detecting unit 141; the registration two-character chain table producing unit 142; the registration two-character chain storing unit 143; the retrieval special character detecting unit 74; the retrieval special character converting table storing unit 213; the retrieval special character converting unit 214; the retrieval two-character chain detecting unit 56; the control unit 144; the character chain collating and judging unit 145; and the character string detecting unit 146.

In the above configuration, an operation of the character string collating apparatus 220 is described with reference to FIG. 38A.

When a registration character string "$C_{-1} C_0 æ C_1 C_2 -- C_N --$" of a full text recorded in the recording medium 23 is received in the apparatus 210, a converted registration character string "$C_{-1} C_0 C_N \hat{\ } C_1 C_2 -- C_N --$" is produced, and a plurality of retrieval two-character chains "$C_{-1} C_0$", "$C_0 C_N \hat{\ }$", "$C_N \hat{\ } C_1$", "$C_1 C_2$", --, "$C_{N-1} C_N$", -- are detected from the converted registration character string in the same manner as in the sixteenth embodiment. Also, a position number of each chain is detected from the converted registration character string in the detecting unit 141 in the same manner as in the eleventh embodiment and are stored in the storing unit 143.

Thereafter, when a user inputs a retrieval character string "$C_{-1} C_0 æ C_1 C_2 -- C_N$" from the input unit 21, the retrieval character string is converted into a converted retrieval character string "$C_{-1} C_0 C_N \hat{\ } C_1 C_2 -- C_N$" in the converting unit 214 in the same manner as in the sixteenth embodiment, and a position of a particular character string "$C_{-1} C_0 æ C_1 C_2 -- C_N$" written in the text is specified in the same manner as in the eleventh embodiment.

Accordingly, because each special character occurring in the text is replaced with a symbolic character determined in correspondence to a general character placed N characters after the special character, the retrieval character string can be efficiently collated with the registration character string while avoiding the increase of a memory capacity in the same manner as in the sixteenth embodiment.

Also, because each special character in the registration character string is replaced with one of a plurality of symbolic characters, a particular occurrence frequency set of each two-character chain type relating to one symbolic character can be rapidly determined in the same manner as in the sixteenth embodiment.

In this embodiment, each special character occurring in the text is replaced with a symbolic character determined in correspondence to a general character placed N characters after the special character. However, it is applicable that each special character occurring in the text be replaced with a symbolic character determined in correspondence to a general character placed N characters before the special character. In other words, it is applicable that each special character occurring in the text be replaced with a symbolic character determined in correspondence to a general character spaced at N characters apart from the special character.

Also, in cases where a series of special characters "ææ-- æ" occurs in the registration character string or the retrieval character string, the series of special characters is replaced with a single special character, and the single special character is replaced with a symbolic character determined according to a general character placed just after the special character. Therefore, a character string "CDææ--æFF" can be distinguished from another character string "CDEF".

Also, the collation for a text written in English is performed, the extraction of words from a registration character string of the text as registration words and the extraction of words from a retrieval character string as retrieval words are required before the collation of the retrieval character string with the registration character string in a conventional character string collating apparatus. However, in cases where a type of special character denotes a space arranged between words in English, the collation of the retrieval character string with the registration character string can be efficiently performed without extracting any words.

Also, the collation for a character string is described in this embodiment. However, the present invention is not limited to the collation for a character string. That is, the collation of retrieval picture data with registration picture data can be performed according to the present invention. In this case, special data such as blank data is treated in the same manner as the special character.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of a first general two-character chain placed just before a second general two-character chain agreeing with the fore general character of the second general two-character chain;

a second character chain recording region for recording all special character chains detected from the registration character string of the text, each special character chain including a fore general character, at least one special character and a rear general character arranged in that order in the registration character string, the rear general character of one special character chain placed just before one general two-character chain recorded in the first character chain recording region agreeing with the fore general character of the general two-character chain, the fore general character of one special character chain placed just after one general two-character chain recorded in the first character chain recording region agreeing with the rear general character of the general two-character chain, and the rear general character of a first special character chain placed just before a second special character chain agreeing with the fore general character of the second special character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore and rear general characters of each special character chain recorded in the second character chain recording region as a special occurrence frequency set.

2. A recording medium according to claim 1 in which each special character is a space frequently occurring in the text written in Hangul language or a space frequently occurring in the text written in English to divide words.

3. A recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by converting each special character arranged in the registration character string into a particular type of symbolic character determined according to a type of a general character spaced at N characters (N is an integral number equal to or higher than 1) apart from the special character, each registration two-character chain including a fore general character or a fore symbolic character and a rear general character or a rear symbolic character arranged just after the fore character in the converted registration character string, the rear general character or the rear symbolic character of a first registration two-character chain agreeing with the fore general character or the fore symbolic character of a second registration two-character chain placed just before the first registration two-character chain; and an occurrence frequency recording region for recording a pair of occurrence frequencies of the fore general character or the fore symbolic character and the rear general character or the rear symbolic character of each registration two-character chain recorded in the character chain recording region as a registration occurrence frequency set, the occurrence frequency of one general character or symbolic character of a particular type placed in a particular position of the converted registration character string denoting the number of general characters or symbolic characters of the same particular type existing in an area between a starting position of the converted registration character string and the particular position of the converted registration character string.

4. A recording medium according to claim 3 in which each special character is a space frequently occurring in the text written in Hangul language or a space frequently occurring in the text written in English to divide words.

5. A recording medium for recording information of a text in which each of a plurality of special characters of the same character type is intermittently arranged in a plurality of general characters classified into a plurality of character types, comprising:

a character chain recording region for recording all registration two-character chains detected from a converted registration character string which is produced from a registration character string of the text by replacing each special character arranged in the registration character string with a first particular type of symbolic character determined according to a type of one general character adjacent to the special character and a second particular type of symbolic character determined according to a type of the other general character adjacent to the special character, each registration two-character chain including a fore general character or a fore symbolic character and a rear general character or a rear symbolic character arranged just after the fore character in the converted registration character string, and the rear general character or the rear symbolic character of a first registration two-character chain agreeing with the fore general character or the fore symbolic character of a second registration two-character chain placed just before the first registration two-character chain in the converted registration character string; and an occurrence frequency recording region for recording a pair of occurrence frequencies of the fore general character or the fore symbolic character and the rear general character or the rear symbolic character of each registration two-character chain recorded in the character chain recording region as a registration occurrence frequency set, the occurrence frequency of one general character or symbolic character of a particular type placed in a particular position of the converted registration character string denoting the number of general characters or symbolic characters of the same particular type existing in an area between a starting position of the converted registration character string and the particular position of the converted registration character string.

6. A recording medium according to claim 5 in which each special character is a space frequently occurring in the text written in Hangul language or a space frequently occurring in the text written in English to divide words.

7. A recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of each general two-character chain agreeing with the fore general character of another general two-character chain;

a second character chain recording region for recording a plurality of two-character chain sets, respectively composed of a first two-character chain including a fore general character and a rear general character in that order, a second two-character chain including the fore general character and one special character in that order and a third two-character chain including the special character and the rear general character, each two-character chain set being produced from one of all special three-character chains detected from the retrieval character string, each special three-character chain including the fore general character, the special character and the rear general character arranged in that order in the text, the rear general character of one special three chain placed just before one general two-character chain recorded in the first character chain recording region agreeing with the fore general character of the general two-character chain, the fore general character of one special three-character chain placed just after one general two-character chain recorded in the first character chain recording region agreeing with the rear general character of the general two-character chain, and the rear general character of a first special three-character chain placed just before a second special three-character chain agreeing with the fore general character of the second special three-character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore and rear general characters of each first two-character chain recorded in the second character chain recording region as a first special occurrence frequency set, recording a pair of occurrence frequencies of the fore general character and the special character of each second two-character chain recorded in the second character chain recording region as a second special occurrence frequency set on condition that the occurrence frequency of the special character is set to a fixed value, and recording a pair of occurrence frequencies of the special character and the rear general character of each third two-character chain recorded in the second character chain recording region as a third special occurrence frequency set on condition that the occurrence frequency of the special character is set to the fixed value.

8. A recording medium according to claim 7 in which each special character is a space frequently occurring in the text written in Hangul language or a space frequently occurring in the text written in English to divide words.

9. A recording medium for recording information of a text in which each of a plurality of special characters of the same character type is intermittently arranged in a plurality of general characters classified into a plurality of character types, comprising:

a first character chain recording region for recording all general two-character chains detected from a registration character string of the text, each general two-character chain including a fore general character and a rear general character arranged just after the fore general character in the registration character string, and the rear general character of each general two-character chain agreeing with the fore general character of another general two-character chain;

a second character chain recording region for recording a plurality of two-character chain sets, respectively composed of a fore two-character chain including a fore general character and one special character in that order and a rear two-character chain including the special character and a rear general character, each two-character chain set being produced from one of all special three-character chains detected from the retrieval character string, each special three-character chain including the fore general character, the special character and the rear general character arranged in that order in the text, the rear general character of one special three-character chain placed just before one general two-character chain recorded in the first character chain recording region agreeing with the fore general character of the general two-character chain, the fore general character of one special three-character chain placed just after one general two-character chain recorded in the first character chain recording region agreeing with the rear general character of the general two-character chain, and the rear general character of a first special three-character chain placed just before a second special three-character chain agreeing with the fore general character of the second special three-character chain;

a first occurrence frequency recording region for recording a pair of occurrence frequencies of the fore and rear general characters of each general two-character chain recorded in the first character chain recording region as a general occurrence frequency set, the occurrence frequency of one general character of a particular type placed in a particular position of the registration character string denoting the number of general characters of the same particular type existing in an area between a starting position of the registration character string and the particular position of the registration character string; and a second occurrence frequency recording region for recording a pair of occurrence frequencies of the fore general character and the special character of each fore two-character chain recorded in the second character chain recording region as a first special occurrence frequency set on condition that the occurrence frequency of the special character is set to zero, and recording a pair of occurrence frequencies of the special character and the rear general character of each rear two-character chain recorded in the second character chain recording region as a second special occurrence frequency set on condition that the occurrence frequency of the special character is set to zero.

10. A recording medium according to claim 9 in which each special character is a space frequently occurring in the text written in Hangul language or a space frequently occurring in the text written in English to divide words.

11. A recording medium for recording information of a text in which each of a plurality of special characters of the same character type is intermittently arranged in a plurality of general characters classified into a plurality of character types, comprising:

a character chain recording region for recording all general two-character chains and all character chain sets detected from a registration character string of the text, each general two-character chain including a fore general character and a rear general character arranged just after the fore general character in the registration character string, each character chain set being composed of a fore two-character chain and a rear two-character chain, each character chain set being obtained by detecting all special three-character chains including a fore general character, one special character and a rear general character arranged in that order in the text, converting the special character of each special three-character chain into a central general character having the same character type as that of the rear general character to produce a converted three-character chain including the fore general character, the central general character and the rear general character and decomposing each converted three-character chain into one fore two-character chain including the fore general character and the central general character and one rear two-character chain including the central general character and the rear general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and an occurrence frequency recording region for recording a pair of occurrence frequencies of the fore general character and the rear general character of each general two-character chain recorded in the character chain recording region as an occurrence frequency set, recording a pair of occurrence frequencies of the fore general character and the central general character of the fore two-character chain of each character chain set recorded in the character chain recording region as an occurrence frequency set, and recording a pair of occurrence frequencies of the central general character and the rear general character of the rear two-character chain of each character chain set recorded in the character chain recording region as an occurrence frequency set by setting the occurrence frequency of the rear general character as that of the central general character, the occurrence frequency of one general character of a particular type placed in a particular position of the registration character string denoting the number of general characters of the same particular type existing in an area between a starting position of the registration character string and the particular position of the registration character string.

12. A recording medium according to claim 11 in which each special character is a space frequently occurring in the text written in Hangul language or a space frequently occurring in the text written in English to divide words.

13. A recording medium for recording information of a text in which each of a plurality of special characters of the same character type is intermittently arranged in a plurality of general characters classified into a plurality of character types, comprising:

a character chain recording region for recording all general two-character chains and all special two-character chains detected from a registration character string of the text, each general two-character chain including a fore general character and a rear general character arranged just after the fore general character in the registration character string, each special two-character chain including one special character as a fore character and a rear general character or a fore general character and one special character as a rear character arranged in that order in the registration character string, the fore character of each special two-character chain placed just after one general two-character chain agreeing with the rear general character of the general two-character chain, the rear character of each special two-character chain placed just before one general two-character chain agreeing with the fore general character of the general two-character chain, the rear general character of a first general two-character chain placed just before a second general two-character chain agreeing with the fore general character of the second general two-character chain, and the rear character of a first special two-character chain placed just before a second special two-character chain agreeing with the fore character of the second special two-character chain; and an occurrence frequency recording region for recording a pair of occurrence frequencies of the fore general character and the rear general character of each general two-character chain recorded in the character chain recording region as an occurrence frequency set, recording an occurrence frequency of the fore or rear general character and a limited occurrence frequency of the rear or fore special character of each special two-character chain recorded in the character chain recording region as an occurrence frequency set, the occurrence frequency of each character of a particular type placed in a particular position of the registration character string denoting the number of characters of the same particular type existing in an area between a starting position of the registration character string and the particular position of the registration character string, and the limited occurrence frequency of each special character being obtained by setting a plurality of N limited values (N is an integer higher than 1) different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string.

14. A recording medium according to claim 13 in which each special character is a space frequently occurring in the text written in Hangul language or a space frequently occurring in the text written in English to divide words.

15. A recording medium according to claim 13 in which the set of N limited values is obtained by dividing an occurrence frequency of each special character by the maximum value to obtain a remainder for each special character, setting one remainder having a value of 0 to the maximum value, and setting the limited occurrence frequency of each special character to the remainder corresponding to the special character.

16. A recording medium for recording information of a text in which each of a plurality of special characters of the same character type is intermittently arranged in a plurality of general characters classified into a plurality of character types, comprising:

a character chain recording area for recording all general two-character chains and all special two-character chains detected from a registration character string of the text, each general two-character chain including a fore general character and a rear general character arranged just after the fore general character in the registration character string, each special two-character chain including a fore special character and a rear general character or a fore general character and a rear special character arranged in that order in the registration character string, the fore character of each special two-character chain placed just after one general two-character chain agreeing with the rear general character of the general two-character chain, the rear character of each special two-character chain placed just before one general two-character chain agreeing with the fore general character of the general two-character chain, the rear general character of a first general two-character chain placed just before a second general two-character chain agreeing with the fore general character of the second general two-character chain, and the rear character of a first special two-character chain placed just before a second special two-character chain agreeing with the fore character of the second special two-character chain; and an occurrence frequency recording area for recording a pair of occurrence frequencies of the fore general character and the rear general character of each general two-character chain recorded in the character chain recording area as an occurrence frequency set and recording a pair of occurrence frequencies of the fore character and the rear character of each special two-character chain recorded in the character chain recording area as an occurrence frequency set, the occurrence frequency of each particular special character placed in a particular position of the registration character string denoting the number of special characters existing in an area between a starting position of the registration character string and the particular position of the registration character string, the occurrence frequency of each particular general character of a particular type placed in a particular position of the registration character string denoting the number of general characters of the same particular type existing in an area between a starting position of the registration character string and the particular position of the registration character string in cases where each of the general characters including the particular general character is not adjacent to any special character, and the occurrence frequency of each particular general character being set to the same prescribed value in cases where each of the general characters including the particular general character is adjacent to one special character.

17. A recording medium according to claim 16 in which each special character is a space frequently occurring in the text written in Hangul language or a space frequently occurring in the text written in English to divide words.

18. A recording medium according to claim 16 in which the occurrence frequency recording area comprises:

a first occurrence frequency recording region for recording one occurrence frequency of one fore general character of each general two-character chain;

a second occurrence frequency recording region for recording one occurrence frequency of one rear general character of each general two-character chain;

a third occurrence frequency recording region for recording one occurrence frequency of one fore special character of each special two-character chain having the fore special character;

a fourth occurrence frequency recording region for recording one occurrence frequency of one rear general character of each special two-character chain having the fore special character;

a fifth occurrence frequency recording region for recording one occurrence frequency of one fore general character of each special two-character chain having the rear special character; and a sixth occurrence frequency recording region for recording one occurrence frequency of one rear special character of each special two-character chain having the rear special character, a memory size of the first occurrence frequency recording region is the same as that of the second occurrence frequency recording region, a memory size of the third occurrence frequency recording region is larger than that of the fourth occurrence frequency recording region, and a memory size of the sixth occurrence frequency recording region is larger than that of the fifth occurrence frequency recording region.

19. A recording medium for recording information of a text in which each of a plurality of special characters of the same character type is intermittently arranged in a plurality of general characters classified into a plurality of character types and at least two general characters exist between each pair of special characters, comprising:

a character chain recording area for recording all general two-character chains detected from a registration character string of the text and recording a special two-character chain detected from the registration character string for each special character, each general two-character chain including a fore general character and a rear general character arranged just after the fore general character in the registration character string, each special two-character chain including a fore general character placed two characters before one special character and a rear general character placed just after the special character in the registration character string, the fore character of a first general two-character chain placed just after a second general two-character chain agreeing with the rear general character of the second general two-character chain; and an occurrence frequency recording area for recording a pair of occurrence frequencies of the fore general character and the rear general character of each general two-character chain recorded in the character chain recording area as an occurrence frequency set and recording a pair of occurrence frequencies of the fore general character and the rear general character of each special two-character chain recorded in the character chain recording area as an occurrence frequency set, the occurrence frequency of each particular general character of a particular type placed in a particular position of the registration character string denoting the number of general characters of the same particular type existing in an area between a starting position of the registration character string and the particular position of the registration character string.

20. A recording medium according to claim 19 in which each special character is a space frequently occurring in the text written in Hangul language or a space frequently occurring in the text written in English to divide words.

21. A recording medium for recording information of a text in which each of a plurality of special characters of the same character type is intermittently arranged in a plurality of general characters classified into a plurality of character types, comprising:
- a first character chain recording region for recording all general two-character chains detected from a registration character string of the text, each general two-character chain including a fore general character and a rear general character arranged just after the fore general character in the registration character string, and the rear general character of one general two-character chain agreeing with the fore general character of another general two-character chain for each general two-character chain;
- a second character chain recording region for recording all special character chains detected from the registration character string of the text, each special character chain including a fore general character, one special character and a rear general character arranged in that order in the registration character string, the rear general character of one special character chain placed just before one general two-character chain recorded in the first character chain recording region agreeing with the fore general character of the general two-character chain, the fore general character of one special character chain placed just after one general two-character chain recorded in the first character chain recording region agreeing with the rear general character of the general two-character chain, and the rear general character of a first special character chain placed just before a second special character chain agreeing with the fore general character of the second special character chain; and
- a position number recording region for recording a position number of each general two-character chain recorded in the first character chain recording region and recording a position number of each special character chain recorded in the second character chain recording region, the position number of each character chain representing the general two-character chains and the special character chains being indicated by an occurrence position number of the fore or rear general character of the character chain, and the occurrence position number of each general character being obtained by numbering all general characters of the registration character string in the order of arranging the general characters in the registration character string.

22. A recording medium according to claim 21 in which each special character is a space frequently occurring in the text written in Hangul language or a space frequently occurring in the text written in English to divide words.

23. A recording medium for recording information of a text in which each of a plurality of special characters of the same character type is intermittently arranged in a plurality of general characters classified into a plurality of character types, comprising:
- a character chain recording region for recording all registration two-character chains detected from a converted registration character string which is produced from a registration character string of the text by converting each special character arranged in the registration character string into a particular type of symbolic character determined according to a type of a general character spaced at N characters (N is an integral number equal to or higher than 1) apart from the special character, each registration two-character chain including a fore general character or a fore symbolic character and a rear general character or a rear symbolic character arranged just after the fore character in the converted registration character string, the rear general character or the rear symbolic character of a first registration two-character chain agreeing with the fore general character or the fore symbolic character of a second registration two-character chain placed just before the first registration two-character chain; and
- a position number recording region for recording a position number of each registration two-character chain recorded in the character chain recording region, the position number of each registration two-character chain being indicated by an occurrence position number of the fore or rear character of the registration two-character chain, and the occurrence position number of each character being obtained by numbering all general characters and symbolic characters of the converted registration character string in the order of arranging the general characters and symbolic characters in the converted registration character string.

24. A recording medium according to claim 23 in which each special character is a space frequently occurring in the text written in Hangul language or a space frequently occurring in the text written in English to divide words.

25. A recording medium for recording information of a text in which each of a plurality of special characters of the same character type is intermittently arranged in a plurality of general characters classified into a plurality of character types, comprising:
- a character chain recording region for recording all registration two-character chains detected from a converted registration character string which is produced from a registration character string of the text by replacing each special character arranged in the registration character string with a first particular type of symbolic character determined according to a type of one general character adjacent to the special character and a second particular type of symbolic character determined according to a type of the other general character adjacent to the special character, each registration two-character chain including a fore general character or a fore symbolic character and a rear general character or a rear symbolic character arranged just after the fore character in the converted registration character string, and the rear general character or the rear symbolic character of a first registration two-character chain agreeing with the fore general character or the fore symbolic character of a second registration two-character chain placed just before the first registration two-character chain in the converted registration character string; and
- a position number recording region for recording a position number of each registration two-character chain recorded in the character chain recording region, the position number of each registration two-character chain being indicated by an occurrence position number of the fore or rear character of the registration two-character chain, and the occurrence position number of each character being obtained by numbering all general characters and symbolic characters of the converted registration character string in the order of arranging the general characters and symbolic characters in the converted registration character string.

26. A recording medium according to claim 25 in which each special character is a space frequently occurring in the text written in Hangul language or a space frequently occurring in the text written in English to divide words.

27. A recording medium for recording information of a text in which each of a plurality of special characters of the same character type is intermittently arranged in a plurality of general characters classified into a plurality of character types, comprising:

a character chain recording region for recording all general two-character chains and all character chain sets detected from a registration character string of the text, each general two-character chain including a fore general character and a rear general character arranged just after the fore general character in the registration character string, each character chain set being composed of a fore two-character chain and a rear two-character chain obtained by detecting all special three-character chains, respectively including a fore general character, one special character and a rear general character arranged in that order in the registration character string, converting the special character of each special three-character chain into a central general character having the same character type as that of the rear general character to produce a converted special three-character chain including the fore general character, the central general character and the rear general character and decomposing each converted special three-character chain into one fore two-character chain including the fore general character and the central general character as a rear general character and one rear two-character chain including the central general character as a fore general character and the rear general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and a position number recording region for recording a position number of each general two-character chain recorded in the character chain recording region, recording a position number of the fore two-character chain of each character chain set recorded in the character chain recording region, and recording a position number of the rear two-character chain of each character chain set recorded in the character chain recording region, the position number of each two-character chain being indicated by an occurrence position number of the fore or rear general character of the two-character chain, the occurrence position number of each general character being obtained by numbering all general characters of the registration character string in the order of arranging the general characters in the registration character string, and the occurrence position number of the fore general character of each rear two-character chain being set to that of the rear general character of the rear two-character chain.

28. A recording medium according to claim 27 in which each special character is a space frequently occurring in the text written in Hangul language or a space frequently occurring in the text written in English to divide words.

29. A recording medium for recording information of a text in which each of a plurality of special characters of the same character type is intermittently arranged in a plurality of general characters classified into a plurality of character types, comprising:

a general character chain recording region for recording all general two-character chains and all character chain sets detected from a registration character string of the text, each general two-character chain including a fore general character and a rear general character arranged just after the fore general character in the registration character string, each character chain set being composed of a first two-character chain, a second two-character chain arranged just after the first two-character chain in the registration character string and a third two-character chain arranged just after the second two-character chain in the registration character string, the first, second and the third two-character chains of each character chain set being obtained by detecting all special three-character chains, respectively including a fore general character, one special character and a rear general character arranged in that order in the registration character string and decomposing each special three-character chain into one first two-character chain including the fore general character and the rear general character, one second two-character chain including the fore general character and the special character as a rear character and one third two-character chain including the special character as a fore character and the rear general character, the first two-character chains and the second two-character chains being arranged in the order of arranging the first and second two-character chains in the registration character string for each type of fore general character, the fore general character of each special three-character chain placed just after one general two-character chain agreeing with the rear general character of the general two-character chain, the rear general character of each special three-character chain placed just before one general two-character chain agreeing with the fore general character of the general two-character chain, the rear general character of a first general two-character chain placed just before a second general two-character chain agreeing with the fore general character of the second general two-character chain, and the rear general character of a first special three-character chain placed just before a second special three-character chain agreeing with the fore general character of the second special three-character chain; and a position number recording region for recording a position number of each general two-character chain recorded in the character chain recording region, recording a position number of each first two-character chain recorded in the character chain recording region, recording a position number of each second two-character chain recorded in the character chain recording region, and recording a position number of each third two-character chain recorded in the character chain recording region, the position number of each general two-character chain being indicated by an occurrence position number of the fore general character of the general two-character chain, the position number of each first two-character chain being indicated by an occurrence position number of the fore general character of the first two-character chain, the position number of each second two-character chain being indicated by an occurrence position number of the rear general character of the second two-character chain, the occurrence position number of each general character being obtained by numbering all general characters of the registration character string in the order of arranging the general characters in the registration character string, the position number of each third two-character chain being set to a fixed value, and the position numbers of the first and second two-character chains being arranged according to the arranging order of the first and second two-character chains.

30. A recording medium according to claim 29 in which each special character is a space frequently occurring in the text written in Hangul language or a space frequently occurring in the text written in English to divide words.

31. A recording medium for recording information of a text in which each of a plurality of special characters of the same character type is intermittently arranged in a plurality of general characters classified into a plurality of character types, comprising:

a character chain recording region for recording all first two-character chains detected from a converted registration character string, which is obtained from the registration character string by converting each pair of one special character and a general character placed just after the special character in the registration character string into a symbolic character determined in correspondence to a character type of the general character, to include a fore general character and a rear general character or a rear symbolic character arranged just after the fore general character in each first two-character chain, recording all second two-character chains, respectively including a fore general character placed two characters before one symbolic character and the symbolic character as a rear character, detected from the converted registration character string, and recording all special two-character chains, respectively including a fore symbolic character and a rear general character arranged in that order in the converted registration character string, detected from the converted registration character string, each group of first and second two-character chains respectively including the same type of fore general character and one group of special two-character chains respectively including one type of symbolic character determined in correspondence to the type of fore general character being arranged in one two-character chain table to produce the two-character chain table for each type of fore general character; and a position number recording region for recording a position number of each first two-character chain recorded in the character chain recording region, recording a position number of each second two-character chain recorded in the character chain recording region, and recording a position number of each special two-character chain recorded in the character chain recording region, the position number of each two-character chain being indicated by an occurrence position number of the fore character of the two-character chain, and the occurrence position numbers of the general and symbolic characters being obtained by numbering all general and symbolic characters of the converted registration character string in the order of arranging the general and symbolic characters in the converted registration character string.

32. A recording medium according to claim 31 in which each special character is a space frequently occurring in the text written in Hangul language or a space frequently occurring in the text written in English to divide words.

33. A character string collating apparatus for collating a registration character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special character chain from the registration character string of the text for each special character, each registration special character chain including a fore general character, one special character and a rear general character arranged in that order in the text, the rear general character of one registration general two-character chain agreeing with the fore general character of one registration special character chain placed just after the registration general two-character chain in the registration character string, and the rear general character of one registration special character chain agreeing with the fore general character of one registration general two-character chain placed just after the registration special character chain in the registration character string;

first occurrence frequency calculating means for calculating a pair of occurrence frequencies of the fore and rear general characters of each registration general two-character chain detected by the first registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a pair of occurrence frequencies of the fore and rear general characters of each registration special character chain detected by the second registration character chain detecting means as an occurrence frequency set;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special character chains existing in the retrieval character string, each retrieval special character chain including a fore general character, one special character and a rear general character arranged in that order in the retrieval character string, the rear general character of one retrieval general two-character chain agreeing with the fore general character of one retrieval special character chain placed just after the retrieval general two-character chain in the retrieval character string, and the rear general character of one retrieval special character chain agreeing with the fore general character of one retrieval general two-character chain placed just after the retrieval special character chain in the retrieval character string;

control means for specifying a plurality of particular general two-character chain type and a particular special character chain types, which are classified by the registration character chain classifying means, corresponding to the retrieval general two-character chains detected by the first retrieval character chain detecting means and the retrieval special character chains detected by the second retrieval character chain detecting means, detecting a retrieval chain order of arranging the retrieval general two-character chains and the registration special character chains in the retrieval character string, and determining a particular chain order corresponding to the retrieval chain order for the particular general two-character chain types and the particular special character chain types;

collating means for repeatedly receiving the occurrence frequency sets of one particular general two-character chain type or one particular special character chain type specified by the control means from the first occurrence frequency calculating means or the second occurrence frequency calculating means in the particular chain order for the particular general two-character chain types and the particular special character chain types, and performing a collating operation for the particular general two-character chain types and the particular special character chain types according to the occurrence frequencies of the particular general two-character chain types and the occurrence frequencies of the particular special character chain types, detecting a series of particular occurrence frequency sets of the particular general two-character chain types and the particular special character chain types on condition that a plurality of particular registration general two-character chains and particular registration special character chains having the particular occurrence frequency sets are connected in series in the registration character string; and character string detecting means for detecting a particular character string agreeing with the retrieval character string from the registration character string according to the particular registration general two-character chains, the particular registration special character chains, the particular occurrence frequency sets of the particular registration general two-character chains and the particular occurrence frequency sets of the particular registration special character chains detected by the collating means.

34. A character string collating apparatus according to claim 33 in which each special character is a space frequently occurring in the text written in Hangul language or a space frequently occurring in the text written in English to divide words.

35. A character string collating apparatus according to claim 33 in which the collating operation performed by the collating means is that one occurrence frequency of the fore general character in each occurrence frequency set of either a first particular general two-character chain type or a first particular special character chain type is collated with an occurrence frequency of the rear general character in a particular occurrence frequency set of either a second particular general two-character chain type or a second particular special character chain type placed just before the first particular general two-character chain type or the first particular special character chain type in the particular chain order to determine a particular occurrence frequency set of either the first particular general two-character chain type or the first particular special character chain type on condition that an occurrence frequency of the fore general character in the particular occurrence frequency set of either the first particular general two-character chain type or the first particular special character chain type agrees with the occurrence frequency of the rear general character in the particular occurrence frequency set of either the second particular general two-character chain type or the second particular special character chain type.

36. A character string collating apparatus according to claim 33, further comprising:

recording means for recording the general two-character chain types and the special character chain types classified by the registration character chain classifying means, the occurrence frequency sets calculated by the first occurrence frequency calculating means for each general two-character chain type and the occurrence frequency sets calculated by the second occurrence frequency calculating means for each special character chain type, the particular general two-character chain types and the particular special character chain types recorded in the recording means being specified by the control means, and the occurrence frequency sets recorded in the recording means being received by the collating means under the control of the control means.

37. A character string collating apparatus according to claim 36 in which an identifier is attached to the special character chain types to distinguish the special character chain types from the general two-character chain types.

38. A character string collating apparatus according to claim 33 in which a series of special characters arranged in the registration character string or the retrieval character string is detected as a single special character by the second registration character chain detecting means or the second retrieval character chain detecting means.

39. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each special character arranged in the registration character string into a symbolic character according to a general-symbolic character type relationship between a character type of the symbolic character and a character type of a general character spaced at N characters (N is an integral number equal to or higher than 1) apart from the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

occurrence frequency calculating means for calculating a pair of occurrence frequencies of the fore general character or the fore symbolic character and the rear general character or the rear symbolic character of each registration two-character chain detected by the registration character chain detecting means as an occurrence frequency set, the occurrence frequency of each particular general character or symbolic character of a particular type placed in a particular position of the converted registration character string denoting the number of general characters or symbolic characters of the same particular type existing in an area between a starting position of the converted registration character string and the particular position of the converted registration character string;

registration character chain classifying means for classifying each group of registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by converting each special character arranged in the registration character string into a symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the occurrence frequency sets of one particular two-character chain type specified by the control means from the occurrence frequency calculating means in the particular chain order for the particular two-character chain types, performing a collating operation for the particular two-character chain types according to the occurrence frequency sets of the particular two-character chain types, and detecting a series of particular occurrence frequency sets of a series of particular registration two-character chains corresponding to the particular two-character chain types arranged in the particular chain order on condition that the series of particular registration two-character chains having the particular occurrence frequency sets are connected in series in the converted registration character string; and character string detecting means for detecting a particular character string agreeing with the retrieval character string from the registration character string according to the particular registration two-character chains and the particular occurrence frequency sets of the particular registration two-character chains detected by the collating means.

40. A character string collating apparatus according to claim 39 in which each special character is a space frequently occurring in the text written in Hangul language or a space frequently occurring in the text written in English to divide words.

41. A character string collating apparatus according to claim 39 in which the collating operation performed by the collating means is that one occurrence frequency of the fore general character in each occurrence frequency set of a first particular two-character chain type is collated with an occurrence frequency of the rear general character in a particular occurrence frequency set of a second particular two-character chain type placed just before the first particular two-character chain type in the particular chain order to determine a particular occurrence frequency set of the first particular two-character chain type on condition that an occurrence frequency of the fore general character in the particular occurrence frequency set of the first particular two-character chain type agrees with the occurrence frequency of the rear general character in the particular occurrence frequency set of the second particular two-character chain type.

42. A character string collating apparatus according to claim 39, further comprising:

recording means for recording the registration two-character chain types classified by the registration character chain classifying means and the occurrence frequency sets calculated by the occurrence frequency calculating means for each two-character chain type, the particular two-character chain type recorded in the recording means being specified by the control means, and the occurrence frequency sets of the particular two-character chain type recorded in the recording means being received by the collating means under the control of the control means.

43. A character string collating apparatus according to claim 39 in which a series of special characters arranged in the registration character string or the retrieval character string is converted into one symbolic character determined according to a character type of a general character spaced at N characters apart from the series of special characters by the registration character string converting means or the retrieval character string converting means.

44. A character string collating apparatus according to claim 39 in which the converted registration character string is produced from the registration character string by the registration character string converting means by converting each special character arranged in the registration character string into a symbolic character determined according to a type of general character adjacent to the special character.

45. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by replacing each special character arranged in a registration character string of the text with a first symbolic character and a second symbolic character according to a general-symbolic character type relationship in which a character type of the first symbolic character corresponds to a character type of one general character adjacent to the special character and a character type of the second symbolic character corresponds to a character type of the other general character adjacent to the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

occurrence frequency calculating means for calculating a pair of occurrence frequencies of the fore general character or the fore symbolic character and the rear general character or the rear symbolic character of each registration two-character chain detected by the registration character chain detecting means as an occurrence frequency set, the occurrence frequency of each particular general character or symbolic character of a particular type placed in a particular position of the converted registration character string denoting the number of general characters o r symbolic characters of the same particular type existing in an area between a starting position of the converted registration character string and the particular position of the converted registration character string;

registration character chain classifying means for classifying the registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by replacing each special character arranged in the retrieval character string with a symbolic character and another second symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted registration character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted registration character string, and determining a particular chain order corresponding to the registration chain order for the particular two-character chain types;

collating means for repeatedly receiving the occurrence frequency sets of one particular two-character chain type specified by the control means from the occurrence frequency calculating means in the particular chain order for the particular two-character chain types, performing a collating operation for the particular two-character chain types according to the occurrence frequency sets of the particular two-character chain types, and detecting a series of particular occurrence frequency sets of a series of particular registration two-character chains corresponding to the particular two-character chain types arranged in the particular chain order on condition that the series of particular registration two-character chains having the particular occurrence frequency sets are connected in series in the converted registration character string; and character string detecting means for detecting a particular character string agreeing with the retrieval character string from the registration character string according to the particular registration two-character chains and the particular occurrence frequency sets of the particular registration two-character chains detected by the collating means.

46. A character string collating apparatus according to claim 45 in which each special character is a space frequently occurring in the text written in Hangul language or a space frequently occurring in the text written in English to divide words.

47. A character string collating apparatus according to claim 45 in which the collating operation performed by the collating means is that one occurrence frequency of the fore general character in each occurrence frequency set of a first particular two-character chain type is collated with an occurrence frequency of the rear general character in a particular occurrence frequency set of a second particular two-character chain type placed just before the first particular two-character chain type in the particular chain order to determine a particular occurrence frequency set of the first particular two-character chain type on condition that an occurrence frequency of the fore general character in the particular occurrence frequency set of the first particular two-character chain type agrees with the occurrence frequency of the rear general character in the particular occurrence frequency set of the second particular two-character chain type.

48. A character string collating apparatus according to claim 45, further comprising:

recording means for recording the registration two-character chain types classified by the registration character chain classifying means and the occurrence frequency sets calculated by the occurrence frequency calculating means for each two-character chain type, the particular two-character chain types recorded in the recording means being specified by the control means, and the occurrence frequency sets recorded in the recording means being received by the collating means under the control of the control means.

49. A character string collating apparatus according to claim 45 in which a series of special characters arranged in the registration character string or the retrieval character string is replaced with a particular type of symbolic character determined according to a type of one general character adjacent to the series of special characters and another particular type of symbolic character determined according to a type of the other general character adjacent to the series of special characters.

50. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, and producing a first registration two-character chain including the fore general character and the rear general character in that order, a second registration two-character chain including the fore general character and the special character in that order and a third registration two-character chain including the special character and the rear general character from each registration special three-character chain, the rear general character of one registration general two-character chain placed just before one registration special three-character chain in the registration character string agreeing with the fore general character of the first registration two-character chain produced from the registration special three-character chain, and the fore general character of one registration general two-character chain placed just after one registration special three-character chain in the registration character string agreeing with the rear general character of the third registration two-character chain produced from the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a pair of occurrence frequencies of the fore and rear general characters of each first registration two-character chain produced by the registration character chain producing means as an occurrence frequency set, determining an occurrence frequency set of each second registration two-character chain produced by the registration character chain producing means by setting an occurrence frequency of the special character of the second registration two-character chain to a fixed value and calculating an occurrence frequency of the fore general character of the second registration two-character chain, and determining an occurrence frequency set of each third registration two-character chain produced by the registration character chain producing means by setting an occurrence frequency of the special character of the third registration two-character chain to the fixed value and calculating an occurrence frequency of the rear general character of the third registration two-character chain;

registration character chain classifying means for classifying the registration general two-character chains, which respectively include the same type of fore general character and the same type of rear general character, detected by the registration character chain detecting means into one general two-character chain type, classifying the first registration two-character chain, which respectively include the same type of fore general character and the same type of rear general character, produced by the registration character chain producing means into one first two-character chain type, classifying the second registration two-character chains, which respectively include the same type of fore general character and the special character, produced by the registration character chain producing means into one second two-character chain type, and classifying the third registration two-character chain, which respectively include the special character and the same type of rear general character, produced by the registration character chain producing means into one third two-character chain types;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special three-character chains, respectively including a fore general character, one special character and a rear general character arranged in that order in the retrieval character string, from the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types, particular first two-character chain types, particular second two-character chain types and particular third two-character chain types, which are classified by the registration character chain classifying means, corresponding to the retrieval general two-character chains detected by the first retrieval character chain detecting means and the retrieval special three-character chains detected by the second retrieval character chain detecting means, detecting a retrieval chain order of arranging the retrieval general two-character chains and the registration special three-character chains in the retrieval character string, and determining a particular chain order corresponding to the retrieval chain order for the particular general two-character chain types, the particular first two-character chain types, the particular second two-character chain types and the particular third two-character chain types;

collating means for repeatedly receiving the occurrence frequency sets of one particular general two-character chain type, one particular first two-character chain type, one particular second two-character chain type or one particular third two-character chain type specified by the control means from the first occurrence frequency calculating means or the second occurrence frequency calculating means in the particular chain order for the particular general two-character chain types, the particular first two-character chain types, the particular second two-character chain types and the particular third two-character chain types, and performing a collating operation for the particular general two-character chain types, the particular first two-character chain types, the particular second two-character chain types and the particular third two-character chain types in which the occurrence frequencies of the occurrence frequency sets of the series of particular two-character chain types detected by the control means are collated with each other to ascertain a connection between each pair of particular general two-character chain types having particular occurrence frequency sets, a connection between each particular first two-character chain type having a particular occurrence frequency set and one particular general two-character chain type having a particular occurrence frequency set and a connection between each particular third two-character chain type having a particular occurrence frequency set and one particular general two-character chain type having a particular occurrence frequency set, and a plurality of particular occurrence frequency sets of the series of particular two-character chain types are detected on condition that a plurality of particular registration two-character chains indicated by the particular occurrence frequency sets are connected with each other in series in the registration character string; and character string detecting means for detecting a particular character string agreeing with the registration character string from the registration character string according to the series of particular registration two-character chains and the particular occurrence frequency sets of the series of particular registration two-character chains detected by the collating means.

51. A character string collating apparatus according to claim 50 in which each special character is a space frequently occurring in the text written in Hangul language or a space frequently occurring in the text written in English to divide words.

52. A character string collating apparatus according to claim 50 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of the first particular general two-character chain type on condition that the occurrence frequency of the fore general character in the particular occurrence frequency set of the first particular general two-character chain type agrees with the occurrence frequency of the rear general character in the particular occurrence frequency set of the second particular general two-character chain type, one occurrence frequency of the fore general character in each occurrence frequency set of one particular first two-character chain type is collated with an occurrence frequency of the rear general character in a particular occurrence frequency set of one particular general two-character chain type placed just before the particular first two-character chain type in the particular chain order to determine a particular occurrence frequency set of the particular first registration two-character chain type on condition that the occurrence frequency of the fore general character in the particular occurrence frequency set of the particular first two-character chain type agrees with the occurrence frequency of the rear general character in the particular occurrence frequency set of the particular general two-character chain type, one occurrence frequency of the fore general character in each occurrence frequency set of one particular second two-character chain type is collated with an occurrence frequency of the fore general character in the particular occurrence frequency set of the particular first two-character chain type placed just before the particular second two-character chain type in the particular chain order to determine a particular occurrence frequency set of the particular second two-character chain type on condition that the occurrence frequency of the fore general character in the particular occurrence frequency set of the particular second two-character chain type agrees with the occurrence frequency of the fore general character in the particular occurrence frequency set of the particular first two-character chain type, and one occurrence frequency of the rear general character in each occurrence frequency set of one particular third two-character chain type is collated with an occurrence frequency of the rear general character in the particular occurrence frequency set of the particular first two-character chain type placed just before the particular third two-character chain type in the particular chain order to determine a particular occurrence frequency set of the particular third two-character chain type on condition that the occurrence frequency of the rear general character in the particular occurrence frequency set of the particular third two-character chain type agrees with the occurrence frequency of the rear general character in the particular occurrence frequency set of the particular first two-character chain type.

53. A character string collating apparatus according to claim 50, further comprising:

recording means for recording the general two-character chain types, the first two-character chain types, the second two-character chain types and the third two-character chain types classified by the registration character chain classifying means, recording the occurrence frequency sets calculated by the first occurrence frequency calculating means for each general two-character chain type, recording the occurrence frequency sets calculated by the second occurrence frequency calculating means for each first two-character chain type, recording the occurrence frequency sets calculated by the second occurrence frequency calculating means for each second two-character chain type, and recording the occurrence frequency sets calculated by the second occurrence frequency calculating means for each third two-character chain type, the particular general two-character chain types, the particular first two-character chain types, the particular second two-character chain types and the particular third two-character chain types recorded in the recording means being specified by the control means, and the occurrence frequency sets recorded in the recording means being received by the collating means under the control of the control means.

54. A character string collating apparatus according to claim 50 in which a series of special characters arranged in the registration character string or the retrieval character string is detected as a single special character by the registration character chain producing means or the second retrieval character chain detecting means.

55. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, and producing a fore registration two-character chain including the fore general character and the special character in that order and a rear registration two-character chain including the special character and the rear general character in that order from each registration special three-character chain, the rear general character of one registration general two-character chain placed just before one registration special three-character chain in the registration character string agreeing with the fore general character of the fore registration two-character chain produced from the registration special three-character chain, and the fore general character of one registration general two-character chain placed just after one registration special three-character chain in the registration character string agreeing with the rear general character of the rear registration two-character chain produced from the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for determining an occurrence frequency set of each fore registration two-character chain produced by the registration character chain producing means by setting an occurrence frequency of the special character of the fore registration two-character chain to zero and calculating an occurrence frequency of the fore general character of the fore registration two-character chain, and determining an occurrence frequency set of each rear registration two-character chain produced by the registration character chain producing means by setting an occurrence frequency of the special character of the rear registration two-character chain to zero and calculating an occurrence frequency of the rear general character of the rear registration two-character chain;

registration character chain classifying means for classifying each group of registration general two-character chains, which respectively include the same type of fore general character and the same type of rear general character, detected by the registration character chain detecting means into one general two-character chain type, classifying each group of fore registration two-character chains, which respectively include the same type of fore general character and the special character, produced by the registration character chain producing means into one fore two-character chain type, and classifying each group of rear registration two-character chains, which respectively include the special character and the same type of rear general character, produced by the registration character chain producing means into one rear two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special three-character chains, respectively including a fore general character, one special character and a rear general character arranged in that order in the retrieval character string, from the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear special two-character chain types, which are classified by the registration character chain classifying means, corresponding to the retrieval general two-character chains detected by the first retrieval character chain detecting means and the retrieval special three-character chains detected by the second retrieval character chain detecting means, detecting a retrieval chain order of arranging the retrieval general two-character chains and the retrieval special three-character chains in the retrieval character string, and determining a particular chain order corresponding to the retrieval chain order for the particular general two-character chain types and the particular fore and rear special two-character chain types;

collating means for repeatedly receiving the occurrence frequency sets of one particular general two-character chain type, one particular fore special two-character chain type or one particular rear special two-character chain type specified by the control means from the first occurrence frequency calculating means or the second occurrence frequency calculating means in the particular chain order for the particular general two-character chain types and the particular fore and rear special two-character chain types, and performing a collating operation in which the occurrence frequencies of the occurrence frequency sets of the series of particular general two-character chain types and particular fore and rear special three-character chain types detected by the control means are collated with each other to ascertain a connection between each pair of particular general two-character chain types having particular occurrence frequency sets, a connection between each particular fore two-character chain type having a particular occurrence frequency set and one particular general two-character chain type having a particular occurrence frequency set and a connection between each particular rear two-character chain type having a particular occurrence frequency set and one particular general two-character chain type having a particular occurrence frequency set, and a plurality of particular occurrence frequency sets of the particular two-character chain types are detected on condition that a series of particular registration two-character chains having the particular occurrence frequency sets are connected with each other in series in the retrieval character string; and character string detecting means for detecting a particular character string agreeing with the retrieval character string from the registration character string according to the series of particular registration two-character chains and the particular occurrence frequency sets detected by the collating means.

56. A character string collating apparatus according to claim 55 in which each special character is a space frequently occurring in the text written in Hangul language or a space frequently occurring in the text written in English to divide words.

57. A character string collating apparatus according to claim 55 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of the first particular general two-character chain type on condition that the occurrence frequency of the fore general character in the particular occurrence frequency set of the first particular general two-character chain type agrees with the occurrence frequency of the rear general character in the particular occurrence frequency set of the second particular general two-character chain type, one occurrence frequency of the fore general character in each occurrence frequency set of one particular fore two-character chain type is collated with an occurrence frequency of the rear general character in a particular occurrence frequency set of one particular general two-character chain type placed just before the particular fore two-character chain type in the particular chain order to determine a particular occurrence frequency set of the particular fore registration two-character chain type on condition that the occurrence frequency of the fore general character in the particular occurrence frequency set of the particular fore two-character chain type agrees with the occurrence frequency of the rear general character in the particular occurrence frequency set of the particular general two-character chain type, one occurrence frequency of the fore general character in each occurrence frequency set of one particular general two-character chain type is collated with an occurrence frequency of the rear general character in a particular occurrence frequency set of one particular rear two-character chain type placed just before the particular general two-character chain type in the particular chain order to determine a particular occurrence frequency set of the particular general two-character chain type on condition that the occurrence frequency of the fore general character in the particular occurrence frequency set of the particular general two-character chain type agrees with the occurrence frequency of the rear general character in the particular occurrence frequency set of the particular rear registration two-character chain type.

58. A character string collating apparatus according to claim 55, further comprising:

recording means for recording the general two-character chain types, the fore two-character chain types and the rear two-character chain types classified by the registration character chain classifying means, recording the occurrence frequency sets calculated by the first occurrence frequency calculating means for each general two-character chain type, recording the occurrence frequency sets calculated by the second occurrence frequency calculating means for each fore two-character chain type, and recording the occurrence frequency sets calculated by the second occurrence frequency calculating means for each rear two-character chain type, the series of particular general two-character chain types and particular fore and rear special three-character chain types recorded in the recording means being specified by the control means, and the occurrence frequency sets recorded in the recording means being received by the collating means.

59. A character string collating apparatus according to claim 55 in which an identifier is attached to the fore two-character chain types and the rear two-character chain types to distinguish the fore two-character chain types and the rear two-character chain types from the general two-character chain types.

60. A character string collating apparatus according to claim 55 in which a series of special characters arranged in the registration character string or the retrieval character string is detected as a single special character by the registration character chain producing means or the second retrieval character chain detecting means.

61. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration character chain producing means for detecting a registration special three-character chain, including a fore general character, one special character and a rear general character arranged in that order in the registration character string, from the registration character string for each special character, converting each registration special three-character chain into a converted registration special three-character chain including the fore general character, a central general character having the same character type as that of the rear general character and the rear general character in that order, and producing a fore registration two-character chain including the fore general character and the central general character in that order and a rear registration two-character chain including the central general character and the rear general character in that order from each converted registration special three-character chain, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

first occurrence frequency calculating means for calculating a pair of occurrence frequencies of the fore and rear general characters of each registration general two-character chain detected by the registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating a rear occurrence frequency of the rear general character of each registration special three-character chain in the registration character string, setting a central occurrence frequency of the central general character to the rear occurrence frequency of the rear general character placed just after the central general character in each converted registration special three-character chain, calculating a fore occurrence frequency of the fore general character of each registration special three-character chain in the registration character string, determining a set of the fore occurrence frequency and the central occurrence frequency as an occurrence frequency set of each fore registration two-character chain produced by the registration character chain producing means, and determining a set of the central occurrence frequency and the rear occurrence frequency as an occurrence frequency set of each rear registration two-character chain produced by the registration character chain producing means;

registration character chain classifying means for classifying each group of registration general two-character chains, which respectively include the same type of fore general character and the same type of rear general character, detected by the registration character chain detecting means into one general two-character chain type, classifying each group of fore registration two-character chains, which respectively include the same type of fore general character and the same type of central general character, produced by the registration character chain producing means into one fore two-character chain type, and classifying each group of rear registration two-character chains, which respectively include the same type of central general character and the same type of rear general character, produced by the registration character chain producing means into one rear two-character chain type;

first retrieval character chain detecting means for detecting all retrieval general two-character chain existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, converting each retrieval special three-character chain into a converted retrieval special three-character chain including the fore general character, a central general character having the same character type as that of the rear general character and the rear general character in that order to produce a converted retrieval character string from the retrieval character string, and producing a fore retrieval two-character chain including the fore general character and the central general character in that order and a rear retrieval two-character chain including the central general character and the rear general character in that order from each converted retrieval special three-character chain, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear two-character chain types, which are classified by the registration character chain classifying means, corresponding to the retrieval general two-character chains detected by the first retrieval character chain detecting means and the fore and rear retrieval two-character chains detected by the second retrieval character chain detecting means, detecting a retrieval chain order of arranging the retrieval general two-character chains and the fore and rear retrieval two-character chains in the converted retrieval character string, and determining a particular chain order corresponding to the retrieval chain order for the particular general two-character chain types and the particular fore and rear two-character chain types;

collating means for repeatedly receiving the occurrence frequency sets of one particular general two-character chain type, one particular fore two-character chain type or one particular rear two-character chain type specified by the control means from the first occurrence frequency calculating means or the second occurrence frequency calculating means in the particular chain order for the particular general two-character chain types and the particular fore and rear two-character chain types, and performing a collating operation in which the occurrence frequencies of the occurrence frequency sets of the series of particular general two-character chain types and particular fore and rear retrieval special two-character chain types detected by the control means are collated with each other to ascertain a connection between each pair of particular general two-character chain types having particular occurrence frequency sets, a connection between each particular fore two-character chain type having a particular occurrence frequency set and one particular general two-character chain type having a particular occurrence frequency set and a connection between each particular rear two-character chain type having a particular occurrence frequency set and one particular general two-character chain type having a particular occurrence frequency set, and a plurality of particular occurrence frequency sets of the particular two-character chain types are detected on condition that a plurality of particular registration two-character chains having the particular occurrence frequency sets are connected with each other in series in the converted retrieval character string; and character string detecting means for detecting a particular character string agreeing with the retrieval character string from the registration character string according to the series of particular registration two-character chains and the particular occurrence frequency sets detected by the collating means.

62. A character string collating apparatus according to claim 61 in which each special character is a space frequently occurring in the text written in Hangul language or a space frequently occurring in the text written in English to divide words.

63. A character string collating apparatus according to claim 61 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of the first particular general two-character chain type on condition that the occurrence frequency of the fore general character in the particular occurrence frequency set of the first particular general two-character chain type agrees with the occurrence frequency of the rear general character in the particular occurrence frequency set of the second particular general two-character chain type, one occurrence frequency of the fore general character in each occurrence frequency set of one particular fore two-character chain type is collated with an occurrence frequency of the rear general character in a particular occurrence frequency set of one particular general two-character chain type placed just before the particular fore two-character chain type in the particular chain order to determine a particular occurrence frequency set of the particular fore two-character chain type on condition that the occurrence frequency of the fore general character in the particular occurrence frequency set of the particular fore two-character chain type agrees with the occurrence frequency of the rear general character in the particular occurrence frequency set of the particular general two-character chain type, one occurrence frequency of the fore general character in each occurrence frequency set of one particular rear two-character chain type is collated with an occurrence frequency of the rear general character in a particular occurrence frequency set of one particular fore two-character chain type placed just before the particular rear two-character chain type in the particular chain order to determine a particular occurrence frequency set of the particular rear two-character chain type on condition that the occurrence frequency of the fore general character in the particular occurrence frequency set of the particular rear two-character chain type agrees with the occurrence frequency of the rear general character in the particular occurrence frequency set of the particular fore two-character chain type, and one occurrence frequency of the fore general character in each occurrence frequency set of one particular general two-character chain type is collated with an occurrence frequency of the rear general character in a particular occurrence frequency set of one particular rear two-character chain type placed just before the particular general two-character chain type in the particular chain order to determine a particular occurrence frequency set of the particular general two-character chain type on condition that the occurrence frequency of the fore general character in the particular occurrence frequency set of the particular general two-character chain type agrees with the occurrence frequency of the rear general character in the particular occurrence frequency set of the particular rear two-character chain type.

64. A character string collating apparatus according to claim 61, further comprising:

recording means for recording the general two-character chain types, the fore two-character chain types and the rear two-character chain types classified by the registration character chain classifying means, recording the occurrence frequency sets calculated by the first occurrence frequency calculating means for each general two-character chain type, recording the occurrence frequency sets calculated by the second occurrence frequency calculating means for each fore two-character chain type, and recording the occurrence frequency sets calculated by the second occurrence frequency calculating means for each rear two-character chain type, the series of particular general two-character chain types and particular fore and rear special three-character chain types recorded in the recording means being specified by the control means, and the occurrence frequency sets recorded in the recording means being received by the collating means under the control of the control means.

65. A character string collating apparatus according to claim 61 in which a series of special characters arranged in the registration character string or the retrieval character string is detected as a single special character by the registration character chain producing means or the second retrieval character chain detecting means.

66. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration general character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration special character chain detecting means for detecting all registration special two-character chains, respectively including one special character as a fore character and a rear general character or a fore general character and one special character as a rear character arranged in that order in the registration character string, the fore character of each registration special two-character chain placed just after one registration general two-character chain agreeing with the rear general character of the registration general two-character chain, the rear character of each registration special two-character chain placed just before one registration general two-character chain agreeing with the fore general character of the registration general two-character chain, and the rear character of a first registration special two-character chain placed just before a second registration special two-character chain agreeing with the fore character of the second registration special two-character chain;

first occurrence frequency calculating means for calculating a pair of occurrence frequencies of the fore and rear general characters of each registration general two-character chain detected by the registration general character chain detecting means as an occurrence frequency set, the occurrence frequency of each character of a particular type placed in a particular position of the registration character string denoting the number of characters of the same particular type existing in an area between a starting position of the registration character string and the particular position of the registration character string;

second occurrence frequency calculating means for calculating an occurrence frequency of the fore or rear general character and a limited occurrence frequency of the rear or fore special character of each registration special two-character chain detected by the registration special character chain detecting means as an occurrence frequency set, the limited occurrence frequency of each special character being obtained by setting a plurality of N limited values (N is an integer higher than 1) different from each other and lower than or equal to a maximum value as a set of N limited values and allocating the N limited values to each group of N special characters arranged in the registration character string on condition that each limited value selected in a predetermined order from one group of N limited values is allocated as one limited occurrence frequency to one special character selected from one group of N special characters in the order of arranging the special characters in the registration character string;

registration character chain classifying means for classifying each group of registration general two-character chains, which respectively include the same type of fore general character and the same type of rear general character, detected by the registration general character chain detecting means into one general two-character chain type, classifying each group of registration special two-character chains, which respectively include one special character of the same limited occurrence frequency as one fore character, detected by the registration special character chain detecting means into one first special two-character chain type, and classifying each group of registration special two-character chains, which respectively include one special character of the same limited occurrence frequency as one rear character, detected by the registration special character chain detecting means into one second special two-character chain type;

registration special two-character chain table producing means for producing a first special two-character chain table in which a plurality of registration special two-character chains respectively including one special character of the same limited occurrence frequency as one fore character and the occurrence frequency sets of the registration special two-character chains are arranged in the order of arranging the registration special two-character chains in the retrieval character string, and producing a second special two-character chain table in which a plurality of registration special two-character chains respectively including one special character of the same limited occurrence frequency as one rear character and the occurrence frequency sets of the registration special two-character chains are arranged in the order of arranging the registration special two-character chains in the retrieval character string;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special two-character chains, respectively including one special character as a fore character and a rear general character or a fore general character and one special character as a rear character arranged in that order in the retrieval character string, the fore character of each retrieval special two-character chain placed just after one retrieval general two-character chain agreeing with the rear general character of the retrieval general two-character chain, the rear character of each retrieval special two-character chain placed just before one retrieval general two-character chain agreeing with the fore general character of the retrieval general two-character chain, and the rear character of a first retrieval special two-character chain placed just before a second retrieval special two-character chain agreeing with the fore character of the second retrieval special two-character chain;

control means for specifying a plurality of particular general two-character chain types and particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, and determining a particular chain order corresponding to the retrieval chain order for the particular general two-character chain types and the particular special two-character chain types;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation in which a first serial connection between two particular registration general two-character chains corresponding to two particular general two-character chain types adjacent to each other is ascertained according to the occurrence frequency sets of the particular registration general two-character chains, a second serial connection between a particular registration general two-character chain and a particular registration special two-character chain corresponding to one particular general two-character chain type and one particular special two-character chain type adjacent to each other is ascertained according to the occurrence frequency set of the particular registration general two-character chain and the occurrence frequency set of the particular registration special two-character chain, a third serial connection between two particular registration special two-character chains corresponding to one pair of particular special two-character chain types adjacent to each other is ascertained according to the occurrence frequency sets of the particular registration special two-character chains on condition that two limited occurrence frequencies of two special characters of the two registration special two-character chains are equal to each other and duplication numbers for the limited occurrence frequencies are equal to each other, and particular occurrence frequency sets of the series of particular registration two-character chains serially connected with each other are determined, the duplication number for one limited occurrence frequency of a particular registration special two-character chain corresponding to one special two-character chain table produced by the registration special two-character chain table indicating the number of limited occurrence frequencies arranged in an area between a starting position of the special two-character chain table and a particular position of the particular registration special two-character chain; and character string detecting means for detecting a particular character string agreeing with the retrieval character string from the registration character string according to the series of particular registration two-character chains and the particular occurrence frequency sets determined by the collating means.

67. A character string collating apparatus according to claim 66 in which each special character is a space frequently occurring in the text written in Hangul language or a space frequently occurring in the text written in English to divide words.

68. A character string collating apparatus according to claim 66 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of a first particular registration general two-character chain corresponding to the first particular general two-character chain type on condition that the occurrence frequency of the fore general character in the particular occurrence frequency set of the first particular registration general two-character chain agrees with the occurrence frequency of the rear general character in the particular occurrence frequency set of a second particular registration general two-character chain corresponding to the second particular general two-character chain type, one occurrence frequency of the fore general character in each occurrence frequency set of one particular special two-character chain type is collated with an occurrence frequency of the rear general character in a particular occurrence frequency set of one particular general two-character chain type placed just before the particular special two-character chain type in the particular chain order to determine a particular occurrence frequency set of a particular registration special two-character chain corresponding to the particular special two-character chain type on condition that the occurrence frequency of the fore general character in the particular occurrence frequency set of the particular registration special two-character chain agrees with the occurrence frequency of the rear general character in the particular occurrence frequency set of a particular registration general two-character chain corresponding to the particular general two-character chain type, one occurrence frequency of the fore general character in each occurrence frequency set of one particular general two-character chain type is collated with an occurrence frequency of the rear general character in a particular occurrence frequency set of one particular special two-character chain type placed just before the particular general two-character chain type in the particular chain order to determine a particular occurrence frequency set of a particular registration general two-character chain corresponding to the particular general two-character chain type on condition that the occurrence frequency of the fore general character in the particular occurrence frequency set of the particular registration general two-character chain agrees with the occurrence frequency of the rear general character in the particular occurrence frequency set of a particular registration special two-character chain corresponding to the particular special two-character chain type, and one limited occurrence frequency of the fore special character in each occurrence frequency set of a first particular special two-character chain type is collated with an limited occurrence frequency of the rear special character in a particular occurrence frequency set of a second particular special two-character chain type placed just before the first particular special two-character chain type in the particular chain order to determine a particular occurrence frequency set of a first particular registration special two-character chain corresponding to the first particular special two-character chain type on condition that the limited occurrence frequency of the fore special character in the particular occurrence frequency set of the first particular registration special two-character chain agrees with the limited occurrence frequency of the rear special character in the particular occurrence frequency set of a second particular registration special two-character chain corresponding to the second particular special two-character chain type and the duplication numbers for the limited occurrence frequencies are equal to each other.

69. A character string collating apparatus according to claim 66, further comprising:

recording means for recording a general two-character chain table, in which one general two-character chain type classified by the registration character chain classifying means and the occurrence frequency sets of the general two-character chain type calculated by the first occurrence frequency calculating means are listed, for each general two-character chain type, the first special two-character chain table for each value of the limited occurrence frequency and the second special two-character chain table for each value of the limited occurrence frequency, the particular general two-character chain types of the general two-character chain tables and the particular special two-character chain types of the first and second special two-character chain tables being specified by the control means, and the occurrence frequency sets of the two-character chain tables being received by the collating means under the control of the control means.

70. A character string collating apparatus according to claim 66 in which a series of special characters arranged in the registration character string or the retrieval character string is detected as a single special character by the registration special character chain detecting means or the second retrieval character chain detecting means.

71. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration general character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

registration special character chain detecting means for detecting all registration special two-character chains, respectively including one special character as a fore character and a rear general character or a fore general character and one special character as a rear character arranged in that order in the registration character string, the fore character of each registration special two-character chain placed just after one registration general two-character chain agreeing with the rear general character of the registration general two-character chain, the rear character of each registration special two-character chain placed just before one registration general two-character chain agreeing with the fore general character of the registration general two-character chain, and the rear character of a first registration special two-character chain placed just before a second registration special two-character chain agreeing with the fore character of the second registration special two-character chain;

first occurrence frequency calculating means for calculating an occurrence frequency of each general character not adjacent to any special character in the registration character string, setting an occurrence frequency of each general character adjacent to one special character to the same prescribed value, and setting the pair of occurrence frequencies of the fore and rear general characters of each registration general two-character chain detected by the registration general character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

second occurrence frequency calculating means for calculating an occurrence frequency of each special character, setting the pair of occurrence frequencies of one general character and one special character in each registration special two-character chain detected by the registration special character chain detecting means as an occurrence frequency set according to the occurrence frequencies of the general characters obtained by the first occurrence frequency calculating means, the occurrence frequency of each particular special character placed in a particular position of the registration character string denoting the number of special characters existing in an area between a starting position of the registration character string and the particular position of the registration character string;

registration character chain classifying means for classifying each group of registration general two-character chains, which respectively include the same type of fore general character and the same type of rear general character, detected by the registration general character chain detecting means into one general two-character chain type, and classifying each group of registration special two-character chains, which respectively include one special character as one fore character and the same type of rear general character or the same type of fore general character and one special character as one rear character, detected by the registration special character chain detecting means into one special two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting all retrieval special two-character chains, respectively including one special character as a fore character and a rear general character or a fore general character and one special character as a rear character arranged in that order in the retrieval character string, the fore character of each retrieval special two-character chain placed just after one retrieval general two-character chain agreeing with the rear general character of the retrieval general two-character chain, the rear character of each retrieval special two-character chain placed just before one retrieval general two-character chain agreeing with the fore general character of the retrieval general two-character chain, and the rear character of a first retrieval special two-character chain placed just before a second retrieval special two-character chain agreeing with the fore character of the second retrieval special two-character chain;

control means for specifying a plurality of particular general two-character chain types and particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, determining a particular chain order corresponding to the retrieval chain order for the particular general two-character chain types and the particular special two-character chain types, and controlling the first occurrence frequency calculating means and the second occurrence frequency calculating means to output the occurrence frequency sets of the particular general two-character chain types and the particular special two-character chain types arranged in the particular chain order;

special character occurrence counting means for setting a special character occurrence number to a particular occurrence frequency of one special character in a particular occurrence frequency set of one particular special two-character chain type first positioned among the particular special two-character chain types arranged in the particular chain order, and incrementing the special character occurrence number each time the occurrence frequency sets of one particular special two-character chain type corresponding to a particular special character are output from the second occurrence frequency calculating means under the control of the control means after the output of the occurrence frequency sets of another particular special two-character chain type corresponding to one special character different from the particular special character;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation in which a first serial connection between two particular registration general two-character chains corresponding to two particular general two-character chain types adjacent to each other is ascertained according to the occurrence frequency sets of the two registration general two-character chains, a second serial connection between a particular registration general two-character chain and a particular registration special two-character chain corresponding to one particular general two-character chain type and one particular special two-character chain type adjacent to each other is ascertained according to the occurrence frequency set of the particular registration general two-character chain and the occurrence frequency set of the particular registration special two-character chain on condition that the occurrence frequency of one special character of the particular registration special two-character chain agrees with the special character occurrence number set by the special character occurrence counting means, a third serial connection between two particular registration special two-character chains corresponding to two particular special two-character chain types adjacent to each other is ascertained according to the occurrence frequency sets of the particular registration special two-character chains according to the occurrence frequency set of the particular registration special two-character chains on condition that the occurrence frequency of one special character of one particular registration special two-character chain corresponding to one particular special two-character chain type arranged after the other particular special two-character chain type in the particular chain order agrees with the special character occurrence number set by the special character occurrence counting means, and particular occurrence frequency sets of the series of particular registration two-character chains serially connected with each other are determined; and character string detecting means for detecting a particular character string agreeing with the retrieval character string from the registration character string according to the series of particular registration two-character chains and the particular occurrence frequency sets determined by the collating means.

72. A character string collating apparatus according to claim 71 in which each special character is a space frequently occurring in the text written in Hangul language or a space frequently occurring in the text written in English to divide words.

73. A character string collating apparatus according to claim 71 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of a first particular registration general two-character chain corresponding to the first particular general two-character chain type on condition that the occurrence frequency of the fore general character in the particular occurrence frequency set of the first particular registration general two-character chain agrees with the occurrence frequency of the rear general character in the particular occurrence frequency set of a second particular registration general two-character chain corresponding to the second particular general two-character chain type, one occurrence frequency of the fore general character in each occurrence frequency set of one particular special two-character chain type is collated with an occurrence frequency of the rear general character in a particular occurrence frequency set of one particular general two-character chain type placed just before the particular special two-character chain type in the particular chain order to determine a particular occurrence frequency set of a particular registration special two-character chain corresponding to the particular special two-character chain type on condition that the occurrence frequency of the fore general character in the particular occurrence frequency set of the particular registration special two-character chain agrees with the occurrence frequency of the rear general character in the particular occurrence frequency set of a particular registration general two-character chain corresponding to the particular general two-character chain type and the occurrence frequency of the rear special character in the particular occurrence frequency set of the particular registration special two-character chain agrees with the special character occurrence number set by the special character occurrence counting means, one occurrence frequency of the fore special character in each occurrence frequency set of a first particular special two-character chain type is collated with an occurrence frequency of the rear special character in a particular occurrence frequency set of a second particular special two-character chain type placed just before the first particular special two-character chain type in the particular chain order to determine a particular occurrence frequency set of a first particular registration special two-character chain corresponding to the first particular special two-character chain type on condition that the occurrence frequency of the fore special character in the first particular occurrence frequency set of the first particular registration general two-character chain agrees with the occurrence frequency of the rear special character in the particular occurrence frequency set of a second particular registration special two-character chain corresponding to the second particular special two-character chain type, one occurrence frequency of the fore general character in each occurrence frequency set of a first particular special two-character chain type is collated with an occurrence frequency of the rear general character in a particular occurrence frequency set of a second particular special two-character chain type placed just before the first particular special two-character chain type in the particular chain order to determine a particular occurrence frequency set of a first particular registration special two-character chain corresponding to the first particular special two-character chain type on condition that the occurrence frequency of the fore general character in the first particular occurrence frequency set of the first particular registration general two-character chain agrees with the occurrence frequency of the rear general character in the particular occurrence frequency set of a second particular registration special two-character chain corresponding to the second particular special two-character chain type and the occurrence frequency of the rear special character in the particular occurrence frequency set of the first particular registration special two-character chain agrees with the special character occurrence number set by the special character occurrence counting means, and one occurrence frequency of the fore general character in each occurrence frequency set of one particular general two-character chain type is collated with an occurrence frequency of the rear general character in a particular occurrence frequency set of one particular special two-character chain type placed just before the particular general two-character chain type in the particular chain order to determine a particular occurrence frequency set of a particular registration general two-character chain corresponding to the particular general two-character chain type on condition that the occurrence frequency of the fore general character in the particular occurrence frequency set of the particular registration general two-character chain agrees with the occurrence frequency of the rear general character in the particular occurrence frequency set of a particular registration special two-character chain corresponding to the particular special two-character chain type.

74. A character string collating apparatus according to claim 71, further comprising:

recording means for recording the general two-character chain types and the special two-character chain types classified by the registration character chain classifying means, recording the occurrence frequency sets calculated by the first occurrence frequency calculating means for each general two-character chain type, and recording the occurrence frequency sets calculated by the second occurrence frequency calculating means for each special two-character chain type, the series of particular general two-character chain types and particular special two-character chain types recorded in the recording means being specified by the control means, and the occurrence frequency sets recorded in the recording means being received by the collating means under the control of the control means.

75. A character string collating apparatus according to claim 71 in which a series of special characters arranged in the registration character string or the retrieval character string is detected as a single special character by the registration special character chain detecting means or the second retrieval character chain detecting means.

76. A character string collating apparatus for collating a retrieval character string with a registration character string of a text, in which each of a plurality of special characters of the same character type is intermittently arranged in a plurality of general characters classified into a plurality of character types and at least two general characters exist between each pair of special characters, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the fore character of a first registration general two-character chain placed just after a second registration general two-character chain agreeing with the rear general character of the second registration general two-character chain;

second registration character chain detecting means for detecting a registration special two-character chain from the registration character string of the text for each special character, each registration special two-character chain including a fore general character placed two characters before one special character and a rear general character placed just after the special character in the registration character string;

occurrence frequency calculating means for calculating a pair of occurrence frequencies of the fore and rear general characters of each registration general two-character chain detected by the first registration character chain detecting means as an occurrence frequency set, and calculating a pair of occurrence frequencies of the fore and rear general characters of each registration special two-character chain detected by the second registration character chain detecting means as an occurrence frequency set, the occurrence frequency of each particular general character of a particular type placed in a particular position of the registration character string denoting the number of general characters of the same particular type existing in an area between a starting position of the registration character string and the particular position of the registration character string;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the fore character of a first retrieval general two-character chain placed just after a second retrieval general two-character chain agreeing with the rear general character of the second retrieval general two-character chain;

second retrieval character chain detecting means for detecting a retrieval special two-character chain from the retrieval character string for each special character, each retrieval special two-character chain including a fore general character placed two characters before one special character and a rear general character placed just after the special character in the retrieval character string;

control means for specifying a plurality of particular general two-character chain type and a particular special two-character chain types, which are classified by the registration character chain classifying means, corresponding to the retrieval general two-character chains detected by the first retrieval character chain detecting means and the retrieval special two-character chains detected by the second retrieval character chain detecting means, detecting a retrieval chain order of arranging the retrieval general two-character chains and the retrieval special two-character chains in the retrieval character string, and determining a particular chain order corresponding to the retrieval chain order for the particular general two-character chain types and the particular special two-character chain types;

collating means for repeatedly receiving the occurrence frequency sets of one particular general two-character chain type or one particular special two-character chain type specified by the control means from the first occurrence frequency calculating means or the second occurrence frequency calculating means in the particular chain order for the particular general two-character chain types and the particular special two-character chain types, and performing a collating operation for the particular general two-character chain types and the particular special two-character chain types according to the occurrence frequencies of the particular general two-character chain types and the occurrence frequencies of the particular special two-character chain types, detecting a series of particular occurrence frequency sets of the particular general two-character chain types and the particular special two-character chain types on condition that a plurality of particular registration general two-character chains and particular registration special two-character chains having the particular occurrence frequency sets are connected in series in the registration character string; and character string detecting means for detecting a particular character string agreeing with the retrieval character string from the registration character string according to the particular registration general two-character chains, the particular registration special two-character chains, the particular occurrence frequency sets of the particular registration general two-character chains and the particular occurrence frequency sets of the particular registration special two-character chains detected by the collating means.

77. A character string collating apparatus according to claim 76 in which each special character is a space frequently occurring in the text written in Hangul language or a space frequently occurring in the text written in English to divide words.

78. A character string collating apparatus according to claim 76 in which the collating operation performed by the collating means is that one occurrence frequency of the fore general character in each occurrence frequency set of a first particular general two-character chain type is collated with an occurrence frequency of the rear general character in a particular occurrence frequency set of a second particular general two-character chain type placed just before the first particular general two-character chain type in the particular chain order to determine a particular occurrence frequency set of the first particular general two-character chain type on condition that an occurrence frequency of the fore general character in the particular occurrence frequency set of the first particular general two-character chain type agrees with the occurrence frequency of the rear general character in the particular occurrence frequency set of the second particular general two-character chain type, one occurrence frequency of the fore general character in each occurrence frequency set of one particular special two-character chain type is collated with an occurrence frequency of the fore general character in a particular occurrence frequency set of one particular general two-character chain type placed just before the particular special two-character chain type in the particular chain order to determine a particular occurrence frequency set of the particular special two-character chain type on condition that an occurrence frequency of the fore general character in the particular occurrence frequency set of the particular special two-character chain type agrees with the occurrence frequency of the fore general character in the particular occurrence frequency set of the particular general two-character chain type, and one occurrence frequency of the fore general character in each occurrence frequency set of one particular general two-character chain type is collated with an occurrence frequency of the rear general character in a particular occurrence frequency set of one particular special two-character chain type placed just before the particular general two-character chain type in the particular chain order to determine a particular occurrence frequency set of the particular general two-character chain type on condition that an occurrence frequency of the fore general character in the particular occurrence frequency set of the particular general two-character chain type agrees with the occurrence frequency of the rear general character in the particular occurrence frequency set of the particular special two-character chain type.

79. A character string collating apparatus according to claim 76, further comprising:

recording means for recording the general two-character chain types and the special two-character chain types classified by the registration character chain classifying means, the occurrence frequency sets calculated by the occurrence frequency calculating means for each general two-character chain type and the occurrence frequency sets calculated by the occurrence frequency calculating means for each special two-character chain type, the particular general two-character chain types and the particular special two-character chain types recorded in the recording means being specified by the control means, and the occurrence frequency sets recorded in the recording means being received by the collating means under the control of the control means.

80. A character string collating apparatus according to claim 76 in which a series of special characters arranged in the registration character string or the retrieval character string is detected as a single special character by the second registration character chain detecting means or the second retrieval character chain detecting means.

81. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character chain detecting means for detecting all registration general two-character chains existing in the registration character string, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special character chain from the registration character string for each special character, each registration special character chain including a fore general character, one special character and a rear general character arranged in that order in the registration character string, the rear general character of one registration general two-character chain agreeing with the fore general character of one registration special character chain placed just after the registration general two-character chain in the registration character string, and the rear general character of one registration special character chain agreeing with the fore general character of one registration general two-character chain placed just after the registration special character chain in the registration character string;

position number setting means for numbering all general characters of the retrieval character string in the order of arranging the general characters in the retrieval character string to allocate an occurrence position number to each general character, and setting a position number of each character chain representing the general two-character chains and the special character chains detected by the first registration character chain detecting means and the second registration character chain detecting means to the occurrence position number of the fore or rear general character of the character chain;

registration character chain classifying means for classifying each group of registration general two-character chains, which respectively include the same type of fore general character and the same type of rear general character, detected by the first registration character chain detecting means into one general two-character chain type, and classifying each group of registration special character chains, which respectively include the same type of fore general character and the same type of rear general character, detected by the second registration character chain detecting means into one special character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special character chain from the retrieval character string for each special character, each retrieval special character chain including a fore general character, one special character and a rear general character arranged in that order in the retrieval character string, the rear general character of one retrieval general two-character chain agreeing with the fore general character of one retrieval special character chain placed just after the retrieval general two-character chain in the retrieval character string, and the rear general character of one retrieval special character chain agreeing with the fore general character of one retrieval general two-character chain placed just after the retrieval special character chain in the retrieval character string;

control means for specifying a plurality of particular general two-character chain type and a particular special character chain types, which are classified by the registration character chain classifying means, corresponding to the retrieval general two-character chains detected by the first retrieval character chain detecting means and the retrieval special character chains detected by the second retrieval character chain detecting means, detecting a retrieval chain order of arranging the retrieval general two-character chains and the retrieval special character chains in the retrieval character string, and determining a particular chain order corresponding to the retrieval chain order for the particular general two-character chain types and the particular special character chain types;

collating means for repeatedly receiving the position numbers of one particular general two-character chain type or one particular special character chain type specified by the control means from the position number setting means in the particular chain order for the particular general two-character chain types and the particular special character chain types, and performing a collating operation for the particular general two-character chain types and the particular special character chain types according to the position numbers of the particular general two-character chain types and the position numbers of the particular special character chain types, detecting a series of particular position numbers of the particular general two-character chain types and the particular special character chain types on condition that a plurality of particular registration general two-character chains and particular registration special character chains having the particular position numbers are connected in series in the registration character string; and character string detecting means for detecting a particular character string agreeing with the retrieval character string from the registration character string according to the particular registration general two-character chains, the particular registration special character chains, the particular position numbers of the particular registration general two-character chains and the particular position numbers of the particular registration special character chains detected by the collating means.

82. A character string collating apparatus according to claim 81 in which each special character is a space frequently occurring in the text written in Hangul language or a space frequently occurring in the text written in English to divide words.

83. A character string collating apparatus according to claim 81 in which the collating operation performed by the collating means is that each position number of either a first particular general two-character chain type or a first particular special character chain type is collated with a particular position number of either a second particular general two-character chain type or a second particular special character chain type placed just before the first particular general two-character chain type or the first particular special character chain type in the particular chain order to determine a particular position number of either the first particular general two-character chain type or the first particular special character chain type on condition that the particular position number of either the first particular general two-character chain type or the first particular special character chain type is higher than the particular position number of either the second particular general two-character chain type or the second particular special character chain type by one.

84. A character string collating apparatus according to claim 81, further comprising:

recording means for recording the general two-character chain types and the special character chain types classified by the registration character chain classifying means, the position numbers set by the position number setting means for each general two-character chain type and special character chain type, the particular general two-character chain types and the particular special character chain types recorded in the recording means being specified by the control means, and the position numbers recorded in the recording means being received by the collating means under the control of the control means.

85. A character string collating apparatus according to claim 81 in which an identifier is attached to the special character chain types to distinguish the special character chain types from the general two-character chain types.

86. A character string collating apparatus according to claim 81 in which a series of special characters arranged in the registration character string or the retrieval character string is detected as a single special character by the second registration character chain detecting means or the second retrieval character chain detecting means.

87. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each special character arranged in the registration character string into a symbolic character according to a general-symbolic character type relationship between a character type of the symbolic character and a character type of a general character spaced at N characters (N is an integral number equal to or higher than 1) apart from the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

position number setting means for numbering all general characters and all symbolic characters of the converted retrieval character string in the order of arranging the general characters and the symbolic characters in the converted retrieval character string to allocate an occurrence position number to each general character or symbolic character, and setting a position number of each registration two-character chain detected by the registration character chain detecting means to the occurrence position number of the fore character or the rear character of the registration two-character chain;

registration character chain classifying means for classifying each group of registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by converting each special character arranged in the retrieval character string into a symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the position numbers of one particular two-character chain type specified by the control means from the position number setting means in the particular chain order for the particular two-character chain types, performing a collating operation for the particular two-character chain types according to the position numbers of the particular two-character chain types, and detecting a series of particular position numbers of a series of particular registration two-character chains corresponding to the particular two-character chain types arranged in the particular chain order on condition that the series of particular registration two-character chains having the particular position numbers are connected in series in the converted registration character string; and character string detecting means for detecting a particular character string agreeing with the retrieval character string from the registration character string according to the particular registration two-character chains and the particular position numbers of the particular registration two-character chains detected by the collating means.

88. A character string collating apparatus according to claim 87 in which each special character is a space frequently occurring in the text written in Hangul language or a space frequently occurring in the text written in English to divide words.

89. A character string collating apparatus according to claim 87 in which the collating operation performed by the collating means is that each position number of a first particular two-character chain type is collated with a particular position number of a second particular two-character chain type placed just before the first particular two-character chain type in the particular chain order to determine a particular position number of the first particular two-character chain type on condition that the particular position number of the first particular two-character chain type is higher than the particular position number of the second particular two-character chain type by one.

90. A character string collating apparatus according to claim 87, further comprising:

recording means for recording the two-character chain types classified by the registration character chain classifying means and the position numbers set by the position number setting means for each two-character chain type, the particular two-character chain types recorded in the recording means being specified by the control means, and the position numbers of the particular two-character chain types recorded in the recording means being received by the collating means under the control of the control means.

91. A character string collating apparatus according to claim 87 in which a series of special characters arranged in the registration character string or the retrieval character string is converted into one symbolic character according to a character type of a general character spaced at N characters apart from the series of special characters by the registration character string converting means or the retrieval character string converting means.

92. A character string collating apparatus according to claim 87 in which the converted registration character string is produced from the registration character string by the registration character string converting means by converting each special character arranged in the registration character string into a symbolic character determined according to a type of general character adjacent to the special character.

93. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by replacing each special character arranged in a registration character string of the text with a first symbolic character and a second symbolic character according to a general-symbolic character type relationship in which a character type of the first symbolic character corresponds to a character type of one general character adjacent to the special character and a character type of the second symbolic character corresponds to a character type of the other general character adjacent to the special character;

registration character chain detecting means for detecting all registration two-character chains existing in the converted registration character string produced by the registration character string converting means, each registration two-character chain including a fore general character or a fore symbolic character and a rear general character or a rear symbolic character arranged just after the fore character in the converted registration character string;

position number setting means for numbering all general characters and all symbolic characters of the converted retrieval character string in the order of arranging the general characters and the symbolic characters in the converted retrieval character string to allocate an occurrence position number to each general character or symbolic character, and setting a position number of each registration two-character chain detected by the registration character chain detecting means to the occurrence position number of the fore character or the rear character of the registration two-character chain;

registration character chain classifying means for classifying the registration two-character chains, which respectively include the same type of fore general character or the same type of fore symbolic character and the same type of rear general character or the same type of rear symbolic character, detected by the registration character chain detecting means into one two-character chain type;

retrieval character string converting means for producing a converted retrieval character string from the retrieval character string by replacing each special character arranged in the retrieval character string with a symbolic character and another symbolic character according to the general-symbolic character type relationship;

retrieval character chain detecting means for detecting all retrieval two-character chains existing in the converted retrieval character string, each retrieval two-character chain including a fore general character or a fore symbolic character and a rear general character or a rear symbolic character arranged just after the fore character in the converted retrieval character string;

control means for specifying a plurality of particular two-character chain type, which are classified by the registration character chain classifying means, corresponding to the retrieval two-character chains detected by the retrieval character chain detecting means, detecting a retrieval chain order of arranging the retrieval two-character chains in the converted retrieval character string, and determining a particular chain order corresponding to the retrieval chain order for the particular two-character chain types;

collating means for repeatedly receiving the position numbers of one particular two-character chain type specified by the control means from the position number setting means in the particular chain order for the particular two-character chain types, performing a collating operation for the particular two-character chain types according to the position numbers of the particular two-character chain types, and detecting a series of particular position numbers of a series of particular registration two-character chains corresponding to the particular two-character chain types arranged in the particular chain order on condition that the series of particular registration two-character chains having the particular position numbers are connected in series in the converted registration character string; and character string detecting means for detecting a particular character string agreeing with the retrieval character string from the registration character string according to the particular registration two-character chains and the particular position numbers of the particular registration two-character chains detected by the collating means.

94. A character string collating apparatus according to claim 93 in which each special character is a space frequently occurring in the text written in Hangul language or a space frequently occurring in the text written in English to divide words.

95. A character string collating apparatus according to claim 93 in which the collating operation performed by the collating means is that each position number of a first particular two-character chain type is collated with a particular position number of a second particular two-character chain type placed just before the first particular two-character chain type in the particular chain order to determine a particular position number of the first particular two-character chain type on condition that the particular position number of the first particular two-character chain type is higher than the particular position number of the second particular two-character chain type by one.

96. A character string collating apparatus according to claim 93, further comprising:

recording means for recording the two-character chain types classified by the registration character chain classifying means and the position numbers calculated by the position number setting means for each two-character chain type, the particular two-character chain types recorded in the recording means being specified by the control means, and the position numbers of the particular two-character chain types recorded in the recording means being received by the collating means under the control of the control means.

97. A character string collating apparatus according to claim 93 in which a series of special characters arranged in the registration character string or the retrieval character string is replaced with a particular type of symbolic character determined according to a type of one general character adjacent to the series of special characters and another particular type of symbolic character determined according to a type of the other general character adjacent to the series of special characters.

98. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special three-character chain, including a fore general character, one special character and a rear general character arranged in that order in the registration character string, from the registration character string for each special character, converting each registration special three-character chain into a converted registration special three-character chain including the fore general character, a central general character having the same character type as that of the rear general character and the rear general character in that order, and decomposing each converted registration special three-character chain into a fore registration two-character chain including the fore general character and the central general character as a rear general character and a rear registration two-character chain including the central general character as a fore general character and the rear general character, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

position number setting means for numbering all general characters of the retrieval character string in the order of arranging the general characters in the retrieval character string to allocate an occurrence position number to each general character, setting an occurrence position number of the fore general character of each rear two-character chain detected by the second registration character chain detecting means to that of the rear general character of the rear two-character chain, and setting a position number of each registration two-character chain detected by the first registration character chain detecting means and the second registration character chain detecting means to the occurrence position number of the fore general character or the rear general character of the registration two-character chain;

registration character chain classifying means for classifying each group of registration general two-character chains, which respectively include the same type of fore general character and the same type of rear general character, detected by the first registration character chain detecting means into one general two-character chain type, classifying each group of fore registration two-character chains, which respectively include the same type of fore general character and the same type of central general character, detected by the second registration character chain detecting means into one fore two-character chain type, and classifying each group of rear registration two-character chains, which respectively include the same type of central general character and the same type of rear general character, detected by the second registration character chain detecting means into one rear two-character chain type;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, converting each retrieval special three-character chain into a converted retrieval special three-character chain including the fore general character to produce a converted retrieval character string from the retrieval character string, a central general character having the same character type as that of the rear general character and the rear general character, and decomposing each converted retrieval special three-character chain into a fore retrieval two-character chain including the fore general character and the central general character as a rear character and a rear retrieval two-character chain including the central general character as a fore character and the rear general character, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular fore and rear two-character chain types, which are classified by the registration character chain classifying means, corresponding to the retrieval general two-character chains detected by the first retrieval character chain detecting means and the fore and rear retrieval two-character chains detected by the second retrieval character chain detecting means, detecting a retrieval chain order of arranging the retrieval general two-character chains and the fore and rear retrieval two-character chains in the converted retrieval character string, and determining a particular chain order corresponding to the retrieval chain order for the particular general two-character chain types and the particular fore and rear two-character chain types;

collating means for repeatedly receiving the position numbers of one particular general two-character chain type, one particular fore two-character chain type or one particular rear two-character chain type specified by the control means from the position number setting means in the particular chain order for the particular general two-character chain types and the particular fore and rear two-character chain types, and performing a collating operation in which the position numbers of the series of particular general two-character chain types and particular fore and rear retrieval special two-character chain types detected by the control means are collated with each other to ascertain a connection between each pair of particular two-character chain types having particular position numbers, and a plurality of particular position numbers of the particular two-character chain types are detected on condition that a plurality of particular registration two-character chains having the particular position numbers are connected with each other in series in the converted retrieval character string; and character string detecting means for detecting a particular character string agreeing with the retrieval character string from the registration character string according to the series of particular registration two-character chains and the particular position numbers detected by the collating means.

99. A character string collating apparatus according to claim 98 in which each special character is a space frequently occurring in the text written in Hangul language or a space frequently occurring in the text written in English to divide words.

100. A character string collating apparatus according to claim 98 in which the collating operation performed by the collating means is that each position number of a first particular general two-character chain type is collated with a particular position number of a second particular general two-character chain type placed just before the first particular general two-character chain type in the particular chain order to determine a particular position number of the first particular general two-character chain type on condition that the particular position number of the first particular general two-character chain type is higher than the particular position number of the second particular general two-character chain type by one, each position number of one particular fore two-character chain type is collated with a particular position number of one particular general two-character chain type placed just before the particular fore two-character chain type in the particular chain order to determine a particular position number of the particular fore two-character chain type on condition that the particular position number of the particular fore two-character chain type is higher than the particular position number of the particular general two-character chain type by one, each position number of one particular rear two-character chain type is collated with a particular position number of one particular fore two-character chain type placed just before the particular rear two-character chain type in the particular chain order to determine a particular position number of the particular rear two-character chain type on condition that the particular position number of the particular rear two-character chain type is higher than the particular position number of the particular fore two-character chain type by one in cases where a position number of each registration two-character chain is set to the occurrence position number of the fore general character of the registration two-character chain, each position number of one particular rear two-character chain type is collated with a particular position number of one particular fore two-character chain type placed just before the particular rear two-character chain type in the particular chain order to determine a particular position number of the particular rear two-character chain type on condition that the particular position number of the particular rear two-character chain type agrees with the particular position number of the particular fore two-character chain type in cases where a position number of each registration two-character chain is set to the occurrence position number of the rear general character of the registration two-character chain, and each position number of one particular general two-character chain type is collated with a particular position number of one particular rear two-character chain type placed just before the particular general two-character chain type in the particular chain order to determine a particular position number of the particular general two-character chain type on condition that the particular position number of the particular general two-character chain type agrees with the particular position number of the particular rear two-character chain type.

101. A character string collating apparatus according to claim 98, further comprising:

recording means for recording the general two-character chain types, the fore two-character chain types and the rear two-character chain types classified by the registration character chain classifying means, recording the position numbers set by the position number setting means for the general two-character chain types and the fore and rear two-character chain types, the series of particular general two-character chain types and particular fore and rear two-character chain types recorded in the recording means being specified by the control means, and the position numbers recorded in the recording means being received by the collating means under the control of the control means.

102. A character string collating apparatus according to claim 98 in which a series of special characters arranged in the registration character string or the retrieval character string is detected as a single special character by the second registration character chain detecting means or the second retrieval character chain detecting means.

103. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

first registration character chain detecting means for detecting all registration general two-character chains existing in the registration character string of the text, each registration general two-character chain including a fore general character and a rear general character arranged just after the fore general character in the registration character string, and the rear general character of a first registration general two-character chain placed just before a second registration general two-character chain in the registration character string agreeing with the fore general character of the second registration general two-character chain;

second registration character chain detecting means for detecting a registration special three-character chain, including a fore general character, one special character and a rear general character arranged in that order in the registration character string, from the registration character string for each special character, and decomposing each registration special three-character chain into a first registration two-character chain including the fore general character and the rear general character, a second registration two-character chain including the fore general character and the special character as a rear character and a third registration two-character chain including the special character as a fore character and the rear general character, the first registration two-character chain, the second registration two-character chain and the third registration two-character chain in each registration special three-character chain being arranged in that order in the registration character string, the rear general character of one registration general two-character chain placed just before one registration special three-character chain in the registration character string agreeing with the fore general character of the registration special three-character chain, and the fore general character of one registration general two-character chain placed just after one registration special three-character chain in the registration character string agreeing with the rear general character of the registration special three-character chain;

position number setting means for numbering all general characters of the retrieval character string in the order of arranging the general characters in the retrieval character string to allocate an occurrence position number to each general character, setting a position number of each registration general two-character chain detected by the first registration character chain detecting means to the occurrence position number of the fore general character of the registration general two-character chain, setting a position number of each first registration two-character chain detected by the second registration character chain detecting means to the occurrence position number of the fore general character of the first registration two-character chain, setting a position number of each second registration two-character chain detected by the second registration character chain detecting means to a fixed value, setting a position number of each third registration two-character chain detected by the second registration character chain detecting means to the occurrence position number of the rear general character of the third registration two-character chain;

registration character chain classifying means for classifying each group of registration general two-character chains, which respectively include the same type of fore general character and the same type of rear general character, detected by the first registration character chain detecting means into one general two-character chain type, classifying each group of first registration two-character chains, which respectively include the same type of fore general character and the same type of rear general character, detected by the second registration character chain detecting means into one first two-character chain type, classifying each group of second registration two-character chains, which respectively include the same type of fore general character, detected by the second registration character chain detecting means into one second two-character chain type, and classifying each group of third registration two-character chains, which respectively include the same type of rear general character, detected by the second registration character chain detecting means into one third two-character chain type;

registration two-character chain arrangement setting means for classifying the first registration two-character chains and the second registration two-character chains detected by the second registration character chain detecting means into a plurality of groups of first and second registration two-character chains respectively having the same type of fore character, and arranging the first and second registration two-character chains of each group in the order of arranging the first and second registration two-character chains in the registration character string;

first retrieval character chain detecting means for detecting all retrieval general two-character chains existing in the retrieval character string, each retrieval general two-character chain including a fore general character and a rear general character arranged just after the fore general character in the retrieval character string, and the rear general character of a first retrieval general two-character chain placed just before a second retrieval general two-character chain in the retrieval character string agreeing with the fore general character of the second retrieval general two-character chain;

second retrieval character chain detecting means for detecting a retrieval special three-character chain, including a fore general character, one special character and a rear general character arranged in that order in the retrieval character string, from the retrieval character string for each special character, and decomposing each retrieval special three-character chain into a first retrieval two-character chain including the fore general character and the rear general character, a second retrieval two-character chain including the fore general character and the special character as a rear character and a third retrieval two-character chain including the special character as a fore character and the rear general character, the first retrieval two-character chain, the second retrieval two-character chain and the third retrieval two-character chain in each retrieval special three-character chain being arranged in that order in the retrieval character string, the rear general character of one retrieval general two-character chain placed just before one retrieval special three-character chain in the retrieval character string agreeing with the fore general character of the retrieval special three-character chain, and the fore general character of one retrieval general two-character chain placed just after one retrieval special three-character chain in the retrieval character string agreeing with the rear general character of the retrieval special three-character chain;

control means for specifying a plurality of particular general two-character chain types and particular first, second and third two-character chain types, which are classified by the retrieval character chain classifying means, corresponding to the retrieval general two-character chains detected by the first retrieval character chain detecting means and the first, second and third retrieval two-character chains detected by the second retrieval character chain detecting means, detecting a retrieval chain order of arranging the retrieval general two-character chains and the first, second and third retrieval two-character chains in the retrieval character string, and determining a particular chain order corresponding to the retrieval chain order for the particular general two-character chain types and the particular first, second and third two-character chain types;

collating means for repeatedly receiving the position numbers of one particular general two-character chain type, or one group of particular first, second and third two-character chain types specified by the control means from the position number setting means in the particular chain order for the particular general two-character chain types and the particular first, second and third two-character chain types, and performing a collating operation in which the position numbers of the series of particular general two-character chain types and particular first, second and third retrieval special two-character chain types detected by the control means are collated with each other to ascertain a connection between each pair of particular two-character chain types having particular position numbers, and a plurality of particular position numbers of the particular two-character chain types are detected on condition that a plurality of particular retrieval two-character chains having the particular position numbers are connected with each other in series in the retrieval character string; and character string detecting means for detecting a particular character string agreeing with the retrieval character string from the registration character string according to the series of particular registration two-character chains and the particular position numbers detected by the collating means.

104. A character string collating apparatus according to claim 103 in which each special character is a space frequently occurring in the text written in Hangul language or a space frequently occurring in the text written in English to divide words.

105. A character string collating apparatus according to claim 103 in which the collating operation performed by the collating means is that each position number of a first particular general two-character chain type is collated with a particular position number of a second particular general two-character chain type placed just before the first particular general two-character chain type in the particular chain order to determine a particular position number of a particular general two-character chain corresponding to the first particular general two-character chain type on condition that the particular position number of the particular general two-character chain is higher than the particular position number of a particular general two-character chain corresponding to the second particular general two-character chain type by one, each position number of one particular first two-character chain type is collated with a particular position number of one particular general two-character chain type placed just before the particular first two-character chain type in the particular chain order to determine a particular position number of a particular first two-character chain corresponding to the particular first two-character chain type, on condition that the particular position number of the particular first two-character chain is higher than the particular position number of a particular general two-character chain corresponding to the particular general two-character chain type by one, and to determine a particular position number of a particular second two-character chain arranged just after the particular first two-character chain by the registration two-character chain arrangement setting means, each position number of one particular third two-character chain type is collated with the particular position number of the particular first two-character chain corresponding to the particular first two-character chain type to determine a particular position number of a particular third two-character chain corresponding to the particular third two-character chain type on condition that the particular position number of the particular third two-character chain is higher than the particular position number of the particular first two-character chain by one, and each position number of one particular general two-character chain type is collated with the particular position number of the particular first two-character chain corresponding to the particular first two-character chain type placed just before the particular general two-character chain type to determine a particular position number of a particular general two-character chain corresponding to the particular general two-character chain type on condition that the particular position number of the particular general two-character chain is higher than the particular position number of the particular first two-character chain by one.

106. A character string collating apparatus according to claim 103, further comprising:

recording means for recording the general two-character chain types, the first two-character chain types, the second two-character chain types and the third two-character chain types classified by the registration character chain classifying means, recording the position numbers set by the position number setting means for the general two-character chain types and the first, second and third two-character chain types, the series of particular general two-character chain types and particular first, second and third two-character chain types recorded in the recording means being specified by the control means, and the position numbers recorded in the recording means being received by the collating means under the control of the control means.

107. A character string collating apparatus according to claim 103 in which a series of special characters arranged in the registration character string or the retrieval character string is detected as a single special character by the second registration character chain detecting means or the second retrieval character chain detecting means.

108. A character string collating apparatus for collating a retrieval character string with a registration character string of a text, in which each of a plurality of special characters of the same character type is intermittently arranged in a plurality of general characters classified into a plurality of character types, to retrieve a particular character string agreeing with the retrieval character string from the registration character string, comprising:

registration character string converting means for producing a converted registration character string from the registration character string by converting each pair of one special character and a general character placed just after the special character into a type of symbolic character determined in correspondence to a type of the general character;

first registration character chain detecting means for detecting all registration first two-character chains, respectively including a fore general character and a rear general character or a rear symbolic character arranged just after the fore general character, from the converted registration character string, and detecting a registration second two-character chain, including a fore general character placed two characters before one symbolic character and the symbolic character as a rear character, from the converted registration character string for each symbolic character;

second registration character chain detecting means for detecting a registration special two-character chain, including a fore symbolic character and a rear general character arranged in that order, from the converted registration character string for each symbolic character;

position number setting means for numbering all general characters and symbolic characters of the converted retrieval character string produced by the registration character string converting means in the order of arranging the general characters and symbolic characters in the converted retrieval character string to allocate an occurrence position number to each general character and symbolic character, setting a position number of each registration two-character chain detected by the first registration character chain detecting means to the occurrence position number of the fore general character of the registration two-character chain, and setting a position number of each registration special two-character chain detected by the second registration character chain detecting means to the occurrence position number of the fore symbolic character of the registration special two-character chain;

two-character chain table producing means for arranging each group of first and second two-character chains respectively including the same type of fore general character and one group of special two-character chains respectively including one type of symbolic character determined in correspondence to the type of fore general character in one two-character chain table to produce the two-character chain table for each type of fore general character;

retrieval character string converting means for producing a converted retrieval character string from the retrieval character string by converting each pair of one special character and a general character placed just after the special character into a type of symbolic character determined in correspondence to a type of the general character in the same manner as the conversion performed by the registration character string converting means;

first retrieval character chain detecting means for detecting all retrieval first two-character chains, respectively including a fore general character and a rear general character or a rear symbolic character arranged just after the fore general character, from the converted retrieval character string produced by the retrieval character string converting means, and detecting a retrieval second two-character chain, including a fore general character placed two characters before one symbolic character and the symbolic character as a rear character, from the converted retrieval character string for each symbolic character;

second retrieval character chain detecting means for detecting a retrieval special two-character chain, including a fore symbolic character and a rear general character arranged in that order, from the converted retrieval character string produced by the retrieval character string converting means for each symbolic character;

control means for specifying a particular group of registration two-character chains respectively agreeing with one retrieval two-character chain detected by the first retrieval character chain detecting means or the second retrieval character chain detecting means for each retrieval two-character chain, detecting a retrieval chain order of arranging the retrieval first and second two-character chains and the retrieval special two-character chains in the retrieval character string, and determining a particular chain order corresponding to the retrieval chain order for the particular groups of registration two-character chains;

collating means for repeatedly receiving position numbers of the particular group of registration two-character chains specified by the control means from the position number setting means, and performing a collating operation in which each of the position numbers of one particular group of registration two-character chains Tc1 is collated with a particular position number of a particular registration two-character chain Tc2 received just before the particular group of registration two-character chains Tc1 in the particular chain order to detect a particular registration two-character chain Tc1 having a particular position number on condition that the particular registration two-character chain Tc1 is connected with the particular registration two-character chain Tc2 in the converted registration character string; and character string detecting means for detecting a particular character string agreeing with the retrieval character string from the registration character string according to the series of particular registration two-character chains Tc1 and the particular position numbers detected by the collating means in the particular chain order.

109. A character string collating apparatus according to claim 108 in which each special character is a space frequently occurring in the text written in Hangul language or a space frequently occurring in the text written in English to divide words.

110. A character string collating apparatus according to claim 108 in which the collating operation performed by the collating means is that each position number of the particular group of first two-character chains Tc1 is collated with a particular position number of a particular first two-character chain Tc2 placed just before the particular group of first two-character chains Tc1 in the particular chain order to determine a particular position number of a particular first two-character chain Tc1 on condition that the particular position number of the particular first two-character chain Tc1 is higher than the particular position number of the particular first two-character chain Tc2 by one, each position number of the particular group of second two-character chains Tc1 is collated with a particular position number of a particular first two-character chain Tc2 placed just before the particular group of second two-character chains Tc1 in the particular chain order to determine a particular position number of a particular second two-character chain Tc1 on condition that the particular position number of the particular second two-character chain Tc1 agrees with the particular position number of the particular first two-character chain type Tc2, each position number of the particular group of special two-character chains Tc1 is collated with a particular position number of a particular first two-character chain Tc2 placed just before the particular group of special two-character chains Tc1 in the particular chain older to determine a particular position number of a particular special two-character chain Tc1 on condition that the particular position number of the particular special two-character chain Tc1 is higher than the particular position number of the particular first two-character chain type Tc2 by one, each position number of the particular group of special two-character chains Tc1 is collated with a particular position number of a particular second two-character chain Tc2 placed just before the particular group of special two-character chains Tc1 in the particular chain order to determine a particular position number of a particular special two-character chain Tc1 on condition that the particular position number of the particular special two-character chain Tc1 is higher than the particular position number of the particular second two-character chain type Tc2 by two, and each position number of the particular group of first two-character chains Tc1 is collated with a particular position number of a particular special two-character chain Tc2 placed just before the particular group of first two-character chains Tc1 in the particular chain order to determine a particular position number of a particular first two-character chain Tc1 on condition that the particular position number of the particular first two-character chain Tc1 is higher than the particular position number of the particular special two-character chain type Tc2 by one.

111. A character string collating apparatus according to claim 108, further comprising:

recording means for recording the registration first two-character chains, the registration second two-character chains and the registration special two-character chains detected by the first registration character chain detecting means and the second registration character chain detecting means, recording the position numbers set by the position number setting means for the registration first and second two-character chains and the registration special two-character chains, the particular groups of registration two-character chains recorded in the recording means being specified by the control means in the particular chain order, and the position numbers recorded in the recording means being received by the collating means under the control of the control means.

112. A character string collating apparatus according to claim 108 in which a series of special characters arranged in the registration character string or the retrieval character string is detected as a single special character by the second registration character chain detecting means or the second retrieval character chain detecting means.

\* \* \* \* \*